(12) United States Patent
Nielsen et al.

(10) Patent No.: US 8,467,969 B2
(45) Date of Patent: Jun. 18, 2013

(54) MARKING APPARATUS HAVING OPERATIONAL SENSORS FOR UNDERGROUND FACILITY MARKING OPERATIONS, AND ASSOCIATED METHODS AND SYSTEMS

(75) Inventors: Steven Nielsen, North Palm Beach, FL (US); Curtis Chambers, Palm Beach Gardens, FL (US); Jeffrey Farr, Jupiter, FL (US)

(73) Assignee: Certusview Technologies, LLC, Palm Beach Gardens, FL (US)

( * ) Notice: Subject to any disclaimer, the term of this patent is extended or adjusted under 35 U.S.C. 154(b) by 187 days.

(21) Appl. No.: 12/797,202

(22) Filed: Jun. 9, 2010

(65) Prior Publication Data

US 2010/0255182 A1     Oct. 7, 2010

Related U.S. Application Data

(63) Continuation of application No. 12/703,958, filed on Feb. 11, 2010, and a continuation-in-part of application No. 12/568,087, filed on Sep. 28, 2009, and a continuation-in-part of application No. 12/539,497, filed on Aug. 11, 2009, now Pat. No. 8,280,631.

(60) Provisional application No. 61/151,574, filed on Feb. 11, 2009, provisional application No. 61/232,112, filed on Aug. 7, 2009, provisional application No. 61/235,519, filed on Aug. 20, 9, provisional application No. 61/102,205, filed on Oct. 2, 2008, provisional application No. 61/102,151, filed on Oct. 2, 2008.

(30) Foreign Application Priority Data

Feb. 10, 2010 (CA) .................................. 2691707

(51) Int. Cl.
*G01C 21/00* (2006.01)

(52) U.S. Cl.
USPC ............................ 701/540; 701/541; 427/137

(58) Field of Classification Search
USPC .................................. 701/540, 541; 427/137
See application file for complete search history.

(56) References Cited

U.S. PATENT DOCUMENTS

| 3,871,557 A | 3/1975 | Smrt |
| 3,972,038 A | 7/1976 | Fletcher et al. |

(Continued)

FOREIGN PATENT DOCUMENTS

| CA | 2623761 | 10/2008 |
| CA | 2623466 | 6/2011 |

(Continued)

OTHER PUBLICATIONS

U.S. Appl. No. 13/686,262, filed Nov. 27, 2012, Nielsen et al.

(Continued)

*Primary Examiner* — Mark Hellner
(74) *Attorney, Agent, or Firm* — Foley & Lardner LLP; Joseph Teja, Jr.

(57) ABSTRACT

Methods, apparatus and systems for performing a marking operation to mark a presence or absence of at least one underground facility using a marking device. Marking material is dispensed onto a target surface via actuation of an actuation system of the marking device. A location tracking system detects a location of the marking device. One or more input devices of the marking device detect(s) one or more operating conditions of the marking device, and marking information is logged into local memory of the marking device. In one aspect, at least some operating information relating to the one or more detected conditions of the marking device are included in the marking information logged into memory.

52 Claims, 30 Drawing Sheets

U.S. PATENT DOCUMENTS

| | | |
|---|---|---|
| 3,974,491 A | 8/1976 | Sipe |
| 3,988,922 A | 11/1976 | Clark et al. |
| 4,258,320 A | 3/1981 | Schonstedt |
| 4,387,340 A | 6/1983 | Peterman |
| 4,388,592 A | 6/1983 | Schonstedt |
| 4,520,317 A | 5/1985 | Peterman |
| 4,536,710 A | 8/1985 | Dunham |
| 4,539,522 A | 9/1985 | Schonstedt |
| 4,590,425 A | 5/1986 | Schonstedt |
| 4,623,282 A | 11/1986 | Allen |
| 4,639,674 A | 1/1987 | Rippingale |
| 4,712,094 A | 12/1987 | Bolson, Sr. |
| 4,747,207 A | 5/1988 | Schonstedt et al. |
| 4,803,773 A | 2/1989 | Schonstedt |
| 4,818,944 A | 4/1989 | Rippingale |
| 4,839,623 A | 6/1989 | Schonstedt et al. |
| 4,839,624 A | 6/1989 | Schonstedt |
| 4,873,533 A | 10/1989 | Oike |
| 4,899,293 A | 2/1990 | Dawson et al. |
| 4,989,151 A | 1/1991 | Nuimura |
| 5,001,430 A | 3/1991 | Peterman et al. |
| 5,006,806 A | 4/1991 | Rippingale et al. |
| 5,014,008 A | 5/1991 | Flowerdew |
| 5,017,873 A | 5/1991 | Rippingale et al. |
| 5,025,150 A | 6/1991 | Oldham et al. |
| 5,043,666 A | 8/1991 | Tavernetti et al. |
| 5,045,368 A | 9/1991 | Cosman et al. |
| 5,065,098 A | 11/1991 | Salsman et al. |
| 5,093,622 A | 3/1992 | Balkman |
| 5,097,211 A | 3/1992 | Schonstedt |
| 5,114,517 A | 5/1992 | Rippingale et al. |
| 5,122,750 A | 6/1992 | Rippingale et al. |
| 5,136,245 A | 8/1992 | Schonstedt |
| 5,138,761 A | 8/1992 | Schonstedt |
| 5,150,295 A | 9/1992 | Mattingly |
| 5,173,139 A | 12/1992 | Rippingale et al. |
| 5,206,065 A | 4/1993 | Rippingale et al. |
| 5,214,757 A | 5/1993 | Mauney et al. |
| 5,231,355 A | 7/1993 | Rider et al. |
| 5,239,290 A | 8/1993 | Schonstedt |
| 5,260,659 A | 11/1993 | Flowerdew et al. |
| 5,264,795 A | 11/1993 | Rider |
| 5,299,300 A | 3/1994 | Femal |
| 5,329,464 A | 7/1994 | Sumic et al. |
| 5,361,029 A | 11/1994 | Rider |
| 5,365,163 A | 11/1994 | Satterwhite et al. |
| 5,373,298 A | 12/1994 | Karouby |
| 5,379,045 A | 1/1995 | Gilbert et al. |
| 5,381,338 A | 1/1995 | Wysocki |
| 5,414,462 A | 5/1995 | Veatch |
| 5,430,379 A | 7/1995 | Parkinson et al. |
| 5,444,364 A | 8/1995 | Satterwhite et al. |
| 5,467,271 A | 11/1995 | Abel et al. |
| 5,471,143 A | 11/1995 | Doany |
| 5,486,067 A | 1/1996 | Huynh |
| 5,490,646 A | 2/1996 | Shaw |
| 5,517,419 A | 5/1996 | Lanckton |
| 5,519,329 A | 5/1996 | Satterwhite |
| 5,529,433 A | 6/1996 | Huynh |
| 5,530,357 A | 6/1996 | Cosman et al. |
| 5,543,931 A | 8/1996 | Lee et al. |
| 5,553,407 A | 9/1996 | Stump |
| 5,568,162 A | 10/1996 | Samsel et al. |
| 5,576,973 A | 11/1996 | Haddy |
| 5,621,325 A | 4/1997 | Draper et al. |
| 5,629,626 A | 5/1997 | Russell et al. |
| 5,644,237 A | 7/1997 | Eslambolchi et al. |
| 5,659,985 A | 8/1997 | Stump |
| 5,673,050 A | 9/1997 | Moussally et al. |
| 5,689,415 A | 11/1997 | Calotychos et al. |
| 5,699,244 A | 12/1997 | Clark, Jr. |
| 5,704,142 A | 1/1998 | Stump |
| 5,739,785 A | 4/1998 | Allison et al. |
| 5,742,509 A | 4/1998 | Goldberg et al. |
| 5,751,289 A | 5/1998 | Myers |
| 5,751,450 A | 5/1998 | Robinson |
| 5,764,127 A | 6/1998 | Hore et al. |
| 5,769,370 A | 6/1998 | Ashjaee |
| 5,815,411 A | 9/1998 | Ellenby |
| 5,819,859 A | 10/1998 | Stump et al. |
| 5,828,219 A | 10/1998 | Hanlon et al. |
| 5,848,373 A | 12/1998 | Delorme et al. |
| 5,916,300 A | 6/1999 | Kirk et al. |
| 5,917,325 A | 6/1999 | Smith |
| 5,918,565 A | 7/1999 | Casas |
| 5,920,194 A | 7/1999 | Lewis et al. |
| 5,955,667 A | 9/1999 | Fyfe |
| 5,987,380 A | 11/1999 | Backman et al. |
| 6,026,135 A | 2/2000 | McFee et al. |
| 6,031,454 A | 2/2000 | Lovejoy et al. |
| 6,032,530 A | 3/2000 | Hock |
| 6,037,010 A | 3/2000 | Kahmann et al. |
| 6,053,260 A | 4/2000 | Boon |
| 6,061,632 A | 5/2000 | Dreier |
| 6,064,940 A | 5/2000 | Rodgers |
| 6,074,693 A | 6/2000 | Manning |
| 6,095,081 A | 8/2000 | Gochenour |
| 6,101,087 A | 8/2000 | Sutton |
| 6,107,801 A | 8/2000 | Hopwood |
| 6,119,376 A | 9/2000 | Stump |
| 6,127,827 A | 10/2000 | Lewis |
| 6,130,539 A | 10/2000 | Polak |
| 6,138,906 A | 10/2000 | DeMayo |
| 6,140,819 A | 10/2000 | Peterman et al. |
| 6,169,958 B1 | 1/2001 | Nagasamy et al. |
| 6,188,392 B1 | 2/2001 | O'Connor et al. |
| 6,188,777 B1 | 2/2001 | Darrell et al. |
| 6,206,282 B1 | 3/2001 | Hayes, Sr. et al. |
| 6,234,218 B1 | 5/2001 | Boers |
| 6,240,360 B1 | 5/2001 | Phelan |
| 6,268,731 B1 | 7/2001 | Hopwood et al. |
| 6,282,477 B1 | 8/2001 | Gudat et al. |
| 6,285,911 B1 | 9/2001 | Watts et al. |
| 6,292,108 B1 | 9/2001 | Straser et al. |
| 6,294,022 B1 | 9/2001 | Eslambolchi et al. |
| 6,297,736 B1 | 10/2001 | Lewis et al. |
| 6,299,934 B1 | 10/2001 | Manning |
| 6,308,565 B1 | 10/2001 | French et al. |
| 6,320,518 B2 | 11/2001 | Saeki et al. |
| 6,327,533 B1 | 12/2001 | Chou |
| RE37,574 E | 3/2002 | Rawlins |
| 6,356,082 B1 | 3/2002 | Alkire et al. |
| 6,362,778 B2 | 3/2002 | Neher |
| 6,363,320 B1 | 3/2002 | Chou |
| 6,375,038 B1 | 4/2002 | Daansen et al. |
| 6,378,220 B1 | 4/2002 | Baioff et al. |
| 6,388,629 B1 | 5/2002 | Albats et al. |
| 6,390,336 B1 | 5/2002 | Orozco |
| 6,401,051 B1 | 6/2002 | Merriam |
| 6,407,550 B1 | 6/2002 | Parakulam et al. |
| 6,411,094 B1 | 6/2002 | Gard et al. |
| 6,414,629 B1 | 7/2002 | Curcio |
| 6,426,872 B1 | 7/2002 | Sutton |
| 6,437,708 B1 | 8/2002 | Brouwer |
| 6,438,239 B1 | 8/2002 | Kuechen |
| 6,459,266 B1 | 10/2002 | Fling |
| 6,476,708 B1 | 11/2002 | Johnson |
| 6,477,588 B1 | 11/2002 | Yerazunis et al. |
| 6,490,524 B1 | 12/2002 | White et al. |
| 6,493,650 B1 | 12/2002 | Rodgers |
| 6,512,478 B1 | 1/2003 | Chien |
| 6,526,400 B1 | 2/2003 | Takata |
| 6,549,011 B2 | 4/2003 | Flatt |
| 6,552,548 B1 | 4/2003 | Lewis et al. |
| 6,585,133 B1 | 7/2003 | Brouwer |
| 6,600,420 B2 | 7/2003 | Goff et al. |
| 6,617,856 B1 | 9/2003 | Royle et al. |
| 6,633,163 B2 | 10/2003 | Fling |
| 6,650,293 B1 | 11/2003 | Eslambolchi |
| 6,650,798 B2 | 11/2003 | Russell et al. |
| 6,658,148 B1 | 12/2003 | Fung |
| 6,674,276 B2 | 1/2004 | Morgan et al. |
| 6,693,585 B1 | 2/2004 | MacLeod |
| 6,700,526 B2 | 3/2004 | Witten |
| 6,710,741 B2 | 3/2004 | Tucker |
| 6,717,392 B2 | 4/2004 | Pearson |
| 6,723,375 B2 | 4/2004 | Zeck et al. |

| | | |
|---|---|---|
| 6,728,662 B2 | 4/2004 | Frost et al. |
| 6,750,816 B1 | 6/2004 | Kunysz |
| 6,751,552 B1 | 6/2004 | Minelli |
| 6,751,553 B2 | 6/2004 | Young |
| 6,751,554 B1 | 6/2004 | Asher et al. |
| 6,777,923 B2 | 8/2004 | Pearson |
| 6,778,128 B2 | 8/2004 | Tucker et al. |
| 6,798,379 B2 | 9/2004 | Tucker et al. |
| 6,799,116 B2 | 9/2004 | Robbins |
| 6,815,953 B1 | 11/2004 | Bigelow |
| 6,819,109 B2 | 11/2004 | Sowers et al. |
| 6,825,775 B2 | 11/2004 | Fling et al. |
| 6,825,793 B2 | 11/2004 | Taylor, Jr. et al. |
| 6,833,795 B1 | 12/2004 | Johnson et al. |
| 6,833,811 B2 | 12/2004 | Zeitfuss et al. |
| 6,836,231 B2 | 12/2004 | Pearson |
| 6,845,171 B2 | 1/2005 | Shum et al. |
| 6,850,161 B1 | 2/2005 | Elliott et al. |
| 6,850,843 B2 | 2/2005 | Smith et al. |
| 6,853,303 B2 | 2/2005 | Chen et al. |
| 6,853,905 B2 | 2/2005 | Barton |
| 6,865,484 B2 | 3/2005 | Miyasaka et al. |
| 6,876,945 B2 | 4/2005 | Emord |
| 6,895,356 B2 | 5/2005 | Brimhall |
| 6,898,525 B1 | 5/2005 | Minelli |
| 6,898,550 B1 | 5/2005 | Blackadar et al. |
| 6,904,361 B1 | 6/2005 | Tallman et al. |
| 6,941,890 B1 | 9/2005 | Cristo et al. |
| 6,947,028 B2 | 9/2005 | Shkolnikov |
| 6,954,071 B2 | 10/2005 | Flatt et al. |
| 6,956,524 B2 | 10/2005 | Tucker et al. |
| 6,956,564 B1 | 10/2005 | Williams |
| 6,958,690 B1 | 10/2005 | Asher et al. |
| 6,968,296 B1 | 11/2005 | Royle |
| 6,972,698 B2 | 12/2005 | Deguchi |
| 6,972,719 B1 | 12/2005 | Swope |
| 6,975,942 B2 | 12/2005 | Young et al. |
| 6,977,508 B2 | 12/2005 | Pearson et al. |
| 6,992,584 B2 | 1/2006 | Dooley et al. |
| 6,993,088 B2 | 1/2006 | Fling et al. |
| 6,999,021 B2 | 2/2006 | Taylor, Jr. |
| 7,003,138 B2 | 2/2006 | Wilson |
| 7,009,399 B2 * | 3/2006 | Olsson et al. ................ 324/326 |
| 7,009,519 B2 | 3/2006 | Leonard et al. |
| 7,038,454 B2 | 5/2006 | Gard et al. |
| 7,042,358 B2 | 5/2006 | Moore |
| 7,048,320 B2 | 5/2006 | Rubel |
| 7,053,789 B2 | 5/2006 | Fling et al. |
| 7,057,383 B2 | 6/2006 | Schlapp et al. |
| 7,062,414 B2 | 6/2006 | Waite et al. |
| 7,079,591 B2 | 7/2006 | Fling et al. |
| 7,091,852 B2 | 8/2006 | Mason et al. |
| 7,091,872 B1 | 8/2006 | Bigelow et al. |
| 7,113,124 B2 | 9/2006 | Waite |
| 7,116,244 B2 | 10/2006 | Fling et al. |
| 7,120,564 B2 | 10/2006 | Pacey |
| 7,142,196 B1 | 11/2006 | Connor |
| 7,143,130 B2 | 11/2006 | Lin |
| 7,162,367 B2 | 1/2007 | Lin et al. |
| 7,216,034 B2 | 5/2007 | Vitikainen |
| 7,235,980 B2 | 6/2007 | Pearson et al. |
| 7,236,091 B2 | 6/2007 | Kiang et al. |
| 7,245,215 B2 | 7/2007 | Gollu |
| 7,285,958 B2 | 10/2007 | Overby et al. |
| 7,298,323 B2 | 11/2007 | Park |
| 7,304,480 B1 | 12/2007 | Pearson et al. |
| 7,310,584 B2 | 12/2007 | Royle |
| 7,319,387 B2 | 1/2008 | Willson et al. |
| 7,331,340 B2 | 2/2008 | Barney |
| 7,336,078 B1 | 2/2008 | Merewether et al. |
| 7,339,379 B2 | 3/2008 | Thompson et al. |
| 7,342,537 B2 | 3/2008 | Pearson et al. |
| 7,356,421 B2 | 4/2008 | Gudmundsson et al. |
| 7,358,738 B2 | 4/2008 | Overby et al. |
| 7,372,247 B1 | 5/2008 | Giusti et al. |
| 7,372,276 B2 | 5/2008 | Mulcahey |
| 7,379,015 B2 | 5/2008 | Workman |
| 7,396,177 B2 | 7/2008 | Lapstun et al. |
| 7,396,178 B2 | 7/2008 | Lapstun et al. |
| 7,400,976 B2 | 7/2008 | Young et al. |
| 7,403,012 B2 | 7/2008 | Worsley et al. |
| 7,403,853 B1 | 7/2008 | Janky et al. |
| 7,413,363 B2 | 8/2008 | Lapstun et al. |
| 7,443,154 B1 | 10/2008 | Merewether et al. |
| 7,451,721 B1 | 11/2008 | Garza et al. |
| 7,482,973 B2 | 1/2009 | Tucker et al. |
| 7,500,583 B1 | 3/2009 | Cox |
| 7,532,127 B2 | 5/2009 | Holman et al. |
| 7,538,724 B1 | 5/2009 | Baillot |
| 7,636,901 B2 | 12/2009 | Munson |
| 7,640,105 B2 | 12/2009 | Nielsen et al. |
| 7,664,530 B2 | 2/2010 | Skelton |
| 7,733,077 B1 | 6/2010 | Merewether et al. |
| 7,773,095 B1 | 8/2010 | Badrak et al. |
| 7,834,801 B2 | 11/2010 | Waite et al. |
| 7,834,806 B2 | 11/2010 | Tucker et al. |
| 7,889,124 B2 | 2/2011 | Islam et al. |
| 7,889,888 B2 | 2/2011 | Deardorr et al. |
| 7,929,981 B2 | 4/2011 | Sangberg |
| 7,978,129 B2 | 7/2011 | Sawyer et al. |
| 7,986,246 B2 | 7/2011 | Angelis et al. |
| 7,990,151 B2 | 8/2011 | Olsson |
| 8,060,304 B2 | 11/2011 | Nielsen et al. |
| 8,081,112 B2 | 12/2011 | Tucker et al. |
| 8,106,660 B1 | 1/2012 | Merewether et al. |
| 8,118,192 B2 | 2/2012 | Daugherty |
| 8,144,245 B2 | 3/2012 | Vik |
| 8,155,390 B2 | 4/2012 | Nielsen et al. |
| 8,194,932 B2 | 6/2012 | Nielsen et al. |
| 8,218,827 B2 | 7/2012 | Nielsen et al. |
| 8,249,306 B2 | 8/2012 | Nielsen et al. |
| 8,260,489 B2 | 9/2012 | Nielsen et al. |
| 8,264,409 B2 | 9/2012 | Miller |
| 8,265,344 B2 | 9/2012 | Nielsen et al. |
| 8,270,666 B2 | 9/2012 | Nielsen et al. |
| 8,280,117 B2 | 10/2012 | Nielsen et al. |
| 8,280,631 B2 | 10/2012 | Nielsen et al. |
| 8,280,969 B2 | 10/2012 | Nielsen et al. |
| 8,290,204 B2 | 10/2012 | Nielsen et al. |
| 8,290,215 B2 | 10/2012 | Nielsen et al. |
| 8,296,308 B2 | 10/2012 | Nielsen et al. |
| 8,300,895 B2 | 10/2012 | Nielsen et al. |
| 8,301,380 B2 | 10/2012 | Nielsen et al. |
| 8,311,765 B2 | 11/2012 | Nielsen et al. |
| 2001/0029996 A1 | 10/2001 | Robinson |
| 2002/0035432 A1 | 3/2002 | Kubica et al. |
| 2002/0052755 A1 | 5/2002 | Whatley |
| 2002/0053608 A1 | 5/2002 | Zeck et al. |
| 2002/0103625 A1 | 8/2002 | Card et al. |
| 2002/0115472 A1 | 8/2002 | Andress |
| 2002/0122000 A1 | 9/2002 | Bradley et al. |
| 2002/0130906 A1 | 9/2002 | Miyaki |
| 2003/0012411 A1 | 1/2003 | Sjostrom |
| 2003/0080897 A1 | 5/2003 | Tranchina |
| 2003/0100316 A1 | 5/2003 | Odamura |
| 2003/0135328 A1 | 7/2003 | Burns et al. |
| 2003/0168834 A1 | 9/2003 | Ulrich |
| 2003/0184300 A1 | 10/2003 | Bigelow |
| 2003/0196585 A1 | 10/2003 | McDonald et al. |
| 2004/0006425 A1 | 1/2004 | Wood |
| 2004/0051368 A1 | 3/2004 | Caputo |
| 2004/0057795 A1 | 3/2004 | Mayfield et al. |
| 2004/0070535 A1 | 4/2004 | Olsson et al. |
| 2004/0124988 A1 | 7/2004 | Leonard et al. |
| 2004/0168358 A1 | 9/2004 | Stump |
| 2004/0203909 A1 | 10/2004 | Koster |
| 2004/0210370 A1 | 10/2004 | Gudat |
| 2004/0220731 A1 | 11/2004 | Tucker |
| 2004/0225444 A1 | 11/2004 | Young et al. |
| 2005/0023367 A1 | 2/2005 | Reighard |
| 2005/0033513 A1 | 2/2005 | Gasbarro |
| 2005/0034074 A1 | 2/2005 | Munson |
| 2005/0038825 A1 | 2/2005 | Tarabzouni |
| 2005/0040222 A1 | 2/2005 | Robinson |
| 2005/0054457 A1 | 3/2005 | Eyestone et al. |
| 2005/0055142 A1 | 3/2005 | McMurtry et al. |
| 2005/0057745 A1 | 3/2005 | Bontje |
| 2005/0150399 A1 | 7/2005 | Wiley |

| | | | | | | |
|---|---|---|---|---|---|---|
| 2005/0156600 A1 | 7/2005 | Olsson | | 2010/0010882 A1 | 1/2010 | Nielsen et al. |
| 2005/0192727 A1 | 9/2005 | Shostak et al. | | 2010/0010883 A1 | 1/2010 | Nielsen et al. |
| 2005/0206562 A1 | 9/2005 | Willson et al. | | 2010/0045517 A1 | 2/2010 | Tucker et al. |
| 2005/0232475 A1 | 10/2005 | Floeder | | 2010/0070347 A1 | 3/2010 | Chen |
| 2005/0278371 A1 | 12/2005 | Funk et al. | | 2010/0084532 A1 | 4/2010 | Nielsen et al. |
| 2006/0026020 A1 | 2/2006 | Waite et al. | | 2010/0084553 A1 | 4/2010 | Frosien |
| 2006/0055584 A1 | 3/2006 | Waite et al. | | 2010/0085376 A1 | 4/2010 | Nielsen et al. |
| 2006/0077095 A1 | 4/2006 | Tucker et al. | | 2010/0085694 A1 | 4/2010 | Nielsen et al. |
| 2006/0084516 A1 | 4/2006 | Eyestone | | 2010/0085701 A1 | 4/2010 | Nielsen et al. |
| 2006/0085133 A1 | 4/2006 | Young | | 2010/0086671 A1 | 4/2010 | Nielsen et al. |
| 2006/0085396 A1 | 4/2006 | Evans | | 2010/0088031 A1 | 4/2010 | Nielsen et al. |
| 2006/0109131 A1 | 5/2006 | Sen et al. | | 2010/0088032 A1 | 4/2010 | Nielsen et al. |
| 2006/0125644 A1 | 6/2006 | Sharp | | 2010/0088134 A1 | 4/2010 | Nielsen et al. |
| 2006/0161349 A1 | 7/2006 | Cross | | 2010/0088135 A1 | 4/2010 | Nielsen et al. |
| 2006/0169776 A1 | 8/2006 | Hornbaker | | 2010/0088164 A1 | 4/2010 | Nielsen et al. |
| 2006/0220955 A1 | 10/2006 | Hamilton | | 2010/0090700 A1 | 4/2010 | Nielsen et al. |
| 2006/0244454 A1 | 11/2006 | Gard | | 2010/0090858 A1 | 4/2010 | Nielsen et al. |
| 2006/0254820 A1 | 11/2006 | Gard et al. | | 2010/0094553 A1 | 4/2010 | Nielsen et al. |
| 2006/0262963 A1 | 11/2006 | Navulur | | 2010/0097224 A1 | 4/2010 | Prodanovich et al. |
| 2006/0276198 A1 | 12/2006 | Michelon et al. | | 2010/0117654 A1 | 5/2010 | Nielsen et al. |
| 2006/0276985 A1 | 12/2006 | Xu | | 2010/0131903 A1 | 5/2010 | Thomson et al. |
| 2006/0282191 A1 | 12/2006 | Gotfried | | 2010/0146454 A1 | 6/2010 | Sugahara |
| 2006/0282280 A1 | 12/2006 | Stotz et al. | | 2010/0161359 A1 | 6/2010 | Asher |
| 2006/0285913 A1 | 12/2006 | Koptis | | 2010/0188088 A1 | 7/2010 | Nielsen et al. |
| 2006/0287900 A1 | 12/2006 | Fiore et al. | | 2010/0188215 A1 | 7/2010 | Nielsen et al. |
| 2006/0289679 A1 | 12/2006 | Johnson et al. | | 2010/0188216 A1 | 7/2010 | Nielsen et al. |
| 2007/0013379 A1 | 1/2007 | Staples et al. | | 2010/0188245 A1 | 7/2010 | Nielsen et al. |
| 2007/0018632 A1 | 1/2007 | Royle | | 2010/0188407 A1 | 7/2010 | Nielsen et al. |
| 2007/0031042 A1 | 2/2007 | Simental | | 2010/0189312 A1 | 7/2010 | Nielsen et al. |
| 2007/0040558 A1 | 2/2007 | Overby et al. | | 2010/0189887 A1 | 7/2010 | Nielsen et al. |
| 2007/0100496 A1 | 5/2007 | Forell | | 2010/0198663 A1 | 8/2010 | Nielsen et al. |
| 2007/0143676 A1 | 6/2007 | Chen | | 2010/0201690 A1 | 8/2010 | Nielsen et al. |
| 2007/0191025 A1 | 8/2007 | McBrierty et al. | | 2010/0201706 A1 | 8/2010 | Nielsen et al. |
| 2007/0219722 A1 | 9/2007 | Sawyer | | 2010/0205031 A1 | 8/2010 | Nielsen et al. |
| 2007/0223803 A1 | 9/2007 | Shindo | | 2010/0205032 A1 | 8/2010 | Nielsen et al. |
| 2007/0268110 A1 | 11/2007 | Little | | 2010/0205264 A1 | 8/2010 | Nielsen et al. |
| 2007/0286021 A1 | 12/2007 | Hoenmans et al. | | 2010/0205536 A1 | 8/2010 | Nielsen et al. |
| 2007/0288195 A1 | 12/2007 | Waite et al. | | 2010/0205554 A1 | 8/2010 | Nielsen et al. |
| 2008/0010009 A1 | 1/2008 | Miyoshi | | 2010/0205555 A1 | 8/2010 | Nielsen et al. |
| 2008/0013940 A1 | 1/2008 | Jung | | 2010/0207816 A1 | 8/2010 | Islam et al. |
| 2008/0121684 A1 | 5/2008 | Gualandri | | 2010/0211354 A1 | 8/2010 | Park et al. |
| 2008/0125942 A1 | 5/2008 | Tucker et al. | | 2010/0228588 A1 | 9/2010 | Nielsen et al. |
| 2008/0180322 A1 | 7/2008 | Islam | | 2010/0245086 A1 | 9/2010 | Nielsen et al. |
| 2008/0186166 A1 | 8/2008 | Zhou et al. | | 2010/0247754 A1 | 9/2010 | Nielsen et al. |
| 2008/0204322 A1 | 8/2008 | Oswald et al. | | 2010/0253511 A1 | 10/2010 | Nielsen et al. |
| 2008/0208415 A1 | 8/2008 | Vik | | 2010/0253513 A1 | 10/2010 | Nielsen et al. |
| 2008/0255795 A1 | 10/2008 | Shkolnikov | | 2010/0253514 A1 | 10/2010 | Nielsen et al. |
| 2008/0310721 A1 | 12/2008 | Yang | | 2010/0256825 A1 | 10/2010 | Nielsen et al. |
| 2009/0004410 A1 | 1/2009 | Thomson et al. | | 2010/0256912 A1 | 10/2010 | Nielsen et al. |
| 2009/0013928 A1 | 1/2009 | Nielsen et al. | | 2010/0256981 A1 | 10/2010 | Nielsen et al. |
| 2009/0043504 A1 | 2/2009 | Bandyopadhyay et al. | | 2010/0257029 A1 | 10/2010 | Nielsen et al. |
| 2009/0063258 A1 | 3/2009 | Mueller et al. | | 2010/0257477 A1 | 10/2010 | Nielsen et al. |
| 2009/0085568 A1 | 4/2009 | Cole | | 2010/0259381 A1 | 10/2010 | Nielsen et al. |
| 2009/0109081 A1 | 4/2009 | Ryerson | | 2010/0259414 A1 | 10/2010 | Nielsen et al. |
| 2009/0121933 A1 | 5/2009 | Tucker et al. | | 2010/0262470 A1 | 10/2010 | Nielsen et al. |
| 2009/0171616 A1 | 7/2009 | Zhang et al. | | 2010/0262670 A1 | 10/2010 | Nielsen et al. |
| 2009/0185858 A1 | 7/2009 | Malit | | 2010/0263591 A1 | 10/2010 | Nielsen et al. |
| 2009/0201178 A1 | 8/2009 | Nielsen et al. | | 2010/0272885 A1* | 10/2010 | Olsson et al. ................. 427/137 |
| 2009/0201311 A1 | 8/2009 | Nielsen et al. | | 2010/0285211 A1 | 11/2010 | Nielsen et al. |
| 2009/0202101 A1 | 8/2009 | Nielsen et al. | | 2010/0318401 A1 | 12/2010 | Nielsen et al. |
| 2009/0202110 A1 | 8/2009 | Nielsen et al. | | 2010/0318402 A1 | 12/2010 | Nielsen et al. |
| 2009/0202111 A1 | 8/2009 | Nielsen et al. | | 2010/0318465 A1 | 12/2010 | Nielsen et al. |
| 2009/0204238 A1 | 8/2009 | Nielsen et al. | | 2010/0324967 A1 | 12/2010 | Nielsen et al. |
| 2009/0204466 A1 | 8/2009 | Nielsen et al. | | 2011/0007076 A1 | 1/2011 | Nielsen et al. |
| 2009/0207019 A1 | 8/2009 | Nielsen et al. | | 2011/0020776 A1 | 1/2011 | Nielsen et al. |
| 2009/0208642 A1 | 8/2009 | Nielsen et al. | | 2011/0022433 A1 | 1/2011 | Nielsen et al. |
| 2009/0210098 A1 | 8/2009 | Nielsen et al. | | 2011/0035245 A1 | 2/2011 | Nielsen et al. |
| 2009/0210245 A1 | 8/2009 | Wold | | 2011/0035251 A1 | 2/2011 | Nielsen et al. |
| 2009/0210284 A1 | 8/2009 | Nielsen et al. | | 2011/0035252 A1 | 2/2011 | Nielsen et al. |
| 2009/0210285 A1 | 8/2009 | Nielsen et al. | | 2011/0035260 A1 | 2/2011 | Nielsen et al. |
| 2009/0210298 A1 | 8/2009 | Nielsen et al. | | 2011/0035324 A1 | 2/2011 | Nielsen et al. |
| 2009/0233573 A1 | 9/2009 | Gray | | 2011/0035328 A1 | 2/2011 | Nielsen et al. |
| 2009/0237408 A1 | 9/2009 | Nielsen et al. | | 2011/0040589 A1 | 2/2011 | Nielsen et al. |
| 2009/0238415 A1 | 9/2009 | Nielsen et al. | | 2011/0040590 A1 | 2/2011 | Nielsen et al. |
| 2009/0324815 A1 | 12/2009 | Nielsen et al. | | 2011/0045175 A1 | 2/2011 | Nielsen et al. |
| 2009/0327024 A1 | 12/2009 | Nielsen et al. | | 2011/0046993 A1 | 2/2011 | Nielsen et al. |
| 2010/0006667 A1 | 1/2010 | Nielsen et al. | | 2011/0046994 A1 | 2/2011 | Nielsen et al. |
| 2010/0010862 A1 | 1/2010 | Nielsen et al. | | 2011/0046999 A1 | 2/2011 | Nielsen et al. |
| 2010/0010863 A1 | 1/2010 | Nielsen et al. | | 2011/0060496 A1 | 3/2011 | Nielsen et al. |

| | | | |
|---|---|---|---|
| 2011/0060549 | A1 | 3/2011 | Nielsen et al. |
| 2011/0095885 | A9 | 4/2011 | Nielsen et al. |
| 2011/0117272 | A1 | 5/2011 | Nielsen et al. |
| 2011/0131081 | A1 | 6/2011 | Nielsen et al. |
| 2011/0137769 | A1 | 6/2011 | Nielsen et al. |
| 2011/0191058 | A1 | 8/2011 | Nielsen et al. |
| 2011/0236588 | A1 | 9/2011 | Nielsen et al. |
| 2011/0279229 | A1 | 11/2011 | Nielsen et al. |
| 2011/0279230 | A1 | 11/2011 | Nielsen et al. |
| 2011/0279476 | A1 | 11/2011 | Nielsen et al. |
| 2011/0283217 | A1 | 11/2011 | Nielsen et al. |
| 2011/0285749 | A1 | 11/2011 | Nielsen et al. |
| 2012/0019380 | A1 | 1/2012 | Nielsen et al. |
| 2012/0036140 | A1 | 2/2012 | Nielsen et al. |
| 2012/0065924 | A1 | 3/2012 | Nielsen et al. |
| 2012/0065944 | A1 | 3/2012 | Nielsen et al. |
| 2012/0066137 | A1 | 3/2012 | Nielsen et al. |
| 2012/0066273 | A1 | 3/2012 | Nielsen et al. |
| 2012/0066506 | A1 | 3/2012 | Nielsen et al. |
| 2012/0069178 | A1 | 3/2012 | Nielsen et al. |
| 2012/0072035 | A1 | 3/2012 | Nielsen et al. |
| 2012/0110019 | A1 | 5/2012 | Nielsen et al. |
| 2012/0113244 | A1 | 5/2012 | Nielsen et al. |
| 2012/0274476 | A1 | 11/2012 | Nielsen et al. |

FOREIGN PATENT DOCUMENTS

| | | |
|---|---|---|
| CH | 695087 A5 | 12/2005 |
| EP | 0636393 | 2/1995 |
| EP | 1521331 | 4/2005 |
| EP | 1852365 | 11/2007 |
| EP | 1974638 | 10/2008 |
| GB | 2266863 | 11/1993 |
| JP | 7256169 | 10/1994 |
| JP | 8285601 | 11/1996 |
| JP | 10060865 | 3/1998 |
| JP | 2000501666 | 2/2000 |
| JP | 2002079167 | 3/2002 |
| WO | WO9112119 | 8/1991 |
| WO | WO9424584 | 10/1994 |
| WO | WO9516827 | 6/1995 |
| WO | WO9629572 | 9/1996 |
| WO | WO9854600 | 12/1998 |
| WO | WO9854601 | 12/1998 |
| WO | WO9900679 | 1/1999 |
| WO | WO0194016 | 12/2001 |
| WO | WO0228541 | 4/2002 |
| WO | WO2004100044 | 11/2004 |
| WO | WO2004102242 | 11/2004 |
| WO | WO2005052627 | 6/2005 |
| WO | WO2006015310 | 2/2006 |
| WO | WO2006136776 | 12/2006 |
| WO | WO2006136777 | 12/2006 |
| WO | WO2007067898 | 6/2007 |

OTHER PUBLICATIONS

U.S. Appl. No. 13/644,226, filed Oct. 3, 2012, Nielsen et al.
3M Dynatel, Brochure, 2006, 1-4.
3M Dynatel, Locating and Marking System, Brochure, 2007, 1-16.
Bearden, T., "New Identification Technology Raises Concerns over Privacy," PBS Online NewsHour Report, Aug. 17, 2006, pp. 1-5, http://www.pbs.org/newshour/bb/science/july-dec06/rfid_08-17.html.
Bernold, L.. et al. "Equipment operator training in the age of internet2," Proceedings of 19th International Symposium on Automation and Robotics in Construction (ISARC 2002), Sep. 2002 [retrieved on Nov. 12, 2010]. Retrieved from the Internet: <URL: http://fire.nist.gov/bfrlpubsibuild02IPDF/b02059.pdf>. p. 4, col. 2, para 2.
Carey, B., "Tracking Shoes," Chicago Tribune Online Edition, Jan. 29, 2007, pp. 1-3, http://www.chicagotribune.com/services/site/premium/access-registered.intercept.
CGA, Common Ground Alliance, Best Practices, Version 1.0, Apr. 2003, 93 pages.
CGA, Common Ground, Study of One-Call Systems and Damage Prevention Best Practices, Aug. 1999, 262 pages.
ESRI Corporate Introduction, http://www.esri.com/library/brochures/pdfs/corporate-intro.pdf, printed on Dec. 9, 2009 (original publication date unknown).
European Search Report, Application No. 08743671.3, Nov. 16, 2011.
European Search Report, Application No. 08743673.9, Feb. 28, 2011.
Fox, G. et al., "GPS Provides Quick, Accurate Data for Underground Utility Location," as featured in Apr. 2002 issue of Trenchless Technology, http://www.woolpert.com/asp/articles/GPS-Provides.asp, Sep. 14, 2007, pp. 1 and 2.
GPS Technology Enhancing Underground Utility Locating, Underground Construction Magazine, Apr. 7, 2010, 4 pages, http://www.undergroundconstructionmagazine.com/print/1034?page=show.
International Search Report and Written Opinion, Application No. PCT/2010/000389, Jun. 2, 2010.
International Search Report and Written Opinion, Application No. PCT/US10/45161, Oct. 29, 2010.
International Search Report and Written Opinion, Application No. PCT/US10/45409, Nov. 18, 2010.
International Search Report and Written Opinion, Application No. PCT/US10/45969, Nov. 18, 2010.
International Search Report and Written Opinion, Application No. PCT/US2008/55796, Oct. 14, 2008.
International Search Report and Written Opinion, Application No. PCT/US2008/55798, Jul. 28, 2008.
International Search Report and Written Opinion, Application No. PCT/US2009/000859, Apr. 14, 2009.
International Search Report and Written Opinion, Application No. PCT/US2009/003957, Mar. 21, 2011.
International Search Report and Written Opinion, Application No. PCT/US2009/005299, Dec. 22, 2009.
International Search Report and Written Opinion, Application No. PCT/US2009/005348, Mar. 2, 2010.
International Search Report and Written Opinion, Application No. PCT/US2009/005359, Feb. 8, 2010.
International Search Report and Written Opinion, Application No. PCT/US11/51616, dated Jan. 31, 2012.
International Search Report and Written Opinion, Application No. PCT/US2011/047807, Dec. 6, 2011.
Jung, H.G., Structure Analysis Based Parking Slot Marking Recognition for Semi-automatic Parking System, Springer-Verlag Berlin Heidelberg 2006, 10 pages.
Luczak, S., "Increasing Accuracy of Tilt Measurements," Engineering Mechanics, vol. 14, 2007, p. 143-154.
New Mexico's Recommended Marking Guidelines for Underground Utilities, May 2006, 8 pages.
Notice of Allowance dated Jan. 24, 2012 from U.S. Appl. No. 12/363,951.
Notice of Allowance dated Mar. 9, 2012 from U.S. Appl. No. 12/236,688.
Notice of Allowance dated May 2, 2012 from U.S. Appl. No. 12/429,929.
Notice of Allowance dated Jul. 12, 2012 from U.S. Appl. No. 12/539,497.
Notice of Allowance dated Aug. 1, 2012 from U.S. Appl. No. 12/364,339.
Notice of Allowance dated Aug. 25, 2011 from U.S. Appl. No. 11/696,606.
Notice of Allowance dated Sep. 5, 2012 from U.S. Appl. No. 12/854,370.
Notice of Allowance dated Oct. 1, 2012 from U.S. Appl. No. 12/607,843.
Notice of Allowance dated Oct. 17, 2012 from U.S. Appl. No. 12/236,688.
Notice of Allowance dated Oct. 25, 2012 from U.S. Appl. No. 12/639,373.
Notice of Allowance dated Nov. 6, 2009 from U.S. Appl. No. 11/685,602.
Notice of Allowance dated Nov. 7, 2012 from U.S. Appl. No. 12/639,041.
Notice of Allowance dated Dec. 12, 2012 from U.S. Appl. No. 12/703,958.
Notice of Allowance dated Dec. 21, 2012 from U.S. Appl. No. 12/364,339.

Notice of Allowance dated Apr. 28, 2011 from U.S. Appl. No. 29/356631.
Notice of Allowance dated Nov. 12, 2010 from U.S. Appl. No. 29/356633.
Notice of Allowance dated Nov. 12, 2010 from U.S. Appl. No. 29/356634.
Notice of Allowance dated Nov. 12, 2010 from U.S. Appl. No. 29/356635.
Notice of Allowance dated Nov. 28, 2011 from Canadian Application No. 2,710,269.
Office Action dated Jan. 12, 2012 from U.S. Appl. No. 12/364,369.
Office Action dated Jan. 25, 2012 from U.S. Appl. No. 12/568,087.
Office Action dated Feb. 1, 2011 from Canadian Application No. 2,691,707.
Office Action dated Feb. 9, 2012 from U.S. Appl. No. 12/364,339.
Office Action dated Feb. 28, 2012 from U.S. Appl. No. 12/539,497.
Office Action dated Mar. 2, 2012 from U.S. Appl. No. 12/639,041.
Office Action dated Mar. 13, 2012 from U.S. Appl. No. 12/364,359.
Office Action dated Mar. 20, 2012 from US. Appl. No. 12/764,164.
Office Action dated Mar. 29, 2012 from GB Application No. 1107052.1.
Office Action dated Apr. 10, 2012 from U.S. Appl. No. 12/854,370.
Office Action dated Apr. 12, 2012 from Canadian Application No. 2,691,707.
Office Action dated Apr. 13, 2012 from Australian Application No. 2008236526.
Office Action dated Apr. 17, 2012 from U.S. Appl. No. 12/607,843.
Office Action dated Apr. 25, 2012 from U.S. Appl. No. 12/363,046.
Office Action dated May 1, 2012 from Australian Application No. 2009300362.
Office Action dated May 15, 2012 from U.S. Appl. No. 12/797,243.
Office Action dated May 17, 2012 from U.S. Appl. No. 12/364,369.
Office Action dated May 24, 2011 from U.S. Appl. No. 12/363,951.
Office Action dated Jun. 1, 2012 from U.S. Appl. No. 12/855,977.
Office Action dated Jun. 4, 2012 from U.S. Appl. No. 12/568,087.
Office Action dated Jun. 4, 2012 from U.S. Appl. No. 12/703,958.
Office Action dated Jun. 8, 2012 from U.S. Appl. No. 12/639,041.
Office Action dated Jun. 13, 2012 from U.S. Appl. No. 12/639,373.
Office Action dated Jun. 16, 2010 from Canadian Application No. 2,691,707.
Office Action dated Jun. 18, 2012 from U.S. Appl. No. 12/701,468.
Office Action dated Jun. 18, 2012 from U.S. Appl. No. 12/701,496.
Office Action dated Jul. 2, 2012 from U.S. Appl. No. 12/797,262.
Office Action dated Jul. 12, 2012 from U.S. Appl. No. 12/571,411.
Office Action dated Jul. 26, 2012 from U.S. Appl. No. 12/639,041.
Office Action dated Jul. 27, 2012 from European Application No. 08743671.3.
Office Action dated Aug. 15, 2012 from Australian Application No. 2010214104.
Office Action dated Aug. 29, 2012 from U.S. Appl. No. 12/701,447.
Office Action dated Sep. 4, 2012 from U.S. Appl. No. 12/622,768.
Office Action dated Sep. 25, 2012 from Australian Application No. 2010214053.
Office Action dated Sep. 26, 2011 from Canadian Application No. 2,739,119.
Office Action dated Sep. 26, 2011 from Canadian Application No. 2,739,320.
Office Action dated Oct. 2, 2012 from Japanese Application No. 2010-502170.
Office Action dated Oct. 4, 2011 from U.S. Appl. No. 12/364,359.
Office Action dated Oct. 15, 2012 from U.S. Appl. No. 12/797,227.
Office Action dated Oct. 19, 2012 from U.S. Appl. No. 12/797,243.
Office Action dated Oct. 20, 2011 from U.S. Appl. No. 12/639,041.
Office Action dated Oct. 24, 2011 from U.S. Appl. No. 12/236,688.
Office Action dated Nov. 9, 2011 from U.S. Appl. No. 12/429,929.
Office Action dated Nov. 14, 2012 from Canadian Application No. 2,750,908.
Office Action dated Nov. 15, 2011 from Canadian Application No. 2,691,707.
Office Action dated Nov. 18, 2009 from Canadian Application No. 2,623,466, filed Mar. 4, 2008.
Office Action dated Nov. 20, 2012 from U.S. Appl. No. 12/701,468.
Office Action dated Nov. 21, 2012 from U.S. Appl. No. 12/701,496.
Office Action dated Nov. 23, 2009 from Canadian Application No. 2,623,761, filed Mar. 4, 2008.
Office Action dated Nov. 23, 2012 from U.S. Appl. No. 12/855,977.
Office Action dated Nov. 26, 2012 from U.S. Appl. No. 12/764,164.
Office Action dated Dec. 5, 2012 from U.S. Appl. No. 12/797,262.
Office Action dated Dec. 18, 2012 from U.S. Appl. No. 12/786,929.
Office Action dated Dec. 20, 2012 from U.S. Appl. No. 12/571,408.
Office Action dated Dec. 30, 2011 from U.S. Appl. No. 12/701,447.
Office Action dated Apr. 28, 2009 from U.S. Appl. No. 11/685,602.
Office Action dated Jul. 20, 2010 from U.S. Appl. No. 11/696,606.
Office Action dated Sep. 17, 2009 from U.S. Appl. No. 11/685,602.
Office Action dated Jul. 11, 2011 from Canadian Application No. 2713282.
Office Action dated Jun. 28, 2011 from Canadian Application No. 2710269.
Office Action dated Mar. 3, 2011 from Australian Application No. 2008226627.
Office Action dated Mar. 9, 2011 from Australian Application No. 2008236526.
Office Action dated Oct. 6, 2010 from Canadian Application No. 2623761.
Olsson, Office Action dated Sep. 13, 2012 from U.S. Appl. No. 12/827,993.
Pevarski, R., Virginia Pilot Project: Technology Meets Damage Prevention, http://www.excavationsafetyonline.com/esg/guidePDFs/2009_2009_ESG_Page_9.pdf, printed on Nov. 3, 2009, 1 page.
Product Data, Hard Hat Aerosols Marking Paint 2300; Rust-oleum Netherlands B.V., Apr. 2005, 1 page, http://www.rustoleum.co.uk/downloads/2300%20Marking%20Spray.pdf.
Product Data, "Inverted Marking Chalk," Rust-oleum, Jul. 2004, 2 pages, http://www.policeone.com/pdfs/markingchalkinfo_ro.pdf.
Trimble Navigation Limited, "H-Star Technology Explained," pp. 1-9, 2005, www.trimble.com.
Virginia Pilot Project, Incorporating GPS Technology to Enhance One-Call Damage Prevention, Phase I—Electronic White Lining Project Report, Nov. 2007, 50 pages.
Virginia Underground utility marking standard, Mar. 2004, 20 pages.
Co-pending U.S. Patent No. 8,060,304, issued Nov. 15, 2011.
Co-pending U.S. Patent No. 8,280,631, issued Oct. 2, 2012.
Co-pending U.S. Publication No. 2009-0013928, filed Sep. 24, 2008.
Co-pending U.S. Publication No. 2009-0201178, filed Feb. 2, 2009.
Co-pending U.S. Publication No. 2009-0204238, filed Feb. 2, 2009.
Co-pending U.S. Publication No. 2009-0208642, filed Feb. 2, 2009.
Co-pending U.S. Publication No. 2009-0210098, filed Feb. 2, 2009.
Co-pending U.S. Publication No. 2009-0324815, filed Apr. 24, 2009.
Co-pending U.S. Publication No. 2010-0084532, filed Sep. 30, 2009.
Co-pending U.S. Publication No. 2010-0085376, filed Oct. 28, 2009.
Co-pending U.S. Publication No. 2010-0085694, filed Sep. 30, 2009.
Co-pending U.S. Publication No. 2010-0085701, filed Sep. 30, 2009.
Co-pending U.S. Publication No. 2010-0086671, filed Nov. 20, 2009.
Co-pending U.S. Publication No. 2010-0088031, filed Sep. 28, 2009.
Co-pending U.S. Publication No. 2010-0090858, filed Dec. 16, 2009.
Co-pending U.S. Publication No. 2010-0094553, filed Dec. 16, 2009.
Co-pending U.S. Publication No. 2010-0188407, filed Feb. 5, 2010.
Co-pending U.S. Publication No. 2010-0189887, filed Feb. 11, 2012.
Co-pending U.S. Publication No. 2010-0198663, filed Feb. 5, 2010.
Co-pending U.S. Publication No. 2010-0245086, filed Jun. 9, 2010.
Co-pending U.S. Publication No. 2010-0247754, filed Jun. 9, 2010.
Co-pending U.S. Publication No. 2010-0256825, filed Jun. 9, 2010.
Co-pending U.S. Publication No. 2010-0262470, filed Jun. 9, 2010.
Co-pending U.S. Publication No. 2010-0263591, filed Jun. 9, 2010.
Co-pending U.S. Publication No. 2010-0285211, filed Apr. 21, 2010.
Co-pending U.S. Publication No. 2011-0045175, filed May 25, 2010.
Co-pending U.S. Publication No. 2011-0060549, filed Aug. 13, 2010.
Co-pending U.S. Publication No. 2011-0117272, filed Aug. 19, 2010.
Co-pending U.S. Publication No. 2011-0191058, filed Aug. 11, 2010.
Co-pending U.S. Publication No. 2012-0072035, filed Sep. 14, 2011.
Office Action dated Dec. 28, 2012 from U.S. Appl. No. 12/364,359.
Notice of Allowance dated Jan. 22, 2013 from U.S. Appl. No. 12/703,958.

Notice of Allowance dated Jan. 8, 2013 from U.S. Appl. No. 12/797,243.
Notice of Allowance dated Feb. 13, 2013 from U.S. Appl. No. 12/701,447.
Notice of Allowance dated Feb. 20, 2013 from U.S. Appl. No. 12/364,369.
Notice of Allowance from U.S. Appl. No. 12/622,768 dated Jan. 24, 2013.
Office Action dated Jan. 9, 2013 from U.S. Appl. No. 12/571,411.
Office Action received Jan. 18, 2013 from Japanese Application No. 2009-553688.
Corrected Notice of Allowability from U.S. Appl. No. 12/364,369 dated Apr. 15, 2013.
Corrected Notice of Allowability from U.S. Appl. No. 12/703,958 dated Apr. 18, 2013.
Office Action dated Mar. 13, 2013 from Chinese Application No. 201080045879.1.
Notice of Allowance dated Mar. 12, 2013 from U.S. Appl. No. 12/429,929.
Corrected Notice of Allowability from U.S. Appl. No. 12/622,768 dated Apr. 3, 2013.
Corrected Notice of Allowability from U.S. Appl. No. 12/703,958 dated Mar. 7, 2013.
Corrected Notice of Allowability from U.S. Appl. No. 12/797,227 dated Apr. 17, 2013.
Notice of Allowance dated Mar. 28, 2013 from U.S. Appl. No. 12/797,227.
Office Action dated Feb. 26, 2013 from Canadian Application No. 2,738,968.
Office Action dated Mar. 20, 2013 from U.S. Appl. No. 12/764,164.
Office Action dated Mar. 25, 2013 from U.S. Appl. No. 12/797,211.
Office Action dated Mar. 28, 2013 from U.S. Appl. No. 12/571,408.
Notice of Alowance dated Apr. 25, 2013 from U.S. Appl. No. 12/364,359.
Office Action dated Apr. 26, 2013 from U.S. Appl. No. 12/859,394.

* cited by examiner

MARKING APPARATUS HAVING OPERATIONAL SENSORS FOR UNDERGROUND FACILITY MARKING OPERATIONS, AND ASSOCIATED METHODS AND SYSTEMS

CROSS-REFERENCES TO RELATED APPLICATIONS

The application claims the benefit, under 35 U.S.C. §120, as a continuation (CON) of U.S. Non-provisional application Ser. No. 12/703,958, filed Feb. 11, 2010, entitled "Marking Apparatus Having Enhanced Features for Underground Facility Marking Operations, and Associated Methods and Systems."

Ser. No. 12/703,958 claims a priority benefit, under 35 U.S.C. §119(a), to Canadian application serial no. 2,691,707, entitled "Marking Apparatus Having Enhanced Features for Underground Facility Marking Operations, and Associated Methods and Systems," filed on Feb. 10, 2010.

Ser. No. 12/703,958 claims a priority benefit, under 35 U.S.C. §119(e), to U.S. Provisional Application Ser. No. 61/151,574, entitled "Marking Device that has Enhanced Features for Underground Facility Locate Operations," filed on Feb. 11, 2009.

Ser. No. 12/703,958 also claims a priority benefit, under 35 U.S.C. §119(e), to U.S. Provisional Application Ser. No. 61/232,112, entitled "Methods and Apparatus for Detecting and Monitoring Use of Locating Equipment for Out-Of-Tolerance Conditions," filed on Aug. 7, 2009.

Ser. No. 12/703,958 also claims a priority benefit, under 35 U.S.C. §120, as a continuation-in-part (CIP) of U.S. Non-provisional application Ser. No. 12/568,087, entitled "Methods and Apparatus for Generating an Electronic Record of Environmental Landmarks based on Marking Device Actuations," filed on Sep. 28, 2009.

Ser. No. 12/568,087 in turn claims a priority benefit, under 35 U.S.C. §119(e), of U.S. Provisional Application Ser. No. 61/102,205, entitled "Data Acquisition For And Method Of Analyzing Locate Operations With Respect To Environmental Landmarks," filed on Oct. 2, 2008.

Ser. No. 12/568,087 also claims a priority benefit, under 35 U.S.C. §120, as a continuation-in-part (CIP) of U.S. Non-provisional application Ser. No. 12/539,497, entitled "Methods and Apparatus for Generating an Electronic Record of a Marking Operation based on Marking Device Actuations," filed on Aug. 11, 2009.

Ser. No. 12/539,497 in turn claims the benefit, under 35 U.S.C. §119(e), of U.S. Provisional Application Ser. No. 61/102,151, entitled "Data acquisition system for and method of analyzing marking operations based on marking device actuations," filed on Oct. 2, 2008.

Each of the above-identified applications is incorporated by reference herein in its entirety.

Ser. No. 12/703,958 also claims a priority benefit, under 35 U.S.C. §119(e), to U.S. Patent Application Ser. No. 61/235,519, entitled "Marking Device With Accelerometer and Local Data Storage," filed Aug. 20, 2009.

BACKGROUND

Field service operations may be any operation in which companies dispatch technicians and/or other staff to perform certain activities, for example, installations, services and/or repairs. Field service operations may exist in various industries, examples of which include, but are not limited to, network installations, utility installations, security systems, construction, medical equipment, heating, ventilating and air conditioning (HVAC) and the like.

An example of a field service operation in the construction industry is a so-called "locate and marking operation," also commonly referred to more simply as a "locate operation" (or sometimes merely as "a locate"). In a typical locate operation, a locate technician visits a work site in which there is a plan to disturb the ground (e.g., excavate, dig one or more holes and/or trenches, bore, etc.) so as to determine a presence or an absence of one or more underground facilities (such as various types of utility cables and pipes) in a dig area to be excavated or disturbed at the work site. In some instances, a locate operation may be requested for a "design" project, in which there may be no immediate plan to excavate or otherwise disturb the ground, but nonetheless information about a presence or absence of one or more underground facilities at a work site may be valuable to inform a planning, permitting and/or engineering design phase of a future construction project.

In many states, an excavator who plans to disturb ground at a work site is required by law to notify any potentially affected underground facility owners prior to undertaking an excavation activity. Advanced notice of excavation activities may be provided by an excavator (or another party) by contacting a "one-call center." One-call centers typically are operated by a consortium of underground facility owners for the purposes of receiving excavation notices and in turn notifying facility owners and/or their agents of a plan to excavate. As part of an advanced notification, excavators typically provide to the one-call center various information relating to the planned activity, including a location (e.g., address) of the work site and a description of the dig area to be excavated or otherwise disturbed at the work site.

A locate operation typically is initiated as a result of an excavator providing an excavation notice to a one-call center. An excavation notice also is commonly referred to as a "locate request," and may be provided by the excavator to the one-call center via an electronic mail message, information entry via a website maintained by the one-call center, or a telephone conversation between the excavator and a human operator at the one-call center. The locate request may include an address or some other location-related information describing the geographic location of a work site at which the excavation is to be performed, as well as a description of the dig area (e.g., a text description), such as its location relative to certain landmarks and/or its approximate dimensions, within which there is a plan to disturb the ground at the work site. One-call centers similarly may receive locate requests for design projects (for which, as discussed above, there may be no immediate plan to excavate or otherwise disturb the ground).

Once facilities implicated by the locate request are identified by a one-call center, the one-call center generates a "locate request ticket" (also known as a "locate ticket," or simply a "ticket"). The locate request ticket essentially constitutes an instruction to inspect a work site and typically identifies the work site of the proposed excavation or design and a description of the dig area, typically lists on the ticket all of the underground facilities that may be present at the work site (e.g., by providing a member code for the facility owner of an underground facility), and may also include various other information relevant to the proposed excavation or design (e.g., the name of the excavation company, a name of a property owner or party contracting the excavation company to perform the excavation, etc.). The one-call center sends the ticket to one or more underground facility owners and/or one or more locate service providers (who may be acting as contracted agents of the facility owners) so that they can conduct a locate and marking operation to verify a presence or absence of the underground facilities in the dig area. For example, in some instances, a given underground facility owner may operate its own fleet of locate technicians, in which case the one-call center may send the ticket to the underground facility owner. In other instances, a given facility owner may contract with a locate service provider to receive locate request tickets and perform a locate and marking operation in response to received tickets on their behalf.

Upon receiving the locate request, a locate service provider or a facility owner (hereafter referred to as a "ticket recipient") may dispatch a locate technician to the work site of planned excavation to determine a presence or absence of one or more underground facilities in the dig area to be excavated or otherwise disturbed. A typical first step for the locate technician includes utilizing an underground facility "locate device," which is an instrument or set of instruments (also referred to commonly as a "locate set") for detecting facilities that are concealed in some manner, such as cables and pipes that are located underground. The locate device is employed by the technician to verify the presence or absence of underground facilities indicated in the locate request ticket as potentially present in the dig area (e.g., via the facility owner member codes listed in the ticket). This process is often referred to as a "locate operation."

In one example of a locate operation, an underground facility locate device is used to detect electromagnetic fields that are generated by an applied signal provided along a length of a target facility to be identified. In this example, a locate device may include both a signal transmitter to provide the applied signal (e.g., which is coupled by the locate technician to a tracer wire disposed along a length of a facility), and a signal receiver which is generally a hand-held apparatus carried by the locate technician as the technician walks around the dig area to search for underground facilities. The transmitter is connected via a connection point to a target object (in this example, underground facility) located in the ground, and generates the applied signal coupled to the underground facility via the connection point (e.g., to a tracer wire along the facility), resulting in the generation of a magnetic field. The magnetic field in turn is detected by the locate receiver, which itself may include one or more detection antenna. The locate receiver indicates a presence of a facility when it detects electromagnetic fields arising from the applied signal. Conversely, the absence of a signal detected by the locate receiver generally indicates the absence of the target facility.

In yet another example, a locate device employed for a locate operation may include a single instrument, similar in some respects to a conventional metal detector. In particular, such an instrument may include an oscillator to generate an alternating current that passes through a coil, which in turn produces a first magnetic field. If a piece of electrically conductive metal is in close proximity to the coil (e.g., if an underground facility having a metal component is below/near the coil of the instrument), eddy currents are induced in the metal and the metal produces its own magnetic field, which in turn affects the first magnetic field. The instrument may include a second coil to measure changes to the first magnetic field, thereby facilitating detection of metallic objects.

In addition to the locate operation, the locate technician also generally performs a "marking operation," in which the technician marks the presence (and in some cases the absence) of a given underground facility in the dig area based on the various signals detected (or not detected) during the locate operation. For this purpose, the locate technician conventionally utilizes a "marking device" to dispense a marking material on, for example, the ground, pavement, or other surface along a detected underground facility. Marking material may be any material, substance, compound, and/or element, used or which may be used separately or in combination to mark, signify, and/or indicate. Examples of marking materials may include, but are not limited to, paint, chalk, dye, and/or iron. Marking devices, such as paint marking wands and/or paint marking wheels, provide a convenient method of dispensing marking materials onto surfaces, such as onto the surface of the ground or pavement.

FIGS. 1A and 1B illustrate a conventional marking device 50 with a mechanical actuation system to dispense paint as a marker. Generally speaking, the marking device 50 includes a handle 38 at a proximal end of an elongated shaft 36 and resembles a sort of "walking stick," such that a technician may operate the marking device while standing/walking in an upright or substantially upright position. A marking dispenser holder 40 is coupled to a distal end of the shaft 36 so as to contain and support a marking dispenser 56, e.g., an aerosol paint can having a spray nozzle 54. Typically, a marking dispenser in the form of an aerosol paint can is placed into the holder 40 upside down, such that the spray nozzle 54 is proximate to the distal end of the shaft (close to the ground, pavement or other surface on which markers are to be dispensed).

In FIGS. 1A and 1B, the mechanical actuation system of the marking device 50 includes an actuator or mechanical trigger 42 proximate to the handle 38 that is actuated/triggered by the technician (e.g., via pulling, depressing or squeezing with fingers/hand). The actuator 42 is connected to a mechanical coupler 52 (e.g., a rod) disposed inside and along a length of the elongated shaft 36. The coupler 52 is in turn connected to an actuation mechanism 58, at the distal end of the shaft 36, which mechanism extends outward from the shaft in the direction of the spray nozzle 54. Thus, the actuator 42, the mechanical coupler 52, and the actuation mechanism 58 constitute the mechanical actuation system of the marking device 50.

FIG. 1A shows the mechanical actuation system of the conventional marking device 50 in the non-actuated state, wherein the actuator 42 is "at rest" (not being pulled) and, as a result, the actuation mechanism 58 is not in contact with the spray nozzle 54. FIG. 1B shows the marking device 50 in the actuated state, wherein the actuator 42 is being actuated (pulled, depressed, squeezed) by the technician. When actuated, the actuator 42 displaces the mechanical coupler 52 and the actuation mechanism 58 such that the actuation mechanism contacts and applies pressure to the spray nozzle 54, thus causing the spray nozzle to deflect slightly and dispense paint. The mechanical actuation system is spring-loaded so that it automatically returns to the non-actuated state (FIG. 1A) when the actuator 42 is released.

In some environments, arrows, flags, darts, or other types of physical marks may be used to mark the presence or absence of an underground facility in a dig area, in addition to or as an alternative to a material applied to the ground (such as paint, chalk, dye, tape) along the path of a detected utility. The marks resulting from any of a wide variety of materials and/or objects used to indicate a presence or absence of underground facilities generally are referred to as "locate marks." Often, different color materials and/or physical objects may be used for locate marks, wherein different colors correspond to different utility types. For example, the American Public Works Association (APWA) has established a standardized color-coding system for utility identification for use by public agencies, utilities, contractors and various groups involved in ground excavation (e.g., red=electric power lines and cables;

blue=portable water; orange=telecommunication lines; yellow=gas, oil, steam). In some cases, the technician also may provide one or more marks to indicate that no facility was found in the dig area (sometimes referred to as a "clear").

As mentioned above, the foregoing activity of identifying and marking a presence or absence of one or more underground facilities generally is referred to for completeness as a "locate and marking operation." However, in light of common parlance adopted in the construction industry, and/or for the sake of brevity, one or both of the respective locate and marking functions may be referred to in some instances simply as a "locate operation" or a "locate" (i.e., without making any specific reference to the marking function). Accordingly, it should be appreciated that any reference in the relevant arts to the task of a locate technician simply as a "locate operation" or a "locate" does not necessarily exclude the marking portion of the overall process. At the same time, in some contexts a locate operation is identified separately from a marking operation, wherein the former relates more specifically to detection-related activities and the latter relates more specifically to marking-related activities.

Inaccurate locating and/or marking of underground facilities can result in physical damage to the facilities, property damage, and/or personal injury during the excavation process that, in turn, can expose a facility owner or contractor to significant legal liability. When underground facilities are damaged and/or when property damage or personal injury results from damaging an underground facility during an excavation, the excavator may assert that the facility was not accurately located and/or marked by a locate technician, while the locate contractor who dispatched the technician may in turn assert that the facility was indeed properly located and marked. Proving whether the underground facility was properly located and marked can be difficult after the excavation (or after some damage, e.g., a gas explosion), because in many cases the physical locate marks (e.g., the marking material or other physical marks used to mark the facility on the surface of the dig area) will have been disturbed or destroyed during the excavation process (and/or damage resulting from excavation).

Previous efforts at documenting locate operations have focused primarily on locate devices that employ electromagnetic fields to determine the presence of an underground facility. For example, U.S. Pat. No. 5,576,973, naming inventor Alan Haddy and entitled "Apparatus and Method for Obtaining Geographical Positional Data for an Object Located Underground" (hereafter "Haddy"), is directed to a locate device (i.e., a "locator") that receives and stores data from a global positioning system ("GPS") to identify the position of the locate device as an underground object (e.g., a cable) is detected by the locate device. Haddy notes that by recording geographical position data relating to the detected underground object, there is no need to physically mark the location of the underground object on the ground surface, and the recorded position data may be used in the future to re-locate the underground object.

Similarly, U.S. Pat. No. 7,319,387, naming inventors Willson et al. and entitled "GPS Interface for Locating Device" (hereafter "Willson"), is directed to a locate device for locating "position markers," i.e., passive antennas that reflect back RF signals and which are installed along buried utilities. In Willson, a GPS device may be communicatively coupled to the locate device, or alternatively provided as an integral part of the locate device, to store GPS coordinate data associated with position markers detected by the locate device. Electronic memory is provided in the locate device for storing a data record of the GPS coordinate data, and the data record may be uploaded to a remote computer and used to update a mapping database for utilities.

U.S. Publication No. 2006/0282280, naming inventors Stotz et al. and entitled "Ticket and Data Management" (hereafter "Stotz"), also is directed to a locate device (i.e., a "locator") including a GPS receiver. Upon detection of the presence of a utility line, Stotz' locate device can update ticket data with GPS coordinates for the detected utility line. Once the locate device has updated the ticket data, the reconfigured ticket data may be transmitted to a network.

U.S. Publication No. 2007/0219722, naming inventors Sawyer, Jr. et al. and entitled "System and Method for Collecting and Updating Geographical Data" (hereafter "Sawyer"), is directed to collecting and recording data representative of the location and characteristics of utilities and infrastructure in the field for creating a grid or map. Sawyer employs a field data collection unit including a "locating pole" that is placed on top of or next to a utility to be identified and added to the grid or map. The locating pole includes an antenna coupled to a location determination system, such as a GPS unit, to provide longitudinal and latitudinal coordinates of the utility under or next to the end of the locating pole. The data gathered by the field data collection unit is sent to a server to provide a permanent record that may be used for damage prevention and asset management operations.

SUMMARY

Applicants have recognized and appreciated that uncertainties which may be attendant to locate and marking operations may be significantly reduced by collecting various information particularly relating to the marking operation, rather than merely focusing on information relating to detection of underground facilities via a locate device. In many instances, excavators arriving to a work site have only physical locate marks on which to rely to indicate a presence or absence of underground facilities, and they are not generally privy to information that may have been collected previously during the locate operation. Accordingly, the integrity and accuracy of the physical locate marks applied during a marking operation arguably is significantly more important in connection with reducing risk of damage and/or injury during excavation than the location of where an underground facility was detected via a locate device during a locate operation.

More specifically, Applicants have recognized and appreciated that conventional techniques for using a locate device to detect underground facilities are sometimes tentative and typically iterative in nature, and use of locate devices with GPS capabilities may result in redundant, spurious and/or incomplete geographic location data collected by such devices. For example, during a typical locate operation, a technician attempting to locate an underground facility with a locate device often needs to sweep an appreciable area around a suspected underground facility, and make multiple passes with the locate device over the underground facility to obtain meaningful detection signals. Furthermore, the technician often needs to rely significantly on visual observations of the area, including relevant landmarks such as facility connections to buildings, transformer boxes, maintenance/public access points, curbs, sidewalks, roadways, etc., to effectively deduce a sensible path of an underground facility to be located. The foregoing is particularly true if at some point during the locate operation the technician loses a signal from an underground facility in the process of being detected (e.g., due to a broken transmitter circuit path from a damaged tracer wire, and loss of the transmitter test signal). In view of the foregoing, it may be readily appreciated that collecting and logging geographic location information throughout this process may result in excessive and/or imprecise data, or in some instances incomplete relevant data (e.g., in the case of signal loss/broken tracer wire), from which it may be difficult to cull the data that is truly complete and representative of where the underground facility ultimately was detected.

Furthermore, Applicants have recognized and appreciated that the location at which an underground facility ultimately is detected during a locate operation is not always where the technician physically marks the ground, pavement or other surface during a marking operation; in fact, technician imprecision or negligence, as well as various ground conditions and/or different operating conditions amongst different locate device, may in some instances result in significant discrepancies between detected location and physical locate marks. Accordingly, having documentation (e.g., an electronic record) of where physical locate marks were actually dispensed (i.e., what an excavator encounters when arriving to a work site) is notably more relevant to the assessment of liability in the event of damage and/or injury than where an underground facility was detected prior to marking.

Examples of marking devices configured to collect some types of information relating specifically to marking operations are provided in U.S. publication no. 2008-0228294-A1, published Sep. 18, 2008, filed Mar. 13, 2007, and entitled "Marking System and Method With Location and/or Time Tracking," and U.S. publication no. 2008-0245299-A1, published Oct. 9, 2008, filed Apr. 4, 2007, and entitled "Marking System and Method," both of which publications are incorporated herein by reference. These publications describe, amongst other things, collecting information relating to the geographic location, time, and/or characteristics (e.g., color/type) of dispensed marking material from a marking device and generating an electronic record based on this collected information. Applicants have recognized and appreciated that collecting information relating to both geographic location and color of dispensed marking material provides for automated correlation of geographic information for a locate mark to facility type (e.g., red=electric power lines and cables; blue=portable water; orange=telecommunication lines; yellow=gas, oil, steam); in contrast, in conventional locate devices equipped with GPS capabilities as discussed above, there is no apparent automated provision for readily linking GPS information for a detected facility to the type of facility detected. Applicants have further appreciated that building a more comprehensive electronic record of information relating to marking operations further facilitates ensuring the accuracy of such operations.

In view of the foregoing, various embodiments of the present invention are directed to marking apparatus with enhanced features, and associated methods and systems, to facilitate collection of a wide variety of information relating to a marking operation, and provide for creation of a comprehensive and robust electronic record of a marking operation. Marking information relating to use of a marking device to perform a marking operation may be acquired from one or more of a variety of input devices in any of a variety of manners, logged/stored in local memory of a marking device, formatted in various manners, processed and/or analyzed at the marking device itself, and/or transmitted to another device (e.g., a remote computer/server) for storage, processing and/or analysis.

In some exemplary embodiments described in detail herein, a marking device may include one or more environmental sensors and/or operational sensors, and the marking information may include environmental information and operational information derived from such sensors. Environmental and/or operational information may be used to control operation of the marking device, assess out-of-tolerance conditions in connection with use of the marking device, and/or provide alerts or other feedback. In yet other embodiments, additional enhancements are disclosed relating to improving the determination of a location (e.g., GPS coordinates) of a dispensing tip of the marking device during use.

In other embodiments, a marking device may be operated in a "solo" mode or a "group" mode. In particular, in a "solo" mode, the marking device may be operated as an individual, independent device to collect, store and/or transmit data, whereas in "group" mode, a marking device may act as a "worker" device or a "leader" device to facilitate consolidation of data collected by multiple devices (e.g., relating to a same ticket) at a single one of the devices, at a host server, or at any other suitable location.

In yet other embodiments, a marking device may be equipped with an enhanced user interface having tactile functionality; in particular, the marking device may include one or more tactile indicators (e.g., vibrating devices) disposed, for example, in a handle, joy stick, actuator or elsewhere on the device, to provide a tactile indication to a technician using the marking device (e.g., as feedback in connection with an operating mode, operating condition, environmental condition, etc.).

During and/or following collection and/or storage of information regarding the marking operation, data compiled in one or more electronic records associated with the marking operation may be accessed, processed and/or analyzed to provide further information relating to the performance of the marking operation. For example, in other embodiments disclosed herein, data from one or more electronic records of the marking operation is processed so as to electronically render (visually recreate) the marking operation (e.g., on a display device associated with the marking device or other display device). Electronic renderings may be generated statically (e.g., in which all available data in an electronic record is rendered essentially simultaneously on an available display field) or in an "animated" time-sequenced recreation of the marking operation (e.g., based on at least timing and geographic location information in the electronic record) once an electronic record is generated. In yet another exemplary implementation, various information to be logged in an electronic record may be passed/transmitted in essentially real-time to one or more display devices to facilitate an essentially real-time electronic rendering on an available display field of a marking operation in process.

According to one embodiment of the present invention, a marking apparatus for use in performing a marking operation to indicate a presence or an absence of at least one underground facility is provided. The marking apparatus comprises a hand-held housing, at least one processor disposed within the hand-held housing, a holder configured to hold to the hand-held housing at least one marking dispenser containing a marking material, and at least one input device communicatively coupled to the at least one processor and configured to sense at least one environmental condition of an environment in which the marking apparatus is located. The at least one input device is configured to provide an output signal to the at least one processor indicative of the sensed at least one environmental condition.

Another embodiment of the present invention is directed to a marking apparatus for use in performing a marking operation to indicate a presence or an absence of at least one underground facility. The marking apparatus comprises a hand-held housing, at least one processor disposed within the hand-held housing, a holder configured to hold to the handheld housing at least one marking dispenser containing a marking material, and at least one actuator configured to actuate the marking dispenser to dispense the marking material. The marking apparatus further comprises a location tracking system configured to determine a location of the apparatus, a temperature sensor communicatively coupled to the at least one processor and configured to sense an ambient temperature of an environment in which the marking apparatus is located and provide a first output signal indicative of the ambient temperature to the at least one processor, and a humidity sensor communicatively coupled to the at least one processor and configured to sense humidity of the environment in which the marking apparatus is located and provide a second output signal indicative of the humidity to the at least one processor. The at least one processor is programmed with processor-executable instructions which, when executed, cause the at least one processor to compare the first output signal to a target ambient temperature range for dispensing the marking material and the second output signal to a target humidity range for dispensing the marking material. In response to determining that one or both of the first output signal and the second output signal is indicative of an out-of-range ambient temperature and/or out-of-range humidity, the at least one processor does at least one of (i) generate an alert to a technician using the marking apparatus and (ii) disable the at least one actuator.

Another embodiment of the present invention is directed to a method for performing a marking operation to mark a presence or absence of at least one underground facility using a marking device. The method comprises A) dispensing, via actuation of an actuation system of the marking device, marking material onto a target surface, B) detecting, via at least one input device of the marking device, at least one environmental condition of an environment in which the marking device is located, and C) logging into local memory of the marking device marking information relating at least in part to A) and B).

Another embodiment of the present invention is directed to an apparatus for marking a presence or absence of an underground facility. The apparatus comprises at least one actuator to control dispensing of a marking material for marking the presence or absence of the underground facility. The apparatus further comprises a memory to store processor-executable instructions, at least one communication interface, and at least one processor communicatively coupled to the at least one actuator, the memory, and the at least one communication interface. Upon execution of the processor-executable instructions, the processor controls the at least one communication interface to receive environmental information regarding at least one environmental condition of an environment in which the apparatus is located, and stores at least some of the received environmental information in the memory.

Another embodiment of the present invention is directed to a marking apparatus for use in performing a marking operation to indicate a presence or an absence of at least one underground facility, comprising a hand-held housing and at least one processor disposed within the hand-held housing. The marking apparatus further comprises a holder configured to hold to the hand-held housing at least one marking dispenser containing a marking material, a location tracking system configured to determine a location of the apparatus, and at least one input device communicatively coupled to the at least one processor and configured to sense an operating condition of the apparatus and provide an output signal to the at least one processor indicative of the sensed operating condition.

Another embodiment of the present invention is directed to a marking apparatus for use in performing a marking operation to indicate a presence or an absence of at least one underground facility. The marking apparatus comprises a housing, at least one processor disposed within the housing, a holder configured to hold to the housing at least one marking dispenser containing a marking material, and at least one actuator configured to actuate the marking dispenser to dispense the marking material. The marking apparatus further comprises an input device communicatively coupled to the at least one processor to provide an input signal to the at least one processor. The at least one processor is programmed with processor-executable instructions which, when executed, cause the at least one processor to compare the input signal to a target value or range of values to assess whether an out-of-tolerance condition is indicated by the input signal. If an out-of-tolerance condition is indicated by the input signal, the at least one processor does at least one of: (a) log an out-of-tolerance indication into an electronic record; (b) generate an alert to a user of the marking apparatus that an out-of-tolerance condition has been detected; and (c) disable the at least one actuator.

Another embodiment of the present invention is directed to a method for use of a marking device, the marking device for use in performing a marking operation to indicate a presence or an absence of at least one underground facility. The method comprises A) acquiring, using an environmental sensor of the marking device, environmental information representative of at least one environmental condition of an environment in which the marking device is located. The method further comprises B) dispensing a marking material using a marking dispenser of the marking device to mark the presence or the absence of the at least one underground facility. The method further comprises C) controlling B) based at least in part on the environmental information acquired in A).

Another embodiment of the present invention is directed to a method for use of a marking device, the marking device for use in performing a marking operation to indicate a presence or an absence of at least one underground facility. The method comprises A) acquiring, using an environmental sensor of the marking device, environmental information representative of at least one environmental condition of an environment in which the marking device is located. The method further comprises B) comparing the environmental information to a target value or range of values to assess whether an out-of-tolerance condition with respect to the environment is indicated by the environmental information. The method further comprises C) if an out-of-tolerance condition is indicated, doing at least one of: (i) logging an out-of-tolerance indication into an electronic record; (ii) generating an alert to a user of the marking apparatus that an out-of-tolerance condition has been detected; and (iii) controlling dispensing of marking material by the marking device.

Another embodiment of the present invention is directed to a method for using a marking device, the marking device for use in performing a marking operation to indicate a presence or an absence of at least one underground facility. The method comprises A) acquiring, using an operational sensor of the marking device, operating information representative of at least one operating condition of the marking device. The method further comprises B) dispensing a marking material using a marking dispenser of the marking device to mark the presence or the absence of the at least one underground facility. The method further comprises C) controlling B) based at least in part on the operating information acquired in A).

Another embodiment of the present invention is directed to a method for using operational data collected as part of a marking operation to indicate the presence or absence of an underground facility. The method comprises receiving the operational data representative of an operating condition of a marking device used to perform the marking operation, and analyzing the operational data for an operating pattern of a technician using the marking device.

Another embodiment of the present invention is directed to at least one computer-readable storage medium storing an electronic record associated with a marking operation. The electronic record comprises at least one data set representing a technician signature with respect to a technician's operation of a marking device for performing the marking operation.

Another embodiment of the present invention is directed to a marking apparatus for performing a marking operation to mark on ground, pavement, or other surface a presence or an absence of at least one underground facility. The apparatus comprises an actuator to dispense a marking material so as to form at least one locate mark on the ground, pavement or other surface to mark the presence or the absence of the at least one underground facility. The apparatus further comprises at least one input device to provide marking information regarding the marking operation. The at least one input device is configured to sense at least one environmental condition of an environment in which the apparatus is located and provide an output signal indicative of the sensed at least one environmental condition. The apparatus further comprises at least one processor communicatively coupled to the actuator and the at least one input device so as to receive the output signal. In one implementation, the apparatus further comprises a memory to store processor-executable instructions. The marking information includes environmental information represented at least in part by the output signal indicative of the sensed at least one environmental condition. In one aspect of this implementation, upon execution of the processor-executable instructions, the processor logs into the memory at least some of the environmental information. In another aspect, the processor logs into the memory the at least some of the environmental information based at least in part on at least one actuation of the actuator.

For purposes of the present disclosure, the term "dig area" refers to a specified area of a work site within which there is a plan to disturb the ground (e.g., excavate, dig holes and/or trenches, bore, etc.), and beyond which there is no plan to excavate in the immediate surroundings. Thus, the metes and bounds of a dig area are intended to provide specificity as to where some disturbance to the ground is planned at a given work site. It should be appreciated that a given work site may include multiple dig areas.

The term "facility" refers to one or more lines, cables, fibers, conduits, transmitters, receivers, or other physical objects or structures capable of or used for carrying, transmitting, receiving, storing, and providing utilities, energy, data, substances, and/or services, and/or any combination thereof. The term "underground facility" means any facility beneath the surface of the ground. Examples of facilities include, but are not limited to, oil, gas, water, sewer, power, telephone, data transmission, cable television (TV), and/or internet services.

The term "locate device" includes one or both of a locate transmitter and a locate receiver (which in some instances may also be referred to collectively as a "locate instrument set," or simply "locate set").

The term "marking device" refers to any apparatus, mechanism, or other device that employs a marking dispenser for causing a marking material and/or marking object to be dispensed, or any apparatus, mechanism, or other device for electronically indicating (e.g., logging in memory) a location, such as a location of an underground facility. Additionally, the term "marking dispenser" refers to any apparatus, mechanism, or other device for dispensing and/or otherwise using, separately or in combination, a marking material and/or a marking object. An example of a marking dispenser may include, but is not limited to, a pressurized can of marking paint. The term "marking material" means any material, substance, compound, and/or element, used or which may be used separately or in combination to mark, signify, and/or indicate. Examples of marking materials may include, but are not limited to, paint, chalk, dye, and/or iron. The term "marking object" means any object and/or objects used or which may be used separately or in combination to mark, signify, and/or indicate. Examples of marking objects may include, but are not limited to, a flag, a dart, and arrow, and/or an RFID marking ball. It is contemplated that marking material may include marking objects. It is further contemplated that the terms "marking materials" or "marking objects" may be used interchangeably in accordance with the present disclosure.

The term "locate mark" means any mark, sign, and/or object employed to indicate the presence or absence of any underground facility. Examples of locate marks may include, but are not limited to, marks made with marking materials, marking objects, global positioning or other information, and/or any other means. Locate marks may be represented in any form including, without limitation, physical, visible, electronic, and/or any combination thereof.

The terms "actuate" or "trigger" (verb form) are used interchangeably to refer to starting or causing any device, program, system, and/or any combination thereof to work, operate, and/or function in response to some type of signal or stimulus. Examples of actuation signals or stimuli may include, but are not limited to, any local or remote, physical, audible, inaudible, visual, non-visual, electronic, mechanical, electromechanical, biomechanical, biosensing or other signal, instruction, or event. The terms "actuator" or "trigger" (noun form) are used interchangeably to refer to any method or device used to generate one or more signals or stimuli to cause or causing actuation. Examples of an actuator/trigger may include, but are not limited to, any form or combination of a lever, switch, program, processor, screen, microphone for capturing audible commands, and/or other device or method. An actuator/trigger may also include, but is not limited to, a device, software, or program that responds to any movement and/or condition of a user, such as, but not limited to, eye movement, brain activity, heart rate, other data, and/or the like, and generates one or more signals or stimuli in response thereto. In the case of a marking device or other marking mechanism (e.g., to physically or electronically mark a facility or other feature), actuation may cause marking material to be dispensed, as well as various data relating to the marking operation (e.g., geographic location, time stamps, characteristics of material dispensed, etc.) to be logged in an electronic file stored in memory. In the case of a locate device or other locate mechanism (e.g., to physically locate a facility or other feature), actuation may cause a detected signal strength, signal frequency, depth, or other information relating to the locate operation to be logged in an electronic file stored in memory.

The terms "locate and marking operation," "locate operation," and "locate" generally are used interchangeably and refer to any activity to detect, infer, and/or mark the presence or absence of an underground facility. In some contexts, the term "locate operation" is used to more specifically refer to detection of one or more underground facilities, and the term "marking operation" is used to more specifically refer to using a marking material and/or one or more marking objects to mark a presence or an absence of one or more underground facilities. The term "locate technician" refers to an individual performing a locate operation. A locate and marking operation often is specified in connection with a dig area, at least a portion of which may be excavated or otherwise disturbed during excavation activities.

The term "user" refers to an individual utilizing a locate device and/or a marking device and may include, but is not limited to, land surveyors, locate technicians, and support personnel.

The terms "locate request" and "excavation notice" are used interchangeably to refer to any communication to request a locate and marking operation. The term "locate request ticket" (or simply "ticket") refers to any communication or instruction to perform a locate operation. A ticket might specify, for example, the address or description of a dig area to be marked, the day and/or time that the dig area is to be marked, and/or whether the user is to mark the excavation area for certain gas, water, sewer, power, telephone, cable television, and/or some other underground facility. The term "historical ticket" refers to past tickets that have been completed.

The following U.S. published applications and patents are hereby incorporated herein by reference:

U.S. Pat. No. 7,640,105, issued Dec. 29, 2009, filed Mar. 13, 2007, and entitled "Marking System and Method With Location and/or Time Tracking;"

U.S. publication no. 2008-0245299-A1, published Oct. 9, 2008, filed Apr. 4, 2007, and entitled "Marking System and Method;"

U.S. publication no. 2009-0013928-A1, published Jan. 15, 2009, filed Sep. 24, 2008, and entitled "Marking System and Method;"

U.S. publication no. 2009-0238414-A1, published Sep. 24, 2009, filed Mar. 18, 2008, and entitled "Virtual White Lines for Delimiting Planned Excavation Sites;"

U.S. publication no. 2009-0241045-A1, published Sep. 24, 2009, filed Sep. 26, 2008, and entitled "Virtual White Lines for Delimiting Planned Excavation Sites;"

U.S. publication no. 2009-0238415-A1, published Sep. 24, 2009, filed Sep. 26, 2008, and entitled "Virtual White Lines for Delimiting Planned Excavation Sites;"

U.S. publication no. 2009-0241046-A1, published Sep. 24, 2009, filed Jan. 16, 2009, and entitled "Virtual White Lines for Delimiting Planned Excavation Sites;"

U.S. publication no. 2009-0238416-A1, published Sep. 24, 2009, filed Jan. 16, 2009, and entitled "Virtual White Lines for Delimiting Planned Excavation Sites;"

U.S. publication no. 2009-0237408-A1, published Sep. 24, 2009, filed Jan. 16, 2009, and entitled "Virtual White Lines for Delimiting Planned Excavation Sites;"

U.S. publication no. 2009-0202101-A1, published Aug. 13, 2009, filed Feb. 12, 2008, and entitled "Electronic Manifest of Underground Facility Locate Marks;"

U.S. publication no. 2009-0202110-A1, published Aug. 13, 2009, filed Sep. 11, 2008, and entitled "Electronic Manifest of Underground Facility Locate Marks;"

U.S. publication no. 2009-0201311-A1, published Aug. 13, 2009, filed Jan. 30, 2009, and entitled "Electronic Manifest of Underground Facility Locate Marks;"

U.S. publication no. 2009-0202111-A1, published Aug. 13, 2009, filed Jan. 30, 2009, and entitled "Electronic Manifest of Underground Facility Locate Marks;"

U.S. publication no. 2009-0204625-A1, published Aug. 13, 2009, filed Feb. 5, 2009, and entitled "Electronic Manifest of Underground Facility Locate Operation;"

U.S. publication no. 2009-0204466-A1, published Aug. 13, 2009, filed Sep. 4, 2008, and entitled "Ticket Approval System For and Method of Performing Quality Control In Field Service Applications;"

U.S. publication no. 2009-0207019-A1, published Aug. 20, 2009, filed Apr. 30, 2009, and entitled "Ticket Approval System For and Method of Performing Quality Control In Field Service Applications;"

U.S. publication no. 2009-0210284-A1, published Aug. 20, 2009, filed Apr. 30, 2009, and entitled "Ticket Approval System For and Method of Performing Quality Control In Field Service Applications;"

U.S. publication no. 2009-0210297-A1, published Aug. 20, 2009, filed Apr. 30, 2009, and entitled "Ticket Approval System For and Method of Performing Quality Control In Field Service Applications;"

U.S. publication no. 2009-0210298-A1, published Aug. 20, 2009, filed Apr. 30, 2009, and entitled "Ticket Approval System For and Method of Performing Quality Control In Field Service Applications;"

U.S. publication no. 2009-0210285-A1, published Aug. 20, 2009, filed Apr. 30, 2009, and entitled "Ticket Approval System For and Method of Performing Quality Control In Field Service Applications;"

U.S. publication no. 2009-0324815-A1, published Dec. 31, 2009, filed Apr. 24, 2009, and entitled "Marking Apparatus and Marking Methods Using Marking Dispenser with Machine-Readable ID Mechanism;"

U.S. publication no. 2010-0006667-A1, published Jan. 14, 2010, filed Apr. 24, 2009, and entitled, "Marker Detection Mechanisms for use in Marking Devices And Methods of Using Same;"

U.S. publication no. 2009-0204238-A1, published Aug. 13, 2009, filed Feb. 2, 2009, and entitled "Electronically Controlled Marking Apparatus and Methods;"

U.S. publication no. 2009-0208642-A1, published Aug. 20, 2009, filed Feb. 2, 2009, and entitled "Marking Apparatus and Methods For Creating an Electronic Record of Marking Operations;"

U.S. publication no. 2009-0210098-A1, published Aug. 20, 2009, filed Feb. 2, 2009, and entitled "Marking Apparatus and Methods For Creating an Electronic Record of Marking Apparatus Operations;"

U.S. publication no. 2009-0201178-A1, published Aug. 13, 2009, filed Feb. 2, 2009, and entitled "Methods For Evaluating Operation of Marking Apparatus;"

U.S. publication no. 2009-0238417-A1, published Sep. 24, 2009, filed Feb. 6, 2009, and entitled "Virtual White Lines for Indicating Planned Excavation Sites on Electronic Images;"

U.S. publication no. 2009-0202112-A1, published Aug. 13, 2009, filed Feb. 11, 2009, and entitled "Searchable Electronic Records of Underground Facility Locate Marking Operations;"

U.S. publication no. 2009-0204614-A1, published Aug. 13, 2009, filed Feb. 11, 2009, and entitled "Searchable Electronic Records of Underground Facility Locate Marking Operations;"

U.S. publication no. 2009-0327024-A1, published Dec. 31, 2009, filed Jun. 26, 2009, and entitled "Methods and Apparatus for Quality Assessment of a Field Service Operation;"

U.S. publication no. 2010-0010862-A1, published Jan. 14, 2010, filed Aug. 7, 2009, and entitled, "Methods and Apparatus for Quality Assessment of a Field Service Operation Based on Geographic Information;"

U.S. publication No. 2010-0010863-A1, published Jan. 14, 2010, filed Aug. 7, 2009, and entitled, "Methods and Apparatus for Quality Assessment of a Field Service Operation Based on Multiple Scoring Categories;" and U.S. publication no. 2010-0010882-A1, published Jan. 14, 2010, filed Aug. 7, 2009, and entitled, "Methods and Apparatus for Quality Assessment of a Field Service Operation Based on Dynamic Assessment Parameters."

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

DETAILED DESCRIPTION

Figure 1B:
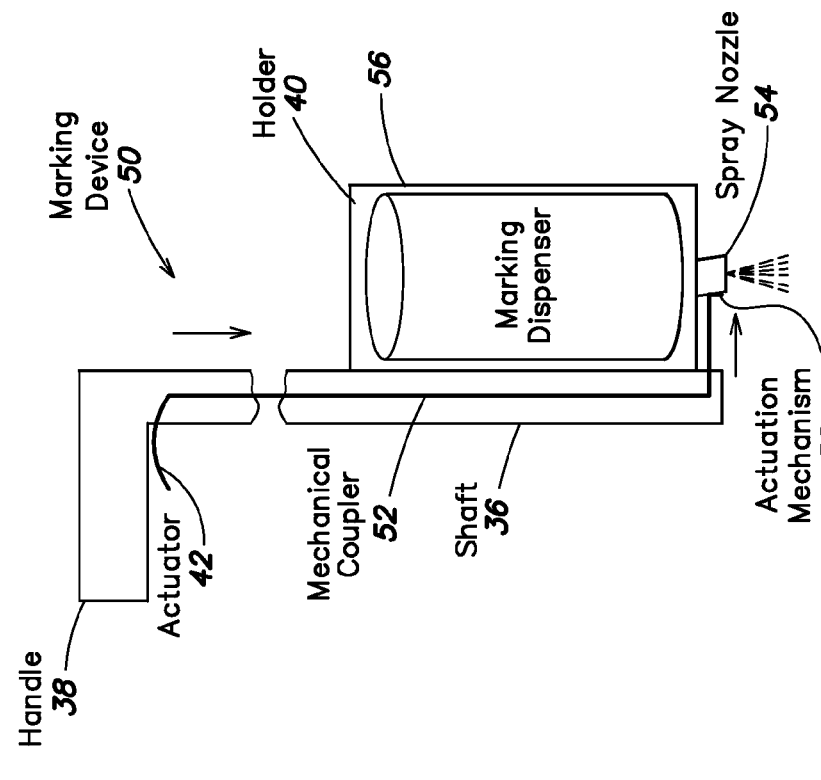
FIGS. 1A and 1B illustrate a conventional marking device in an actuated and non-actuated state, respectively.

Following below are more detailed descriptions of various concepts related to, and embodiments of, inventive marking apparatus having enhanced features for underground facility marking operations, and associated methods and systems. It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes.

I. OVERVIEW

In some embodiments of the present invention, a marking device employed by a locate technician to dispense marking material is particularly configured to acquire "marking information" relating to a marking operation based at least in part on actuations of the marking device, and create an electronic record of at least some of the marking information. As discussed in greater detail below, examples of marking information relating to the marking operation that may be logged into an electronic record may include, but are not limited to:

- timing information (e.g., one or more time stamps) associated with one or more actuations of the marking device and/or one or more events occurring during a given actuation;
- geographic information (e.g., one or more geographic coordinates) associated with one or more actuations of the marking device (in some instances, the geographic information may be accompanied by timing information, such as a time stamp, for each acquisition of geographic information);
- marking material information: one or more aspects/characteristics of a marking material (e.g., a color, brand, type, serial number, UPC code, weight, inventory information, etc. associated with the marking material) dispensed in response to one or more actuations of the marking device;
- service-related information: one or more identifiers for the locate technician performing the marking operation, the marking device itself (e.g., a serial number of the marking device), and/or the locate contractor dispatching the locate technician;
- ticket information: information relating to one or more facilities to be marked, location information (e.g., an address, geo-coordinates, and/or text description) relating to the work site and/or dig area in which the locate and marking operation is performed, ground type information (e.g., a description of the ground at which marking material is dispensed), excavator information, other text-based information, etc.;
- environmental information: information derived from one or more environmental sensors associated with the marking device, examples of which sensors include, but are not limited to, temperature sensors, humidity sensors, light sensors, altitude sensors, image capture devices and audio recorders;
- operational information: information derived from one or more operational sensors associated with the marking device, examples of which sensors include, but are not limited to, operational temperature sensors, a compass, an inclinometer, an accelerometer, a yaw rate sensor, a proximity sensor, a pressure sensor, one or more device health sensors, image capture devices, and audio devices; and
- device health information: information about the status of one or more components of a locate device, such as battery status, WiFi connectivity status, GPS receiver status (e.g., GPS signal strength/quality, number of satellites in view), etc.

Marking information including any or all of the foregoing types of information may be logged/stored in local memory of a marking device, formatted in various manners, processed and/or analyzed at the marking device itself, and/or transmitted to another device (e.g., a remote computer/server) for storage, processing and/or analysis. In particular, environmental and/or operational information may be used to control operation of the marking device, assess out-of-tolerance conditions in connection with use of the marking device, and/or provide alerts or other feedback. In yet other embodiments, operational information may be analyzed and processed so as to improve a determination of a location (e.g., GPS coordinates) of a dispensing tip of the marking device during use.

In other embodiments, a marking device may be configured to operate in multiple different modes so as to collect various information relating not only to a marking operation itself, but additionally (or alternatively) various information relating to the work site/dig area in which the marking operation is performed. For example, in one implementation, the marking device may be configured to operate in a first "marking mode" as well as a second "landmark identification mode" (or more simply "landmark mode"). In a "marking mode," marking material may be dispensed with respective actuations of the marking device and various marking information transmitted and/or stored in an electronic record attendant to this process. Alternatively, in a "landmark mode," marking material is not necessarily dispensed with an actuation of the marking device (and in some instances the dispensing of marking material is specifically precluded); instead, a technician positions the marking device proximate to an environmental landmark of interest and, upon actuation, the marking device collects various information about the landmark (hereafter referred to as "landmark information"). As discussed in greater detail below, landmark information may include, but is not limited to, geo-location data of an environmental landmark, type of environmental landmark, and a time stamp for any acquired information relating to an environmental landmark.

In other embodiments, a marking device may be operated in a "solo" mode or a "group" mode. In particular, in a "solo" mode, the marking device may be operated as an individual, independent device to collect, store and/or transmit data, whereas in "group" mode, a marking device may act as a "worker" device or a "leader" device to facilitate consolidation of data collected by multiple devices (e.g., relating to a same ticket) to a host server.

In yet other embodiments, a marking device may be equipped with an enhanced user interface having tactile functionality; in particular, the marking device may include one or more tactile indicators (e.g., vibrating devices) disposed, for example, in a handle, joy stick, actuator or elsewhere on the device, to provide a tactile indication to a technician using the marking device (e.g., as feedback in connection with an operating mode, operating condition, environmental condition, etc.).

In various implementations of the methods and apparatus described herein, data from one or more electronic records, including one or more pieces of marking information and/or one or more pieces of landmark information, may be processed and analyzed to provide insight into the marking operation. In one embodiment, a computer-generated image or other visual representation based on the marking information and/or landmark information may be electronically rendered; for example, this visual representation may provide electronic indications ("electronic locate marks") of the relative placement of marking material dispensed during a marking operation, and electronic locate marks corresponding to different types of facilities may be color-coded. Additionally, electronic identifiers (e.g., icons, shapes, symbols, patterns, etc.) of one or more environmental landmarks may be included in a visual representation, alone or together with electronic locate marks. Such a visual representation may be used, for example, to provide immediate feedback to the locate technician (e.g., via a display device associated with the marking device), provide essentially real-time feedback to a supervisor monitoring the technician's work from a remote location, provide a visual record of the marking information and/or landmark information (e.g., for archiving purposes once one or more electronic records are generated), and/or to verify the quality (e.g., accuracy and completeness) of work performed during a locate and marking operation.

II. MARKING DEVICE

Figure 2:
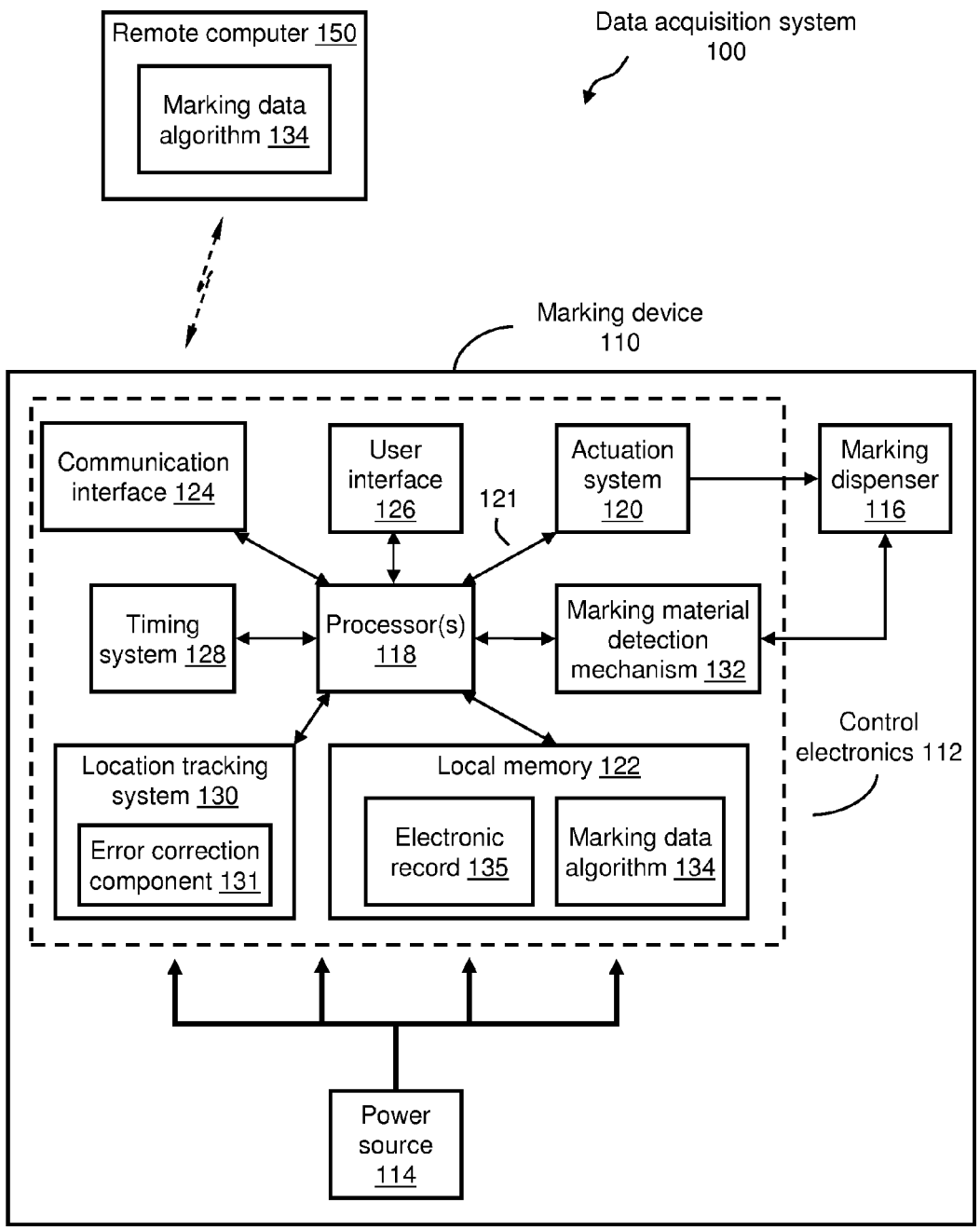
FIG. 2 is a functional block diagram of a data acquisition system according to one embodiment of the present invention for creating electronic records of marking operations based on actuations of a marking device.
Figure 3:
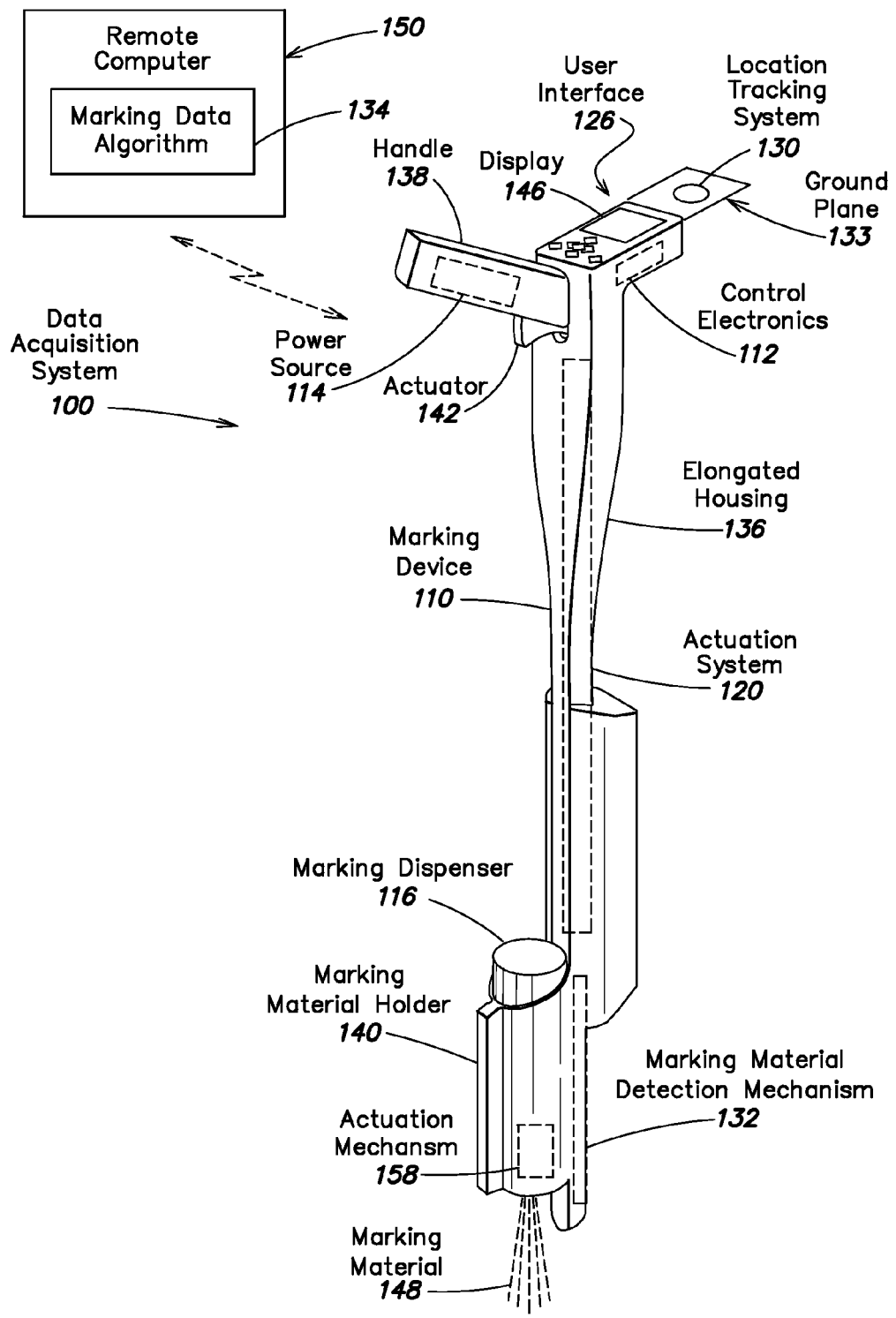
FIG. 3 is a perspective view of the data acquisition system of FIG. 2, illustrating an exemplary marking device according to one embodiment of the present invention.

FIGS. 2 and 3 illustrate a functional block diagram and perspective view, respectively, of one example of a data acquisition system 100, including a marking device 110 and optionally a remote computer 150, according to one embodiment of the present invention. One or both of the marking device 110 and the remote computer 150 of the data acquisition system 100 may be configured to sense one or more actuations of the marking device 110 (e.g., to dispense marking material during a marking operation), and collect information based on one or more actuations of the marking device so as to generate an electronic record.

As shown in FIG. 2, in one embodiment marking device 110 includes control electronics 112, the components of which are powered by a power source 114. Power source 114 may be any power source that is suitable for use in a portable device, such as, but not limited to, one or more rechargeable batteries, one or more non-rechargeable batteries, a solar photovoltaic panel, a standard AC power plug feeding an AC-to-DC converter, and the like.

The marking device 110 is configured to hold a marking dispenser 116, which as shown in FIG. 3 is loaded into a marking material holder 140 of the marking device 110. In one exemplary implementation, the marking dispenser 116 is an aerosol paint canister that contains paint; however, it should be appreciated that the present invention is not limited in this respect, as a marking material dispensed by the marking device 110 may be any material, substance, compound, and/or element, used to mark, signify, and/or indicate. Examples of marking materials may include, but are not limited to, paint, chalk, dye, and/or marking powder.

As also shown in FIG. 2, in one embodiment control electronics 112 of marking device 110 may include, but are not limited to, a processor 118, at least a portion of an actuation system 120 (another portion of which may include one or more mechanical elements), a local memory 122, a communication interface 124, a user interface 126, a timing system 128, and a location tracking system 130.

The processor 118 may be any general-purpose processor, controller, or microcontroller device. Local memory 122 may be any volatile or non-volatile data storage device, such as, but not limited to, a random access memory (RAM) device and a removable memory device (e.g., a universal serial bus (USB) flash drive, a multimedia card (MMC), a secure digital card (SD), a compact flash card (CF), etc.). As discussed further below, the local memory may store a marking data algorithm 134, which may be a set of processor-executable instructions that when executed by the processor 118 causes the processor to control various other components of the marking device 110 so as to generate an electronic record 135 of a marking operation, which record also may be stored in the local memory 122 and/or transmitted in essentially real-time (as it is being generated) or after completion of a marking operation to a remote device (e.g., remote computer 150).

In one exemplary implementation, a Linux-based processing system for embedded handheld and/or wireless devices may be employed in the marking device 110 to implement various components of the control electronics 112. For example, the Fingertip4™ processing system, including a Marvell PXA270 processor and available from InHand Electronics, Inc. (www.inhandelectronics.com/products/fingertip4), may be used. In addition to the PXA270 processor (e.g., serving as the processor 118), the Fingertip4™ includes flash memory and SDRAM (e.g., serving as local memory 122), multiple serial ports, a USB port, and other I/O interfaces (e.g., to facilitate interfacing with one or more input devices and other components of the marking device), supports a variety of wired and wireless interfaces (WiFi, Bluetooth®, GPS, Ethernet, any IEEE 802.11 interface, or any other suitable wireless interface) to facilitate implementation of the communication interface 124, and connects to a wide variety of LCD displays (to facilitate implementation of a user interface/display).

Communication interface 124 of marking device 110 may be any wired and/or wireless communication interface by which information may be exchanged between marking device 110 and an external or remote device, such as a remote computing device that is elsewhere in the dig area (i.e., not a part of the marking device 110) or outside the dig area. For example, data that is provided by components of data acquisition system 100 and/or stored in local memory 122 (e.g., one or more electronic records 135) may be transmitted via communication interface 124 to a remote computer, such as remote computer 150, for processing. Examples of wired communication interfaces may include, but are not limited to, USB ports, RS232 connectors, RJ45 connectors, Ethernet, and any combination thereof. Examples of wireless communication interfaces may include, but are not limited to, an Intranet connection, Internet, Bluetooth® technology, Wi-Fi, Wi-Max, IEEE 802.11 technology (e.g., operating at a minimum bandwidth of 54 Mbps, or any other suitable bandwidth), radio frequency (RF), Infrared Data Association (IrDA) compatible protocols, Local Area Networks (LAN), Wide Area Networks (WAN), Shared Wireless Access Protocol (SWAP), any combination thereof, and other types of wireless networking protocols. The wireless interface may be capable of capturing signals that reflect a user's intent. For example, the wireless interface may include a microphone that can capture a user's intent by capturing the user's audible commands. Alternatively, the wireless interface may interact with a device that monitors a condition of the user, such as eye movement, brain activity, and/or heart rate.

User interface 126 of marking device 110 may be any mechanism or combination of mechanisms by which a user may operate data acquisition system 100 and by which information that is generated by data acquisition system 100 may be presented to the user. For example, user interface 126 may include, but is not limited to, a display device (including integrated displays and external displays, such as Heads-Up Displays (HUDs)), a touch screen, one or more manual push-buttons, a microphone to provide for audible commands, one or more light-emitting diode (LED) indicators, one or more toggle switches, a keypad, an audio output (e.g., speaker, buzzer, and alarm), and any combination thereof. In one implementation, the user interface 126 includes a "menu/on" button to power up the marking device and provide a menu-driven graphical user interface (GUI) displayed by the display device (e.g., menu items and/or icons displayed on the display device) and navigated by the technician via a joystick or a set of four "up/down/left/right" buttons, as well as a "select/ok" button to take some action pursuant to the selection of a menu item/icon. As described below, the display may also be used in some embodiments of the invention to display information relating to a placement of marking material in a dig area, a location of an underground facility in a dig area, or any other suitable information that may be displayed based on information acquired to create an electronic record 135.

In various embodiments, the one or more interfaces of the marking device 110—including the communication interface 124 and user interface 126—may be used as input devices to receive information to be stored in the memory 122 as part of an electronic record of a marking operation. In some cases, marking information received via the interface(s) (e.g., via the communication interface 124) may include ticket information regarding underground facilities to be marked during a marking operation. As another example, using an interface such as the user interface 126, service-related information may be input, including an identifier for the marking device used by the technician, an identifier for a technician, and/or an identifier for the technician's employer. Alternatively, some or all of the service-related information similarly may be received via the communication interface 124 (and likewise some or all of the ticket information may be received via the user interface 126).

The actuation system 120 of marking device 110 shown in the block diagram of FIG. 2 may include both electrical and mechanical elements according to various embodiments discussed in further detail below, and for purposes of illustration is shown in FIG. 2 as included as part of the control electronics 112. The actuation system 120 may include a mechanical and/or electrical actuator mechanism (e.g., see the actuator 142 shown in FIG. 3) to provide one or more signals or stimuli as an input to the actuation system 120. Upon receiving one or more signals or stimuli (e.g., actuation/triggering by a locate technician or other user), the actuation system 120 causes marking material to be dispensed from marking dispenser 116. In various embodiments, the actuation system 120 may employ any of a variety of mechanical and/or electrical techniques (e.g., one or more switches or other circuit components, a dedicated processor or the processor 118 executing instructions, one or more mechanical elements, various types of transmitters and receivers, or any combination of the foregoing), as would be readily appreciated by those of skill in the relevant arts, to cause the marking dispenser 116 to dispense marking material in response to one or more signals or stimuli. The actuation system 120 also provides one or more output signals in the form of an actuation signal 121 to the processor 118 to indicate one or more actuations of the marking device, in response to which the processor 118 may acquire/collect various marking information and log data into the electronic record 135. Additional details of exemplary actuation system implementations are provided below in connection with FIGS. 3 through 5.

In some embodiments, the actuation system 120 may be configured so as not to cause marking material to be dispensed from marking dispenser 116 in response to one or more signals or stimuli; rather, the actuation system may merely facilitate a logging of data from one or more input devices in response to operation of an actuator/trigger, without necessarily dispensing marking material. In some instances, this may facilitate "simulation" of a marking operation (i.e., simulating the dispensing of marking material) by providing an actuation signal 121 to the processor 118 indicating one or more simulated actuation events, in response to which the processor may cause the logging of various data for creating an electronic record without any marking material actually being dispensed.

Location tracking system 130 of marking device 110 constitutes another type of input device that provides marking information, and may include any device that can determine its geographical location to a certain degree of accuracy. For example, location tracking system 130 may include a global positioning system (GPS) receiver or a global navigation satellite system (GNSS) receiver. A GPS receiver may provide, for example, any standard format data stream, such as a National Marine Electronics Association (NMEA) data stream, or other data formats. An error correction component 131 may be, but is not limited to, any mechanism for improving the accuracy of the geographic information provided by location tracking system 130; for example, error correction component 131 may be an algorithm for correcting any offsets (e.g., due to local disturbances in the atmosphere) in the geo-location data of location tracking system 130. While shown as part of a local location tracking system of the marking device 110, error correction component 131 alternatively may reside at a remote computing device, such as remote computer 150. In other embodiments, location tracking system 130 may include any device or mechanism that may determine location by any other means, such as performing triangulation by use of cellular radiotelephone towers.

In one exemplary implementation, the location tracking system 130 may include an ISM300F2-05-V0005 GPS module available from Inventek Systems, LLC of Westford, Mass. (see www.inventeksys.com/html/ism300f2-c5-v0005.html). The Inventek GPS module includes two UARTs (universal asynchronous receiver/transmitter) for communication with the processor 118, supports both the SIRF Binary and NMEA-0183 protocols (depending on firmware selection), and has an information update rate of 5 Hz. A variety of geographic location information may be requested by the processor 118 and provided by the GPS module to the processor 118 including, but not limited to, time (coordinated universal time—UTC), date, latitude, north/south indicator, longitude, east/west indicator, number and identification of satellites used in the position solution, number and identification of GPS satellites in view and their elevation, azimuth and SNR values, and dilution of precision values. Accordingly, it should be appreciated that in some implementations the location tracking system 130 may provide a wide variety of geographic information as well as timing information (e.g., one or more time stamps) to the processor 118.

In another embodiment, location tracking system 130 may not reside locally on marking device 110. Instead, location tracking system 130 may reside on any on-site computer, which serves as a location reference point, to which the location of marking device 110 may be correlated by any other means, such as, but not limited to, by a triangulation technique between the on-site computer and marking device 110.

With respect to other input devices of the marking device 110 that may provide marking information, the control electronics 112 may also include a timing system 128 having an internal clock (not shown), such as a crystal oscillator device, for processor 118. Additionally, timing system 128 may include a mechanism for registering time with a certain degree of accuracy (e.g., accuracy to the minute, second, or millisecond) and may also include a mechanism for registering the calendar date. In various implementations, the timing system 128 may be capable of registering the time and date using its internal clock, or alternatively timing system 128 may receive its time and date information from the location tracking system 130 (e.g., a GPS system) or from an external timing system, such as a remote computer or network, via communication interface 124. In yet other implementations, a dedicated timing system for providing timing information to be logged in an electronic record 135 may be optional, and timing information for logging into an electronic record may be obtained from the location tracking system 130 (e.g., GPS latitude and longitude coordinates with a corresponding time stamp). Timing information may include, but is not limited to, a period of time, timestamp information, date, and/or elapsed time.

Marking material detection mechanism 132 of the marking device 110 shown in FIG. 2 is another type of input device that provides marking information, and may be any mechanism or mechanisms for determining a presence or absence of a marking dispenser 116 in or otherwise coupled to the marking device 110, as well as determining certain attributes/characteristics of the marking material within marking dispenser 116 when the dispenser is placed in or coupled to the marking device. As shown in FIG. 3, in some embodiments the marking material detection mechanism 132 may be disposed generally in an area proximate to a marking material holder 140 in which a marking dispenser 116 may be placed.

For example, in one embodiment, the marking material detection mechanism 132 may include one or more switch devices (e.g., a make/break single pole/single throw contact switch) disposed at one or more points along the marking material holder 140 and electrically coupled to the processor 118. The switch device(s) may also be coupled to ground or a DC supply voltage, such that when the switch device is in a first state (e.g., closed/making contact) the ground or DC supply voltage is passed to the processor 118 (e.g., via an I/O pin of the processor which provides an interrupt to, or is periodically monitored by, the processor), and when the switch is in a second state (e.g., open/no contact) the ground or DC supply voltage is not passed to the processor 118. When the marking dispenser 116 is present in the holder 140, the switch device(s) is in one of two possible states and when there is no marking dispenser the switch device(s) is in another of the two possible states (e.g., the marking dispenser, when present, may depress the switch device(s) so as to make contact and pass the ground/DC voltage to the processor). In this manner, the marking material detection mechanism 132 may provide a signal to the processor indicating the presence or absence of the marking dispenser 116 in the marking device 110.

The marking material detection mechanism 132 also or alternatively may include a barcode reader to read barcode data from a dispenser 116 and/or a radio-frequency identification (RFID) reader for reading information from an RFID tag that is provided on marking dispenser 116. The RFID tag may include, for example, a unique serial number or universal product code (UPC) that corresponds to the brand and/or type of marking material in marking dispenser 116. The type of information that may be encoded within the RFID tag on marking dispenser 116 may include product-specific information for the marking material, but any information of interest may be stored on an RFID tag. For example, user-specific information and/or inventory-related information may be stored on each RFID tag for a marking dispenser 116 to facilitate inventory tracking of marking materials. In particular, an identifier for a technician may be stored on an RFID tag when the technician is provided with a marking dispenser 116, and information relating to weight, amount dispensed, and/or amount remaining may be written to the RFID tag whenever the marking dispenser is used.

In one exemplary implementation, the marking material detection mechanism 132 may include a Micro RWD MIFARE-ICODE RFID reader module available from IB Technology (Eccel Technology Ltd) of Aylesbury, Buckinghamshire, UK (see www.ibtechnology.co.uk/products/icode.htm). The Micro RWD reader module includes an RS232 communication interface to facilitate communication between the processor 118 and the reader module (e.g., via messages sent as a string of ASCII characters), and supports both reading information from an RFID tag attached to a marking dispenser as well as writing information to an RFID tag attached to the marking dispenser. In one aspect of an exemplary implementation, an antenna constituted by one or more turns of wire (e.g., two turns of awg 26 wire, 6.5 cm in diameter, about 1 uH) is coupled to the Micro RWD reader module and disposed in the marking material holder 140 of the marking device 110 (see FIG. 3), proximate to a marking dispenser 116 when placed in the holder 140, so as to capture close near field signals (e.g., from an RFID tag on the dispenser, within about 2 inches) and exclude far field signals. In another aspect, the Micro RWD reader module may be configured to read RFID tags having an ICODE SLI format (e.g., ISO 15693 ICODE SLI). In yet another aspect, an RFID tag may be affixed to an aerosol paint can serving as the marking dispenser, such that the tag conforms to a plastic cap of the paint can and is disposed at a particular location relative to a notch in the cap (e.g., 90 degrees+/−15 degrees from the notch) that allows access to the spray nozzle of the can and is in a relatively predictable position substantially aligned with the antenna when the paint can is placed in the marking material holder 140. Examples of RFID tags suitable for this purpose are available from BCS Solutions, Inc. (see www.bcssolutions.com/solutions/rfid) and include, but are not limited to, the HF Bullseye Wet Inlay SLA Round 40.

In yet other embodiments, marking material detection mechanism 132 may alternatively or further be configured to detect properties of marking material as it is dispensed. For example, the marking material detection mechanism may include one or more of an optical sensor, an olfactory sensor, an auditory sensor (e.g., a microphone), a weight sensor, and any combination thereof. For example, in one embodiment an optical sensor in the marking device may be used to identify the composition and/or type of marking material in the marking dispenser by analyzing light reflected by the material as it is dispensed. Similarly, an olfactory sensor may be used to identify one or more characteristics of the marking material based on an odor profile of the material, and an auditory sensor may be used to identify the difference between paint being sprayed from an aerosol can and aerosol without paint being sprayed from a can (e.g., as the dispenser becomes emptied of paint).

In one embodiment, information provided by one or more input devices of the marking device 110 (e.g., the timing system 128, the location tracking system 130, the marking material detection mechanism 132, the user interface 126, the communication interface 124) is acquired and logged (stored in memory) upon actuation of the actuation system 120 (e.g., triggering an actuator). Some embodiments of the invention may additionally or alternatively acquire/log information from one or more input devices at one or more times during or throughout an actuation, such as when a technician is holding a mechanical or electrical actuator for some period of time and moving to dispense marking material in a line (e.g., see FIG. 7). In various aspects of such embodiments, marking information derived from one or more input devices may be collected at a start time of an actuation, at one or more times during an actuation, and in some cases at regular intervals during an actuation (e.g., several times per second, once per second, once every few seconds). Further, some marking information may be collected at an end of an actuation, such as time information that may indicate a duration of an actuation.

Additionally, it should be appreciated that while some marking information may be received via one or more input devices at the start of each marking operation and upon successive actuations of the marking device, in other cases some marking information may be collected by or provided to the marking device once, prior to a marking operation (e.g., on power-up or reset of the marking device, as part of an electronic instruction or dispatch by a locate company, and/or in response to a request/query from a locate technician), and stored in local memory 122 for later incorporation into an electronic record. For example, prior to a given marking operation and one or more actuations of the marking device, ticket information and/or service-related information may have already been received (e.g., via the communication interface 124 and/or user interface 126) and stored in local memory 122. Upon generation of an electronic record of a given marking operation, information previously received via the interface(s) may be retrieved from the local memory (if stored there initially) and entered into an electronic record, in some case together with information collected pursuant to one or more actuations of the marking device. Alternatively, ticket information and/or service-related information may be received via the interface(s) and stored in an entry in the electronic record 135 "directly" in response to one or more actuations of the marking device (e.g., without being first stored in local memory).

In sum, according to embodiments of the present invention, various marking information from one or more input devices, regardless of how or when it is received, may be stored in an electronic record of a marking operation, in which at least some of the marking information is logged pursuant to one or more actuations of the marking device.

In one embodiment, the optional remote computer 150 of the data acquisition system 100 may be a centralized computer, such as a central server of an underground facility locate service provider. In another embodiment, remote computer 150 may be a computer that is at or near the work site (i.e., "on-site"), e.g., a computer that is present in a locate technician's vehicle.

Whether resident and/or executed on either the marking device 110 or the remote computer 150, as noted above the marking data algorithm 134 includes a set of processor-executable instructions (e.g., stored in memory, such as local memory 122 of the marking device) that, when executed by processor 118 of the marking device 110 or another processor, processes information (e.g., various marking information) collected in response to (e.g., during) one or more actuations of the marking device 110, and/or in some cases before or after a given actuation or series of actuations. As also discussed above, according to various embodiments the actuations of marking device 110 may effect both dispensing marking material and logging of marking information, or merely logging of marking information for other purposes (e.g., simulating the dispensing of marking material) without dispensing marking material. In either situation, marking data algorithm 134, when executed by the processor 118, may cause the processor to perform collection, logging/storage (creation of electronic records), and in some instances further processing and analysis of various marking information with respect to marking device actuations. For example, as discussed in further detail below in connection with FIG. 9, the operations of marking data algorithm 134 as effected by the processor 118 may include, but are not limited to, the following:

(1) reading in (acquiring) data that is generated by any component (e.g., one or more input devices); for example, data may be read in that is acquired at a start of a given actuation, throughout the duration of the actuation, at the end of the actuation, before or after the actuation, and any combination thereof;

(2) processing the information that is collected and associating the collected information with respective actuations; for example, any information collected may be parsed/packaged so as to be associated with any one or more actuations of the marking device, irrespective of when the data was actually acquired;

(3) formatting the acquired information, e.g., as multiple time-stamped event entries constituting actuation data sets forming an electronic record, wherein each actuation data set corresponds to a particular actuation; and (4) using respective actuation data sets of an electronic record to visually recreate the marking operation (e.g., render a computer-generated representation in a display field, wherein respective actuation data sets correspond to electronic locate marks).

It should also be appreciated that the marking data algorithm 134 may include one or more adjustable parameters that govern various aspects of the collection and logging of marking information (e.g., the rate at which various marking information is collected from one or more input devices), and that these parameters may be adjusted or set, for example, by an administrator at a remote computer, after which the marking data algorithm is downloaded to the marking device for execution by the processor 118. Alternatively, in other implementations, adjustable parameters of a marking data algorithm already resident on a marking device may in some cases be adjusted remotely via the communication interface, or locally via the user interface.

While the functionality of various components of the marking device 110 was discussed above in connection with FIG. 2, FIG. 3 shows some structural aspects of the marking device 110 according to one embodiment. For example, the marking device 110 may include an elongated housing 136 in which is disposed one or more elements of the actuation system 120, one or more elements of the control electronics 112 and the power source 114. Elongated housing 136 may be hollow or may contain certain cavities or molded compartments for installing any components therein, such as the various components of marking device 110 that are shown in FIG. 2. The elongated housing 136 and other structural elements associated with the housing, as discussed below, may be formed of any rigid, semi-rigid, strong, and lightweight material, such as, but not limited to, molded plastic and aluminum.

Incorporated at a proximal end of elongated housing 136 may be a handle 138, which provides a convenient grip by which the user (e.g., the locate technician) may carry the marking device 110 during use (i.e., the exemplary marking device depicted in FIG. 3 is intended to be a hand-held device). In one implementation, the power source 114 may be provided in the form of a removable battery pack housing one or more rechargeable batteries that are connected in series or parallel in order to provide a DC voltage to marking device 110, and disposed within a compartment in the handle 138. Such an arrangement facilitates use of conventional removable/rechargeable battery packs often employed in a variety of cordless power tools, in which the battery pack similarly is situated in a handle of the tool. It should be appreciated, however, that the power source 114 in the form of a battery pack may be disposed in any of a variety of locations within or coupled to the elongated housing 136.

As also shown in FIG. 3, mounted near handle 138 is user interface 126, which may include a display 146. The display 146 may be a touch screen display to facilitate interaction with a user/technician, and/or the user interface also may include one or more buttons, switches, joysticks, a keyboard, and the like to facilitate entry of information by a user/technician. One or more elements of the control electronics 112 (e.g., the processor 118, memory 122, communication interface 124, and timing system 128) also may be located in the proximal end of the elongated housing in the vicinity of the user interface 126 and display 146. As with the power source 114, it should be appreciated that one or more elements of the control electronics 112 may be disposed in any of a variety of locations within or coupled to the elongated housing 136.

In the embodiment of FIG. 3, the location tracking system 130 similarly may be positioned on the proximal end of the elongated housing 136 to facilitate substantially unobstructed exposure to the atmosphere; in particular, as illustrated in FIG. 3, the location tracking system 130 may be situated on an a ground plane 133 (providing an electrical ground at least at the antenna frequency of the location tracking system, e.g., at approximately 1.5 GHz) that extends from the proximal end of the housing 136 and is approximately parallel to the ground, surface or pavement when the marking device is being normally operated by a technician (so as to reduce signal modulation with subtle movements of the marking device).

As also shown in FIG. 3, incorporated at the distal end of elongated housing 136 is a marking dispenser holder 140 for holding one or more marking dispensers 116 (e.g., an aerosol paint canister). Dispenser 116 may be one or more replaceable dispensers or one or more reusable refillable dispensers (including a fixed reservoir forming a part of the device 110) or any other suitable dispenser. Also situated at the distal end of the housing is the marking material detection mechanism 132 to detect a presence or absence of the marking dispenser 116 in the marking material holder 140, and/or one or more characteristics of the marking material 148, as well as an actuation mechanism 158, which in some implementations may constitute part of the actuation system 120 and be employed to interact with the marking dispenser 116 so as to effect dispensing of the marking material 148.

With respect to the actuation system 120, as shown in FIG. 3, at least a portion of the actuation system 120 is indicated generally along the length of the elongated housing for purposes of illustration. More specifically, however, in various implementations the actuation system 120 may include multiple components disposed in various places in, on or coupled to the marking device 110. For example, in the embodiment of FIG. 3, the actuation system 120 includes an actuator 142, which for example may be a mechanical mechanism provided at the handle 138 in the form of a trigger that is pulled by a finger or hand of an user/technician. The actuation system 120 further includes the actuation mechanism 158 disposed at the distal end of the marking device that is responsive to the actuator 142 to dispense marking material. In general, in various exemplary implementations as discussed in further detail below, the actuation system 120 may employ any of a variety of mechanical and/or electrical techniques to cause the marking dispenser 116 to dispense marking material 148 in response to one or more signals or stimuli. In the embodiment shown in FIG. 3, the signal/stimulus is initially provided to the actuation system via the mechanical actuator 142; i.e., a locate technician or other user triggers (e.g., pulls/depresses) the actuator 142 to provide a signal/stimulus to the actuation system 120, which in turn operates the actuation mechanism 158 to dispense marking material in response to the signal/stimulus.

In response to the signal/stimulus provided by the actuator 142, as discussed above the actuation system may also provide an actuation signal 121 to the processor 118 to indicate an actuation. As discussed in further detail below in connection with FIG. 9, pursuant to the execution by the processor 118 of the marking data algorithm 134, the actuation signal 121 may be used to cause the logging of information that is provided by one or more components of the marking device 110 so as to generate an electronic record of the marking operation.

Figure 1A:
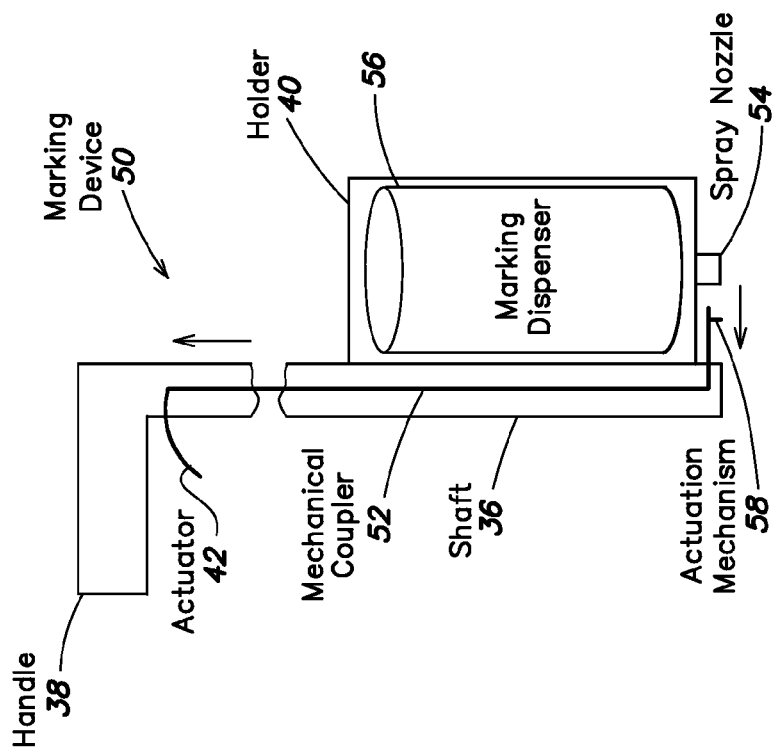
Figure 4A:
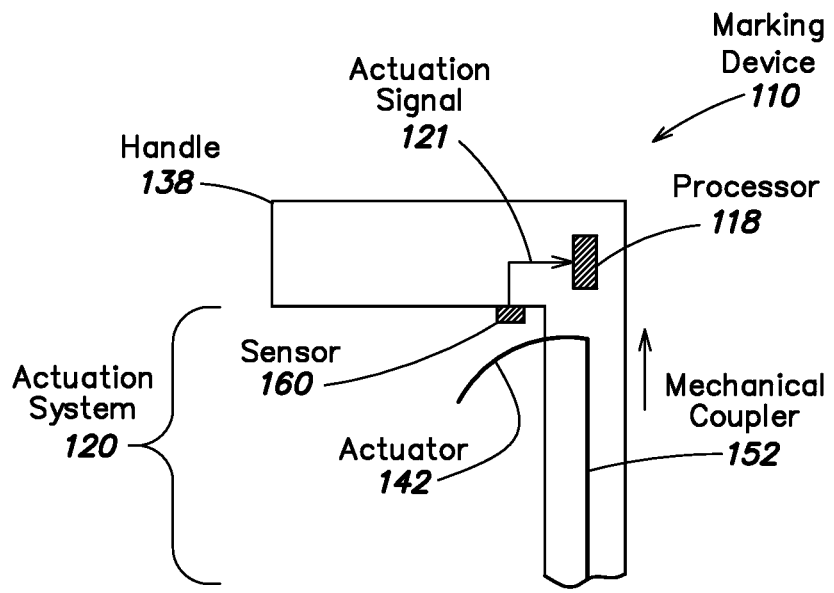
FIGS. 4A and 4B illustrate a portion of an actuation system of the marking device of FIG. 3 according to one embodiment of the present invention.
Figure 4B:
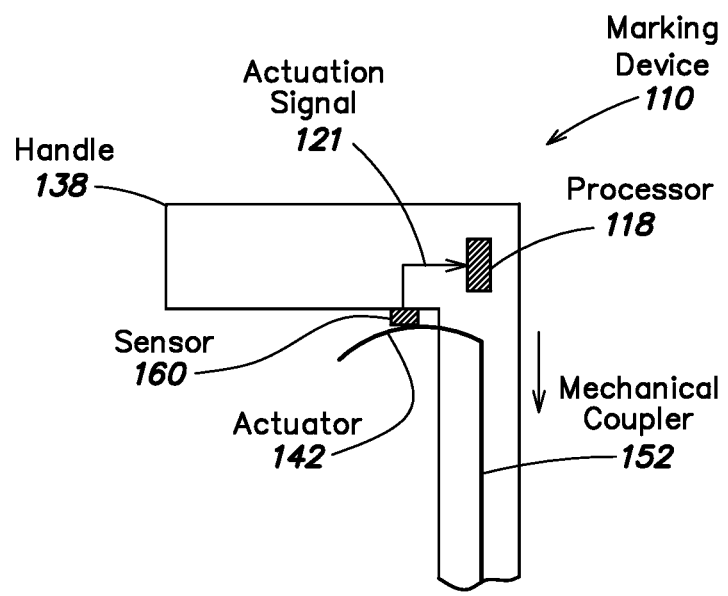

FIGS. 4A and 4B illustrate a portion of the actuation system 120 according to one embodiment of the present invention. FIG. 4A shows the actuator 142 in an un-actuated state, whereas FIG. 4B shows the actuator 142 in an actuated state (in which a signal/stimulus is provided by the actuator). In the example of FIGS. 4A and 4B, the actuator 142 is coupled to a mechanical coupler 152, similar to that shown in FIGS. 1A and 1B, which extends along a length of the elongated housing and is in turn coupled to a mechanical actuation mechanism 158 at the distal end of the housing (not shown in FIGS. 4A and 4B) that ultimately effects dispensing of marking material when the actuator is in the actuated state. The portion of the actuation system 120 shown in FIGS. 4A and 4B also includes a sensor 160 which is configured to provide an actuation signal 121 to the processor 118 to indicate one or both of the respective actuated and un-actuated states of the actuator 142.

In one implementation, the sensor 160 may include a switch device (e.g., a make/break single pole/single throw contact switch) disposed along the handle 138 of the marking device such that, when pulled, the actuator contacts (e.g., depresses) the switch causing a state of the switch to toggle. In another implementation, the sensor 160 may include a switch device such as a reed (magnetic) switch disposed at some point along the length of the elongated housing; in such an implementation, the mechanical coupler 152 may have a magnet disposed along it at an appropriate position relative to the reed switch, such that movement of the mechanical coupler 152 upon actuation of the actuator 142 causes a state of the reed switch to toggle. Electrically, a switch device serving as the sensor 160 may be coupled to ground or a DC supply voltage, such that when the switch device is in a first state (e.g., closed/making contact) the ground or DC supply voltage is passed to the processor 118 (e.g., via an I/O pin of the processor which provides an interrupt to, or is periodically monitored by, the processor), and when the switch is in a second state (e.g., open/no contact) the ground or DC supply voltage is not passed to the processor 118. In this manner, the sensor 160 may provide the actuation signal 121 to the processor indicating actuation (and release) of the actuator 142.

Figure 5:
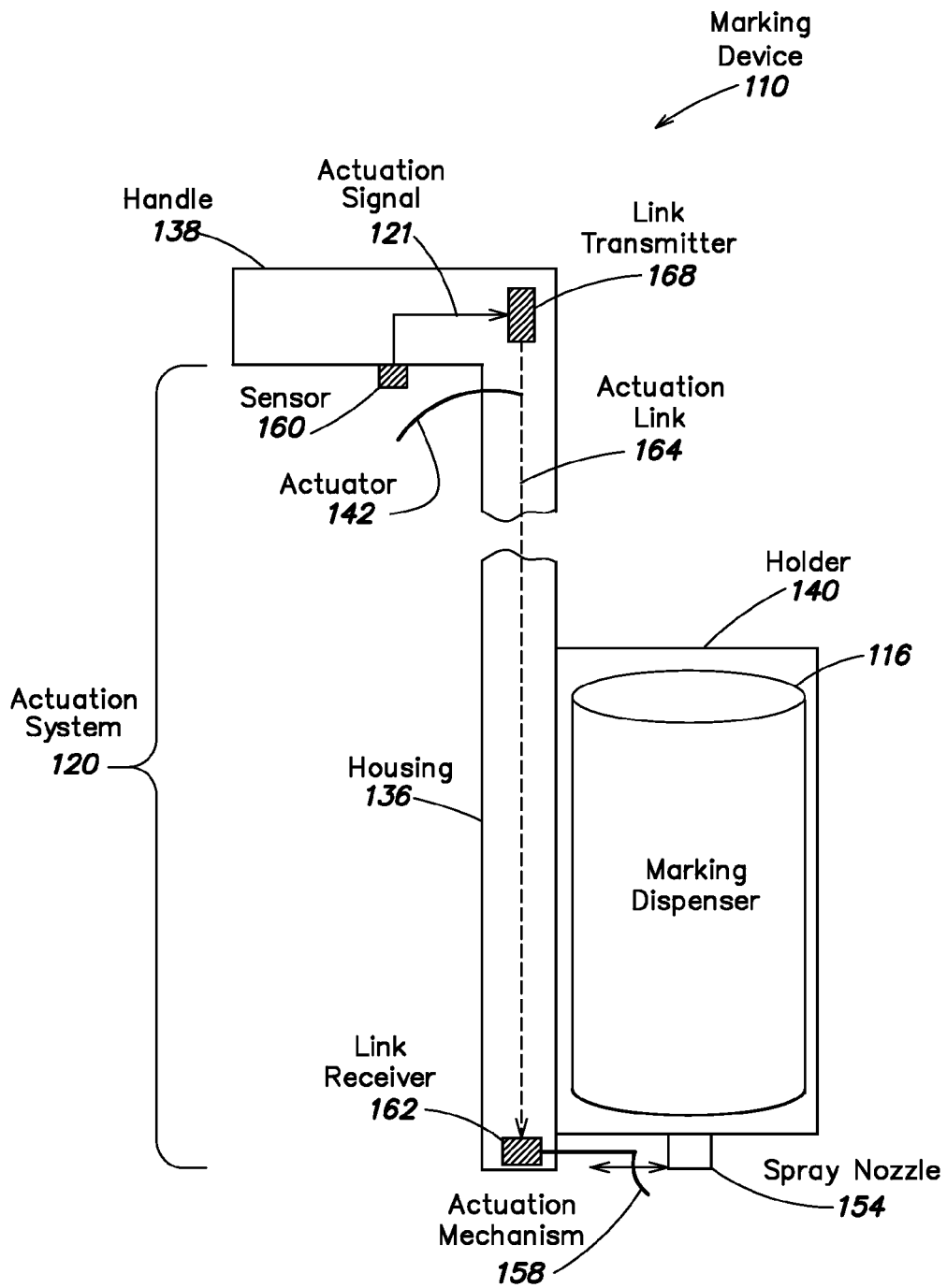
FIG. 5 illustrates various components of an actuation system 120 according to other embodiments of the present invention.

FIG. 5 illustrates various components of an actuation system 120 according to other embodiments of the present invention. Generally speaking, the actuation system 120 may include the actuator 142 and the sensor 160 to detect actuation and release of the actuator 142 (and also provide a corresponding actuation signal 121 representing same to the processor 118). While a "trigger-pull" type of actuator 142 is shown primarily for purposes of illustration in FIG. 5, it should be appreciated that more generally an actuator of the actuation system 120 may be implemented by any form or combination of a lever, switch, program, processor, screen, microphone for capturing audible commands, and the like, as discussed above. For example, in one implementation, a microphone may serve as both the actuator 142 and the sensor 160 shown in FIG. 5 to provide an actuation signal 121 based on audible commands, so as to effect voice-activated actuation of the marking device.

FIG. 5 also shows that the actuation system 120 of this embodiment includes a link transmitter 168 coupled and responsive to the sensor 160 to transmit one or more signals and/or other stimulus via an actuation link 164, and a link receiver 162 to receive the one or more signals and/or other stimulus from the actuation link 164. In response to such signals and/or other stimulus, the link receiver 162 operates the actuation mechanism 158. The link transmitter 168, the link 164, and the link receiver 162 may include one or more electrical and/or mechanical components. For example, the link receiver 162 may include a linear solenoid mechanically coupled to the actuation mechanism 158 and whose movement is responsive to one or more signals and/or stimuli received from the link 164. In various exemplary implementations, the link transmitter 168 and the link 164 simply may include a wire that couples the sensor 160 to the solenoid to activate the solenoid upon changes of state in the actuation signal 121. Alternatively, the transmitter 168 may be an RF transmitter that is activated in response to the actuation signal 121, the link 164 may be a wireless link, and the receiver 162 may include an RF receiver.

Other examples of transmitter/link/receiver combinations include, but are not limited to, an acoustic transmitter/link/receiver (e.g., a sound wave source that provides a sound wave of a certain tone, duration, and/or amplitude when the actuator is actuated, and a corresponding sound wave detector), an optical transmitter/link/receiver (e.g., a light or laser source that provides an optical signal of a certain wavelength, duration, and/or amplitude when the actuator is actuated, and a corresponding optical detector), a fluid transmitter/link/receiver (e.g., a fluid system that provides a fluid control output of a certain volume, pressure, and/or duration when the actuator is actuated, and a corresponding fluid sensor for sensing the presence of, for example, a short blast of water of a certain volume, pressure, and/or duration to indicate an actuation; the fluid system may be, for example, a closed-loop system that has a source reservoir at the top of the marking device, a fluid line in proximity with the fluid sensor, a return reservoir for capturing water during the actuation process, and appropriate pressure regulation and ducts for cycling water from the return reservoir back to the source reservoir), and an air transmitter/link/receiver (e.g., an air system that provides an air control output of a certain volume, pressure, and/or duration when the actuator is actuated, and a corresponding air sensor for sensing the presence of, for example, a blast or puff of air of a certain volume, pressure, and/or duration to indicate an actuation).

While not explicitly shown in FIG. 5, in yet other embodiments it should be appreciated that the sensor 160 may be coupled to the processor 118 (to provide the actuation signal 121 representing actuation/release of the actuator), and in turn the processor may provide a signal to the link transmitter 168, such that dispensing of marking material may in part be under the control of the processor 118 executing particular instructions for this purpose. More specifically, while in some implementations dispensing of marking material may be directly responsive to actuation of the actuator (and cease upon release of the actuator), in other implementations dispensing of marking material may be initiated in some manner upon actuation of the actuator, but then continued dispensing of marking material may not necessarily be dictated by continued actuation, or release, of the actuator. Rather, the processor 118 may provide one or more signals or commands to the link transmitter 168 to govern dispensing of marking material in some manner that does not necessarily track each actuation and release of the actuator.

For example, in one implementation the processor 118 may execute instructions such that, once the actuation signal 121 from the sensor 160 indicates actuation of the actuator, the processor 118 provides a signal to the link transmitter 168 that causes dispensing of marking material for some predetermined or user-defined amount of time, irrespective of release of the actuator. Additionally or alternatively, the processor may provide one or more signals to the link transmitter 168 that causes dispensing of marking material for multiple discrete amounts of time with a single actuation (e.g., three bursts of 1 second each per actuation). From the foregoing, it should be generally appreciated that a wide variety of marker sizes and patterns may be generated from the marking device in an automated or semi-automated manner based on processor-based control of the actuation system 120. It should also be appreciated that automated or semi-automated processor-based control of the dispensing of marking material may also govern in some fashion how, how often, and/or what type of marking information is collected and logged to generate an electronic record of a marking operation, as discussed further below in connection with FIG. 9.

III. EXEMPLARY MARKING TECHNIQUES

Figure 6:
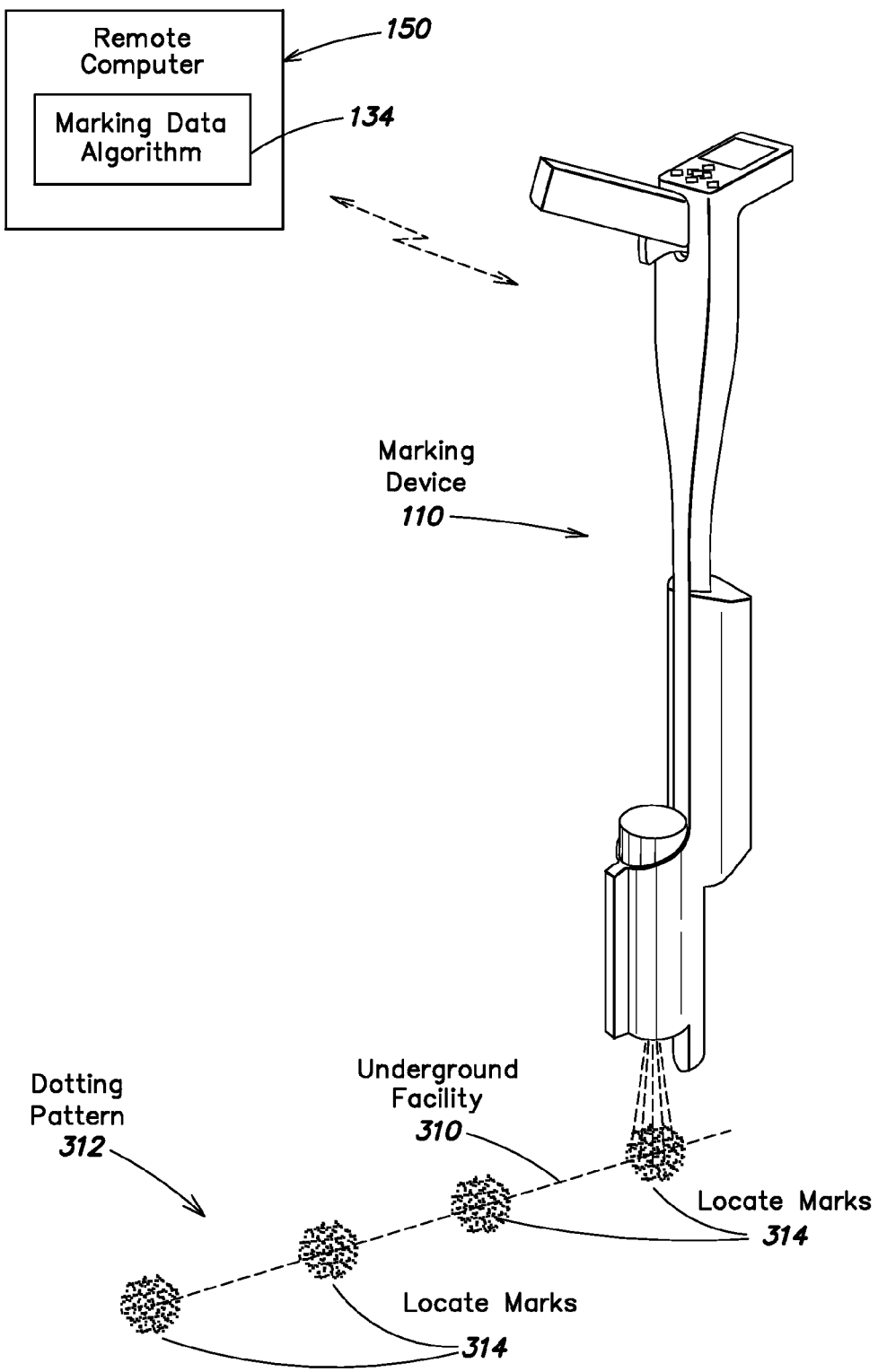
FIG. 6 is a perspective view of an exemplary marking device being used for marking a dotting pattern, according to one embodiment of the present invention.
Figure 7:
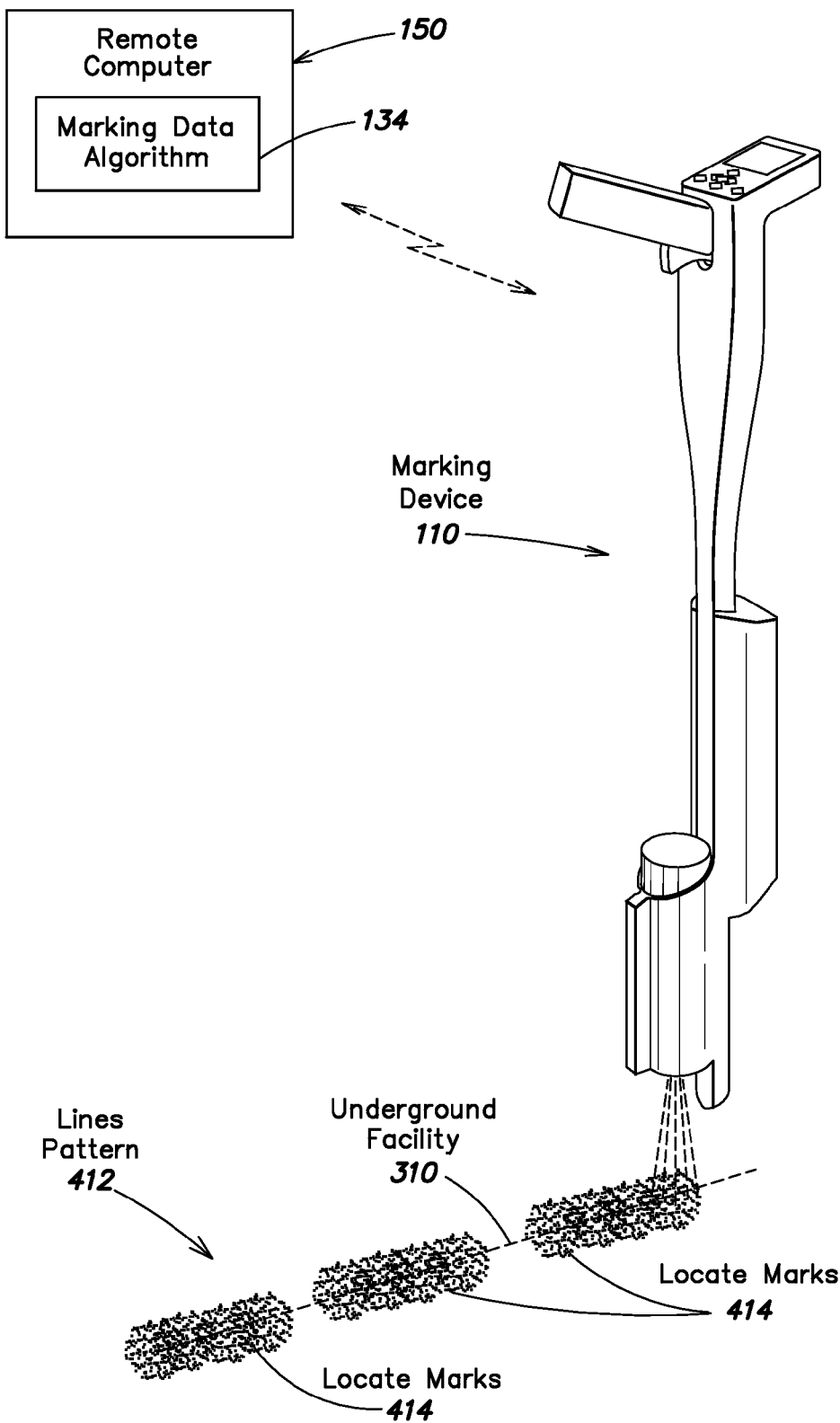
FIG. 7 is a perspective view of an exemplary marking device being used for marking a lines pattern, according to one embodiment of the present invention.

FIGS. 6 and 7 provide examples of how the marking device 110 shown in FIGS. 2 and 3 may be employed by a technician during a marking operation. Referring now to FIG. 6, a perspective view of marking device 110 when in use for marking a "dotting pattern" is presented. In marking operations, a dotting pattern may be utilized to preliminarily and quickly indicate the presence or absence of a target facility during an initial locate of a target facility. By way of example, FIG. 6 shows an underground facility 310, which may be any facility, such as an underground gas line, water pipe, sewer pipe, power line, telephone line, cable television conduit, and the like. FIG. 6 also shows a dotting pattern 312 that is formed by multiple locate marks 314 dispensed via marking device 110. The locate marks 314 of dotting pattern 312 are formed by successive short bursts of marking material (e.g., brief actuations); i.e., each locate mark 314 corresponds to one brief actuation of the marking device 110.

Referring now to FIG. 7, a perspective view of marking device 110 when in use for marking a "lines pattern" is presented. In marking operations, a lines pattern is typically the end product of a marking operation. This pattern extends the dotting pattern (e.g., dotting pattern 312 of FIG. 6) so as to create lines (e.g., a series of dashes) that indicate the presence or absence of an underground facility. These lines subsequently provide important reference marks to an excavator so as to avoid damage to a facility during excavation activities or other disturbances of the ground. By way of example, FIG. 7 shows underground facility 310, which may be any concealed facility, such as an underground gas line, water pipe, sewer pipe, power line, telephone line, cable television conduit, and the like. FIG. 7 also shows a lines pattern 412 that is formed by multiple locate marks 414 dispensed via marking device 110. A characteristic of locate marks 414 of lines pattern 412 is that each locate mark 414 is formed by an extended burst of marking material (e.g., a longer actuation of the marking device) as compared with a dotting pattern. As with the dotting pattern shown in FIG. 6, however, each locate mark 414 of the lines pattern shown in FIG. 7 may correspond to one actuation of marking device 110. In some alternative implementations, as discussed above, a series of locate marks (e.g., all three marks 414) may be automatically generated by one actuation of marking device 110 pursuant to processor-based control of the actuation system.

Figure 8:
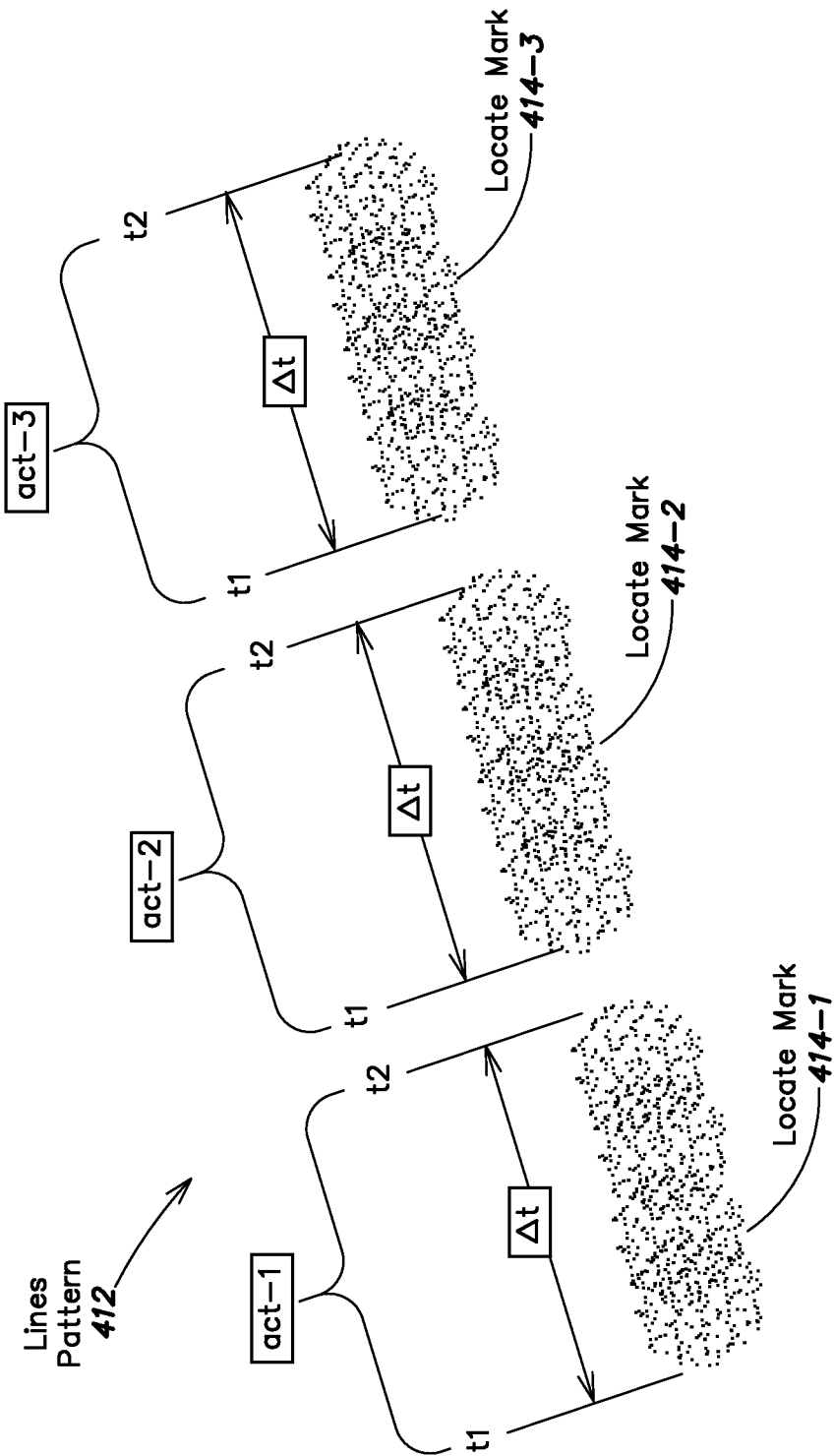
FIG. 8 is a plan view that shows further details of the lines pattern of FIG. 7, in connection with the information acquired for purposes of creating an electronic record according to one embodiment of the present invention.

FIG. 8 illustrates a plan view that shows further details of the lines pattern 412 of FIG. 7. In the example of FIG. 8, each locate mark 414-1, 414-2, and 414-3 corresponds to one actuation ("act") of marking device 110, i.e., locate mark 414-1 corresponds to act-1, locate mark 414-2 corresponds to act-2, and locate mark 414-3 corresponds to act-3. Furthermore, each actuation and its corresponding locate mark 412 has a start time t1, an end time t2, and a duration ($\Delta$t). While FIG. 8 shows three locate marks, it should be appreciated that lines pattern 412 may be formed by any number of locate marks.

IV. FORMAT, CONTENT AND PROCESS OF GENERATING ELECTRONIC RECORDS OF MARKING INFORMATION

In one embodiment of the present invention for generating an electronic record of a marking operation, the processor 118 of the marking device 110, executing the marking data algorithm 134, may collect various marking information and generate an electronic record having one or more "actuation data sets" respectively associated with one or more actuations (act-1, act-2, act-3 . . . act-n) and corresponding locate marks, as shown in FIG. 8. Marking information may be collected and entered into such an electronic record at various times relative to the start time t1 and the end time t2 of a given actuation, e.g., at t1 only, at t2 only, at both t1 and t2, at any time(s) between t1 and t2, and/or before or after t1 and t2.

Examples of marking information that generally (but not necessarily) is acquired with respect to t1 and t2 of each actuation, and points between t1 and t2 ("actuation data"), may include, but are not limited to:

(1) timing information: time and date for one or both of t1 and t2 (hereinafter also referred to as "time stamp data"), and/or duration ($\Delta$t) of the actuation, which may be provided in some instances by timing system 128; and (2) geographic information: latitude and longitude data from location tracking system 130 (hereinafter also referred to as "geo-location data") (e.g., GPS data may be expressed in degrees, minutes, and seconds (i.e., DDD°, MM', and SS.S"), degrees and decimal minutes (DDD° and MM.MMM'), or decimal degrees (DDD.DDDDD°)).

Examples of marking information that may be acquired before, during or after a given actuation or succession of actuations, and also entered into an electronic record, include, but are not limited to:

(3) marking material information, such as the presence, color, brand and/or type of dispensed marking material or a simulated dispensing of such marking material (i.e., hereinafter also referred to as "product data");

(4) service-related information: identification (ID) number of the locate service provider (e.g., a party/company who dispatches the locate technician, hereinafter also referred to as "service provider ID"); ID number of the user and/or technician (hereinafter also referred to as "user ID"); ID number of the marking device being used for the marking operation (hereinafter also referred to as "device ID"); and (5) ticket information, such as the requesting party (e.g., excavator information), type of facility requested to be marked by the requesting party, and address of the work site/dig area for the marking operation (hereinafter also referred to as "locate request data"). Ticket information also may include a variety of text-based information which may be included in an original locate request ticket, and/or text-based or other information entered in by a technician (e.g., via the user interface 126 and/or display 146) upon initiation of and/or during a marking operation, such as ground type information (e.g., a description of the ground at which marking material is dispensed). Thus, ticket information may be received or derived from a locate request ticket and/or provided by another source, such as entry by a user/technician.

In exemplary methods for generating an electronic record of marking operations according to some embodiments of the invention, as discussed in greater detail below, for a given actuation the processor 118 may request the location tracking system 130 to provide geographic information at one or more times during the actuation (e.g., periodically at regular intervals). Thus, an actuation data set of an electronic record for a given actuation of the marking device may have multiple pieces of geographic information (and associated time stamps) representing the location of the marking device at multiple times during a corresponding actuation. Additionally, for a given actuation, the processor 118 also may request the marking material detection mechanism 132 to provide marking material information as part of the actuation data set. The processor also may include ticket information and service-related information, which may be collected (e.g., via one or more of the user interface 126 and the communication interface 124) before a corresponding actuation, stored in memory 122 and retrieved from the memory for entry into the electronic record upon or during the corresponding actuation, or collected and entered into the electronic record upon or during the corresponding actuation.

While the collection and logging of marking information to generate an electronic record is discussed in some aspects, for purposes of illustration, in terms of actuation data sets (i.e., a set of data that is associated and logged with a corresponding actuation of the marking device), it should be appreciated that various embodiments of the present invention are not limited in this respect. More generally, an electronic record of a marking operation may be generated in any of a variety of manners, have a variety of file formats and/or data structures, and include any of a variety of marking information (some of which may be germane to one or more actuations of the marking device and some of which may be common to multiple actuations or the overall marking operation in general).

Figure 9:
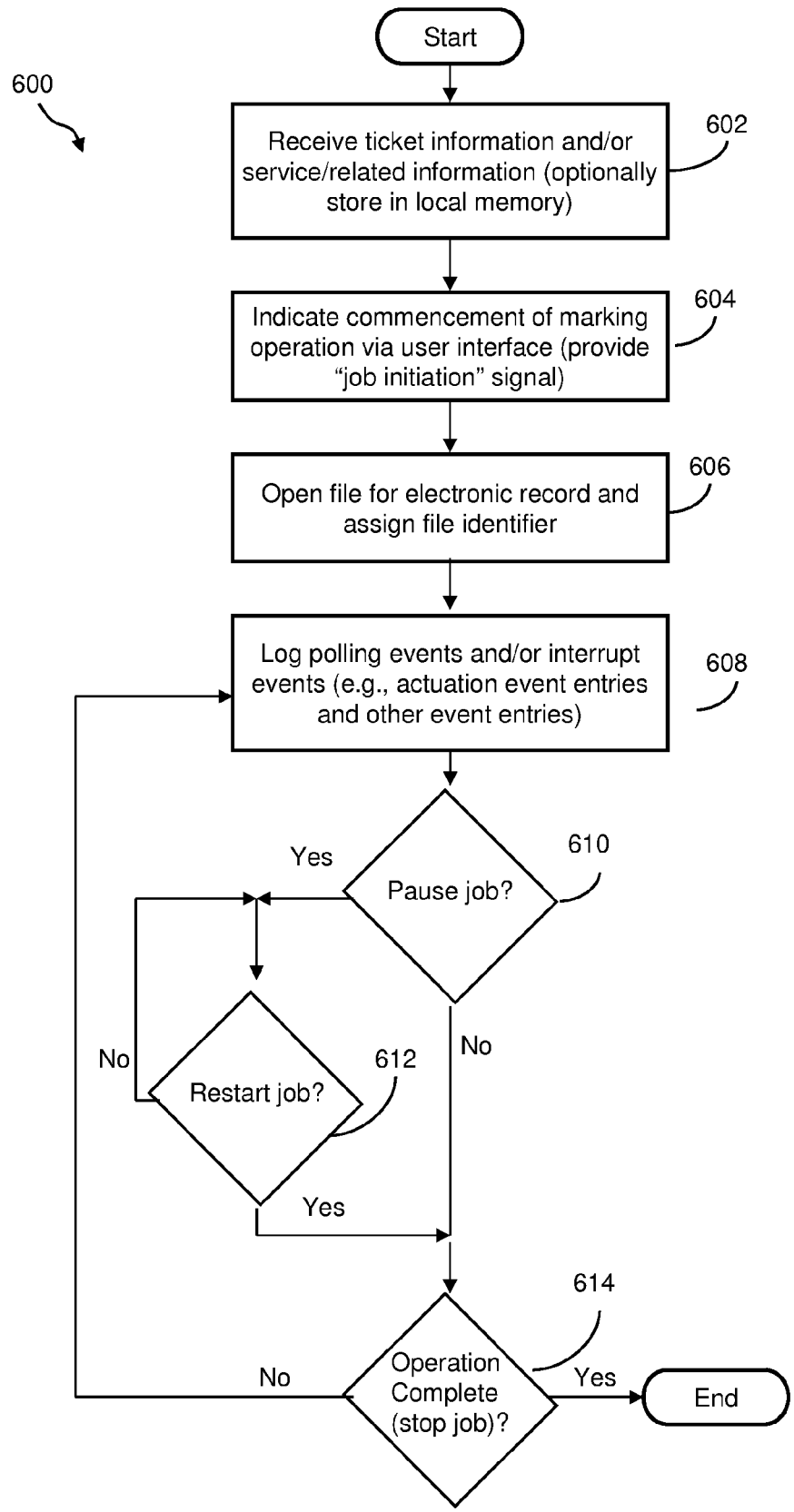
FIG. 9 is a flow diagram of an exemplary method for collecting marking information for generation of an electronic record, according to one embodiment of the present invention.

FIG. 9 is a flow diagram of an exemplary process 600 for collecting marking information during operation of a marking device 110 and generating an electronic record, according to one embodiment of the present invention. It should be appreciated that as various marking information is collected and logged in the process 600, such marking information also may be transmitted from the marking device (e.g., to remote computer 150) to facilitate essentially real-time monitoring of the marking operation, and/or remote generation of an electronic record of the marking operation.

In block 602 of the process 600 shown in FIG. 9, ticket information and/or service-related information may be received (e.g., via one or more of the user interface 126 and the communication interface 124 of marking device 110) and this information optionally may be stored in whole or in part in local memory 122 of the marking device. The ticket information and/or service-related information may be received electronically in any of a variety of formats, and the processor may be configured to appropriately parse the information for subsequent entry into an electronic record.

For example, in some embodiments, the ticket information may be received as part of an electronic locate request ticket, and individual respective pieces of ticket information (e.g., ticket number, work site address information, requesting party, etc.) may be extracted or derived from the electronic locate request ticket. In other embodiments, various aspects of ticket information may be input by a user/technician via the user interface.

For example, in block 602 the process 600 may provide for the entry of any of a variety of text information for inclusion in an electronic record and/or selection by a user/technician (e.g., via the user interface) of various information to be included in an electronic record as part of ticket information (and/or service-related information). One example of such information may relate to a ground type in and around the work site/dig area at which marking material is dispensed as part of the marking operation. In some implementations, a text description of the ground type may be entered and stored as part of the electronic record. In another exemplary implementation, the processor 118 controls the user interface 126 (including display 146) so as to display information to the technician to facilitate such a selection. In particular, a ground type selection submenu may be displayed, including one or more categories of ground types displayed in any of a variety of manners (e.g., as a list of text entries, an arrangement of icons symbolizing respective categories, labeled symbols, etc.). Examples of ground type categories that may be displayed in such a submenu include, but are not limited to: 1) "Pavement;" 2) "Grass;" 3) "Rough/Rocky;" 4) "Dirt;" 5) "Gravel/Sand;" and 6) "Other." More generally, any number and variety of ground type categories may be presented to the technician via the user interface in alphabetically ordered lists, numerically ordered lists, or other types of ordered text-based or symbolic arrangements, for example. In yet another exemplary implementation, the user interface may include a microphone and the processor may be configured to accept and process audible commands, such that a ground type category may be accomplished via voice-activated commands by simply speaking into the microphone.

Similarly, with respect to service-related information, a user/technician may manually enter some aspects of this information via the user interface/display, while other aspects may already be available in other memory locations (e.g., the marking device ID or serial number, a technician ID to which the marking device is assigned or checked-out, etc.) and/or may be received electronically.

While block 602 is illustrated as one element of the process 600, it should be appreciated that respective pieces of information received as input in block 602 may be received at different times and via different interfaces/sources, and thus may occur at different points in the process 600. It should also be appreciated that block 602 is an optional step in the process 600, and that more generally a process for collecting marking information to generate an electronic record need not necessarily include collection of one or both of ticket information and service-related information.

In block 604, the locate technician utilizes the user interface 126 to indicate the initiation of a marking operation. For example, the technician may press a button, operate a joystick, or touch a touch screen display portion of a graphical user interface to commence a marking operation. In response, a "job initiation signal" is provided to the processor 118 (e.g., via a switch closure and a ground or DC level applied to an I/O pin of the processor, or by the user interface providing a signal to the processor) to initiate generation of an electronic record. Alternatively, a remote job initiation signal may be received by the processor via the communication interface from another device, such as the remote computer 150.

In response to the job initiation signal, in block 606 the processor opens a file in the memory 122 in which to store the electronic record 135, and assigns a file identifier to the opened file. In one example, the file identifier assigned to the opened file may be or include one or more of a job number ("job ID") or ticket number derived from the ticket information and/or the service-related information, an identifier for the marking device itself, and an identifier for a remote computer associated with the marking device (e.g., for either remote control operation of the device and/or data uploading/downloading). To this end, if ticket information and/or service-related information is not previously available (e.g., if no information is received in block 602), the technician optionally may be prompted to manually enter (e.g., via a "wizard" or sequence of dialogues germane to obtaining relevant information displayed on the display of the user interface) various elements of ticket information and/or service-related information from which a file identifier may be derived, or provide other information that may be used as a file identifier.

A file opened in block 606 for purposes of storing an electronic record may have any of a variety of formats and include any of a variety of data structures. In one embodiment, the processor initially opens up a "flat file" for collection and logging of marking information to facilitate generation of an electronic record. As known in the art, a flat file is a plain text or mixed text/binary file containing one entry (data record) per line, in which each entry may have multiple fields containing respective values, and wherein the respective values may be separated by delimiters (e.g., commas) or have a fixed length. In one exemplary implementation, the processor 118 logs data into a flat file opened for the electronic record as a succession of time stamped "event entries." Some event entries may be related specifically to actuation and/or logged in response to actuation of the marking device (e.g., the processor 118 receiving an actuation signal 121). Other event entries may be more generally related in some manner to overall operation of the marking device or the marking operation itself, but not necessarily associated with one or more particular actuations (e.g., start/pause/stop marking operation, power/battery status, communication link/network connection status, etc.), and these other event entries may be logged at virtually any time (in some cases irrespective of one or more actuations).

Accordingly, it should be appreciated that in one aspect of this embodiment a flat file for an electronic record may contain a succession of time stamped event entries on respective lines, in which one or more event entries may have multiple delimited fields/values and at least some of the event entries relate to actuation of the marking device. In another aspect, one or more fields/values in a given event entry may specifically indicate in some manner whether or not the event is associated with an actuation of the marking device. In general, an "actuation event entry" constitutes an entry in a file for an electronic record that is in some manner specifically related to, and/or logged in response to or during, actuation of the marking device, and multiple actuation event entries for a given actuation constitute an actuation data set for that actuation. Again, it should be appreciated that a file for an electronic record may include one or more other event entries that may not be particularly associated with an actuation.

In other embodiments, the file for an electronic record may or may not be a flat file, and event entries associated with actuations (actuation event entries) may be somehow identified and differentiated from other event entries that are not associated with an actuation. For example, a file for an electronic record may include a particular data structure or format that segregates or separates in some manner event entries associated with successive actuations from those event entries that are not particularly associated with actuations (and/or may be common to multiple actuations or a group of actuations). In yet other embodiments, as discussed below, marking information may be initially collected and logged in a first file for an electronic record in a first format (e.g., a flat file including a succession of time-stamped event entries as "raw data" for the marking operation) that may be stored and/or transmitted for any of a variety of purposes, and then reformatted and/or reorganized in some manner in one or more subsequent files (e.g., a file having a particular data structure that segregates/separates actuation-related information from other information in different fields/elements of a data structure) for archiving and/or transmission to one or more other devices/processors.

Once a file for an electronic record is opened in block 606, in block 608 the processor can begin collecting and logging various marking information, i.e., logging in the electronic record (and/or transmitting via the communication interface) actuation event entries and/or other event entries. In one exemplary implementation, the processor may be programmed so as to poll one or more input devices and/or other components of the marking device to receive information, either once or multiple times/periodically following the job initiation signal, and log responses to these polls ("polling events") as event entries with associated time stamps. Examples of entries corresponding to polling events that may be logged into the file for the electronic record (and/or transmitted) include, but are not limited to, one or more "power status event entries" including power information associated with the power source 114, one or more "ticket information event entries" including ticket information (e.g., as received from the user interface or the communication interface, retrieved from local memory, etc.), one or more "service-related information event entries" including the service-related information (e.g., as received from the user interface or the communication interface, retrieved from local memory, etc.), and one or more "communication interface event entries" including status information regarding operation of the communication interface (e.g., network communication available/unavailable).

Additionally or alternatively, the processor may be programmed so as to respond to one or more signals designated as "interrupt events" from one or more components of the marking device. Such interrupt events cause logging of information in the electronic record (and/or transmission of information) upon/following the processor detecting the corresponding signal(s). For example, the "job initiation signal" itself may constitute an interrupt event, in response to which the processor 118 not only opens a file for the electronic record but, once the file is opened, the processor may request timing information from the timing system 128 and log into the electronic record a "start job event entry" including a job initiation time stamp associated with receipt of the job initiation signal.

In a similar manner, following commencement of a marking operation, the locate technician may utilize the user interface 126 (e.g., press a button, operate a joy-stick, or touch a touch screen display portion of a graphical user interface) to pause, restart, and/or indicate completion of the marking operation, and these actions may constitute interrupt events. For example, as indicated in block 610 of FIG. 9, a "pause signal" may be provided by the user interface to the processor, in response to which the processor may request timing information from the timing system and log a "pause job event entry" including a pause job time stamp associated with the at least one pause signal. When the technician is ready to continue, as shown in block 612 of FIG. 9 the technician may indicate this via the user interface and a "restart job event entry" similarly may be logged. When the marking operation is deemed by the technician to be completed, as noted in block 614 of FIG. 9 the technician may utilize the user interface so as to provide a "stop signal" to the processor, in response to which the processor may request timing information from the timing system and log a "stop job event entry" including a stop job time stamp associated with the stop signal.

Additionally, the locate technician may utilize the user interface 126 to denote the beginning and end of a marking operation for a particular facility type, and these actions may constitute interrupt events. For example, upon beginning a marking operation for a given facility type, the technician may select "line start" from the user interface, and a corresponding "line start signal" may be provided by the user interface to the processor, in response to which the processor may request timing information from the timing system and log a "line start event entry." Similarly, when the technician wishes to indicate completion of the marking operation for a given facility type, the technician may select "line stop" from the user interface, and a corresponding "line stop signal" may be provided by the user interface to the processor, in response to which the processor may request timing information from the timing system and log a "line stop even entry."

While various events are noted above as examples of "polling events" as opposed to "interrupt events," it should be appreciated that the invention is not limited in these respects, and that the marking data algorithm 134 executed by the processor 118 may be configured in any of a variety manners to designate various functions performed by and/or information provided by various components of the marking device as polling events or interrupt events. For example, the power source 114 may be configured to provide a "low battery signal" to the processor, which when present is treated by the processor as an interrupt event that may be logged by the processor and/or that may cause the processor to take some particular action (e.g., provide an audible/visible alert; disable logging of further data, etc.). In one aspect, absent the "low battery signal," the processor may request status information from the power source once or occasionally as a polling event. Similarly, the communication interface 124 may be configured to provide a "no network connection available signal" to the processor, which when present is treated by the processor as an interrupt event (that is logged and/or causes the processor to take some action), and when not present, the processor may poll the communication interface to request status information as a polling event.

Another example of an interrupt event is given by the actuation signal 121 provided by the actuation system 120 upon actuation of the actuator 142 (i.e., a signal change-of-state indicating a transition from a non-actuated state to an actuated state), in response to which the processor logs one or more actuation event entries in the electronic record. More specifically, in one implementation, the receipt of a non-actuated to actuated transition state of the actuation signal 121 by the processor may cause an initial actuation event entry to be logged as a "start actuation event entry" having an associated time stamp (i.e., a start time for the corresponding actuation) and also cause the processor to subsequently poll one or more input devices for information during the corresponding actuation and until release of the actuator (i.e., subsequent change of state of the actuation signal 121). In this manner, an actuation data set for a given actuation may include multiple actuation event entries.

For example, during actuation of the actuator, the processor may poll the location tracking system 130 so as to receive geographic information, and in turn log one or more "geo-location data event entries" in the actuation data set for the corresponding actuation. As discussed above in connection with FIGS. 2 and 3, in one exemplary implementation the location tracking system is configured to provide geographic information at an information update rate of approximately 5 Hz, and the processor may log respective updates of geographic information provided by the location tracking system at this update rate during an actuation as multiple geo-location data event entries of the actuation data set. It should be appreciated, however, that methods and apparatus according to various embodiments of the present invention are not limited in this respect, and that other geographic information update rates may be employed in various implementations (e.g., update rates of up to approximately 100 Hz), based in part on the particular location tracking system employed. Furthermore, it should be appreciated that in some implementations the geographic information provided by the location tracking system 130 may include one or more longitude coordinates, latitude coordinates, and a corresponding geo-location data time stamp at which a given set of longitude/latitude coordinates are obtained by the location tracking system; accordingly, a given geo-location data event entry in an actuation data set may include a longitude coordinate, a latitude coordinate, and the corresponding geo-location data time stamp.

Similarly, in some implementations, pursuant to an interrupt provided by the actuation signal 121, the processor may subsequently poll one or more of the timing system 128 and the marking material detection mechanism 132 so as to receive timing information and/or marking material information during a corresponding actuation, and in turn log one or more of a "timing event entry," and a "marking material detection event entry" as part of the actuation data set. Any of a variety of marking material information as discussed above may be collected and logged during actuation in response to processor polling of the marking material detection mechanism (e.g., causing an RFID tag reader to read various information from an RFID tag affixed to the marking dispenser).

Additionally, in some implementations, pursuant to an interrupt provided by the actuation signal 121, the processor may subsequently poll one or more of the user interface 126, the communication interface 124, and the local memory 122 to retrieve ticket information and/or service-related information for logging into an actuation data set. As discussed above, in some implementations the receipt/retrieval of ticket information and/or service-related information may be treated as a polling event not necessarily associated with actuations, and this information need not be included in one or more actuation data sets. However, in other implementations it may be desirable to include at least some aspect of ticket information and/or service related information in each actuation data set, notwithstanding the possible redundancy of data content in respective actuation data sets (e.g., see Table 6, discussed further below in connection with FIG. 10).

Another example of an interrupt event is given by a change-of-state of the actuation signal 121 indicating a transition from the actuated state to the non-actuated state, i.e., release of the actuator 142. In response to this event, the processor may request information from the timing system 128 and log an "end actuation event entry" including an end time stamp.

Yet another type of interrupt event causing the processor to log one or more event entries may be provided by the marking material detection mechanism 132 in the form of a signal that indicates whether or not a marking dispenser is contained in or appropriately coupled to the marking device. To this end, as discussed above in connection with FIGS. 2 and 3, the marking material detection mechanism may include a toggle switch that provides a two-state signal to the processor (e.g., dispenser in/dispenser out) as an interrupt. Upon receiving an interrupt indicating a transition from "dispenser out" to "dispenser in," the processor may collect and log this event as a "dispenser in event entry" with a corresponding time stamp, and then request other marking material information relating to the marking material in the dispenser from the marking material detection mechanism. In view of the foregoing, it should be appreciated that in some embodiments, marking material information may not necessarily be collected during one or more actuations of the marking device, but alternatively may be collected only upon a "dispenser in" event being detected. Upon detection of an interrupt event indicating a transition from "dispenser in" to "dispenser out," the processor similarly may collect and log this event as a "dispenser out event entry."

In yet another embodiment, the processor 118, executing marking data algorithm 134, may be configured to repeatedly/regularly poll all available input devices and other components of the marking device (e.g., in a predetermined order, in response to receipt of the job initiation signal) and generate an essentially continuous stream of data packets including marking information received pursuant to these polling events. In one aspect of this embodiment, each data packet of marking information may include a header, one or more flag fields, and one or more information payload fields. For example, in one implementation, the header for each packet may include one or more of a job ID (e.g., ticket identifier), technician ID, device ID (e.g., serial number), packet type ID, and/or a time stamp corresponding to logging of information/generation of the packet. Each packet also may include one or more payload fields for carrying information provided by the polled device(s) or components, and one or more flag fields that are set (or reset) upon occurrence of one or more predetermined interrupt events (e.g., pull/depress actuator, release actuator, marking dispenser in, marking dispenser out, low power, communication link fail, etc.). In this manner, a continuous stream of data may be provided as an output by the processor, in which certain interrupt events, such as an actuation and/or release of the actuator, "tag" certain data packets via an interrupt flag. In yet other aspects of this embodiment, all data packets thusly generated may be stored in the file opened for the electronic record and/or transmitted from the marking device in essentially real time; alternatively, only certain data packets with one or more predetermined flags set may be stored and/or transmitted.

Table 1 below illustrates an example of a portion of the contents of a relatively simple flat file for an electronic record that may be generated by the process 600 of FIG. 9:

TABLE 1

| TIME | LAT | LONG | EVENT | MARKER COLOR |
|---|---|---|---|---|
| 1:23:00.00 PM | −80.3851 | 25.5604 | Spraying | ORANGE |
| 1:23:00.20 PM | −80.3851 | 25.5604 | Spraying | ORANGE |
| 1:23:00.40 PM | −80.3851 | 25.5604 | Spraying | ORANGE |
| 1:23:00.60 PM | −80.3851 | 25.5604 | Spraying | ORANGE |
| 1:23:00.80 PM | −80.3851 | 25.5604 | Spraying | ORANGE |
| 1:23:01.00 PM | −80.3851 | 25.5604 | Spraying | ORANGE |
| 1:23:01.20 PM | −80.3851 | 25.5604 | Spraying | ORANGE |
| 1:23:01.40 PM | −80.3851 | 25.56039 | Spraying | ORANGE |
| 1:23:01.60 PM | −80.3851 | 25.56039 | Spraying | ORANGE |
| 1:23:01.80 PM | −80.3851 | 25.5604 | Spraying | ORANGE |
| 1:23:02.00 PM | −80.3851 | 25.5604 | Spraying | ORANGE |

The portion of the file shown in Table 1 corresponds to multiple actuation event entries (one entry per line) collected and logged during an actuation of the marking device. Each entry has a time stamp (e.g., entries are logged at a rate of approximately five events per second) and further includes multiple fields having respective values (e.g., as comma separated values) for latitude and longitude coordinates received from the location tracking device, an event indicator indicating that the device is "Spraying" (the actuator is actuated), and a color of the marking material being dispensed.

As noted above, it should be appreciated that the portion of the file shown in Table 1 is provided primarily for purposes of illustration, and that the format and/or content for respective event entries and the file itself for an electronic record generated by and/or based on the information collection process discussed above in connection with FIG. 9 may have any of a variety of different formats and/or content.

To this point, Tables 2 through 5 below provide examples of various events for which event entries may be logged in a file for an electronic record and/or transmitted by the marking device, exemplary formats for these event entries, and exemplary file formats for files having multiple such entries, according to another embodiment of the present invention.

Job Started/Paused/Restarted/Completed Events: This event entry format provides information about when a marking operation ("job") was started and completed in addition to capturing details about if and when the job was paused and restarted.

TABLE 2

| | |
|---|---|
| Format | INFO+JOBS: (DATE) (TIME) (WAND_ID) (JOB_ID) (STATE) <CR><LF> |
| Examples | INFO+JOBS: DATE(2009-04-15) TIME(12:03:44) WAND(2334) JOB(4000) (STARTED) <CR> <LF><br>INFO+JOBS: DATE(2009-04-15) TIME(12:11:44) WAND(2334) JOB(4000) (PAUSED) <CR> <LF><br>INFO+JOBS: DATE(2009-04-15) TIME(12:51:44) WAND(2334) JOB(4000) (RESTARTED) <CR> <LF><br>INFO+JOBS: DATE(2009-04-15) TIME(13:09:44) WAND(2334) JOB(4000) (END) <CR> <LF> |

Actuation State Change Events: For purposes of this event format, the actuator is deemed to have three possible states, i.e., PRESSED, HELD and RELEASED. Marking information from one or more input devices/other components of the marking device is recorded with these events to provide information about the job in progress.

TABLE 3

| | |
|---|---|
| Format | INFO+ WPTR: (DATE) (TIME) (GPS data) (PAINT info) (TRIGGER SWITCH STATE) <CR><LF> |
| Examples | INFO+WPTR: DATE(2009-04-15) TIME(12:04:44)<br>GPS($GPGGA,120443,4807.038,N,01131.000,E,1,08,0.9,545.4,M,46.9,M,,*47 )<br>CLR(RED) SWCH(PRESSED)<CR><LF><br>INFO+WPTR: DATE(2009-04-15) TIME(12:04:45)<br>GPS($GPGGA,120445,4807.038,N,01131.000,E,1,08,0.9,545.4,M,46.9,M,,*47 )<br>CLR(RED) SWCH(HELD)<CR><LF><br>INFO+WPTR: DATE(2009-04-15) TIME(12:04:46)<br>GPS($GPGGA,120446,4807.038,N,01131.000,E,1,08,0.9,545.4,M,46.9,M,,*47 )<br>CLR(RED) SWCH(RELEASED)<CR><LF> |

Marking Device Status Events: The status event collects various marking information and/or information on operating characteristics of the device on a periodic basis while a job is in progress (e.g., pursuant to processor polls).

TABLE 4

| | |
|---|---|
| Format | INFO+STAT: (DATE) (TIME) (GPS data) (PAINT status) (MEMORY used in %) (BATTERY level) <CR><LF> |
| Examples | INFO+STAT: DATE(2009-04-15) TIME(12:04:00)<br>GPS($GPGGA,120400,4807.038,N,01131.000,E,1,08,0.9,545.4,M,46.9,M,,*47 )<br>CLR(RED) MEM(65) BAT(3)<CR><LF> |

Error Events: Should any input device or other component of the marking device encounter a significant error condition, this may be logged as an event. In some cases, the user/technician also may be notified of the error through the user interface 126 (visible alert on display, audible alarm/alert, etc.). Similar event formats may be adopted for warning alerts/events and informational alerts/events.

TABLE 5

| | |
|---|---|
| Format | INFO+ERR: (DATE) (TIME) (GPS data) (PAINT status) (MEMORY used in %) (BATTERY level) <CR><LF> |
| Examples | INFO+ERR: DATE(2009-04-15) TIME(12:04:00) GPS($GPGGA,120400,4807.038,N,01131.000,E,1,08,0.9,545.4,M,46.9,M,,*47 ) CLR(RED) MEM(65) BAT(3)<CR><LF> |

With respect to file formats for electronic records including the event entries outlined above in Tables 2 through 5, two exemplary file formats, namely ASCII and XML, are provided below for purposes of illustration. In various implementations, a given marking device may be particularly configured to store and/or transmit electronic records and respective entries therein in either format (or other formats). With respect to identification of files/electronic records, a standard naming scheme/format may be adopted, for example, including an identifier for the remote computer with which the marking device may be communicating ("ServerID"), an identifier for the marking device itself ("WandID"), and an identifier for the marking operation/job ("JobID"), and having the format "ServerID_WandID_Job ID."

ASCII Data Format: This format allows low-level remote processing engines to quickly and easily receive, parse, and react to marking information logged and/or transmitted by the marking device. An example of an electronic record formatted in ASCII based on the event entries outlined in Tables 2 through 5 is as follows:

```
INFO+JOBS: DATE(2009-04-15) TIME(12:03:44) WAND(2334) JOB(4000) (STARTED)
<CR> <LF>
INFO+STAT: DATE(2009-04-15) TIME(12:04:00)
GPS($GPGGA,120400,4807.038,N,01131.000,E,1,08,0.9,545.4,M,46.9,M,,*47 )
CLR(RED) MEM(65) BAT(3)<CR><LF>
INFO+WPTR: DATE(2009-04-15) TIME(12:04:44)
GPS($GPGGA,120443,4807.038,N,01131.000,E,1,08,0.9,545.4,M,46.9,M,,*47 )
CLR(RED) SWCH(PRESSED)<CR><LF>
INFO+WPTR: DATE(2009-04-15) TIME(12:04:45)
GPS($GPGGA,120445,4807.038,N,01131.000,E,1,08,0.9,545.4,M,46.9,M,,*47 )
CLR(RED) SWCH(HELD)<CR><LF>
INFO+WPTR: DATE(2009-04-15) TIME(12:04:46)
GPS($GPGGA,120446,4807.038,N,01131.000,E,1,08,0.9,545.4,M,46.9,M,,*47 )
CLR(RED) SWCH(RELEASED)<CR><LF>
INFO+STAT: DATE(2009-04-15) TIME(12:05:00)
GPS($GPGGA,120500,4807.038,N,01131.000,E,1,08,0.9,545.4,M,46.9,M,,*47 )
CLR(RED) BAT(3)<CR><LF>
INFO+JOBS: DATE(2009-04-15) TIME(12:10:03) WAND(2334) JOB(4000)
(PAUSED)<CR> <LF>
INFO+JOBS: DATE(2009-04-15) TIME(13:01:43) WAND(2334) JOB(4000)
(RESTARTED)<CR> <LF>
INFO+WPTR: DATE(2009-04-15) TIME(13:01:50)
GPS($GPGGA,130150,4807.038,N,01131.000,E,1,08,0.9,545.4,M,46.9,M,,*47 )
CLR(RED) SWCH(PRESSED)<CR><LF>
INFO+WPTR: DATE(2009-04-15) TIME(13:01:51)
GPS($GPGGA,130151,4807.038,N,01131.000,E,1,08,0.9,545.4,M,46.9,M,,*47 )
CLR(RED) SWCH(RELEASED)<CR><LF>
INFO+JOBS: DATE(2009-04-15) TIME(13:20:30) WAND(2334) JOB(4000) (END)<CR>
<LF>
```

XML Data Format: This format allows transmission of self-describing data elements from the marking device, in some instances reducing processing errors and reducing the risks and effort involved in upgrades and data changes. An example of an electronic record formatted in XML based on the event entries outlined in Tables 2 through 5 is as follows:

```
<WAND ID=2334>
  <JOB ID=4000>
    <ACTIVITY>
      <DATE>2009-04-15</DATE>
      <TIME>12:03:44</TIME>
```

```
            <STATUS>Started</STATUS>
        </ACTIVITY>
        <ACTIVITY>
            <DATE>2009-04-15</DATE>
            <TIME>12:04:00</TIME>
            <GPS>($GPGGA, 120400,4807.038,N,01131.000,E,1,08,0.9,545.4,M,46.9,M,,*47</GPS>
            <PAINT>
                <COLOR>Red</COLOR>
                <VALID>True</VALID>
              <SN>2342343243355</SN>
            </PAINT>
            <SWITCH>Pressed</SWITCH>
        </ACTIVITY>
    </JOB>
</WAND>
```

Yet another alternative format for storing and organizing marking information in an electronic record of a marking operation, according to one embodiment of the invention, is shown in Table 6 below. By way of example, Table 6 shows the format and content of three actuation data sets of an electronic record of a marking operation for a given facility, in which each actuation data set includes information associated with multiple actuation event entries logged during a corresponding actuation and resulting locate mark (e.g., act-1, act-2, and act-3), as shown for example in FIG. 8. As discussed above, it should be appreciated that the format and content shown below in Table 6 may constitute an "original" electronic record generated by the processor pursuant to the process 600 shown in FIG. 9, or may be derived from raw data collected and logged pursuant to the process 600 (e.g., as a flat file, an ASCII formatted file, or an XML formatted file) and subsequently reorganized and particularly formatted.

TABLE 6

| | Example actuation data set for act-1 | |
|---|---|---|
| act-1 | Service provider ID | 0482 |
| | User ID | 4815 |
| | Device ID | 7362 |
| | T1 timestamp data | 12-Jul-2008; 09:35:15.2 |
| | T2 timestamp data | 12-Jul-2008; 09:35:16.1 |
| | Duration ($\Delta t$) | 00:00:00.9 |
| | T1 geo-location data | 2650.9348,N,08003.5057,W |
| | $1^{st}$ interval location data | 2650.9353,N,08003.5055,W |
| | $2^{nd}$ interval location data | 2650.9356,N,08003.5055,W |
| | . | . |
| | . | . |
| | . | . |
| | Nth interval location data | 2650.9246,N,08003.5240,W |
| | T2 geo-location data | 2650.9255,N,08003.5236,W |
| | Product data | Color=Red, Brand=ABC, Type/Batch = 224B-1 |
| | Ground Type | Grass |
| | Other info (text entry) | "thick and wet at time of marking" |
| | Locate request data | Requestor: XYZ Construction Company, Requested service address: 222 Main St, Orlando, FL |
| | Example actuation data set for act-2 | |
| act-2 | Service provider ID | 0482 |
| | User ID | 4815 |
| | Device ID | 7362 |
| | T1 timestamp data | 12-Jul-2008; 09:35:17.5 |
| | T2 timestamp data | 12-Jul-2008; 09:35:18.7 |
| | Duration ($\Delta t$) | 00:00:01.2 |
| | T1 geo-location data | 2650.9256,N,08003.5234,W |
| | 1st interval location data | 2650.9256,N,08003.5226,W |
| | $2^{nd}$ interval location data | 2650.9256,N,08003.5217,W |
| | . | . |
| | . | . |
| | . | . |
| | Nth interval location data | 2650.9260,N,08003.5199,W |
| | T2 geo-location data | 2650.9266,N,08003.5196,W |
| | Product data | Color=Red, Brand=ABC, Type/Batch = 224B-1 |
| | Ground Type | Grass |
| | Other info (text entry) | "thick and wet at time of marking" |
| | Locate request data | Requestor: XYZ Construction Company, Requested service address: 222 Main St, Orlando, FL |
| | Example actuation data set for act-3 | |
| act-3 | Service provider ID | 0482 |
| | User ID | 4815 |
| | Device ID | 7362 |
| | T1 timestamp data | 12-Jul-2008; 09:35:18.7 |
| | T2 timestamp data | 12-Jul-2008; 09:35:19.8 |
| | duration ($\Delta t$) | 00:00:01.1 |
| | T1 geo-location data | 2650.9273,N,08003.5193,W |
| | 1st interval location data | 2650.9281,N,08003.5190,W |
| | $2^{nd}$ interval location data | 2650.9288,N,08003.5188,W |
| | . | . |
| | . | . |
| | . | . |
| | Nth interval location data | 2650.9321,N,08003.5177,W |
| | T2 geo-location data | 2650.9325,N,08003.5176,W |
| | Product data | Color=Red, Brand=ABC, Type/Batch = 224B-1 |
| | Ground Type | Grass |
| | Other info (text entry) | "thick and wet at time of marking" |
| | Locate request data | Requestor: XYZ Construction Company, Requested service address: 222 Main St, Orlando, FL |

In addition to the information shown in Table 6, a job ID or some other identifier for the electronic record as a whole (e.g., a ticket number), as well as a total number of actuations for a given marking operation (e.g., the total number of actuation data sets in a given electronic record in this embodiment), may be included in the electronic record.

With regard to color information that may be included in any of the event entries and electronic records discussed herein, Table 7 below shows an example of the correlation of marking material color to the type of facility to be marked.

TABLE 7

| Correlation of color to facility type | |
|---|---|
| Marking material color | Facility Type |
| Red | Electric power lines, cables or conduits, and lighting cables |
| Yellow | Gas, oil, steam, petroleum, or other hazardous liquid or gaseous materials |

TABLE 7-continued

Correlation of color to facility type

| Marking material color | Facility Type |
| --- | --- |
| Orange | Communications, cable television, alarm or signal lines, cables, or conduits |
| Blue | Water, irrigation, and slurry lines |
| Green | Sewers, storm sewer facilities, or other drain lines |
| White | Proposed excavation |
| Pink | Temporary survey markings |
| Purple | Reclaimed water, irrigation, and slurry lines |
| Black | Mark-out for errant lines |

Figure 10:
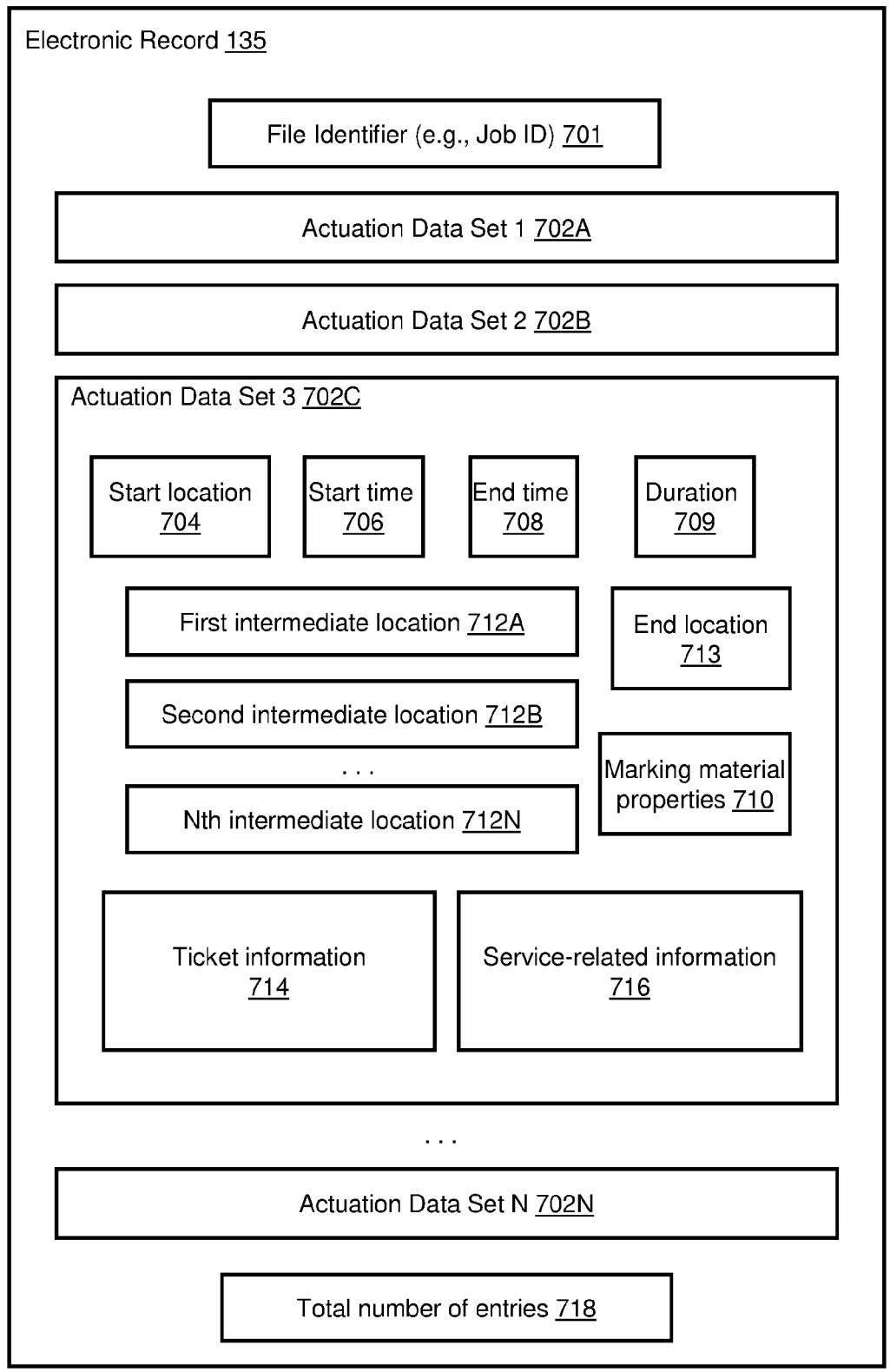
FIG. 10 is a block diagram of an exemplary data structure for an electronic record of a marking operation including information retrieved during one or more actuations of a marking device, according to one embodiment of the present invention.

FIG. 10 illustrates an exemplary data structure for an electronic record 135, according to another embodiment of the present invention, that may be generated by and/or based on information collected during the process 600 discussed above in connection with FIG. 9 and based on the organization of information shown in Table 6 above. As shown in FIG. 10, the record 135 includes a file identifier 701 (e.g., one or more of Job ID, WandID, ServerID, etc.) and a plurality of actuation data sets 1 through N (with reference numbers 702A, 702B, 702C . . . 702N), wherein each actuation data set is associated with a corresponding actuation of a marking device. For purposes of the following discussion, FIG. 10 shows additional details of the data structure for actuation data set 3 702C, showing several fields in which data (e.g., actuation event entries) may be entered to constitute the actuation data set. While only the exemplary details of the data structure of actuation data set 3 are shown in the electronic record 135 of FIG. 10, it should be appreciated that multiple actuation data sets of the electronic record 135 may have the same data structure as that shown for actuation data set 3 in FIG. 10.

The data structure of the actuation data set 3 702C of the electronic record 135 shown in FIG. 10 includes a start location field 704 (corresponding to T1 geo-location data shown in Table 2), an end location field 713 (corresponding to T2 geo-location data shown in Table 2), a start time field 706 (corresponding to T1 timestamp data shown in Table 2), an end time field 708 (corresponding to T2 timestamp data shown in Table 2) and a duration field 709 (corresponding to the duration Δt shown in Table 2). Additionally, the data structure for entry 3 702C includes one or more fields 712A, 712B, . . . 712N for intermediate location data (corresponding to $1^{st}$ interval location data, $2^{nd}$ interval location data . . . Nth interval location data shown in Table 2). Finally, the data structure for the entry 3 702C may include one or more ticket information fields 714 (e.g., corresponding to Locate request data in Table 2) and one or more service-related information fields 716 (e.g., corresponding to Service provider ID, User ID, and Device ID in Table 2).

In addition to one or more actuation data sets corresponding to actuations of a marking device, the electronic record 135 shown in FIG. 10 may include one or more additional elements. For example, FIG. 10 shows an additional element 718 of the electronic record to store the total number of entries in the record. Furthermore, according to another embodiment, various other information that may be common to multiple (or all) actuation data sets of a given electronic record may be stored in one or more additional elements of the electronic record that are not contained within one or more of the actuation data sets themselves. For example, in one alternative implementation, one or more of the ticket information field 714, the service-related information field 716, and the marking material properties field 710, which are shown as part of the data structure for a given actuation data set of the electronic record, may instead be elements of the electronic record that are not included within any one actuation data set (e.g., the information contained in one or more of the ticket information field and the service-related information field may be common to all actuation data sets of a given electronic record).

V. LANDMARK IDENTIFICATION MODE

In yet another embodiment of the present invention, the marking device 110 shown in FIGS. 2 and 3 may be configured (e.g., via particular instructions included in the marking data algorithm 134 executing on the processor 118, and/or various hardware modifications) to operate in multiple different modes so as to collect various information relating not only to a marking operation itself (marking information), but additionally (or alternatively) various information relating to the work site/dig area in which the marking operation is performed. For example, in one implementation, the marking device may be configured to operate in a first "marking mode" which essentially follows various aspects of the process outlined in FIG. 9, and also operate in a second "landmark identification mode" (or more simply "landmark mode"), in which the marking device acquires information relating to one or more environmental landmarks that may be germane to the marking operation (e.g., in and around the work site/dig area and/or generally in the vicinity of the marking operation).

More specifically, in a "marking mode," marking material may be dispensed with respective actuations of the marking device and various information transmitted and/or stored in an electronic record attendant to this process, as discussed above. Alternatively, in a "landmark mode," marking material is not necessarily dispensed with an actuation of the marking device (and in some instances the dispensing of marking material is specifically precluded); instead, a technician positions the marking device proximate to an environmental landmark of interest and, upon actuation, the marking device collects various information about the landmark (hereafter referred to as "landmark information"), which information may include, but is not limited to, geo-location data of an environmental landmark, type of environmental landmark, and a time stamp for any acquired information relating to an environmental landmark.

Figure 11A:
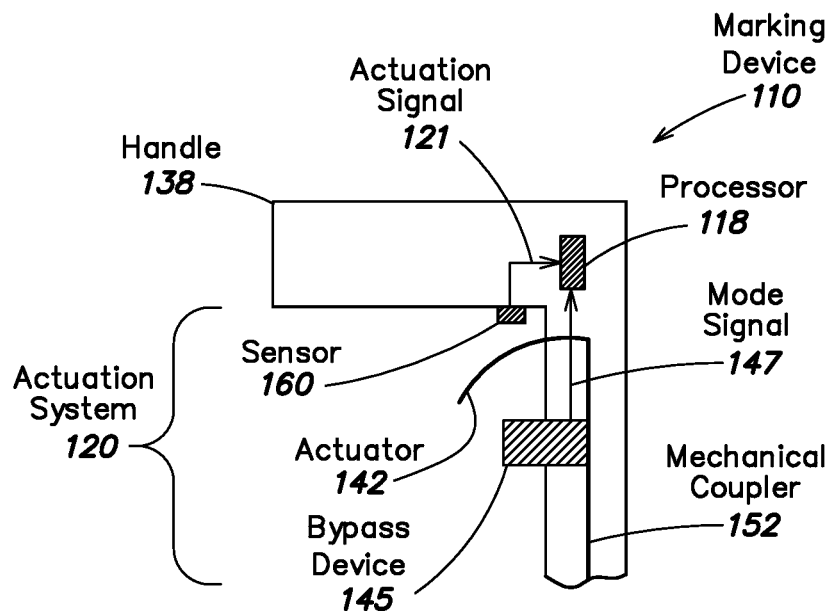
FIGS. 11A and 11B conceptually illustrate a portion of an actuation system of a marking device including a mechanical coupler, in which the marking device has been modified to accommodate a landmark mode, according to one embodiment of the present invention.
Figure 11B:
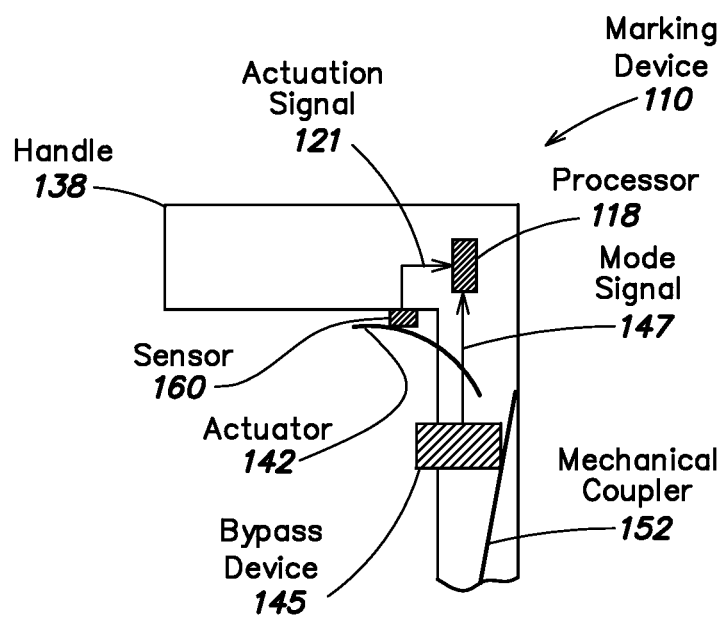

FIGS. 11A and 11B are similar to FIGS. 4A and 4B, and conceptually illustrate a portion of an actuation system 120 including a mechanical coupler 152, in which the marking device 110 has been modified to include a mode selector device so as to accommodate a landmark mode, according to one embodiment of the present invention. In a manner similar to that shown in FIGS. 4A and 4B, FIG. 11A shows the actuator 142 in an un-actuated state, whereas FIG. 11B shows the actuator 142 in an actuated state. In the embodiment of FIGS. 11A and 11B, the modifications are such that, in the landmark mode, the marking device is precluded from dispensing markers or marking material, even though the actuator 142 may be actuated by a user.

More specifically, as shown in FIGS. 11A and 11B, in this embodiment the marking device 110 further includes a mode selector device in the form of a bypass device 145 that is operated so as to impact and deflect the mechanical coupler 152 of the actuation system 120, such that the mechanical coupler 152 fails to cause the dispensing of a marking material upon actuation of the actuator 142. In FIG. 11A, the bypass device is shown in a first state (e.g., released) which allows the marking device to operate in marking mode as described above (i.e., the mechanical coupler is allowed to be displaced essentially vertically with actuation of the actuator 142 and thereby dispense markers). In FIG. 11B, the bypass device is shown in a second state (e.g., depressed) which allows the marking device to operate in landmark mode; in particular, the mechanical coupler 152 is deflected by the bypass device such that upon actuation of the actuator 142, the mechanical coupler 152 is not displaced vertically. In one example, with reference again to FIGS. 1B and 11B, when the mechanical coupler 152 is deflected by the bypass device 145, actuations of the actuator 142 do not effect full essentially up/down vertical movement of the mechanical coupler 152; as a result, the mechanical coupler fails to displace the actuation mechanism, and no pressure is applied to the spray nozzle of a paint dispenser (or dispensing mechanism of other types of marker dispensers). At the same time, however, actuation of the actuator 142 nonetheless provides an actuation signal 121 to the processor 118 (which may provide for logging of an actuation event entry as discussed above).

In various implementations, the bypass device 145 may be a locking and/or spring-loaded switching device (e.g., a press/release locking thumb switch) appropriately positioned along the housing of the marking device (e.g., near or on the handle), wherein the bypass device provides for both deflection of the mechanical coupler as well as opening/closure of electrical contacts so as to provide a mode signal 147 to the processor 118. For example, as shown in FIG. 11A, the first state (released) of the bypass device 145 may include an open contact state and no deflection of the mechanical coupler, whereas the second state shown in FIG. 11B (depressed) may include a closed contact state (e.g., in which the mode signal 147 is provided to the processor 118 as an interrupt event to indicate "landmark mode") when the bypass device deflects the mechanical coupler 152.

In response to the mode signal 147 indicating landmark mode, the processor 118 may request timing information from the timing system and log into an electronic record a "landmark mode event entry" including a landmark mode time stamp associated with the landmark mode signal. Additionally, or alternatively, the processor may respond to the landmark mode signal by taking one or more other actions pursuant to execution of a portion of the marking data algorithm 134 including particular instructions to implement the landmark mode, such as providing for the selection of landmark categories and/or types (via the user interface 126 and menus provided on the display 146), and logging actuation event entries in an electronic record as "landmark event entries." Further details of landmark mode operation of the marking device are discussed below in connection with FIG. 12.

In another exemplary implementation, rather than employing the bypass device 145 shown in FIGS. 11A and 11B as a mode selector device, a marking device configured to implement a landmark mode in which no marker or marking material is dispensed may be modified to include an actuator locking device as a mode selector device to prevent operation of the actuator 142. In essence, such a device would function in a manner similar to a "trigger lock." Like the bypass device, the actuator locking device or "trigger lock" may not only mechanically impede operation of the actuator, but also include electrical switch contacts (opened/closed) so as to provide a mode signal to the processor to indicate a landmark mode when the actuator locking device is engaged to impede actuation. Because such an actuator locking device impedes operation of the actuator, the actuator itself cannot be employed to provide an actuation signal 121 to the processor to facilitate the logging into an electronic record of actuation event entries as "landmark event entries." Accordingly, in implementations involving an actuator locking device, another aspect of the user interface (e.g., a button, switch, portion of the touch screen display, microphone to provide for voice-activation, etc.) is employed to provide a signal to the processor 118 to facilitate logging of an event (e.g., a "landmark event") by the technician. Further details of logging of landmark events are discussed below in connection with FIG. 12.

Yet another exemplary implementation of a marking device modified to operate in landmark mode is based on the general implementation of an actuation system 120 shown in FIG. 5, in which the landmark mode is selected via the user interface 126 and/or display 146 (e.g., menu-driven GUI) rather than via a bypass device or actuator locking device; i.e., some functionality of the user interface itself provides for a mode selector device. With reference again to FIG. 5, dispensing of marking material in this implementation is controlled by a link transmitter 168. As discussed above in connection with FIG. 5, the link transmitter 168 may be responsive to the actuation signal 121 provided by sensor 160 with operation of the actuator 142, for example, or alternatively responsive to a signal provided by the processor 118 (such that dispensing of marking material may in part be under the control of the processor 118 executing particular instructions for this purpose). Accordingly, in this implementation, when a landmark mode is selected via the user interface 126, the marking device may be configured to either dispense marking material (by not impeding any control signals to the link transmitter 168) (e.g., so as to form one or more "landmark locate marks" on or near a target environmental landmark), or not to dispense marking material (by impeding control signals to the link transmitter 168 or otherwise controlling the link transmitter to not dispense marking material). In either case, the actuation signal 121 output by sensor 160 may nonetheless be provided to the processor 118 so as to facilitate logging of an actuation event entry upon actuation of the actuator 142, which in landmark mode may be designated as a "landmark event entry," as discussed further below in connection with FIG. 12.

Figure 12:
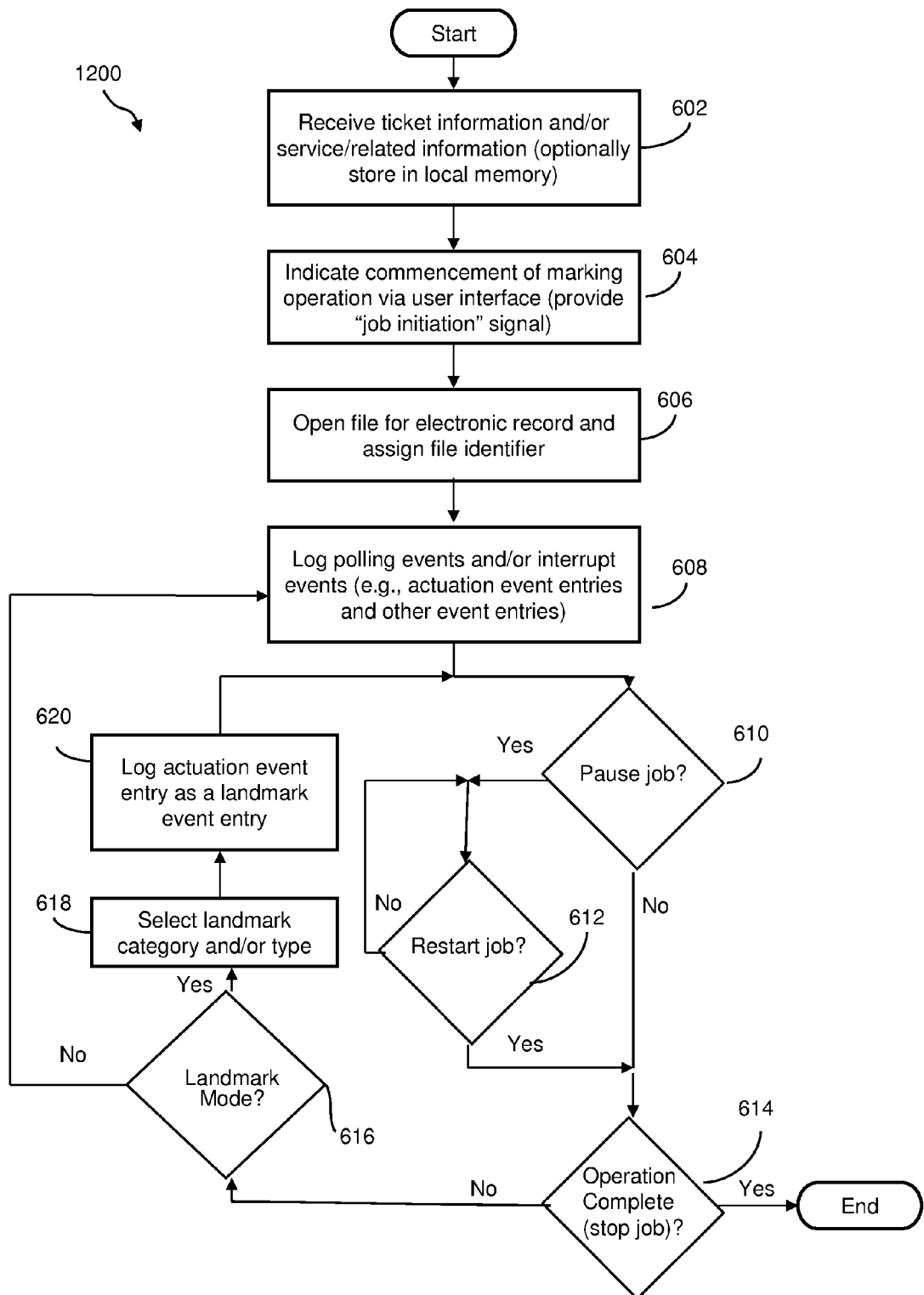
FIG. 12 is a flow diagram of an exemplary method for operating a marking device having a marking mode and a landmark mode so as to collect marking information and/or environmental landmark information, and generate an electronic record of such information, according to one embodiment of the present invention.

FIG. 12 is a flow diagram of an exemplary process 1200, according to one embodiment of the present invention, for operating a marking device having a marking mode and a landmark mode so as to collect marking information and/or environmental landmark information during operation of the marking device, and generate an electronic record of such information. Several aspects of the process 1200 shown in FIG. 12 are substantially similar or identical to those discussed above in connection with FIG. 9; in particular, blocks 602 through 614 are the same in both FIGS. 9 and 12, and the blocks 616, 618, and 620 in FIG. 12 are additional aspects of the process 1200.

In the process 1200 outlined in FIG. 12, following commencement of a marking operation the locate technician may utilize the user interface 126 (e.g., press a button, operate a joy-stick, touch a touch screen display portion of a graphical user interface, speak into a microphone to provide a voice-activated command, etc.) to not only pause, restart, and/or indicate completion of the marking operation, but further to select a landmark mode of operation for the marking device. As noted above in the discussion of FIG. 9, any one or more of these actions may constitute interrupt events. For example, as indicated in block 616 of FIG. 12, if a technician selects "landmark mode" via the user interface, the user interface may provide a "landmark mode signal" to the processor. In response to this signal, the processor may request timing information from the timing system and log a "landmark mode event entry" including a landmark mode time stamp associated with the landmark mode signal. Additionally, or alternatively, the processor may respond to the landmark mode signal by taking one or more other actions pursuant to execution of a portion of the marking data algorithm 134 including particular instructions to implement the landmark mode (as discussed above, the landmark mode may be entered in alternative implementations via a mode signal provided to the processor 118 by a bypass device or an actuator locking device serving as a mode selector device).

Table 8 below provides an example of content and format for a mode select event entry that may be logged in a file for an electronic record and/or transmitted by the marking device. The example mode select event entry shown below in Table 8 follows a similar format to that used for the event entry examples provided in Tables 2-5 above.

TABLE 8

| | |
|---|---|
| Format | INFO+MODE: (DATE) (TIME) (WAND_ID) (JOB_ID) (MODE) <CR><LF> |
| Examples | INFO+MODE: DATE(2009-04-15) TIME(12:03:44) WAND(2334) JOB(4000) (LANDMARK) <CR> <LF> |

In the process outlined in FIG. 12, subsequent to selection of the landmark mode, as noted in block 618 the process may provide for the selection of a particular category and/or type of landmark for which information is to be collected. To this end, in one implementation the processor 118 controls the user interface 126 (including display 146) so as to display information to the technician to facilitate such a selection. In particular, a landmark selection submenu may be displayed, including one or more categories of landmarks displayed in any of a variety of manners (e.g., as a list of text entries, an arrangement of icons symbolizing respective categories, labeled symbols, etc.). Examples of landmark categories that may be displayed in such a submenu include, but are not limited to: 1) "Natural Gas;" 2) "Water/Sewer;" 3) "Power Line;" 4) "Phone Line;" 5) "CATV Line;" and 6) "Other."

Upon selection via the user interface of one of the landmark categories displayed on the submenu, the processor may control the user interface so as to display yet another submenu indicating various types of landmarks that fall within the selected category, so as to facilitate selection of a particular type of landmark for which information is to be collected. Examples of types of landmarks that may be displayed and available for selection via the user interface, for each of the above identified categories, include, but are not limited to:

Natural Gas: 1) Service Meter; 2) Manifold; 3) Test Station; 4) Regulator Station; 5) Vent/Vent stack; 6) Valve; 7) Trace Wire; 8) Anode; 9) Branch Service; 10) Capped Service; 11) Compressor Station; 12) Farm Tap; 13) Service Regulator; 14) Service Line; 15) Service Riser; 16) Shut Off Valve; 17) Tee; 18) Valve Box; 19) Transmission Pipeline; 20) Main/Distribution Main; 21) Offset; 22) Low Pressure; 23) Medium Pressure; 24) High Pressure Water/Sewer: 1) Transmission Main; 2) Water Main; 3) Manhole; 4) Valve; 5) Clean out; 6) Sewer Lateral; 7) Water Meter; 8) Storm Sewer 9) Sanitary Sewer; 10) Pump Station; 11) Tap; 12) Faucet; 13) Fire Hydrant; 14) Tracer Wire Power Line: 1) Pole; 2) Anchor; 3) Transformer; 4) Manhole; 5) Handhole; 6) Street light; 7) Electrical Riser; 8) Primary; 9) Secondary; 10) Switch; 11) Fused Switch; 12) Circuit Breaker; 13) Duct; 14) Power Plant; 15) Transmission Substation; 16) Power Substation; 17) Service Line; 18) Meter; 19) Pedestal; 20) Switch Gear; 21) Switch Cabinet; 22) Buried Transformer; 23) Riser; 24) Red Top Tracer Phone Line: 1) Pole; 2) Anchor; 3) Manhole; 4) Handhole; 5) Subscriber Line Carrier; 6) Digital Loop Carrier; 7) Remote Terminal; 8) Cross Box; 9) Continual environment Vault; 10) Fiber Optics; 11) Encapsulated Plant; 12) Building Terminal; 13) Terminal; 14) Aerial; 15) Buried; 16) Underground; 17) Duct Run; 18) Central Office; 19) Buried Joint; 20) Splice CATV Line: 1) Pole; 2) Anchor; 3) Headend; 4) Manhole; 5) Handhole; 6) Transmitter; 7) Fiber Transmitter; 8) Receiver; 9) Fiber Receiver; 10) HUB Location; 11) Power Supply/Inserter; 12) Fiber Node; 13) Amplifier; 14) Ped; 15) Dog House; 16) Subscriber Service Line; 17) Trunk Station; 18) Trunk Line Amplifier; 19) AC Power Supply Pedestal Other: various natural, architectural, or infrastructure-related landmarks, such as buildings, curbs, "tagged" curbs (intentionally marked curbs that are likely to survive excavation, to serve as points of reference to validate marking operations), streets, driveways, property boundaries, trees and other landscape elements, termination points of abandoned facilities, etc.

While the foregoing discussion of landmark categories and types provides one construct in which a wide variety of landmarks are made available for selection by the technician, it should be appreciated that in other implementations, options for landmark selection may be presented in different manners. For example, a more succinct list of landmark types may be presented to the technician to facilitate easy selection (e.g., a more limited set of about a dozen more common landmark types that might be encountered in the field, such as "telephone pole," "fire hydrant," "meter," "manhole," "curb," etc.). More generally, any number and variety of landmark types may be presented to the technician via the user interface in alphabetically ordered lists, numerically ordered lists, or other types of ordered text-based or symbolic arrangements, for example.

In another exemplary implementation, the categories and/or types of landmarks made available for selection via the user interface may be based at least in part on a type of facility being marked when the marking device was in a marking mode prior to selection of the landmark mode. For example, consider a technician using the marking device in the marking mode and in the process of marking a power line. In one implementation, upon switching to landmark mode, the user is first presented with selection options for landmark category and/or type that are more closely related to a power line (e.g., a more limited subset of option types including "pole," "transformer," "pedestal," etc.). In one aspect, the technician may nonetheless still have the option to select other categories and/or types of landmarks, but as a default the technician is first presented with options related to the type of facility last being marked. In another aspect, the selection options for landmark category and/or type may be specifically and intentionally limited to those options that are most germane to the type of facility last being marked in the previous marking mode (i.e., immediately prior to entry into the landmark mode).

In yet another exemplary implementation, the user interface may include a microphone and the processor may be configured to accept and process audible commands, such that landmark category and/or type selection may be accomplished via voice-activated commands. For example, once landmark mode is selected, the technician may select a particular landmark category or type by simply speaking into the microphone (e.g., "telephone pole," "fire hydrant," "meter," "manhole," "curb," etc.).

In addition to, or as an alternative to, selection of landmark category and/or type, block 618 may provide for the entry of any of a variety of text information for inclusion as part of the landmark information in an electronic record. For example, in some exemplary implementations, via the user interface and/or display the technician may enter text-based information relating to an environmental landmark (e.g., as an offset to another topological, architectural, or infrastructure feature in proximity to the environmental landmark—"telephone pole 5 ft. from back of curb"). Additionally, in a manner similar to landmark type selection, the user interface/display may provide for menu-driven selection via a GUI of predetermined options for additional text-based information to be included as part of the landmark information (e.g., a set of "stock" text messages for selection to be included as part of landmark information).

Following selection of landmark category and/or type, and/or entry/section of any text-based information in block 618 of the process 1200 shown in FIG. 12, in block 620 actuations of the actuator 142 in landmark mode cause the processor to collect various "landmark information" with each actuation, which information is logged in an electronic record as a "landmark event entry" (rather than an actuation event entry, as noted in Table 3 above). Furthermore, as noted above, the processor 118 and/or the link transmitter 168 of the actuation system 120 may be particularly configured to either dispense or not dispense marking material upon actuations in landmark mode. Essentially, in landmark mode, the technician positions the marking device proximate to a selected category/type of landmark and actuates the actuator to acquire various information relating to the landmark (e.g., geo-location data, type, time stamp).

In general, the processor may be configured to communicate with (e.g., poll) any of a variety of input devices to collect landmark information to be logged in an electronic record. As discussed above in connection with the marking mode (refer again to FIG. 2), such information may be acquired from any of a variety of input devices including, but not limited to, the location tracking system 130, the timing system 128, the communications interface 124 (e.g., a USB port or other port), the user interface 126, and the local memory 122.

In particular, any data that is available from the location tracking system (e.g., any information available in various NMEA data messages, such as coordinated universal time, date, latitude, north/south indicator, longitude, east/west indicator, number and identification of satellites used in the position solution, number and identification of GPS satellites in view and their elevation, azimuth and SNR values, dilution of precision values) may be collected as landmark information and logged in an electronic record as part of a landmark event entry. Additionally, information collected from the user interface in the form of a text entry by the technician may be included in a landmark event entry; for example, in one implementation, upon actuation of the actuator, the processor may prompt the technician via the display of the user interface to enter text notes, if desired (e.g., the technician may describe an offset of a target environmental landmark from an architectural, topographical, or infrastructure feature to compliment geographic information provided by the location tracking system), and this textual information may serve as landmark information. In view of the foregoing, it should be appreciated that "landmark information" may include a wide variety of information components including, but not limited to, one or more of geographical information (e.g., from the location tracking system), timing information (e.g., from the location tracking system and/or the timing system), landmark category and/or type information (e.g., selected or entered via the user interface), textual information (e.g., entered via the user interface), or other information (e.g., received from the local memory and/or the communications interface).

Table 9 below provides an example of content and format for a landmark event entry that may be logged in a file for an electronic record and/or transmitted by the marking device when in landmark mode. The example landmark event entry shown below in Table 9 also follows a similar format to that used for the event entry examples provided in Tables 2-5 above.

TABLE 9

| | |
|---|---|
| Format | INFO+LMRK: (DATE) (TIME) (GPS data) (CATEGORY, TYPE)(TEXT) <CR><LF> |
| Examples | INFO+LMRK: DATE(2009-04-15) TIME(12:04:44) GPS($GPGGA, 120443, 4807.038, N, 01131.000, E, 1, 08, 0.9, 545.4, M, 46.9, M,, *47) LMRK(3, 12)("Panel mounted rear wall of shed")<CR><LF> |

In the example landmark event entry given in Table 9, the landmark information includes a time stamp (e.g., DATE and TIME), geographical information (e.g., GPS data), category/type information, and text-based information for an environmental landmark. The notation LMRK (3,12) in the example denotes a category 3, type 12 landmark which, in the exemplary listings provided above, corresponds to "Power Line," "Circuit Breaker." It should be appreciated that the event entry shown in Table 9 is provided primarily for purposes of illustration, and that a variety of other or additional landmark information may be included in landmark event entries, as noted above.

As with the event entry examples provided in Tables 2-5 above, the exemplary format for a mode select and landmark event entry as shown in Tables 8 and 9 may be included in either an ASCII and XML file format for an electronic record that is stored and/or transmitted by the marking device (in which a particular naming scheme/format may be adopted to identify files/electronic records, such as "ServerID_WandID-_Job ID"). It should also be appreciated that an electronic record generated by a multi-mode marking device in some instances may include a mixture of actuation event entries and landmark event entries, actuation event entries without any landmark event entries, and landmark event entries without any actuation event entries.

Yet another alternative format for storing and organizing landmark information in an electronic record, according to one embodiment of the invention, is shown in Tables 10 and 11 below. By way of example, Table 10 shows the format and content of an electronic record entry for a utility pole, which includes one geo-location data point, and Table 11 shows the format and content of an electronic record entry for a pedestal, which includes four geo-location data points (i.e., one for each corner of the pedestal). It should be appreciated that the format and content shown below in Tables 10 and 11 is provided primarily for purposes of illustration and, as noted above, a variety of format and content may be included in an electronic record entry for landmark information. The examples provided in Tables 10 and 11 may constitute an "original" electronic record generated by the processor pursuant to the process 1200 shown in FIG. 12, or may be derived from raw data collected and logged pursuant to the process 1200 (e.g., as a flat file, an ASCII formatted file, or an XML formatted file) and subsequently reorganized and particularly formatted. It should also be appreciated that the examples provided in Tables 10 and 11 illustrate that landmark information may be included in an electronic record together with one or both of ticket information and service-related information, as discussed above in connection with electronic records including various marking information.

TABLE 10

Example record of data acquired for a utility pole while in landmark identification mode of operation

| Record #1 | Service provider ID | 0482 |
|---|---|---|
| | User ID | 4815 |
| | Device ID | 7362 |
| | Type of EL | Type = utility pole |
| | timestamp data | 12-Jul-2008; 09:35:17.5 |
| | geo-location data | 2650.9256, N, 08003.5234, W |
| | Other info (text entry) | "5 ft. from back of curb" |
| | Locate request data | Requestor: XYZ Construction Company, Requested service address: 222 Main St, Orlando, FL |

TABLE 11

Example record of data acquired for a pedestal while in landmark identification mode of operation

| Record #2 | Service provider ID | 0482 |
|---|---|---|
| | User ID | 4815 |
| | Device ID | 7362 |
| | Type of EL | Type = pedestal |
| | timestamp data | 12-Jul-2008; 09:35:17.5 |
| | geo-location data | 2650.9256, N, 08003.5234, W |
| | Type of EL | Type = pedestal |
| | timestamp data | 12-Jul-2008; 09:35:21.2 |
| | geo-location data | 2650.9256, N, 08003.5226, W |
| | Type of EL | Type = pedestal |
| | timestamp data | 12-Jul-2008; 09:35:26.7 |
| | geo-location data | 2650.9288, N, 08003.5188, W |
| | Type of EL | Type = pedestal |
| | timestamp data | 12-Jul-2008; 09:35:33.5 |
| | geo-location data | 2650.9321, N, 08003.5177, W |
| | Other info (text entry) | "7 ft from pavement edge" |
| | Locate request data | Requestor: XYZ Construction Company, Requested service address: 222 Main St, Orlando, FL |

Figure 13:
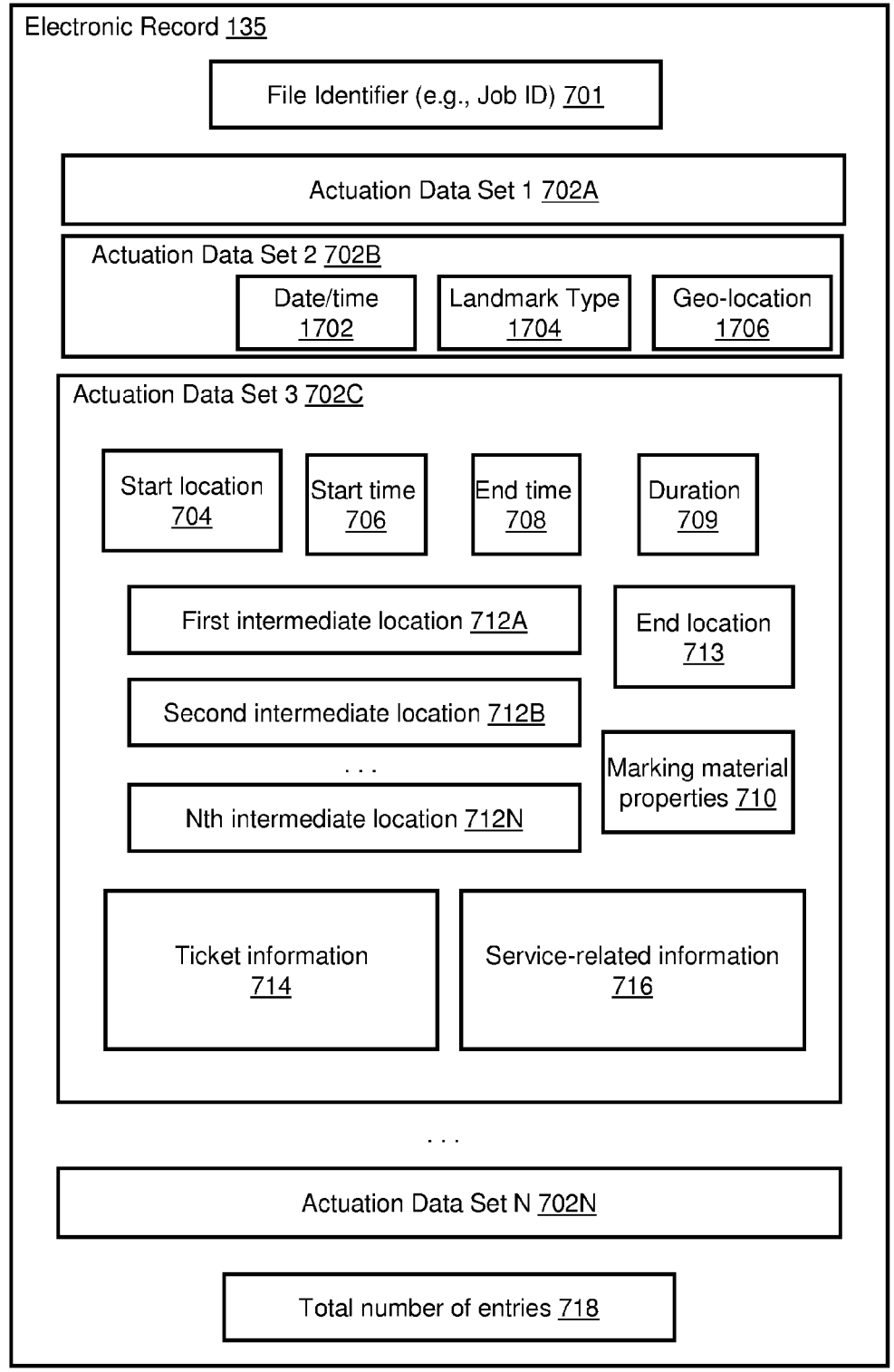
FIG. 13 is a block diagram of an exemplary data structure for an electronic record of a marking operation including both marking information and landmark information retrieved during actuations of a marking device, according to one embodiment of the present invention.

FIG. 13 is a block diagram similar to FIG. 10 and illustrates an exemplary data structure for an electronic record 135 that includes both marking information and landmark information (i.e., that may be generated by and/or based on information collected during the process 1200 discussed above in connection with FIG. 12 and based on the organization of information shown in Tables 9 and 10 above). Like the exemplary electronic record shown in FIG. 10, the record 135 in FIG. 13 includes a file identifier 701 (e.g., one or more of Job ID, WandID, ServerID, etc.) and a plurality of actuation data sets 1 through N (with reference numbers 702A, 702B, 702C ... 702N), wherein each actuation data set is associated with a corresponding actuation of a marking device. In FIG. 13, also as in FIG. 10, additional details of the data structure for actuation data set 3 702C are shown, relating to marking information collected in marking mode. However, unlike FIG. 10, FIG. 13 shows that the actuation data set 2 702B relates to landmark information acquired pursuant to an actuation in landmark mode; in particular, the actuation data set 2 702B includes a date/time field 1702, a type field 1704, and a geo-location field 1706 corresponding to a landmark event entry.

In other respects, the data structure in FIG. 13 is similar to that shown in FIG. 10. For example, various other information that may be common to multiple (or all) actuation data sets of a given electronic record may be stored in one or more additional elements of the electronic record that are not contained within one or more of the actuation data sets themselves (e.g., one or more of the ticket information field 714, the service-related information field 716, and the marking material properties field 710, which are shown as part of the data structure for a given actuation data set of the electronic record, may instead be elements of the electronic record that are common to all actuation data sets of a given electronic record).

Once an actuation of the marking device in landmark mode has been logged as a landmark event entry, the process 1200 shown in FIG. 12 returns to block 610. At this point, the technician is provided (via the user interface/display) with the options of pausing the job (block 610), restarting the job if previously paused (block 612), stopping the job and indicating completion (block 614) or selecting landmark mode again (block 616) for the next actuation. If the technician selects none of these options, the process returns to block 608, at which point further polling and/or interrupt events are logged (i.e., an actuation event entry capturing marking information is logged with the next actuation of the actuator), as discussed above in connection with FIG. 9. Accordingly, after an actuation in landmark mode, in one exemplary implementation the marking device defaults back to the marking mode, unless and until the technician selects the landmark mode again for a subsequent actuation.

In an alternative implementation not shown in FIG. 12, following actuation of the marking device in landmark mode, the processor may control the user interface/display to provide an option to the technician to exit landmark mode (rather than automatically presenting the options of pause job, restart job, stop job, or landmark mode). In this manner, the marking device remains in landmark mode for subsequent actuations until the technician makes a menu selection to exit landmark mode, at which point the process 1200 returns to block 610.

In yet another embodiment, the processor 118, executing marking data algorithm 134 in landmark mode, may be configured to generate an essentially continuous stream of data packets representing various event entries logged by the marking device (e.g., as shown above in Tables 2-9). As discussed above in connection with the marking mode, each data packet may include a header, one or more flag fields, and one or more information payload fields. To accommodate both a marking mode and a landmark mode, one flag field may be set or reset upon selection of the landmark mode so as to identify the contents of any information payload field in the data packet as landmark information as opposed to marking information. Similarly, as discussed above, one or more other flag fields may be set (or reset) upon occurrence of one or more predetermined interrupt events (e.g., pull/depress actuator, release actuator, marking dispenser in, marking dispenser out, low power, communication link fail, etc.). In this manner, a continuous stream of data may be provided as an output by the processor, in which certain interrupt events, such as an actuation and/or release of the actuator, "tag" certain data packets via an interrupt flag, and certain data packets also may be tagged as generated in marking mode or landmark mode. In yet other aspects of this embodiment, all data packets thusly generated may be stored in the file opened for the electronic record and/or transmitted from the marking device in essentially real time; alternatively, only certain data packets with one or more predetermined flags set may be stored and/or transmitted.

Thus, in landmark identification mode, a locate technician may employ an appropriately configured marking device to capture the types and locations of environmental landmarks of interest that are present at the work site and/or in the general environs of a dig area. While in landmark mode, the locate technician may approach a certain environmental landmark, then select the type of the environmental landmark via user interface, position the marking device (e.g., place the tip of marking device) proximate to the target environmental landmark, and then actuate the marking device. In doing so, the marking device logs in an electronic record landmark information including, for example, the type of the target environmental landmark, the geo-location of the target environmental landmark, and a time stamp in an electronic record. The locate technician may move from one environmental landmark to the next until information about all environmental landmarks of interest has been captured. Additionally, one or more data points (e.g., "landmark event entries") may be captured for any given environmental landmark.

VI. COMPUTER-GENERATED VISUAL REPRESENTATION OF A MARKING OPERATION INCLUDING MARKING INFORMATION AND LANDMARK INFORMATION

With reference again to FIGS. 2 and 3, in yet another embodiment the processor 118, executing marking data algorithm 134, and/or one or more remote computers 150 executing marking data algorithm 134, may additionally process various marking information and/or landmark information provided in real time from a marking device and/or stored in an electronic record of a marking operation and control a display device (e.g., display 146 of marking device 110 or some other display device) to render a computer-generated visual representation of one or both of the marking information and landmark information. Such a visual representation may be used, for example, to provide immediate feedback to the locate technician, provide essentially real-time feedback to a supervisor monitoring the technician from a remote location, provide a visual record of the marking information and/or the landmark information (e.g., for archiving purposes, once one or more electronic records are generated), and/or to verify the quality (e.g., accuracy and completeness) of work performed during a locate and marking operation. For purposes of the following discussion, a "marking operation" may refer to one or both of the processes of collecting marking information and landmark information. Accordingly, it should be appreciated that in various exemplary implementations of a computer-generated visual representation, only marking information may be visually rendered, only landmark information may be visually rendered, or both marking information and landmark information may be visually rendered.

In various aspects of this embodiment, a visual representation may be static in that all available marking information and/or landmark information is presented in a display field at one time after generation of an electronic record; alternatively, the visual representation may be dynamic in that marking information and/or landmark information is displayed in essentially real-time as it is collected, or may be displayed after generation of the electronic record in a time-sequenced animation that "recreates" the collection of information on the time scale in which it was originally acquired (e.g., based on the time stamps indicating when the information was acquired).

In other aspects, the relative positions of all locate marks represented by actuation event entries logged and/or transmitted by the marking device, as well as the relative positions of all environmental landmarks represented by landmark event entries logged and/or transmitted by the marking device, may be displayed (e.g., based on geo-location data and some appropriate scale of an available display field of display 146) to provide a visual representation of the marking operation. A visual representation of a marking operation may also be rendered in one or more particular colors corresponding to one or more particular underground facilities marked during the marking operation (e.g., see Table 7).

In one exemplary implementation, such a visual representation may include one "electronic locate mark" displayed in a display field for each actuation/dispensing action of a marking device, such that there is essentially a one-to-one correspondence between electronic locate marks and physical locate marks for a given underground facility marked during a marking operation. Alternatively, in another exemplary implementation of such a visual representation, an essentially continuous solid line (or other line type) may be displayed in a display field to represent a given underground facility marked during a marking operation. In another aspect, the processor may process the geo-location data in respective marking actuation data sets of an electronic record so as to filter, average, interpolate and/or otherwise "smooth" data (e.g., so as to provide "cleaner" visual renderings and/or connect successive locate marks represented by the respective actuation data sets of the electronic record); alternatively, "raw data" provided by the marking device may be utilized for the visual representation. In yet another aspect of this embodiment, visual representations of multiple marking operations for different underground facilities within the same work site/dig area may be generated in the same display field of a display device so as to provide a composite visual representation, in which different underground facilities may be uniquely identified in some manner (e.g., by different line types and/or different colors), and one or more environmental landmarks in and/or around the work site/dig area may be identified using a variety of displayed identifiers (e.g., icons, symbols, marks, shapes, etc.).

Figure 14:
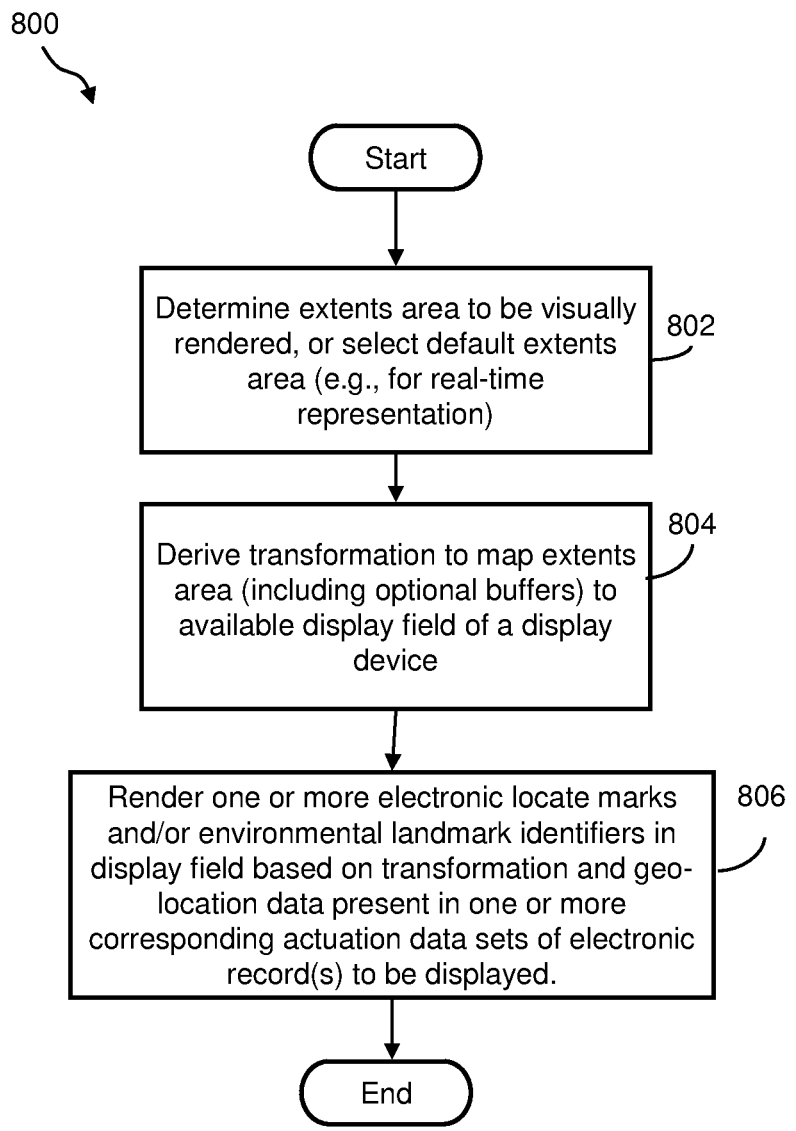
FIG. 14 is a flow diagram of an exemplary method for displaying a visual representation of a marking operation in a display field having a predetermined scale, according to one embodiment of the present invention.

FIG. 14 illustrates a flow chart for a process 800 according to one embodiment of the present invention for generating a visual representation of a marking operation based on an electronic record and/or essentially real-time information transmission from the marking device 110. As noted above, the process 800 may result from the execution of various embodiments of the marking data algorithm 134 on the processor 118 of the marking device 110 (to render the visual representation on the display 146 of the marking device), or by one or more other remote computers (to render the visual representation on one or more other display devices).

In block 802 of the process 800, if an electronic record has already been generated for the marking operation in which one or more underground facilities are marked and/or environmental landmark information is acquired, the record is examined to determine the geographic extents of the locate marks and/or environmental landmarks to be visually rendered on a display device. In particular, the processor 118 may review the geo-location data of all actuation data sets of the electronic record to determine (e.g., based on the respective latitude and longitude coordinates of the available geo-location data) the maximum extents of the marking operation to be visually rendered.

The maximum extents of the marking operation may be determined in any of a variety of manners according to different exemplary implementations. For example, in one exemplary implementation, in block 802 the processor 118 may determine the centroid of all electronic locate marks and/or environmental landmarks represented by respective actuation data sets of the electronic record to be displayed.

The processor then determines the geographic extent of the collection of electronic locate marks and/or environmental landmarks by determining one or more latitude/longitude coordinate pairs from the available data having a greatest distance from the centroid. In one example, the processor may determine a single farthest point from the centroid, and a distance between this farthest point and the centroid serves as a radius of a circle that provides an "extents area circle." In another example, the "farthest opposing corners" of a rectangle around the centroid may be determined by assigning the centroid as the origin of a reference coordinate system, and finding the coordinate pairs in opposing quadrants of the coordinate system having a greatest distance from the centroid (e.g., the +LAT/+LONG and −LAT/−LONG coordinate pairs at a greatest distance from the origin) to provide an "extents area rectangle." Other types of polygons and closed shapes (ovals) may be employed to provide an extents area for the marking operation to be displayed.

Alternatively, if an electronic record has not been previously generated and information received in essentially real-time from the marking device is to be displayed in a display field, a default extents area may be selected in advance based on any of a variety of criteria. For example, address and/or site description information provided in a ticket pursuant to which the marking operation is performed may provide a basis on which an extents area for the marking operation may be estimated a priori. Similarly, as discussed further below in connection with FIG. 17, an available digital image of the work site/dig area may be employed to determine or estimate an initial extents area for the marking operation.

In block 804, the extents area of the marking operation to be visually rendered is then mapped to an available display field of a display device, using any appropriate scaling factor as necessary, to ensure that all of the geo-location data in the electronic record fits within the display field. For example, in one exemplary implementation, a transformation may be derived using information relating to the available display field (e.g., a reference coordinate system using an appropriate scale for a given display field of a display device) to map data points within the extents area to the available display field. In another aspect of this example, a buffer area around the extents area may be added to provide one or more suitable margins for the displayed visual representation, and/or to accommodate different shapes of extents areas to the available display field of the display device, and an appropriate transformation may be derived based on this optional additional buffer area.

Once a transformation is derived to map the marking operation extents area to the available display field of a display device, in block 806 one or more electronic locate marks and/or one or more identifiers (e.g., icons, symbols, marks, shapes, etc.) for environmental landmarks is/are rendered in the display field based on applying the transformation to the geo-location data present in the data set of one or more corresponding actuation data sets of the electronic record. In one exemplary implementation, one electronic locate mark is rendered in the display field for each actuation data set of an electronic record. With reference again to Table 6 and FIG. 10, in one embodiment each actuation data set includes at least T1 geo-location data for a start of an actuation of a marking device and one or more other pieces of geo-location data during actuation. Using multiple pieces of geo-location data per actuation data set, an electronic locate mark may be rendered as a line in the display field (e.g., so as to visually represent one of the physical locate marks 414-1, 414-2 or 414-3 shown in FIG. 8). In another exemplary implementation, an electronic locate mark may be rendered for each geo-location data in a given entry, such that multiple electronic locate marks correspond to one actuation (e.g., a series of dots electronically rendered to graphically represent a line-type physical locate mark). In one aspect, as discussed above, a given electronic locate mark may be rendered in a particular color and/or line type to represent a type of underground facility represented by the mark (e.g., as indicated by marking material information included in the electronic record).

Figure 15:
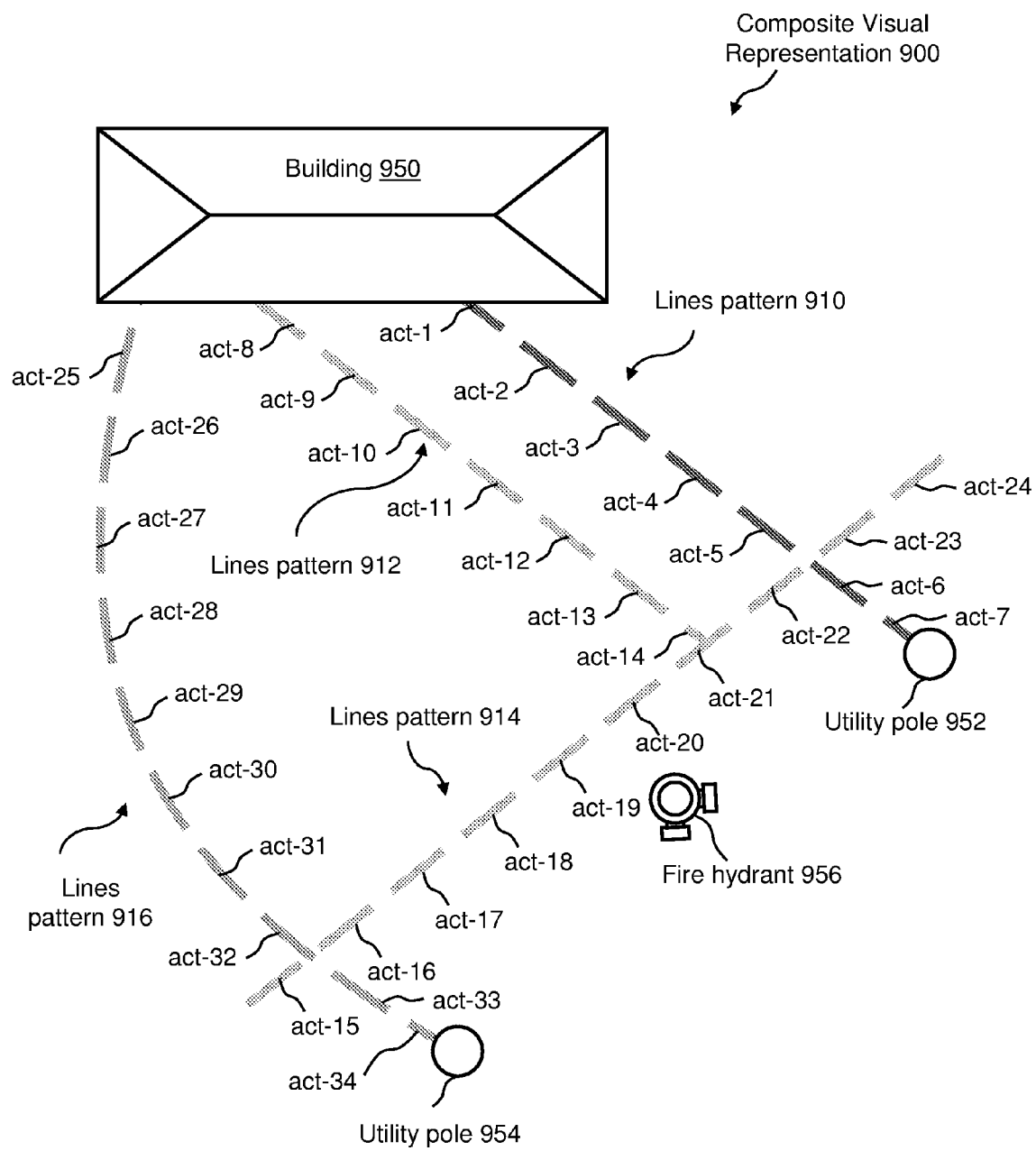
FIG. 15 is an example of a visual representation showing electronic locate marks and identifiers for environmental landmarks based on collected data corresponding to respective actuations of a marking device during marking operations, according to one embodiment of the present invention.

FIG. 15 illustrates a plan view of an exemplary composite visual representation 900 that "electronically recreates" a marking operation for various underground facilities and environmental landmarks present in a work site/dig area, based for example on the process 1200 discussed above in connection with FIG. 12. In particular, FIG. 15 illustrates a number of electronic locate marks corresponding to actuations of a marking device whose relative positions in the display field are derived from marking actuation data sets of the electronic record, as discussed above. In the example of FIG. 15, act-1 through act-7 form a lines pattern 910 representing a first marked underground facility, act-8 through act-14 form a lines pattern 912 representing a second marked underground facility, act-15 through act-24 form a lines pattern 914 representing a third marked underground facility, and act-25 through act-34 form a lines pattern 916 representing a fourth marked underground facility. FIG. 15 also includes identifiers for various environmental landmarks disposed in proximity to the electronic locate marks; in particular, a building 950 is shown in the top portion of FIG. 15, whereas two utility poles 952 and 954, as well as a fire hydrant 956, are shown in the bottom portion of FIG. 15.

Figure 16:
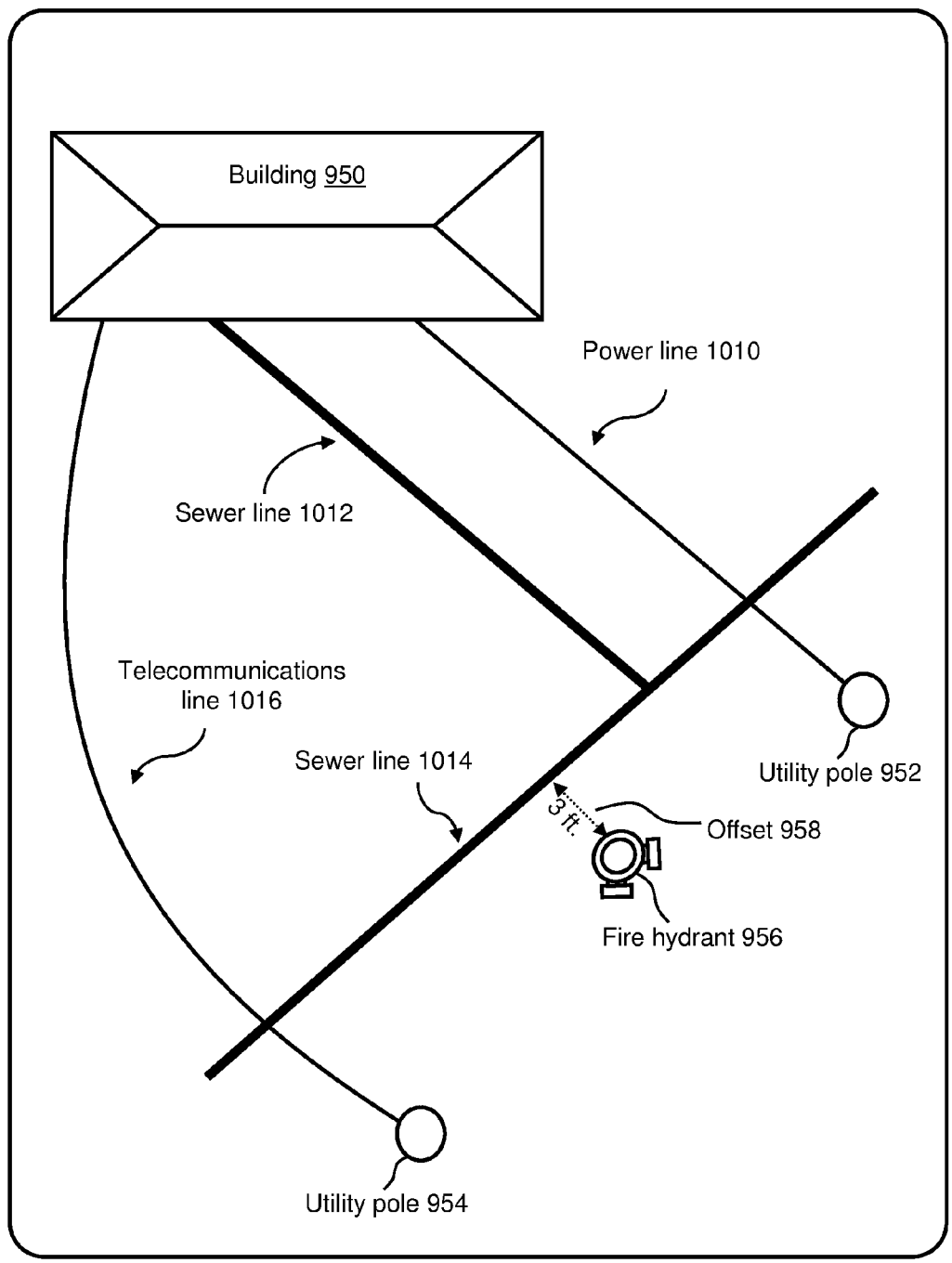
FIG. 16 is an example of another visual representation of marking operations, according to one embodiment of the present invention.

As noted above, while in one embodiment there may be a one-to-one correspondence between electronic locate marks rendered in a single or composite visual representation and physical locate marks placed in a dig area during a marking operation, or there may be multiple electronic locate marks for a corresponding physical locate mark, in yet other embodiments a single or composite visual representation may provide a variety of other indicators/digital representations of marked underground facilities in a computer-generated visual rendering. For example, FIG. 16 illustrates another example of a composite visual representation 1000 based on the same electronic record used to generate the composite visual representation 900 of FIG. 15, in which continuous lines are used to indicate the respective marking operations. To this end, in one exemplary implementation, an additional step may be included in the process 800 shown in FIG. 14, in which the processor may process the marking geo-location data in an electronic record by filtering, averaging, interpolating and/or otherwise "smoothing" the data so as to connect successive discrete locate marks represented by the respective actuation data sets of the electronic record and thereby provide a substantially smooth continuous line for display.

Similarly, filtering, averaging, interpolating, processing and/or otherwise smoothing of data may be applied to landmark information captured in landmark event entries. For example, multiple event entries logged for a particular environmental landmark (e.g., the four corners of a pedestal) may be processed so as to provide a single point in a display field at which to display a symbol, icon or other identifier for an environmental landmark. Such processing may include, for example, selecting any one of multiple geo-location coordinates captured in multiple event entries as representative of the landmark location, calculating a centroid of all points represented by captured coordinates, "pre-filtering" a collection of coordinates to eliminate significant "outliers" and subsequently determining a centroid of the remaining coordinates, etc.

In the example of FIG. 16, as also noted above, different underground facility types may be indicated in different color lines, and the different colors/facility types may be derived from the electronic record (e.g., based on the correlations provided in Table 7). Furthermore, in other aspects, text indicators may be included in the visual representation, and/or other types of coding may be used (different line styles such as patterns, width, bold, etc.; a succession of symbols or other graphic icons, etc.) to indicate different facility types, and/or some other aspect of a given facility (e.g., the material used for a particular pipe, conduit, cable, sheathing; the diameter of a particular pipe, conduit, cable; offsets to one or more environmental landmarks, etc.). By way of example, FIG. 16 indicates that the four underground facilities in the composite visual representation correspond to a power line 1010 (which may be rendered in the color red), a first sewer line 1012 (which may be rendered in the color green), a second sewer line 1014 (which also may be rendered in the color green), and a telecommunications line 1016 (which may be rendered in the color orange). An exemplary composite visual representation may include additional textual, numeric and/or graphic elements to provide other information available in the electronic record for the marking operations (e.g., timestamp information, ID information, coordinates for location information, offset indications, etc.). For example, in FIG. 16 an offset 958 of 3 feet is indicated between the fire hydrant 956 and the sewer line 1014.

In some marking operations, a technician may use the marking device not only to mark an underground facility's placement/path relative to the ground, pavement or other surface, but also to "annotate" the marking operation in some fashion. For example, in some instances a technician actually "writes" with the marking device (e.g., by actuating the marking device to dispense paint) to provide text annotations, offset indications, arrows, other symbols, and the like on the ground, pavement or other surface. Accordingly, the electronic record for a marking operation may include one or more actuation data sets corresponding to actuations in which the technician was "writing" to annotate the marking operation in some fashion rather than marking the path of an underground facility. In some cases, providing such technician annotations on a visual representation of a marking operation may be desirable; however, in other instances such annotations may provide erratic markings on a visual representation, in which case additional processing of geo-location data or other information in the electronic record (e.g., filtering, averaging, interpolating and/or otherwise "smoothing" the data) may be employed.

Figure 17:
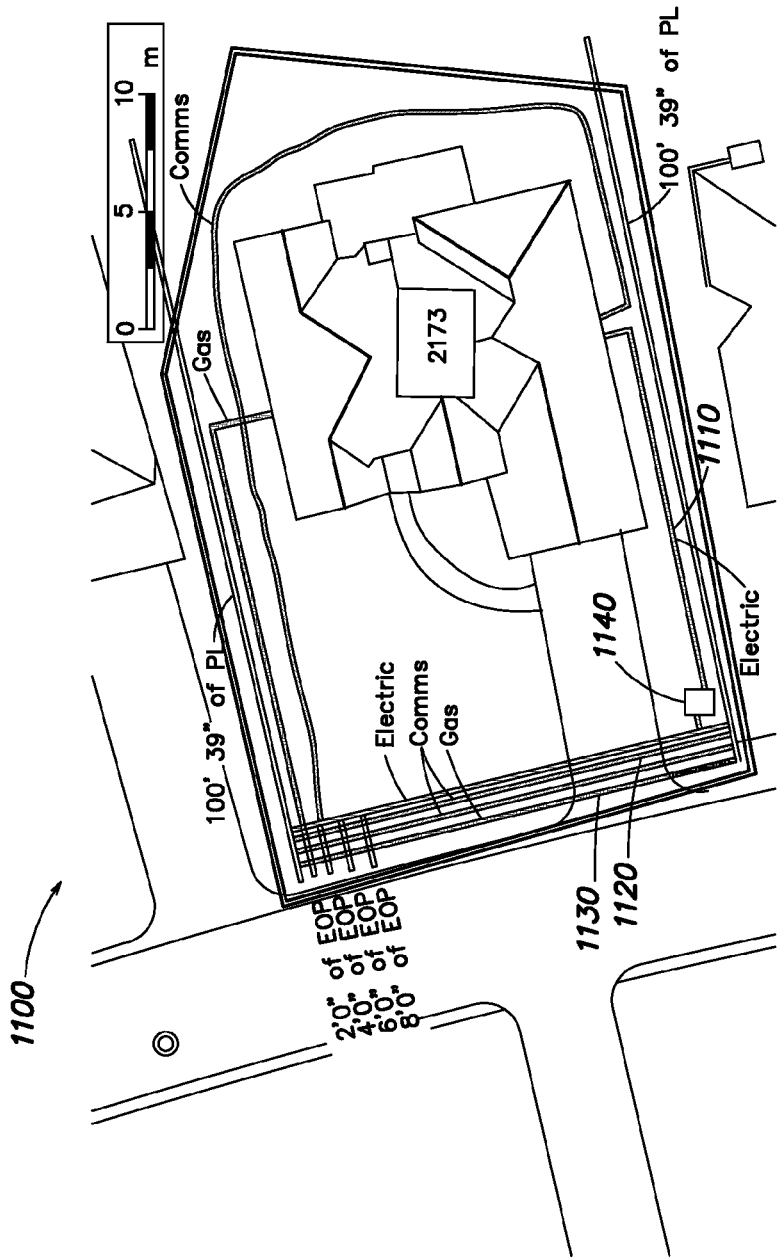
FIG. 17 is an example of another visual representation of marking operations, according to another embodiment of the present invention, in which electronic locate marks and identifiers for environmental landmarks are overlaid on a digital image of a work site/dig area.

In yet another embodiment, a single or composite visual representation of a marking operation, including one or both of marking information and landmark information, may be rendered on a display device together with a digital image representative of at least a portion of a dig area at a work site, such that one or more electronic locate marks and/or one or more identifiers for environmental landmarks appear in appropriate relative positions overlaid on the displayed digital image. FIG. 17 illustrates yet another example of a composite visual representation 1100, albeit based on an electronic record different than that used to generate the visual representations of FIGS. 15 and 16, in which continuous lines are used to indicate the respective different underground facilities marked, and these lines are overlaid on a digital image of a dig area, together with identifiers for environmental landmarks. It should be appreciated that although continuous lines representing underground facilities are depicted on a digital image in FIG. 17, in other embodiments discrete electronic locate marks corresponding to successive actuations of a marking device (or multiple discrete electronic locate marks per actuation) may be overlaid on a digital image of the dig area.

In the embodiment of FIG. 17, a number of different image sources and image types may be employed to provide the digital image on which a visual representation of a marking operation may be overlaid. For purposes of the present disclosure, such a digital image (also referred to herein as an "input image") may be any image represented by source data that is electronically processed (e.g., the source data is in a computer-readable format) to display the image on a display device. An input image may include any of a variety of paper/tangible image sources that are scanned (e.g., via an electronic scanner) or otherwise converted so as to create source data (e.g., in various formats such as XML, PDF, JPG, BMP, etc.) that can be processed to display the input image. An input image also may include an image that originates as source data or an electronic file without necessarily having a corresponding paper/tangible copy of the image (e.g., an image of a "real-world" scene acquired by a digital still frame or video camera or other image acquisition device, in which the source data, at least in part, represents pixel information from the image acquisition device).

In some exemplary implementations, input images according to the present disclosure may be created, provided, and/or processed by a geographic information system (GIS) that captures, stores, analyzes, manages and presents data referring to (or linked to) location, such that the source data representing the input image includes pixel information from an image acquisition device (corresponding to an acquired "real world" scene or representation thereof), and/or spatial/geographic information ("geo-encoded information").

In view of the foregoing, various examples of input images and source data representing input images according to the present disclosure, to which the inventive concepts disclosed herein may be applied, include but are not limited to:

Manual "free-hand" paper sketches of the geographic area (which may include one or more buildings, natural or man-made landmarks, property boundaries, streets/intersections, public works or facilities such as street lighting, signage, fire hydrants, mail boxes, parking meters, etc.);

Various maps indicating surface features and/or extents of geographical areas, such as street/road maps, topographical maps, military maps, parcel maps, tax maps, town and county planning maps, call-center and/or facility polygon maps, virtual maps, etc. (such maps may or may not include geo-encoded information);

Facility maps illustrating installed underground facilities, such as gas, power, telephone, cable, fiber optics, water, sewer, drainage, etc. Facility maps may also indicate street-level features (streets, buildings, public facilities, etc.) in relation to the depicted underground facilities. Examples of facility maps include CAD drawings that may be created and viewed with a GIS to include geo-encoded information (e.g., metadata) that provides location information (e.g., infrastructure vectors) for represented items on the facility map;

Architectural, construction and/or engineering drawings and virtual renditions of a space/geographic area (including "as built" or post-construction drawings);

Land surveys, i.e., plots produced at ground level using references to known points such as the center line of a street to plot the metes and bounds and related location data regarding a building, parcel, utility, roadway, or other object or installation;

A grid (a pattern of horizontal and vertical lines used as a reference) to provide representational geographic information (which may be used "as is" for an input image or as an overlay for an acquired "real world" scene, drawing, map, etc.);

"Bare" data representing geo-encoded information (geographical data points) and not necessarily derived from an acquired/captured real-world scene (e.g., not pixel information from a digital camera or other digital image acquisition device). Such "bare" data may be nonetheless used to construct a displayed input image, and may be in any of a variety of computer-readable formats, including XML);

Photographic renderings/images, including street level, topographical, satellite, and aerial photographic renderings/images, any of which may be updated periodically to capture changes in a given geographic area over time (e.g., seasonal changes such as foliage density, which may variably impact the ability to see some aspects of the image); and An image, such as any of the above image types, that includes one or more dig area indicators, or "virtual white lines," that provide one or more indications of or graphically delimit a dig area, as described in U.S. patent application Ser. No. 12/366,853, published as U.S. Patent Publication 2009-0238417-A1, incorporated by reference herein. The virtual white lines may include lines, drawing shapes, shades, symbols, coordinates, data sets, or other indicators that are added to an image, and may assist a locate technician in the performance of a locate operation by identifying the area of interest, i.e., the dig area. In this manner, a searchable electronic record according to the concepts disclosed herein may be generated based on a previously marked-up input image on which the dig area is indicated.

It should also be appreciated that source data representing an input image may be compiled from multiple data/information sources; for example, any two or more of the examples provided above for input images and source data representing input images, or any two or more other data sources, can provide information that can be combined or integrated to form source data that is electronically processed to display an image on a display device.

As noted above, in some implementations an input image may be indexed to Global Positioning System (GPS) coordinates or another coordinate system that provides geo-spatial positioning. An input image may include geo-coding or other geographical identification metadata and may be provided in any computer-readable format. An input image may also include images of map symbols, such as roads and street names, that may be superimposed upon or displayed separately from an underlying geographic area when the input image is displayed on a display device.

Based on the foregoing, a digital image may be displayed in an available display field of a display device either before or after electronic locate marks and/or identifiers for environmental landmarks are displayed in the available display field. For example, in one implementation, after the block 806 in FIG. 14, all or a portion of the digital image may be mapped to the available display field based on any relevant geographic information accompanying the digital image (e.g., GPS coordinates to which the image is indexed). Alternatively, the digital image may be mapped first to the available display field of the display device depending on appropriate scaling and/or transformation parameters as would be readily appreciated by one of ordinary skill in the art, and thereafter one or more electronic locate marks and/or one or more identifiers for environmental landmarks similarly may be mapped to the available display field in appropriate positions relative to the underlying digital image. In the example of FIG. 17, a first visual representation of a gas line 1130 is depicted, a second visual representation of a communication line 1120 is depicted, and a third visual representation of an electric line 1110 is depicted on an aerial image of a residential dig area for purposes of illustration. As discussed above in connection with other embodiments, these visual representations may be displayed in different colors and/or line types to denote different types of underground facilities and/or various attributes of a given facility. As also illustrated in FIG. 17, other types of markings may be included as part of the displayed image, including various environmental landmarks such as junction boxes or transformers 1140, streets, property boundaries, tie-downs (reference lines between marked facilities and environmental landmarks and/or property boundaries) and their associated dimensions, and one or more text boxes 2173 (e.g., to indicate an address of the work site over the residence), and the like.

In some implementations, marking information and landmark information, if displayed together, may be differentiated in a display field in any of a variety of manners (e.g., different line types, symbols or patterns; different colors or shades of related colors; artificially offset from each other in the display field if marking information and landmark information overlap or are sufficiently close to each other in some instances, etc.) to allow for sufficient visual perception of both marking information and landmark information.

Figure 18:
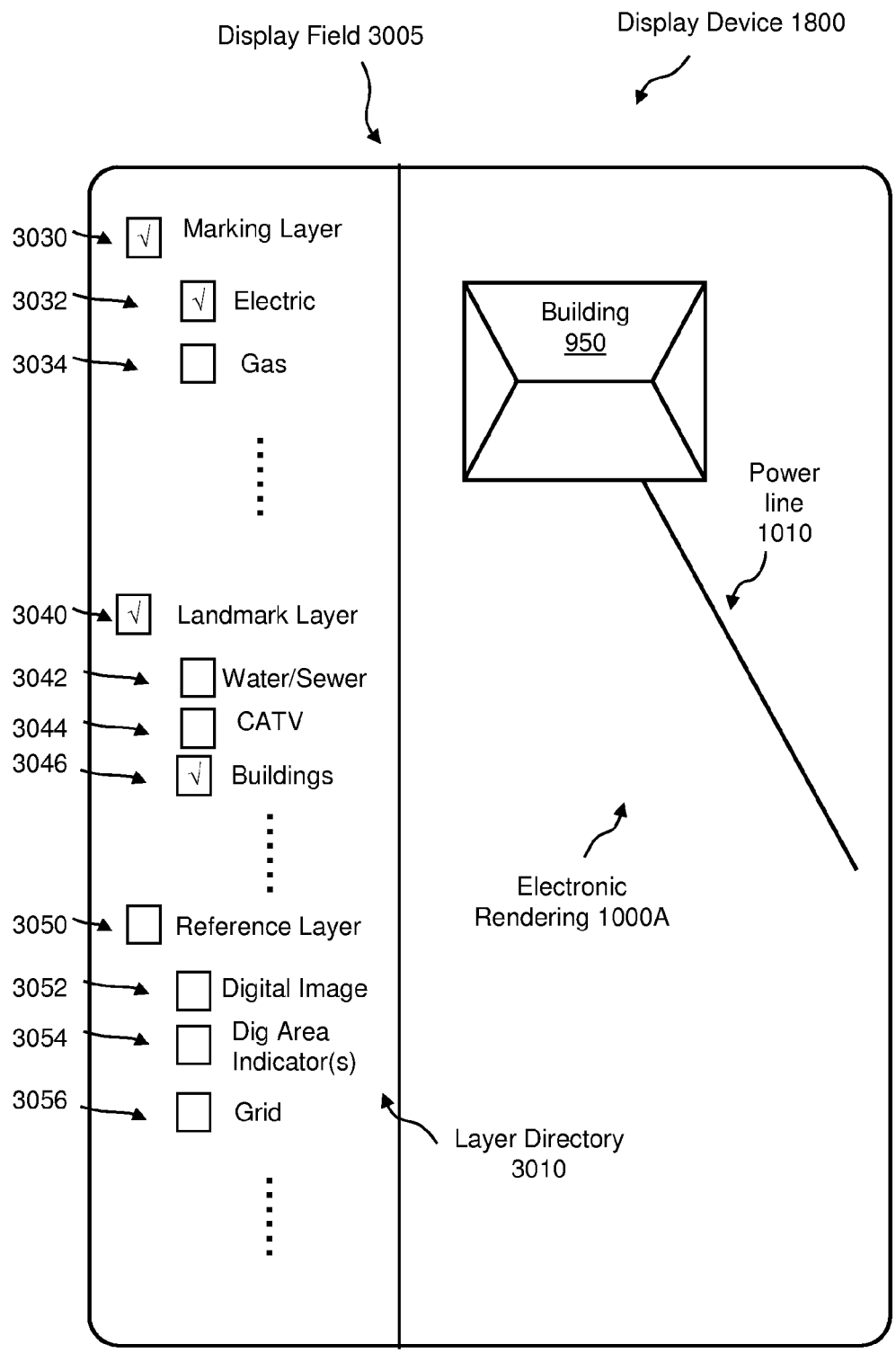
FIG. 18 shows a generic display device having a display field in which one or more display layers and/or sub-layers of marking information, landmark information, and/or image/reference information may be selectively enabled or disabled for display, according to one embodiment of the present invention.

Additionally, in one embodiment, each of marking information and landmark information, if present in a computer-aided visual rendering, as well as any constituent information forming part of the marking information and landmark information, may be displayed as separate "layers" of the visual rendering, such that a viewer of the visual rendering may turn on and turn off displayed information based on a categorization of the displayed information. FIG. 18 shows a generic display device 1800 having a display field 3005 with exemplary content for purposes of explaining some concepts germane to display layers, according to one embodiment. For example, all marking information may be categorized generally under one layer designation 3030 ("marking layer") and independently enabled or disabled for display accordingly, and all landmark information may be categorized generally under yet another layer designation 3040 ("landmark layer") and independently enabled or disabled for display accordingly. Respective layers may be enabled or disabled for display in any of a variety of manners; for example, in one implementation, a "layer directory" or "layer legend" pane 3010 may be included in the display field 3005 (or as a separate window selectable from the display field of the visual rendering), showing all available layers, and allowing a viewer to select each available layer to be either displayed or hidden, thus facilitating comparative viewing of layers.

Furthermore, any of the above-mentioned general categories for layers may have sub-categories for sub-layers, such that each sub-layer may also be selectively enabled or disabled for viewing by a viewer. For example, under the general layer designation of "marking layer," different facility types that may have been detected during a marking operation (and indicated in the marking information by color, for example) may be categorized under different sub-layer designations (e.g., designation 3032 for "marking layer—electric;" designation 3034 for "marking layer—gas;" etc.); in this manner, a viewer may be able to hide only the electric marking information while viewing the gas marking information, or vice versa, in addition to having the option to view or hide all marking information. Sub-layer designations similarly may be employed for the landmark information (e.g., designation 3042 for "landmark layer—water/sewer;" designation 3044 for "landmark layer—CATV;" designation 3046 for "landmark layer—buildings"). As shown in the example of FIG. 18, both the marking and landmark layers are enabled for display; amongst the illustrated sub-layer designations, only the "electric" sub-layer of the marking layer is enabled for display, and only the "buildings" sub-layer of the landmark layer is enabled for display. Accordingly, using the exemplary composite visual representation 1000 shown in FIG. 16 as a baseline for purposes of illustration, only the power line 1010 appears in the electronic rendering 1000A shown in FIG. 18 as a constituent element of the electric sub-layer of the marking layer, together with the building 950.

Virtually any characteristic of the information available for display may serve to categorize the information for purposes of display layers or sub-layers. In particular, any of the various exemplary constituent elements of marking information discussed herein (e.g., timing information, geographic information, service-related information, ticket information, marking material information, environmental information, and operational information, the latter two of which are discussed in greater detail further below) may be categorized as a sub-layer, and one or more sub-layers may further be categorized into constituent elements for selective display (e.g., as sub-sub-layers). Similarly, any of the various exemplary constituent elements of landmark information discussed herein (e.g., geo-location data of an environmental landmark, type of environmental landmark, a time stamp for any acquired information relating to an environmental landmark) may be categorized as a sub-layer (and any sub-layer may be further categorized into sub-sub-layers, and so on).

It should further be appreciated that, according to various embodiments, the attributes and/or type of visual information displayed as a result of selecting one or more layers or sub-layers is not limited. In particular, visual information corresponding to a selected layer or sub-layer may be electronically rendered in the form of one or more lines or shapes (of various colors, shadings and/or line types), text, graphics (e.g., symbols or icons), and/or images, for example Likewise, the visual information corresponding to a selected layer or sub-layer may include multiple forms of visual information (one or more of lines, shapes, text, graphics and/or images).

As a non-limiting illustrative example, a "marking" layer may include respective sub-layers of different facility types marked, in which respective facility types are rendered on the display as lines having different colors, line types and/or shading. A "temperature" sub-layer of a "marking" layer may include ground temperatures sensed during marking of respective facility types, in which sensed temperatures are rendered on the display as an icon/symbol in combination with text (e.g., a snowflake accompanied by a text label "15 deg. F") in proximity to the visual rendering of the marked facility. From the foregoing, it may be appreciated that a wide variety of information may be categorized in a nested hierarchy of layers, and information included in the layers may be visually rendered, when selected/enabled for display, in a variety of manners.

In addition to the marking information and/or the landmark information, in yet other embodiments in which a digital image is rendered in the display field (e.g., as shown in FIG. 17), the image information on which the digital image is based may be categorized as a display layer, such that the marking information, landmark information, and image information may be selectively enabled or disabled for display as a display layer. In this manner, the displayed digital image on which one or both of marking information and landmark information may be overlaid (and in some instances constituent elements thereof) may be toggled on and off conveniently for comparative display.

In one exemplary implementation, all image information may be categorized generally under one layer designation (e.g., "Reference"—see designation 3050 in FIG. 18), and independently enabled or disabled for display (e.g., hidden) accordingly. Similarly, while not shown in FIG. 18, in some implementations all information available for overlay, including both marking information and landmark information if available, may be categorized generally under another layer designation (e.g., "Field") and independently enabled or disabled for display; accordingly, it should be appreciated that in one aspect of this alternative implementation, under the general layer designation of "Field," the marking information may be categorized as one sub-layer of the Field layer (in some cases with additional associated marking sub-sub-layers) and the landmark information may be categorized as another sub-layer of the Field layer (in some cases with additional associated landmark sub-sub-layers).

Like the "Field" layer, the "Reference" layer similarly may have one or more sub-layers for various constituent elements of the image information upon which the digital image is rendered. Virtually any number of possible sub-layers may be accordingly designated, based at least on the various examples of image information discussed above (e.g., maps, such as road maps or facilities maps; dig area indicators, either alone or forming part of a digital image; grids, either alone or forming part of a digital image; engineering or architectural drawings; photographic renderings; etc.—any of which may have constituent elements of information that respectively may be categorized as image or "Reference" sub-layers). To provide illustrative non-limiting examples of sub-layers of the "Reference" layer, FIG. 18 indicates a "digital image" sub-layer with the designation 3052, a "dig area indicator(s)" sub-layer with the designation 3054, and a "grid" sub-layer with the designation 3056.

The various examples of visual representations illustrated in FIGS. 15-18 may be used for various purposes, including, but not limited to:

(1) The display may be viewed by the marking technician for substantially immediate feedback of his/her work performed, which can be compared against the ticket information to ensure that the full scope of the current marking operation has been completed satisfactorily.

(2) The display may be viewed by a supervisor (using remote computer 150 that is receiving the data) as substantially immediate feedback of work performed by the marking technician, which again can be compared against the ticket information to ensure that the full scope of the current marking operation has been completed satisfactorily. When the supervisor is viewing the marking operation in real time, he/she may contact the marking technician in real time in the event that the marking operation is unsatisfactory;

(3) The display may be viewed by a quality control supervisor (using remote computer 150 that has received the data) as feedback of work performed by the technician, which again can be compared against the ticket information to ensure that the full scope of the current marking operation has been completed satisfactorily. By viewing the marking operation, the quality control supervisor may dispatch a quality control technician or other personnel in the event that there is the marking operation is unsatisfactory, and (4) The display may be viewed by a training supervisor as feedback of work performed by the marking technician, which can be used to assess employee performance and direct training activities.

VII. ENVIRONMENTAL AND OPERATIONAL SENSORS, AND INFORMATION DERIVED THEREFROM

According to another aspect of the present invention, a marking device includes one or more environmental and/or operational sensors, which constitute additional examples of input devices from which marking information may be derived. In particular, one or more environmental sensors associated with a marking device may provide a variety of environmental information in connection with use of the device; similarly, one or more operational sensors associated with the marking device may provide a variety of operational information in connection with use of the marking device. One or both of such environmental information and operational information may constitute all or a portion of marking information and may be employed in any of the manners described above in connection with marking information. In particular, environmental information and/or operational information may be logged/stored in local memory of a marking device, transferred to and stored in internet accessible memory, formatted in various manners, processed and/or analyzed at the marking device itself, and/or transmitted to another device (e.g., a remote computer/server, an internet storage site, cellular telephone, personal digital assistant (PDA), etc.) for storage, processing and/or analysis.

As used herein, environmental sensors are those which sense some condition of the environment in which the marking device is present, but need not sense a condition of the marking device itself. Examples of environmental conditions which may be sensed include, but are not limited to, temperature, humidity, light, and altitude among others. Environmental sensors may be included with the marking device for one or more of various reasons. For example, information provided by one or more of the environmental sensors may be used to assess whether a marking operation was or is being performed in suitable environmental conditions (e.g., within accepted environmental tolerances). Additionally or alternatively, information provided by one or more environmental sensors may be used to interact with the technician operating the marking device, for example by issuing a notification or warning signal to the technician if the sensed environmental condition is outside of an acceptable range (i.e., out of tolerance). Also, the information from the environmental sensor(s) may trigger an action or alteration of the marking device, such as activating, enabling or disabling a particular component of the marking device. Additionally or alternatively, information provided by one or more environmental sensors may augment other information collected by the marking device, such as any of the types of information described above as being collected by a marking device according to various embodiments herein. In some instances, information from two or more of the environmental sensors may be used in combination, examples of which are described in detail below.

As used herein, operational sensors are those which sense some operating condition of the marking device. Examples of such conditions include, but are not limited to, the angle of inclination of the marking device, the direction or heading of the marking device, a pressure applied to the marking device, and/or some characteristic of motion of the marking device (e.g., the speed at which the marking device is moving, the acceleration of the marking device, etc.), among others. Operational sensors may be included with the marking device for one or more of various reasons. For example, information provided by one or more of the operational sensors may be used to assess whether a marking device was or is operating appropriately during a marking operation or whether the marking device was or is being operated (e.g., both electronically and/or physically manipulated) appropriately by the technician (e.g., within accepted tolerances or according to protocols). Additionally or alternatively, information from one or more operational sensors may be used to detect patterns of operation of the technician, such as technician "signatures" in using/manipulating the marking device (e.g., characteristic movements unique to the technician). Additionally or alternatively, information from one or more operational sensors may be used to interact with the technician, for example by issuing a notification or warning signal to the technician in response to the detected operational characteristic falling outside of an acceptable range. Also, the information from the operational sensor(s) may trigger an action or alteration of the marking device, such as activating, enabling or disabling a particular component of the marking device. Additionally or alternatively, information provided by one or more operational sensors may augment other information collected by the marking device, such as any of the types of information previously described herein in connection with other embodiments. Other uses of data provided by one or more operational sensors are also possible and contemplated in the various aspects described herein. In some instances, information from two or more operational sensors may be used in combination, examples of which are described below. Furthermore, information from one or more operational sensors may be used in combination with information from one or more environmental sensors, as also described further below.

It should be appreciated that some of the sensors described herein may be considered both environmental and operational sensors, either because the sensor senses both an environmental condition and an operating condition of the marking device (i.e., the sensor senses more than one condition) or because a single condition sensed by the sensor may be considered both an environmental condition and an operating condition. For example, an image capture device may be considered both an environmental sensor (e.g., the image capture device may capture an image of the surrounding environment) and an operational sensor (e.g., the image capture device may capture an image of some action the technician has taken, such as dispensing of a marker). Furthermore, the operation of a sensor may change over time. For example, a sensor may be configured at one time to measure an internal operating temperature and at a different time to measure an outside ambient temperature. Thus, it should be appreciated that while the sensors described below are categorized generally as being either environmental or operational for purposes of illustrating some exemplary implementations, the categories are not mutually exclusive, and such categorization is not limiting unless otherwise stated.

Figure 19:
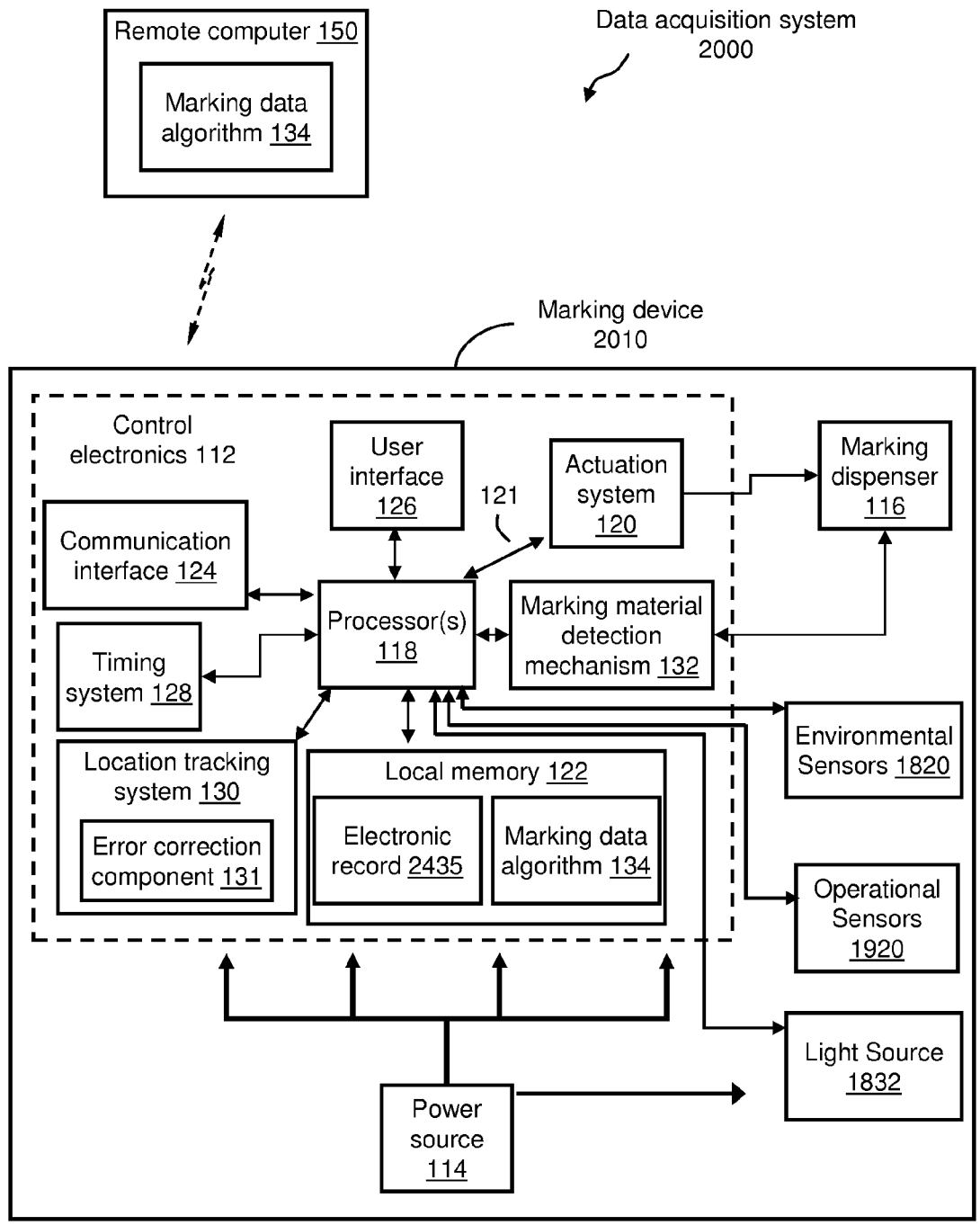
FIG. 19 is a functional block diagram of a data acquisition system including a marking device with both environmental sensors and operational sensors, according to one embodiment of the present invention.

FIG. 19 is a functional block diagram of a data acquisition system including a marking device with both environmental sensors and operational sensors, according to one embodiment of the present invention. As shown in FIG. 19, the data acquisition system 2000 includes a marking device 2010 and the previously described remote computer 150. The marking device 2010 comprises control electronics 112, power source 114, and marking dispenser 116, all of which also have been described above in connection with other embodiments. The marking device 2010 also comprises a light source 1832, and one or both of environmental sensors 1820 and operational sensors 1920. It should be appreciated that while both environmental sensors 1820 and operational sensors 1920 are shown in the marking device 2010, marking devices according to other embodiments contemplated by the present disclosure need not necessarily include both environmental sensors and operational sensors.

With respect to environmental sensors, non-limiting examples of suitable environmental sensors include a temperature sensor (e.g., one or more of an ambient temperature sensor and a surface temperature sensor (e.g., a temperature sensor for sensing a temperature of a surface on which marking material is being dispensed)), a humidity sensor, a light sensor, an altitude sensor, an image capture device (e.g., a camera), and an audio recorder. This list is not exhaustive, however, as other types of environmental sensors may be included as appropriate to sense various environmental conditions of interest.

Figure 20:
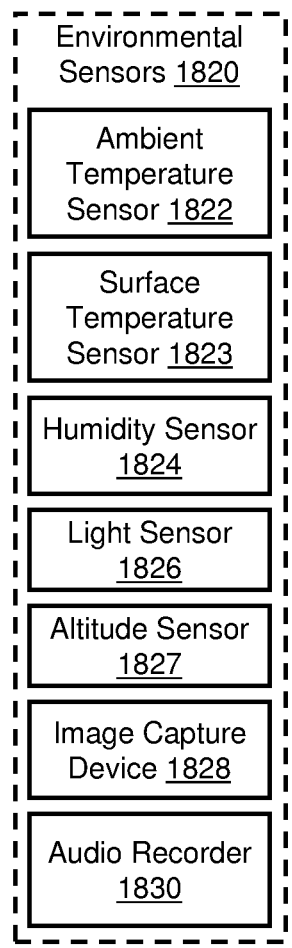
FIG. 20 is a block diagram showing details of the environmental sensors shown in FIG. 19, according to one embodiment of the present invention.

FIG. 20 is a block diagram showing details of the environmental sensors 1820 shown in FIG. 19, according to one embodiment of the present invention. In FIG. 20, the illustrated environmental sensors 1820 include an ambient temperature sensor 1822, a surface temperature sensor 1823, a humidity sensor 1824, a light sensor 1826, an altitude sensor 1827, an image capture device 1828, and an audio recorder 1830. Additional or alternative environmental sensors may be included, and one or more of the illustrated environmental sensors may be omitted, in some embodiments. The environmental sensors may be coupled to the processor 118 to receive control signals from the processor 118 and/or to provide their respective outputs (e.g., signals, data, information) to the processor 118, and, as described further below, may operate in one of various suitable manners. Information provided by any of the environmental sensors may be stored in local memory 122, for example as an electronic record 2835, described below, and/or transmitted to an external device, such as the remote computer 150, remote storage, etc.

The ambient temperature sensor 1822 may be configured to sense the ambient temperature in the vicinity of the marking device 2010. The ambient temperature may be a useful piece of information, for example in determining whether the temperature is adverse to performance of the marking operation, which may occur when the temperature is too hot or too cold (e.g., thereby adversely affecting some characteristic of the marking material itself, or dispensing of marking material). For example, in some embodiments, it may be preferable to operate the marking device only within a predetermined ambient temperature range between 20° F. and 110° F., although other ranges are possible. In addition, as described further below, the ambient temperature may be useful in combination with one or more other types of environmentally sensed inputs, such as humidity, in evaluating the conditions in which a marking operation is performed.

The ambient temperature sensor may be any suitable temperature sensor, such as an infrared sensor, and may be an analog or digital temperature sensor, as the various aspects described herein relating to a marking device including an ambient temperature sensor are not limited to using any particular type of temperature sensor. According to one embodiment, the temperature sensor may be part of a combined temperature and humidity sensor, such as the HS-2000V from Precon of Memphis, Tenn. In some embodiments, the ambient temperature sensor may be suitable to operate between −40° F. and 125° F., or over any other suitable range, which in some embodiments may encompass the expected temperatures to which the marking device may be exposed during normal operation. The data output by the ambient temperature sensor 1822 may be stored in local memory 122 and/or may be transmitted to an external device, such as remote computer 150, in those embodiments in which the marking device 2010 is communicatively coupled to the external device.

The surface temperature sensor 1823 may be configured to sense the temperature of the surface on which the marking device is dispensing the marking material (e.g., the ground under the marking device). The temperature of the surface may be useful information for various reasons, for example in assessing whether the surface temperature is within an acceptable range for dispensing the marking material. As an example, some commercially available paints, which may be used as a marking material in some embodiments, provide recommended temperature ranges for painting, such as between 70° F. and 80° F., outside of which the paint may not coat, sufficiently dry or remain on the painted surface. Thus, as a non-limiting example, information from the surface temperature sensor 1823 may be used to assess whether the marking operation was or is being performed in such recommended temperature conditions. As with the ambient temperature sensor 1822, the information provided by the surface temperature sensor 1823 may be stored in local memory 122 and/or transmitted to an external device, such as the remote computer 150.

The surface temperature sensor 1823 may be any suitable type of sensor for determining surface temperature, such as an infrared temperature sensor or any other suitable type of temperature sensor. In some embodiments, the surface temperature sensor may be configured to operate across a range of temperatures encompassing all expected surface temperatures on which marking material may be dispensed during normal operation. For example, in one embodiment the surface temperature sensor may operate between −40° F. and 125° F., although other temperature ranges are also possible.

The humidity sensor 1824 may be configured to sense the humidity of the environment in which the marking device 2010 is used, and in some embodiments may provide a relative humidity measurement (e.g., 0% to 100% humidity). Such information may be useful alone or in combination with other information in determining whether, for example, the environment is too humid for performance of the marking operation. For example, if the humidity is too great, marking material such as paint may not adequately dry and/or remain in place on the surface on which it is dispensed. In some embodiments, humidity greater than 90% may be adverse to painting, although the humidity tolerance may differ for different materials. Thus, an acceptable humidity for painting on grass, for example, may differ from that for painting on concrete or dirt. The humidity information provided by humidity sensor 1824 may be used to assess whether a marking operation was or is being performed within acceptable humidity tolerances. The humidity sensor may be any suitable type of humidity sensor, as the type is not limiting. According to one embodiment, the humidity sensor may be part of a combined temperature and humidity sensor, such as the HS-2000V from Precon of Memphis, Tenn. The information provided by the humidity sensor 1824 may be stored in local memory 122 and/or transmitted to an external device, such as the remote computer 150.

The light sensor 1826 may be configured to sense the intensity, flux, or illuminance of ambient light in the vicinity of the marking device 2010. Such information may be useful, for example, to assess whether a marking operation was or is being performed in suitable lighting conditions (e.g., whether there was sufficient light to allow for accurate performance of a marking operation, whether the area surrounding the marking operation is sufficiently lit to ensure worker safety, etc.).

The light sensor 1826 may be any suitable type of light sensor. In one embodiment, the light sensor is a cadmium sulfide (CdS) photocell, which is a photoresistor device whose resistance decreases with increasing incident light intensity. Such a device may provide a resistance or voltage measurement as its output indicative of measured flux. However, other types of light sensors may alternatively be used. One non-limiting example of a suitable photocell is the PDV-P5001 from Advanced Photonix, Inc. of Ann Arbor, Mich.

The units output by the light sensor may depend on whether the light sensor is sensing light intensity, light flux, or illuminance. For example, the output may be in candela for light intensity, lumen for flux, or lux for illuminance. According to one embodiment, target values for illuminance for accurate performance of a marking operation may be between approximately 1,000 lux and 100,000 lux, although other ranges may be appropriate based on a particular location and type of marking operation being performed. According to one embodiment, the output may be converted to a percentage between 0% and 100%, for example in which 0% corresponds to darkness and 100% corresponds to full sunlight. Other outputs may alternatively be produced. The information provided by the light sensor 1826 may be stored in local memory 122 and/or transmitted to an external device, such as the remote computer 150.

According to one embodiment, the marking device further comprises a light source 1832, such as a flashlight or light emitting diode (LED) torch. The light source 1832 may be activated manually (e.g., by the technician) or may be coupled to the light sensor 1826 (e.g., directly coupled or coupled through one or more components, such as processor 118) and activated automatically in response to the light sensor sensing an unsatisfactorily low lighting condition (e.g., by receiving a signal from processor 118 or by directly receiving an output signal of the light sensor). The threshold light level for such automatic activation may be any suitable level, non-limiting examples of which include any level at which the technician may have difficulty seeing and therefore performing the marking operation, and any predetermined level below which technician safety may be comprised. Information about such activation of the light source (e.g., the occurrence of the activation, the time of activation, the duration, etc.) may be stored in local memory 122 and/or transmitted to an external device, such as the remote computer 150.

The altitude sensor 1827 may be configured to measure the altitude of the marking device 2010, and may be any suitable type of altitude sensor for doing so. The altitude at which a marking operation is performed may impact the performance of a marking material (e.g., paint) and worker safety, among other considerations. Thus, information about the altitude may be useful for a variety of reasons.

The output of the altitude sensor 1827 may be in any suitable units, and in some embodiments provides an altitude with respect to sea level. For example, the altitude sensor may provide an altitude in meters, miles, feet, or any other suitable units. The information provided by the altitude sensor 1827 may be stored in local memory 122 and/or transmitted to an external device, such as the remote computer 150.

The image capture device 1828 may be positioned on the marking device to capture an image of the environment surrounding the marking device 2010, may be positioned to capture an image of marking material dispensed by the marking device 2010, or may be configured or configurable in any suitable manner to capture any type of image of interest. According to one embodiment, a technician may be meant to take a picture of the marking material dispensed during a marking operation and/or of an environmental landmark in the vicinity of where marking material is dispensed. Thus, inclusion of an image capture device 1828 in the marking device 2010 may facilitate compliance with such protocols.

The image capture device 1828 may be capable of taking still images, video images, or both, as the various aspects described herein relating to marking devices including an image capture device are not limited in this respect. Thus, the image capture device 1828 may be any suitable type of image capture device, and in some embodiments may be a type that is suitable for use in a portable device, such as, but not limited to, the types of digital cameras that may be installed in portable phones, wide angle digital cameras, 360 degree digital cameras, infrared (IR) cameras, and the like. In some implementations, a wide angle lens and automatic zoom may be utilized to maximize the coverage area of each image.

The output of the image capture device may include various information. The output may include all or part of a captured image. Additionally or alternatively, the output may include information about the settings and/or operation of the image capture device, such as any one or more of resolution, frame rate (for video images), flash status (i.e., flash used or not used), image size, video sequence duration, zoom setting, etc.

In those embodiments in which the image capture device is a digital device, the images may be stored in local memory 122 and/or transmitted to an external device, such as the remote computer 150. The images may be in any standard or proprietary image file format (e.g., JPEG, TIFF, BMP, etc.). Furthermore, the images may be associated with a specific job, a geographic position, and an exact time, in some embodiments, for example by flagging the image based on the time at which it was taken, the location at which it was taken, and/or the job during which it was taken. In one embodiment, each captured image may be cached and transmitted with all other captured data from one or more other sensors/input devices.

The environmental sensors 1820 may further comprise an audio recorder 1830, which may be used to capture audio input from a technician and/or from the environment (e.g., sounds in the vicinity of the marking device). Thus, in one embodiment, the technician may, for example, dictate notes relating to the performance of the marking operation, such as describing visible landmarks in the area of the marking operation, notes about performance of the marking device, or any other notes which may be relevant to performance of a marking operation. In one embodiment, the audio recorder may record sounds from the environment, such as passing cars, planes, etc. Such recordings may be useful, for example, in assessing whether a technician was at the intended location of the marking operation. For example, if a passing train is evident from the recording and the intended marking location is not near a train track, the recording may provide evidence that the technician was in the wrong location.

The audio recorder 1830 may be an analog or digital device or devices. For example, in one embodiment the audio recorder 1830 may be an analog recorder configured to receive an analog input signal (e.g., from a microphone) and store the analog signal. According to another embodiment, the audio recorder 1830 may be a digital audio recorder, including any suitable combination of components for receiving an analog signal (e.g., from a microphone), converting the analog signal to a digital signal, performing any suitable digital signal processing (e.g., filtering, amplifying, converting to text, etc.) and storing the digital information. According to one embodiment, the audio recorder may include a dedicated digital audio processor to perform those functions recited or any other suitable functions. It should be appreciated from the foregoing that a microphone (not shown in FIG. 19) may be associated with the audio recorder 1830 to provide the audio input to the audio recorder.

According to one embodiment, for example in which a technician may dictate notes, the audio processing of the audio input may include performing speech recognition (e.g., speech to text generation). Such functionality may be provided by suitable speech recognition software executing on a dedicated audio processor, or in any other suitable manner. Any generated text may be, for example, displayed on a display of the user interface 126, or may be stored for later display on a separate device.

The recordings provided by the audio recorder 1830 may be stored in a dedicated audio memory, in local memory 122 and/or transmitted to an external device, such as the remote computer 150. In those embodiments in which the audio recorder is a digital audio recorder, the audio files may be in any standard or proprietary audio file format (e.g., WAV, MP3, etc.).

Although not illustrated in FIG. 20, the communication interface 124 of FIG. 19 may also serve as or enable another environmental sensor. According to one embodiment, the marking device may be internet enabled and information may be received via the communication interface 124 over the internet. According to one embodiment, information about an environmental condition may be received via the communication interface. For example, temperature information or humidity information, among others, may be received over the internet via communication interface 124. In such instances, the received temperature or humidity information may augment any temperature and humidity information collected by a temperature and humidity sensor of the marking device, or may replace such information, such that in some embodiments the marking device may not include a physical temperature or humidity sensor. Thus, it should be appreciated that the communication interface may serve as a "virtual sensor" by receiving environmental information of interest, not being limited to temperature and humidity.

As explained above, another type of input device which may be included with a marking device is an operational sensor. Thus, according to one aspect of the present invention and as shown in FIG. 19, the marking device 2010 may include one or more operational sensors 1920 for sensing one or more operating conditions or characteristics of the marking device.

Figure 21:
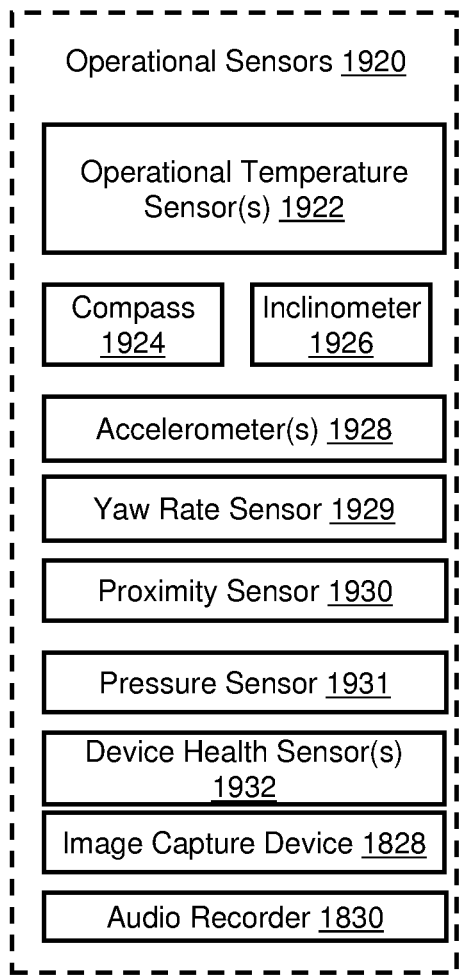
FIG. 21 is a block diagram showing details of the operational sensors shown in FIG. 19, according to one embodiment of the present invention.

FIG. 21 is a block diagram showing details of the operational sensors shown in FIG. 19, according to one embodiment of the present invention. The illustrated exemplary operational sensors 1920 include, but are not limited to, one or more temperature sensors 1922, a compass 1924, an inclinometer 1926, one or more accelerometers 1928, a yaw rate sensor 1929, a proximity sensor 1930, a pressure sensor 1931, one or more device health sensors 1932, the image capture device 1828, and the audio recorder 1830. Additional or alternative operational sensors may be included, and one or more of the illustrated operational sensors may be omitted, in some embodiments. The operational sensors may be coupled to the processor 118 to receive control signals from the processor 118 and/or to provide their respective outputs to the processor 118, and, as described further below, may operate in one of various suitable manners. Information provided by any of the operational sensors may be stored in local memory 122, for example in an electronic record 2835, described below, and/or transmitted to an external device, such as the remote computer 150, remote storage, etc.

One or more operational temperature sensors 1922 may be configured to sense any temperature of interest with respect to the marking device 2010. For example, it may be desirable in some embodiments to monitor the temperature of the processing circuitry of the marking device 2010, such as the temperature of the processor 118. Alternatively, it may be desirable in some embodiments to monitor the temperature of other components of the marking device 2010, for example, the temperature of one of the other operational sensors 1920. Thus, it should be appreciated that a plurality of operational temperature sensors 1922 may be included and arranged to sense any operating temperatures of interest of the marking device 2010. In this manner, the operating temperatures of one or more components of the marking device 2010 may be monitored and an alert or notification may be generated (e.g., by the control electronics) and provided to the technician if one of the operating temperatures is determined to be outside of an acceptable tolerance, for example if a component is overheating. Alternatively, the temperature from one or more operational temperature sensors 1922 may be used to calibrate or compensate data or signals provided by any one of the other sensors which may have a temperature-dependent output.

The temperature sensor(s) 1922 may be any suitable temperature sensor, such as a temperature-dependent variable resistor, or any other type of temperature sensor suitable for measuring the temperature of the components of interest of the marking device. The temperature sensor 1922 may be configured to operate over any suitable temperature range of interest, which in one embodiment may be from −40° F. to 125° F., although other temperature ranges may be employed in other embodiments. The data output by the temperature sensor 1922 may be stored in local memory 122 and/or may be transmitted to an external device, such as remote computer 150, in those embodiments in which the marking device 2010 is communicatively coupled to the external device.

The compass 1924 may be configured to determine the direction in which the marking device 2010 is facing, and therefore may be positioned at one of various suitable locations. For example, according to one embodiment, the compass 1924 may be positioned toward the top of the marking device 2010, and aligned such that the compass identifies the direction toward which the front of the marking device points (i.e., the direction in which the marking device faces when held by the technician). The heading information provided by the compass 1924 may be provided in degrees or in any other suitable units, and may be provided relative to a reference direction (e.g., relative to true North). According to one embodiment, the compass may be initially calibrated to true North, such that subsequent heading readings may be relative to true North.

The heading information provided by the compass 1924 may be useful to determine a direction in which the technician moves during a marking operation. Such information may be particularly useful in instances in which the location tracking system 130 does not provide a signal or a sufficiently accurate signal to monitor the technician's movements. The compass 1924 may be any suitable type of compass, including analog or digital, and may provide any suitable readout. According to one embodiment, the compass 1924 is a digital compass, which provides a heading of the marking device 2010. According to one embodiment, the compass may include one or more gyroscopes. According to one embodiment, the compass 1924 is an OS4000-T solid state tilt compensated nano compass available from OceanServer Technology, Inc. of Fall River, Mass. The information provided by the compass 1924 may be stored in local memory 122 and/or transmitted to an external device, such as the remote computer 150.

The inclinometer 1926 may be any suitable inclinometer configurable to measure an angle of inclination of the marking device 2010. According to one embodiment, the inclinometer may provide an angle with respect to ground. According to one embodiment, the inclinometer may be a multi-axis digital device and may sense angles with respect to horizontal and/or vertical planes. The inclinometer may provide a voltage as an output signal, indicative of the angle of inclination. According to some embodiments, the inclinometer may have an output range spanning +/−30 degrees (e.g., with respect to ground), although other ranges may alternatively be provided by some inclinometers.

The inclinometer 1926 may be positioned toward the top of the marking device 2010, for example, near where the technician may hold the marking device during use. Alternatively, according to another embodiment, the inclinometer may be positioned substantially near the tip of the marking device 2010 (i.e., the end of the marking device from which marking material is dispensed), which may be substantially the same as tip 2302 of the marking device 2100 illustrated in FIG. 23. Other locations for the inclinometer with respect to the marking device are also possible.

The information provided by the inclinometer may be useful for one or more of various purposes. For example, according to one embodiment, the information about the angle of the marking device may be useful in determining whether the technician is appropriately using the marking device (e.g., for determining whether the marking device is being held at a suitable angle relative to the surface (e.g., the ground) on which marking material is being dispensed to ensure accurate dispensing of the marking material), and in some instances may therefore be used to disable the marking dispenser if the technician is holding the marking device at an inappropriate angle. According to another embodiment, as described in further detail below in connection with FIG. 28, the information about the angle of the marking device may be used to determine the location of one point of the marking device relative to a second point of the marking device (e.g., for use in determining the relative positioning of the tip of the marking device compared to the top of the marking device). The information provided by the inclinometer may be stored in local memory 122 and/or transmitted to an external device, such as the remote computer 150.

One or more accelerometers 1928 may be configured to sense the acceleration of the marking device 2010 and may provide an output in terms of g-force or in any other suitable units. Such information may be useful, for example, in assessing whether a technician is appropriately using (e.g., physically moving or manipulating) the marking device 2010. For example, there may be predetermined acceptable acceleration ranges associated with normal operation of the marking device, and therefore the accelerometer(s) 1928 may provide information which may be used to assess whether a technician is operating the marking device 2010 within those acceptable ranges. In addition, any acceleration data provided by the accelerometer(s) may be integrated to obtain velocity data and/or integrated twice to obtain data about distance traveled (e.g., via appropriate functionality included in the marking data algorithm 134 or other algorithm executed by the processor 118), either of which integration results may be useful for a variety of reasons. The acceleration information provided by the accelerometer(s) 1928 may be stored in local memory 122 and/or transmitted to an external device, such as the remote computer 150.

The accelerometer(s) 1928 may be any suitable accelerometer for sensing the acceleration of the marking device and may provide any suitable outputs. According to one embodiment, the accelerometer may be a 3-axis accelerometer, providing an indication of the acceleration of the marking device along three orthogonal axes. The output of each axis may be a frequency (e.g., in Hz) or may be converted to units of g. For example, in one embodiment the accelerometer may be a 3-axis accelerometer that outputs a signal ranging from 0.5 Hz-550 Hz for the z-axis, from 0.5 Hz-1600 Hz for the x-axis, and from 0.5 Hz-1600 Hz for the y-axis. Again, the accelerometer may alternatively provide an output in terms of g or any other suitable units. In one exemplary implementation, an accelerometer may be an ADXL 330KCPZ-RL accelerometer available from Analog Devices of Norwood, Mass. In some exemplary implementations, the accelerometer may output acceleration data, whereas in other implementations the accelerometer may output velocity data along each of the three axes, as well as the orientation of the accelerometer.

In addition to providing acceleration data, an accelerometer may be operated as an inclinometer according to known techniques (see, e.g., description at http://www.tilt-china.com/uploadPDF/How_to_use_an_accelerometer_as_an_inclinometer.pdf, viewed on Jan. 27, 2010 and prepared by Shanghai Vigor Technology Development Co.). Thus, according to one embodiment of the present invention, a marking device may include an accelerometer configured to function as an inclinometer and therefore provide a measure of inclination of the marking device.

Furthermore, as explained in greater detail below, the marking device 2010 may comprise a plurality of accelerometers located at different positions with respect to the marking device. Information from such accelerometers may be useful, for example, in assessing the relative motion of one portion (e.g., the tip) of the marking device with respect to a second portion (e.g., the top) of the marking device, for example using the techniques described in U.S. Patent Application Publication 2008/0255795, which is hereby incorporated herein by reference in its entirety. According to one such non-limiting embodiment, one accelerometer may be positioned near the tip of the marking device and a second accelerometer may be positioned near the top of the marking device. Both may be 3-axis accelerometers. Such an arrangement may also be used to determine the location of the tip of the marking device relative to the location of the top of the marking device, as explained below in connection with FIG. 28.

Additionally, the data output by one or both accelerometers may be used to monitor for out-of-tolerance operation of the marking device, such as improper manipulation of the marking device by the technician. For example, acceleration data from either accelerometer may be indicative of whether the marking device is being swung, thrown, or dropped, among other things. For example, acceleration values from either accelerometer above some threshold value for a sufficient duration (e.g., for one second or greater, or any other suitable duration) may be indicative of the marking device being thrown or dropped. The threshold value of acceleration indicative of such behavior may be different for the two accelerometers. Similarly, detection of acceleration values deviating from an expected or target pattern may be indicative of misuse of the marking device. In response to detecting such manipulation of the marking device, various actions may be taken, such as generating an alert, logging an event, disabling the actuation system of the marking device, or any of the actions described further below.

Moreover, a marking device may be provided with two accelerometers to monitor whether the marking device is being held in a satisfactory manner during use. For example, it may be preferable for a marking device to be maintained at a substantially perpendicular angle relative to ground as a technician is painting, even when the technician is moving (e.g., swinging) the marking device. It should be appreciated that when operated in a such a manner, the top of the marking device and the tip of the marking device may exhibit similar acceleration characteristics (e.g., peaks in acceleration at the same time (e.g., at the same points of a swinging motion), minimum values of acceleration at the same time (e.g., at the same points of a swinging motion), etc.) By positioning an accelerometer toward the tip of the marking device and another toward the top of the marking device, the resulting acceleration data may be indicative of whether the technician is properly manipulating the marking device.

Other uses for multiple accelerometers on a marking device are also possible, and those examples listed above are non-limiting.

The operational sensors 1920 may further comprise a yaw rate sensor 1929, which may be configured to sense the yaw rate (i.e., a twisting motion) of the marking device. The yaw rate sensor may be any suitable yaw rate sensor and may provide its output in any suitable units, for example in degrees per second (degrees/sec). One non-limiting example of a suitable yaw rate sensor is an ADXRS610BBGZ-RL gyro sensor from Analog Devices of Norwood, Mass. According to another embodiment, a yaw rate measurement may be provided by some types of compasses, such that a combination compass and yaw rate sensor may be used. The yaw rate sensor may be positioned at any suitable location on the marking device to detect yaw rate. The information provided by the yaw rate sensor 1929 may be stored locally and/or transmitted to an external device such as the remote computer 150.

The proximity sensor 1930 may be configured to measure the distance from any point of interest of the marking device 2010 to a point of interest in its surroundings. For example, in one embodiment, the proximity sensor 1930 may be positioned at the tip of the marking device, and may be oriented to determine the distance between the tip of the marking device and any surface upon which marking material is being dispensed by the marking device (a target surface). Alternatively, in one embodiment, the proximity sensor may be positioned toward the top of the marking device and oriented to determine a distance between the top of the marking device and the ground. Other configurations are also possible.

Information about the distance from the marking device to any surrounding surface may be useful for one of various reasons. For example, such information may be useful in assessing whether a technician is properly operating the marking device. As a non-limiting example, there may be predetermined acceptable distances between the marking dispenser of the marking device and the surface on which marking material is being dispensed. Some spray paint cans, for example, are provided with instructions giving recommended distances (e.g., between 6-12 inches) between the paint can and the surface to be painted. The proximity sensor may be used to determine whether the technician is maintaining the marking device at an acceptable distance from the surface upon which the marking material is being dispensed. Alternatively, according to another embodiment, and as described in greater detail below, the distance of a portion of the marking device from the ground may be useful in determining the distance between two points of the marking device.

The proximity sensor 1930 may be any suitable type of proximity sensor (e.g., any commercially available proximity sensor), including an analog or digital device. In one embodiment, proximity sensor 1930 may be a Sharp GP2D120 short range IR distance sensor from Sharp Electronics Corporation (Mahwah, N.J.) and is able to take a substantially continuous distance reading and return a corresponding analog voltage with a range of about 1.6 inches to about 12 inches. Such a proximity sensor may be suitable, for example, when the sensor is used to sense the distance from the tip of the marking device to a surface on which marking material is being dispensed, since such a distance may typically be less than about 12 inches. According to another embodiment, the proximity sensor may be a sonar device. Other types of proximity sensors may also be suitably used. The information provided by the proximity sensor 1930 (e.g., a distance value, for example, in centimeters, meters, or feet) may be stored locally and/or transmitted to an external device such as the remote computer 150.

The pressure sensor 1931 may be configured to sense any pressure of interest with respect to the marking device. For example, according to one embodiment it may be desirable to detect the pressure applied to a handle of the marking device, for instance to determine whether a technician is holding the marking device and, if so, whether it is being held appropriately. Accordingly, a pressure sensor may be positioned in the handle of the marking device in one non-limiting embodiment and configured to detect the pressure applied to the handle. According to another embodiment, it may be desirable to determine the pressure applied to an actuation system of the marking device, for example if the actuation system is a trigger. Accordingly, a pressure sensor may be configured to determine the pressure applied to the trigger or other actuation mechanism in those embodiments in which the marking device includes such a trigger or actuation mechanism. According to one embodiment, the marking device may include multiple pressure sensors, for example one for determining the pressure applied to a handle of the marking device and one for determining a pressure applied to an actuation system of the marking device. However, any number of pressure sensors may be included, and they may be configured to sense any pressure of interest with respect to the marking device.

The pressure sensor 1931 may be any suitable type of pressure sensor for detecting the pressure of interest. The information provided by the pressure sensor 1931, which may be in any suitable units, may be stored locally and/or transmitted to an external device such as the remote computer 150.

The marking device may further include device health monitoring capability. Characteristics of the health of the marking device which may be the subject of monitoring include, but are not limited to, battery life, battery drain level, battery charging capacity, wireless signal strength (in those embodiments in which the marking device has wireless capabilities), network connectivity, operating temperature, available memory, and the status of any one or more input devices of the marking device, such as an accelerometer, location tracking system (e.g., GPS receiver), image capture device, light sensor, marking material detection mechanism, etc. To this end, the marking device may include hardware and/or software configured to serve the health monitoring purpose.

According to one embodiment, the marking device may include a processor (e.g., processor 118) configured to run a device health software program or application to process the inputs from one or more operational sensors, such as operational temperature sensor 1922, to assess whether those inputs indicate the marking device is operating appropriately. According to another embodiment, the marking device may include dedicated device health hardware, such as device health sensor 1932, which may provide data that is processed by a device health software program (for example, executing on processor 118) to assess the health of the marking device.

Non-limiting examples of device health sensor 1932 include a voltmeter and an ammeter, among others.

In one embodiment, data provided by the device health sensor 1932 may indicate that a low battery condition is present during the marking operation and, thus, it may be determined that the operations of the marking device are not reliable. Other device conditions, such as wireless signal strength (e.g., in those embodiments in which the marking device 2010 is wirelessly coupled to an external device, such as remote computer 150), available memory, temperature of one or more components of the marking device, power connection of one or more components of the marking device, or other conditions of the marking device may be monitored by a device health sensor. Thus, it should be appreciated that a marking device according to the embodiments described herein may include any suitable number of device health sensors for monitoring a desired number of device conditions.

According to one embodiment, a record or message may be created based on operation of the device health sensor. For example, a record or message may be created including a device ID (e.g., of the marking device) and the current state of certain device components, such as input devices (e.g., environmental and operational sensors). The record or message may also or alternatively include an identification of any resource utilization that is nearing a specified threshold (e.g., memory nearing capacity). Thus, it should be appreciated that various conditions may be monitored under the rubric of monitoring the health of the marking device, and various actions taken in response to such monitoring.

The operational sensors 1920 may further comprise the image capture device 1828. As previously mentioned, the image capture device 1828 may be considered an operational sensor, for example, if and when configured to capture an image relating to the operation of the marking device 2010. In one embodiment, the image capture device may be configured to capture an image of any marking material dispensed by the marking device 2010. Such an image may be used to verify that a marking material was appropriately placed on ground, pavement or other surface in the context of its surroundings. Images of dispensed marking material such as a paint also may be used to verify that the marking material appropriately coated and adhered to a surface on which it was dispensed. Images of marking material as it is being dispensed also may be used to ascertain and/or verify some attribute or characteristic of the marking material itself. Concepts relating to determination of various marking material attributes using a variety of techniques are discussed in U.S. Non-provisional application Ser. No. 12/429,947, filed Apr. 24, 2009, and entitled "MARKER DETECTION MECHANISMS FOR USE IN MARKING DEVICES AND METHODS OF USING SAME," published as U.S. Patent Publication 2010-0006667-A1, which application is hereby incorporated by reference.

Furthermore, the operational sensors 1920 may comprise an audio recorder, similar to or the same as audio recorder 1830, and therefore shown as audio recorder 1830 in FIG. 21. For example, the marking device may include multiple audio recorders, with one or more operating as an environmental sensor (e.g., recording acoustic input from the environment) and one or more operating as operational sensors (e.g., recording acoustic input relating to operation of one or more components of the marking device, as described below with respect to the marking dispenser). According to one non-limiting embodiment, an audio recorder may be configured to record audio input corresponding to the sound created by dispensing of marking material from the marking dispenser 116. For example, in one embodiment, the marking dispenser 116 may comprise an aerosol paint can and the marking material may be the paint. A sound is often emitted when the aerosol paint can is activated. The frequency of that sound may depend on, and therefore be indicative of, what is being dispensed from the paint can. For example, in one embodiment the paint can may have a fixed resonance frequency with resonance sidebands. The frequency of the resonance sidebands may vary depending on the amount of paint in the paint can, such that the resonance sidebands may move closer (in terms of frequency) to the fixed resonance frequency as the amount of paint in the paint can decreases. Thus, by suitable detection of the resonance sidebands during actuation of the paint can, a determination may be made whether paint is being dispensed or not. Also, if no paint or propellant is being dispensed from the paint can (e.g., when the paint can is empty of both paint and propellant or if the paint can is not functioning), then no sound may be emitted. A non-limiting example is now given.

According to one embodiment, the frequency amplitude of the sound generated by the paint can may be tracked over time to assess an amount of paint in the paint can and/or whether paint is being dispensed. If the amplitude of a particular frequency of interest remains above a threshold value for a threshold duration, it may be determined that paint is being dispensed. By contrast, if the amplitude of the frequency of interest does not remain above the threshold value for the threshold duration, it may be determined that the paint can is not dispensing paint, e.g., because the paint can is substantially empty of paint or is not functioning.

According to one embodiment, a method of determining whether paint is being emitted from a marking dispenser may begin by calibrating the audio recorder to account for background noise, although not all embodiments involve such a calibration routine. A microphone associated with the audio recorder is positioned to detect sound emitted when a paint can, serving as the marking dispenser 116 in this non-limiting embodiment, is activated. Thus, according to one embodiment, the microphone may be positioned proximate the tip of the marking device, an example of which is shown later in FIG. 23 (which illustrates a microphone near the tip 2302 of the marking device 2100). The analog signal from the microphone may be digitized by sampling at 20 kHz or any other suitable sampling rate. The digital data may then be low-pass filtered, for example by a processor (e.g., processor 2118, described below). According to one embodiment, the low-pass filter has a passband at approximately 3.3 kHz, although any suitable passband may be used. The data from the low-pass filter may then be squared in value, which removes any negative values. The resulting data may then be low-pass filtered, for example using the same processor which performed the first low-pass filtering function, or any other suitable hardware and/or software. This second low-pass filtering step may have a passband at approximately 50 Hz, although any suitable passband may be used.

The amplitude of the signal output by the second low-pass filtering step may then be compared against a threshold amplitude selected to be indicative of the amount of paint in the paint can and/or being dispensed. If the amplitude exceeds the threshold amplitude for a sufficient duration (e.g., 50 milliseconds, 25 milliseconds, or any other suitable duration), then the data suggests that the paint can contains paint, since such a result may occur when the resonance frequency sidebands of the paint can are sufficiently far from the fixed resonance frequency. By contrast, if the amplitude does not exceed the threshold amplitude for the threshold duration, then the data suggests that the paint can contains little or no paint. The threshold amplitude may be selected based on characteristics of the subject paint can, among other things.

It should be appreciated that other methods of processing the audio input are also possible, as this is only one example. In addition, other uses of the audio recorder information (i.e., other than determining if marking material has been dispensed) are possible. Furthermore, it should be appreciated that the audio input may also be stored by the audio recorder.

As previously described, the audio recorder may be any suitable audio recorder, including a digital audio recorder or analog audio recorder, for example of any of the types previously described. In one embodiment, the audio recorder may comprise a dedicated PIC processor, as described further below with respect to FIG. 22. In those embodiments in which the marking device includes two or more audio recorders (e.g., one operating as an environmental sensor and another operating as an operational sensor), the audio recorders may share any suitable combination of circuitry. For example, multiple audio recorders may share a same digital signal processor (e.g., a dedicated audio signal processor). A separate microphone may be associated with each audio recorder, or a microphone may be shared between two or more audio recorders. Thus, it should be appreciated that the exact configuration and components of audio recorders according to the various embodiments described herein are not limiting.

The audio files produced by an audio recorder operating as an operational sensor may be stored locally in dedicated audio memory, in local memory 122 and/or transmitted to an external device, such as the remote computer 150.

In any of the embodiments illustrated in FIG. 19, any one or more of the environmental sensors 1820 illustrated in FIG. 20 and/or operational sensors 1920 illustrated in FIG. 21 may be operated in any suitable manner, including continuously, periodically, and/or in response to an event or trigger (e.g., one or more actuations of the marking device), or in any other suitable manner. For example, one or more of the environmental sensors 1820 and/or operational sensors 1920 may operate continuously during performance of a marking operation. In particular, the ambient temperature sensor may output a substantially continuous data stream indicative of the sensed ambient temperature. Similarly, the surface temperature sensor, humidity sensor, light sensor, and altitude sensor may output substantially continuous data streams indicative of the respective sensed conditions. The inclinometer, compass, accelerometer, yaw rate sensor, proximity sensor, pressure sensor, and device health sensor may also output substantially continuous data streams indicative of the sensed operation. The image capture device 1828 may record a video sequence continuously during the marking operation, and the audio recorder 1830 may continuously record any audio input during performance of the marking operation.

Alternatively, one or more of the environmental sensors 1820 and/or operational sensors 1920 may be operated and/or polled periodically, with the resulting output data being logged and/or transmitted periodically. For example, the ambient temperature sensor may provide an output signal indicative of the sensed ambient temperature every second, every five seconds, every ten seconds, every minute, every ten minutes, or at any other suitable time interval. Similarly, the surface temperature sensor, humidity sensor, light sensor, altitude sensor, operational temperature sensor(s), inclinometer, compass, accelerometer(s), yaw rate sensor, proximity sensor, pressure sensor, and device health sensor(s) may output data at periodic intervals. The image capture device may capture a still image or a video sequence of any desired duration at periodic intervals. The audio recorder may capture audio of any desired duration at periodic intervals. It should be appreciated that in some embodiments one or more of the environmental sensors 1820 and/or operational sensors 1920 may themselves operate so as to provide output information in an essentially continuous fashion, but only be read or polled (e.g., by processor 118) on some discrete or periodic basis. Accordingly, output signals or data provided by one or more sensors may be acquired, logged into local memory, and/or transmitted to an external device in any of a variety of manners.

According to another embodiment, one or more of the environmental sensors 1820 and/or operational sensors 1920 may operate, be read discretely, and/or be polled, and therefore the corresponding data may be logged and/or transmitted, in response to actuation of the actuation system 120 of the marking device. For example, actuation of the actuation system 120 may trigger dispensing of marking material and simultaneously may trigger recording of a sensed ambient temperature from ambient temperature sensor 1822 in the local memory 122. The remaining environmental sensors 1820 and/or operational sensors 1920 may be operated, read and/or polled in a similar manner.

In one embodiment, one or more of the environmental sensors 1820 and/or operational sensors 1920 may be activated, read discretely, and/or polled by the technician irrespective of whether the actuation system 120 is actuated. For example, the technician may activate, read, and/or poll one or more of the environmental sensors by depressing a selection button corresponding to the environmental sensor(s), by choosing a selection button or menu option from a user interface of the marking device (in those embodiments in which the marking device includes a user interface), or in any other suitable manner. The operational sensors may operate similarly.

Thus, it should be appreciated that the operation of sensors, and reading and/or logging and/or transmitting of data from the environmental sensors 1820 and operational sensors 1920, is not limited to any particular manner or time, but rather that various suitable schemes are contemplated. Also, it should be appreciated that in those embodiments in which a marking device comprises multiple sensors, the sensors need not operate in the same manner as each other. For example, one or more of the sensors may operate periodically while one or more may only provide their data output in response to actuation of the marking device actuation system. In one embodiment, a plurality of the sensors may provide their data outputs periodically, but at different rates. Other operating schemes are also possible.

Figure 22:
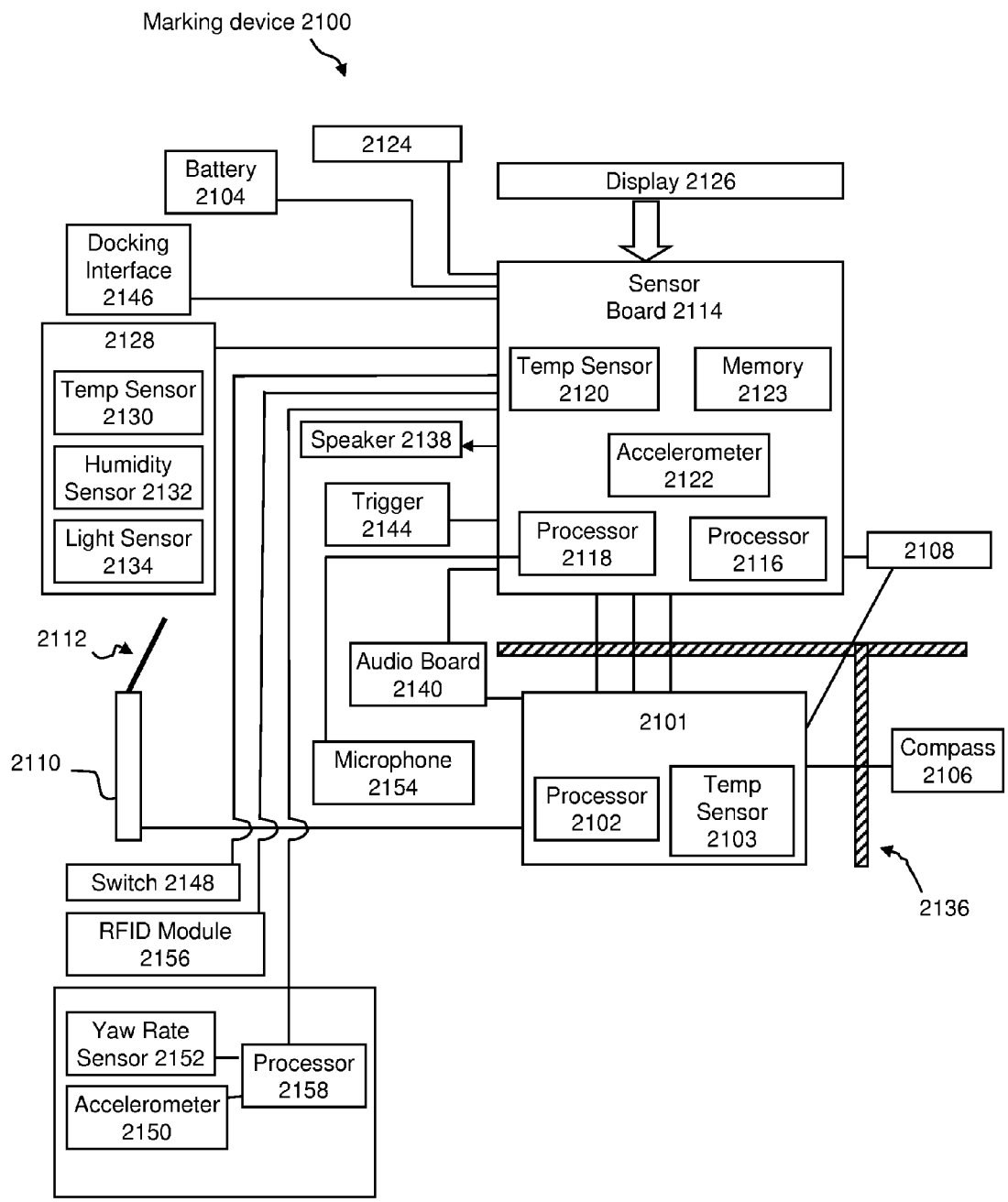
FIG. 22 is a functional block diagram of the marking device of FIG. 19, according to one embodiment of the present invention.
Figure 23:
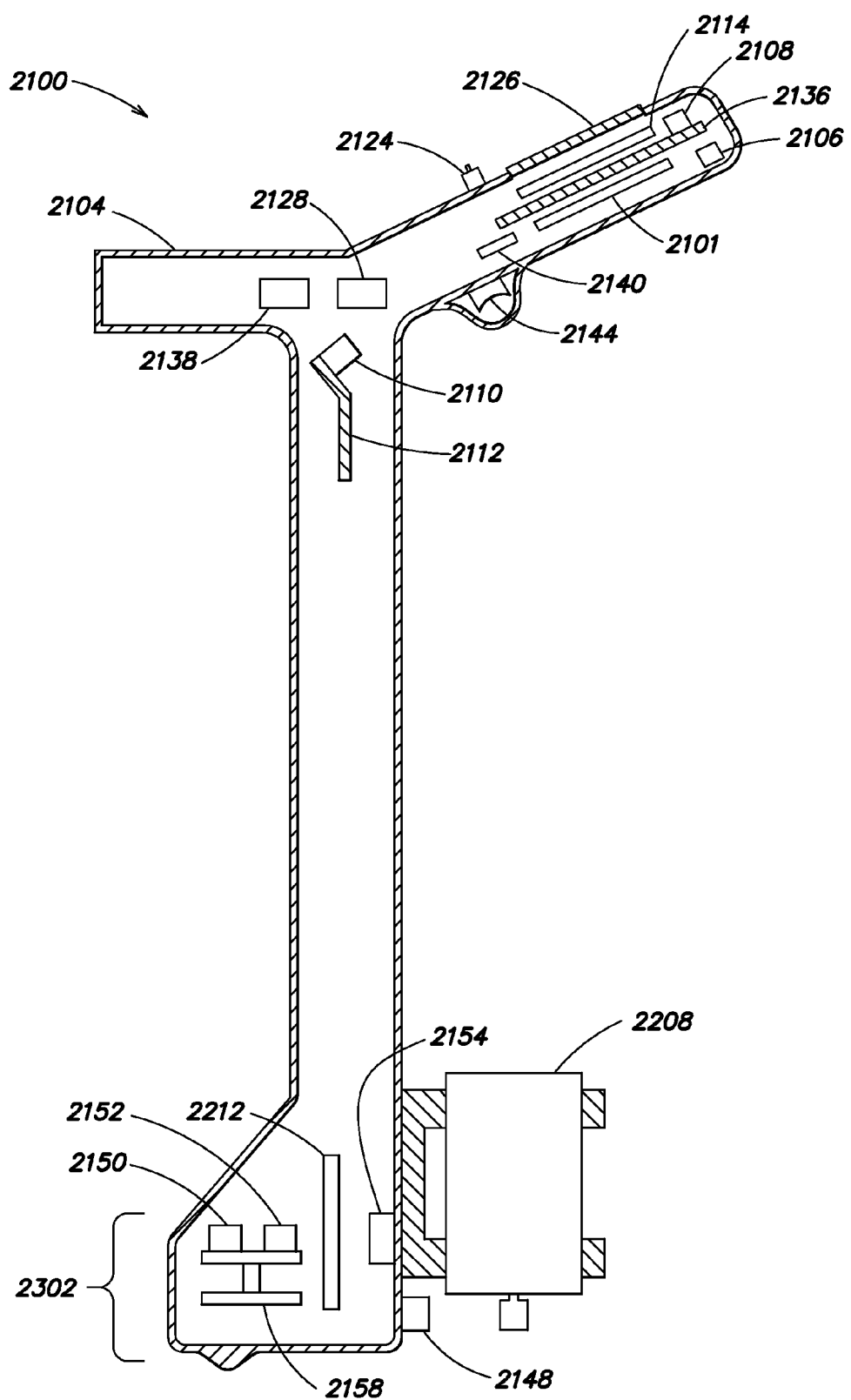
FIG. 23 is a perspective view illustrating a non-limiting physical configuration of the marking device of FIG. 22, according to one embodiment of the present invention.

FIG. 22 illustrates a functional block diagram of a marking device 2100 including both environmental and operational sensors, according to another non-limiting embodiment. FIG. 23 illustrates a corresponding structural representation of the marking device 2100. The marking device 2100 is in significant respects functionally similar to the marking device 2010 described above in connection with FIGS. 18-20. However, specific implementation details, such as disposition and distribution of various components of the marking device, may differ in some respects; accordingly, unique reference characters are used in the description of FIGS. 22 and 23, although some of the components described in connection with these figures may be substantially similar or identical to components already described above. In some instances, a component described in previous embodiments as a single element (e.g., the processor 118) may include multiple components (multiple processors) in the embodiment of FIGS. 22 and 23, which together perform substantially the same general functionality as already described above (e.g., but in a distributed fashion).

With reference to FIG. 22, the marking device 2100 includes control electronics, environmental sensors, operational sensors, as well as some additional components. The control electronics include a processor 2102, which in this non-limiting example is an Atom™ processor available from Intel Corporation of Santa Clara, Calif. The processor 2102 is on a processor board 2101 that also includes a temperature sensor 2103 configured to monitor the processor temperature. In this manner, the processor temperature may be monitored for overheating or other adverse temperature conditions. The control electronics further comprise a battery 2104, which provides power to the various components of the marking device 2100.

Several of the components of the marking device 2100 are connected directly to the processor 2102. For example, a compass 2106 is connected to and provides its output directly to the processor 2102. Similarly, a location tracking system 2108 (e.g., a GPS receiver, such as the ISM300F1-C3 GPS module from Inventek Systems of Billerica, Mass.) is directly coupled to the processor 2102 to provide its output to the processor. Additionally, the marking device 2100 comprises Wi-Fi capability, provided by communications interface 124 in the form of a Wi-Fi module 2110 having a Wi-Fi antenna 2112. The Wi-Fi module is coupled directly to the processor 2102 via a USB connection, in this non-limiting example.

The marking device 2100 further comprises a sensor board 2114, which is connected to several sensors, itself includes several sensors, and is coupled to the processor 2102 to provide various data to the processor 2102 and receive control signals from the processor 2102. The sensor board 2114 comprises two processors, labeled as 2116 and 2118. The processor 2116, which is a PIC 24 processor in this non-limiting example (for example, PIC24FJ256GA106-I/PT from Microchip Technology Inc. of Chandler, Ariz.), may be configured to receive data from various of the sensors of the marking device 2100, and to communicate with the processor 2102. The processor 2118 may be a dedicated digital signal audio processor, and may be, for example a PIC 30 processor, such as DSPIC30F301230ISO-ND from Microchip Technology Inc. of Chandler, Ariz. Processor 2118 may receive audio input from a microphone, and may process the audio input and provide it to the processor 2102. The sensor board 2114 further comprises a temperature sensor 2120, configured to monitor the temperature of the sensor board to determine whether any of the components of the sensor board are overheating. The sensor board 2114 further comprises an accelerometer 2122, which is a 3-access accelerometer in this non-limiting embodiment, as well as memory 2123, which in this non-limiting example is EEPROM.

As shown, various sensors and other components of the marking device 2100 are electrically coupled to the sensor board 2114, for example to provide their outputs to the processor 2116. For example, the marking device 2100 comprises a joystick and user interface buttons 2124, which provide their outputs to the processor 2116. A technician using the marking device may use the joystick and buttons 2124 (for example, joystick SKQUCAA010 from Alps Electric Co., Ltd. and pushbutton module TL11078F180WQ from E-Switch, Inc. of Minneapolis, Minn.) to interact with the marking device, for example to navigate menus presented on the display 2126 of the marking device and to make user-selected entries. The marking device may further comprise a board 2128 having on it a temperature sensor 2130, a humidity sensor 2132, and a light sensor 2134. The temperature sensor 2130 may be configured to detect the air temperature outside of the marking device. The humidity sensor 2132 may be configured to detect the humidity of the environment in which the marking device is located. The light sensor 2134 may be configured to detect the light intensity, light flux, or illuminance of the environment in which the marking device is being used. Each of those three sensors may be connected to the sensor board 2114 and provide their output signals to the processor 2116.

Furthermore, the marking device 2100 may comprise various additional sensors, which, as discussed below with respect to FIG. 23, may be located in the tip of the marking device. These include a paint can detection switch 2148, a 3-axis accelerometer 2150, a yaw rate sensor 2152, the previously described microphone 2154, and an RFID module (e.g., an RFID read/write module) 2156. The outputs of these sensors may also be provided to the processor 2116 on the sensor board 2114. In addition, the marking device may comprise another PIC processor 2158, such as a PIC 18 processor, configured to digitize the output signals of the 3-axis accelerometer and the yaw rate detector located in the tip of the marking device prior to providing those outputs to processor 2116.

The marking device also includes a trigger 2144 for actuating the marking device. The trigger may be coupled to the sensor board 2114, and in particular to the processor 2116 in this non-limiting example. Additionally, a mode selection switch may be associated with the trigger, such that the processor 2116 may detect not only when the trigger is actuated, but also what mode is involved. Examples of suitable modes include paint mode, in which actuation of the trigger causes the dispensing of a marking material, such as paint, and landmark mode, in which actuation of the trigger may not result in dispensing of marking material, but may result in data collection. Other modes are also possible, as these examples are non-limiting.

In addition, as shown, the marking device 2100 may further comprise a speaker 2138, which may be used to provide audio output to the technician using the marking device. To facilitate this functionality, the marking device may further comprise an audio board 2140 coupled between the processor 2102 and the sensor board 2114. The audio board may receive digital signals from the processor 2102 and convert them to analog signals, which may be provided to the sensor board 2114 to drive the speaker 2138.

Also, as mentioned, the marking device 2100 comprises a display 2126, which may be connected to the sensor board, and which in some embodiments may be mounted directly to the sensor board 2114.

Although not shown in FIG. 22, various forms of memory may be provided with the marking device 2100. For example, the processor 2102 may include RAM as well as a flash memory, or any other suitable types of memory. Data output from any of the sensors or components of the marking device 2100 may be stored in the memory of the processor 2102. Each of the processors 2116 and 2118 may include internal flash memory as well as RAM.

To provide electrical isolation between various components of the marking device, for example to prevent electrical cross-talk or interference, one or more electrical shields may be included. In the illustrated embodiment, a shield 2136 may be provided to electrically shield the compass 2106 from the location tracking system (e.g., GPS receiver) 2108 and from the processor 2102, as well as to shield the location tracking system 2108 from the processor 2102. According to one embodiment, the compass may be shielded by a metallic enclosure (e.g., a copper box), which may provide shielding from interference caused by other components of the marking device as well as shielding from the environment.

As shown, the marking device also comprises a docking interface 2146 to facilitate docking the marking device to a docking station. The docking station may be a device configured to receive the marking device when the marking device is not in use to perform a marking operation, and may be, for example, any of the types of docking stations described in U.S. patent application Ser. No. 12/571,411, filed on Sep. 30, 2009 and titled "Marking Device Docking Stations and Methods of Using Same," which is hereby incorporated herein by reference in its entirety. According to one embodiment, the marking device may make both electrical and mechanical connection to the docking station when docked, such that the docking interface may be configured to provide both electrical and mechanical connection. While docked, the marking device battery may be charged and/or the marking device may exchange information with the docking station. For example, the marking device may transfer any collected marking data to the docking station. Other functions may also be performed by the docking station, as described in U.S. patent application Ser. No. 12/571,411.

Docking events (e.g., docking and de-docking of a marking device) may be recorded as event entries, for example similar in form to the event entries of Tables 2-5. Table 14A illustrates an example of event entry indicating a change in docking status of a marking device. Other entry formats are also possible.

TABLE 14A

| | |
|---|---|
| Format | INFO+DOCK: (DATE) (TIME) (GPS data) (DOCKING STATE) <CR><LF> |
| Examples | INFO+ DOCK R: DATE(2009-04-15) TIME(12:04:44)<br>GPS($GPGGA, 120443, 4807.038, N, 01131.000, E, 1, 08, 0.9, 545.4, M, 46.9, M,, *47)<br>DOCK(DOCKED)<CR><LF><br>INFO+ DOCK: DATE(2009-04-15) TIME(12:04:45)<br>GPS($GPGGA, 120445, 4807.038, N, 01131.000, E, 1, 08, 0.9, 545.4, M, 46.9, M,, *47)<br>DOCK(DE-DOCKED)<CR><LF><br>INFO+ DOCK: DATE(2009-04-15) TIME(12:04:46)<br>GPS($GPGGA, 120446, 4807.038, N, 01131.000, E, 1, 08, 0.9, 545.4, M, 46.9, M,, *47)<br>DOCK(DOCKED)<CR><LF> |

In general, the components of marking device 2100 may operate in any of the manners previously described with respect to marking devices, environmental sensors, and operational sensors. However, in one non-limiting embodiment, the various sensors of marking device 2100 may operate at different rates. As an example, the accelerometers and yaw rate sensor of the marking device may output their data at relatively high frequencies, such as in the kHz range, MHz range, or higher. The temperature sensors, humidity sensor, and light sensor may output their data at relatively lower frequencies, such as approximately 1 Hz, for example because those quantities may not change as rapidly as the quantities measured by the accelerometers and the yaw rate sensor. The joystick and buttons 2124 may output their data at an intermediate frequency, for example 10 Hz. Lastly, the RFID sensor of RFID module 2156 may output its data only when the paint can detection switch 2148 changes state, corresponding to insertion or removal of a paint can. In this manner, power may be conserved by operating the RFID sensor only when needed.

According to one embodiment, the output data from the sensors is only read and stored upon actuation of the trigger 2144, even though the sensors may update their outputs at the above-indicated frequencies. Upon such actuation, data from any one or more of the sensors may be read out and stored in the memory of processor 2102. The stored data may therefore represent the values present at the sensors at the time of actuation. In this manner, data values output by the sensors when the trigger is not actuated may not be stored in some instances, but rather may be updated by the subsequent data value from the sensor. In this manner, only the most recent data from the sensors may be stored upon actuation.

FIG. 23 illustrates one non-limiting example of a physical implementation of the marking device 2100 of FIG. 22, utilizing the same reference numbers as used in FIG. 22. Not all of the components are shown in FIG. 23.

As shown, the accelerometer 2150 and a yaw rate sensor 2152 are located toward the tip 2302 of the marking device 2100 on a first circuit board. Processor 2158 (for example, a PIC 18 processor, such as a PIC18F2431-I/SO from Microchip Technology Inc. of Chandler, Ariz.), is disposed on a second circuit board coupled to the circuit board including the accelerometer and the yaw rate sensor, and is configured to receive the outputs from the accelerometer and yaw rate sensor, digitize them, and send them to the sensor board 2114. The can detection switch 2148 is included to detect insertion and removal of paint can 2208 from the marking device. The microphone 2154 is configured to detect sound emitted when paint is dispensed from the paint can 2208 and provides its output to processor 2118, shown in FIG. 22. The RFID board 2212 is oriented vertically within the figure and includes the RFID module 2156, which may include an RFID reader configured to read an RFID tag on the paint can 2208 or on the lid of the paint can 2208, for example to determine product information relating to the paint can 2208.

It should be appreciated that other electrical and physical configurations of a marking device including one or more environmental and/or operational sensors are possible, and that FIGS. 22 and 23 illustrate one non-limiting example.

As mentioned previously, environmental information and/or operational information output by any one or more environmental sensors and operational sensors of the marking device (e.g., of the environmental sensors 1820 and/or operational sensors 1920) may be used for one or more of various purposes, some of which have been previously described. Examples of such purposes include assessing whether a marking operation was or is being performed within environmental and/or operational tolerances, interacting with the technician and/or controlling/altering operation of the marking device, and augmenting data records/files.

To this end, the various environmental information and/or operational information provided by various sensors may be organized and handled as data in various formats, and in some implementations may be organized in terms of events and corresponding event entries formatted according to a particular protocol, for example as discussed above in connection with Tables 2 through 5. Event entries similar to these and including various environmental and/or operational information may be generated by the marking device at some point once information has been read/acquired from environmental and/or operational sensors, the event entries themselves (or any information contained therein) may be logged in a file for an electronic record, and/or the event entries themselves (or any information contained therein) may be transmitted by the marking device (e.g., to remote computer 150).

In some implementations, environmental information and/or operational information may be contained within one or more event entries corresponding to an actuation of the marking device, such that the environmental information and/or the operational information is part of an actuation data set. Table 15 below illustrates a modification of an event entry originally depicted in Table 3 above, in which environmental information and operational information is included as part of the data formatted in an actuation state change event entry, according to one example. The information for acceleration may include three values for each axis of each accelerometer. One value for a particular axis may be a raw value, the second value for a particular axis may be a high-pass filtered value, and the third value may be a low-pass filtered value. Data values are only shown for one of the two accelerometers listed. As in Table 3, for purposes of this event format, the actuator is deemed to have three possible states, i.e., PRESSED, HELD and RELEASED. Marking information from one or more input devices/other components of the marking device is recorded with these events to provide information about the job in progress.

to some predetermined scale/units of measure for the numeric information), alphanumeric (e.g., 78F), text (e.g., YES), symbolic (e.g., Y or N to indicate "yes" or "no," or some other symbol to provide an indication, such as ! to indicate sensor failure or no sensor information available), or referential in nature (e.g., a filename, pointer or other link to provide an indication of where relevant information relating to the particular environmental and/or operational condition may be found).

In other implementations, one or both of environmental information and/or operational information may be formatted in one or more particular event entries generated specifically to provide such information, in a manner that is not necessarily related to actuation of the marking device. For example, such "sensor read events" may be generated as the result of the processor reading one or more environmental and/or operational sensors one or more times while a job is in progress (e.g., on a periodic basis pursuant to processor polls). Table 16 below provides an example of such a sensor read event entry.

TABLE 15

| | |
|---|---|
| Format | INFO+ WPTR: (DATE) (TIME) (GPS data) (PAINT info) (TRIGGER SWITCH STATE) (AMB TEMP info) (SURF TEMP info) (HUM info) (LIGHT info) (ALTITUDE info) (IMAGE info) (AUDIO info) (OP TEMP info) (COMPASS info) (INCL info) (ACC1 info) (ACC2 info) (YAW info) (PROX info) (DH1 info) (DH2 info) <CR><LF> |
| Examples | INFO+WPTR: DATE(2008-12-07) TIME(09:35:15)<br>GPS($GPGGA, 120443, 4807.038, N, 01131.000, E, 1, 08, 0.9, 545.4, M, 46.9, M,, *47)<br>CLR(RED) SWCH(PRESSED) AMB TEMP(73F) SURF TEMP(78F) HUM(31)<br>LIGHT(1500) ALT (200) IMAGE(Y) AUDIO(Y) OP TEMP(97F) COMPASS(243) INCL(−40)<br>ACC1_x_raw(.285) ACC1_x_high(.280) ACC1_x_low(.275) ACC1_y_raw(.385)<br>ACC1_y_high(.382) ACC1_y_low(.380) ACC1_z_raw(.155) ACC1_z_high(.150)<br>ACC1_z_low(.145) (ACC2(!) YAW(!) PROX(15) DH1(67) DH2(!)<CR><LF><br>INFO+WPTR: DATE(2009-04-15) TIME(12:04:45)<br>GPS($GPGGA, 120445, 4807.038, N, 01131.000, E, 1, 08, 0.9, 545.4, M, 46.9, M,, *47)<br>CLR(RED) SWCH(HELD) AMB TEMP(73F) SURF TEMP(78F) HUM(31) LIGHT(1500)<br>ALT(203) IMAGE(Y) AUDIO(Y) OP TEMP(97F) COMPASS(243) INCL(−40)<br>ACC1_x_raw(.285) ACC1_x_high(.280) ACC1_x_low(.275) ACC1_y_raw(.385)<br>ACC1_y_high(.382) ACC1_y_low(.380) ACC1_z_raw(.155) ACC1_z_high(.150)<br>ACC1_z_low(.145) ACC2(!) YAW(!) PROX(15) DH1(67) DH2(!)<CR><LF><br>INFO+WPTR: DATE(2009-04-15) TIME(12:04:46)<br>GPS($GPGGA, 120446, 4807.038, N, 01131.000, E, 1, 08, 0.9, 545.4, M, 46.9, M,, *47)<br>CLR(RED) SWCH(RELEASED) AMB TEMP(73F) SURF TEMP(78F) HUM(31)<br>LIGHT(1500) ALT(201) IMAGE(Y) AUDIO(Y) OP TEMP(97F) COMPASS(243) INCL(−40)<br>ACC1_x_raw(.285) ACC1_x_high(.280) ACC1_x_low(.275) ACC1_y_raw(.385)<br>ACC1_y_high(.382) ACC1_y_low(.380) ACC1_z_raw(.155) ACC1_z_high(.150)<br>ACC1_z_low(.145) ACC2(!) YAW(!) PROX(15) DH1(67) DH2(!)<CR><LF> |

TABLE 16

| | |
|---|---|
| Format | INFO+SENSOR: (DATE) (TIME) (AMB TEMP info) (SURF TEMP info) (HUM info) (LIGHT info) (ALTITUDE info) (IMAGE info) (AUDIO info) (OP TEMP info) (COMPASS info) (INCL info) (ACC1 info) (ACC2 info) (YAW info) (PROX info) (DH1 info) (DH2 info) <CR><LF> |
| Examples | INFO+SENSOR: DATE(2009-04-15) TIME(12:04:45) AMB TEMP(73F) SURF TEMP(78F) HUM(31) LIGHT(1500) ALT(200) IMAGE(Y) AUDIO(Y) OP TEMP(97F) COMPASS(243) INCL(−40) ACC1(.285) ACC2(!) YAW(!) PROX(15) DH1(67) DH2(!)<CR><LF> |

The contents of an information field for a particular piece of environmental information and/or operational information in an event entry may have any of a number of forms; for example, the content may be strictly numeric (e.g., according With respect to file formats for electronic records including event entries or information derived therefrom, as discussed above any number of file formats may be employed (e.g., ASCII, XML).

Figure 24:
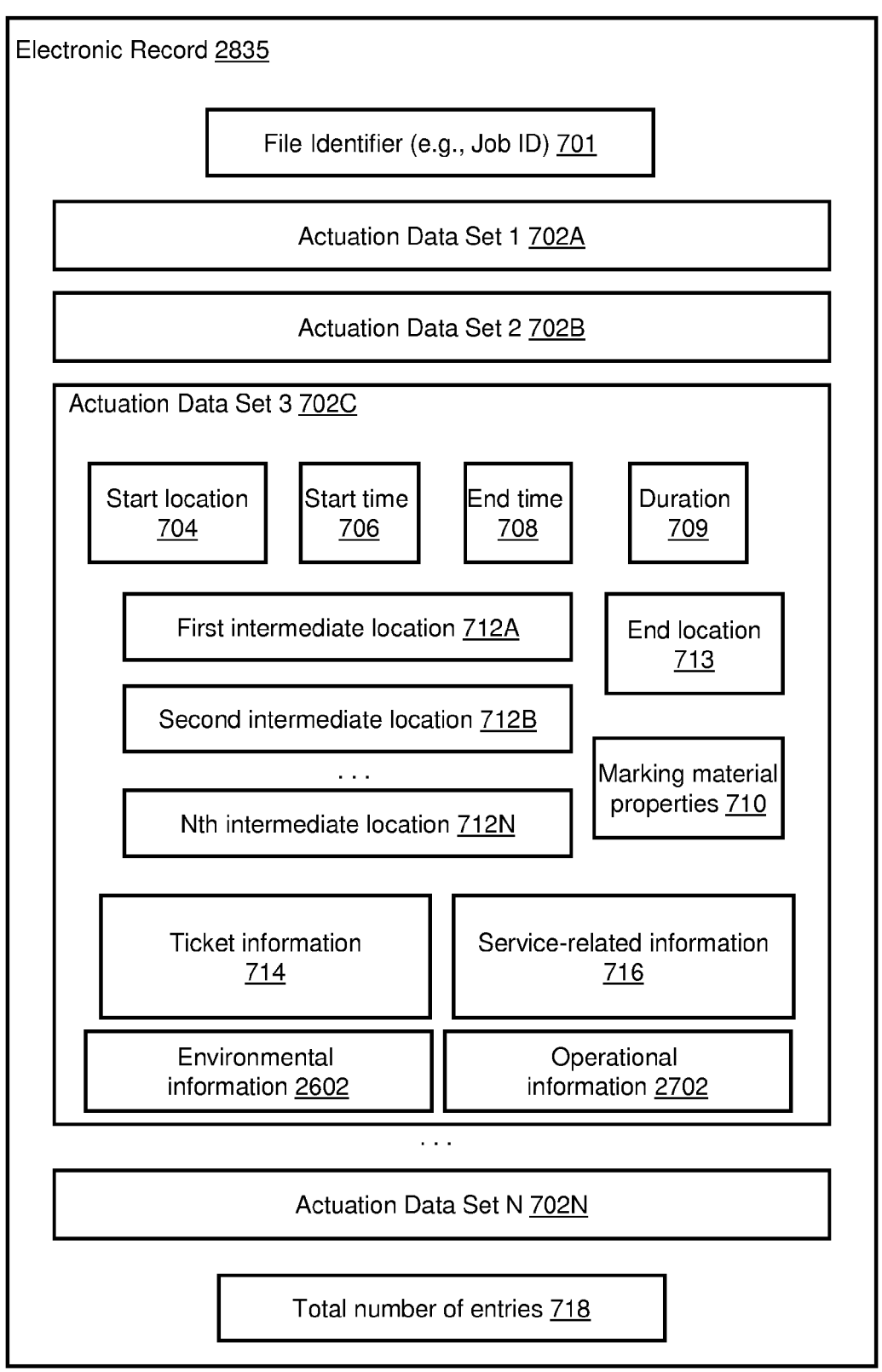
FIG. 24 is a block diagram of an exemplary data structure of an electronic record of a marking operation including information received from environmental sensors and operational sensors of the marking device, according to one embodiment of the present invention.

FIG. 24 illustrates an electronic record 2835, similar to the electronic record 135 previously described in connection with FIGS. 10 and 13, which may be generated by a marking device 2010 or 2100, stored in local memory 122 of the marking device, and/or transmitted in whole or part by the marking device, according to one embodiment. Some or all of the information provided in the electronic record 2835 may be derived from an event entry generated by the marking device (e.g., an event entry is generated and then parsed to provide information in various fields of an electronic record), or the information contained in the electronic record 2835 may be provided in another manner pursuant to the concepts disclosed herein (e.g., sensor information may be acquired directly from one or more sensors, and acquired information may be stored in the electronic record without necessarily generating an event entry). In addition to the information elements shown previously in FIGS. 10 and 13, the electronic record 2835 may further include one or both of environmental information 2602 and operational information 2702. While both types of information are shown for simplicity in FIG. 24, it should be appreciated that an electronic record according to various embodiments need not include both environmental information and operational information.

The exemplary electronic record 2835 shown in FIG. 24 may be used to evaluate performance of a marking operation, for example, by reviewing information in the actuation data set 702C, the ticket information 714, service-related information 716, the environmental information 2602 and/or the operational information 2702. It should be appreciated that the electronic record 2835 includes some information that assumes that the marking device 2010 or 2100 includes the timing system 128 and the location tracking system 130, such as the timing and location information shown in the electronic record.

Table 17 provides an example of a data record that may be generated by marking device 2010 or marking device 2100 upon actuation of the actuation system. Each shown "act" corresponds to a separate actuation. As shown, the data record may include information about the service provider identification, the user (technician) identification, the marking device identification, a timestamp (for example, provided by a timing system such as timing system 128), product data for the marking material being dispensed, locate request data, and information relating to the environmental sensors 1820. This example is provided for purposes of illustration, and is not limiting, as many different forms of data records may be generated based on the operation of the marking devices 2010 and 2100.

TABLE 17

Example record of data acquired by marking device 2010 or 2100 upon actuation

| | | |
|---|---|---|
| Record # act-1 | Service provider ID | 0482 |
| | User ID | 4815 |
| | Device ID | 7362 |
| | timestamp data | 12-Jul-2008; 09:35:15.2 |
| | Product data | Color = Red, Brand = ABC |
| | Locate request data | Requestor: XYZ Construction Company, Requested service address: 222 Main St, Orlando, FL |
| | Ambient temperature (° F.) | 75 |
| | Surface temperature (° F.) | 80 |
| | Humidity (%) | 85 |
| | Illuminance (lux) | 15000 |
| | Altitude (meters) | 200 |
| | Image captured (Y/N) | Y |
| | Audio captured (Y/N) | N |

TABLE 17-continued

Example record of data acquired by marking device 2010 or 2100 upon actuation

| | | |
|---|---|---|
| Record # act-2 | Service provider ID | 0482 |
| | User ID | 4815 |
| | Device ID | 7362 |
| | timestamp data | 12-Jul-2008; 09:35:17.5 |
| | Product data | Color = Red, Brand = ABC |
| | Locate request data | Requestor: XYZ Construction Company, Requested service address: 222 Main St, Orlando, FL |
| | Ambient temperature (° F.) | 75 |
| | Surface temperature (° F.) | 80 |
| | Humidity (%) | 85 |
| | Illuminance (lux) | 15500 |
| | Altitude (meters) | 200 |
| | Image captured (Y/N) | N |
| | Audio captured (Y/N) | N |
| Record # act-3 | Service provider ID | 0482 |
| | User ID | 4815 |
| | Device ID | 7362 |
| | timestamp data | 12-Jul-2008; 09:35:18.7 |
| | Product data | Color = Red, Brand = ABC |
| | Locate request data | Requestor: XYZ Construction Company, Requested service address: 222 Main St, Orlando, FL |
| | Ambient temperature (° F.) | 74 |
| | Surface temperature (° F.) | 81 |
| | Humidity (%) | 86 |
| | Illuminance (lux) | 15000 |
| | Altitude (meters) | 200 |
| | Image captured (Y/N) | Y |
| | Audio captured (Y/N) | Y |

In a manner similar to Table 17, Table 18 provides another example of a data record that may be generated by marking device 2010 or 2100 upon actuation of the actuation system. Each shown "act" corresponds to a separate actuation. As shown, the data record may include information about the service provider identification, the user (technician) identification, the device identification, a timestamp (for example, provided by a timing system such as timing system 128), product data for the marking material being dispensed, locate request data, and information relating to the operational sensors 1920. The location tracking system 130 provides the geo-location data. The temperature sensor(s) 1922 provides the temperature data. The compass 1924 provides the heading. The inclinometer 1926 provides the inclination. The accelerometer(s) 1928 provides the acceleration, which in this embodiment is a three-axis accelerometer. The yaw rate sensor 1929 provides the yaw rate. The proximity sensor 1930 provides the distance, which may represent the distance from the tip of the marking device to the ground, in one non-limiting embodiment. The pressure sensor 1931 provides the pressure measurement. This example is provided for purposes of illustration, and is not limiting, as many different forms of data records may be generated based on the operation of the marking device 2010 or 2100.

TABLE 18

Example record of data acquired by marking device 2010 or 2100 upon actuation

| | | |
|---|---|---|
| Record # act-1 | Service provider ID | 0482 |
| | User ID | 4815 |
| | Device ID | 7362 |

TABLE 18-continued

Example record of data acquired by marking device 2010 or 2100 upon actuation

|  |  |  |
|---|---|---|
|  | timestamp data | 12-Jul-2008; 09:35:15.2 |
|  | Geo-location data | 2650.9256, N, 08003.5234, W |
|  | Product data | Color = Red, Brand = ABC |
|  | Locate request data | Requestor: XYZ Construction Company, Requested service address: 222 Main St, Orlando, FL |
|  | Temperature (° F.) | 75 |
|  | Heading (degrees) | 243 |
|  | Inclination (degrees) | 25 |
|  | Acceleration (g) (x-axis) | 0.75 |
|  | Acceleration (g) (y-axis) | 1.75 |
|  | Acceleration (g) (z-axis) | 0.85 |
|  | Yaw rate (degrees/sec) | 10 |
|  | Distance (cm) | 15 |
|  | Pressure (psi) | 45 |
|  | Image captured (Y/N) | Y |
|  | Audio captured (Y/N) | N |
| Record # act-2 | Service provider ID | 0482 |
|  | User ID | 4815 |
|  | Device ID | 7362 |
|  | timestamp data | 12-Jul-2008; 09:35:17.5 |
|  | Geo-location data | 2650.9273, N, 08003.5236, W |
|  | Product data | Color = Red, Brand = ABC |
|  | Locate request data | Requestor: XYZ Construction Company, Requested service address: 222 Main St, Orlando, FL |
|  | Temperature (° F.) | 75 |
|  | Heading (degrees) | 243 |
|  | Inclination (degrees) | 26 |
|  | Acceleration (g) (x-axis) | 0.80 |
|  | Acceleration (g) (y-axis) | 0.75 |
|  | Acceleration (g) (z-axis) | 0.95 |
|  | Yaw rate (degrees/sec) | 12 |
|  | Distance (cm) | 14 |
|  | Pressure (psi) | 47 |
|  | Image captured (Y/N) | N |
|  | Audio captured (Y/N) | N |
| Record # act-3 | Service provider ID | 0482 |
|  | User ID | 4815 |
|  | Device ID | 7362 |
|  | timestamp data | 12-Jul-2008; 09:35:18.7 |
|  | Geo-location data | 2650.9276, N, 08003.5239, W |
|  | Product data | Color = Red, Brand = ABC |
|  | Locate request data | Requestor: XYZ Construction Company, Requested service address: 222 Main St, Orlando, FL |
|  | Temperature (° F.) | 74 |
|  | Heading (degrees) | 245 |
|  | Inclination (degrees) | 26 |
|  | Acceleration (g) (x-axis) | 0.75 |
|  | Acceleration (g) (y-axis) | 1.40 |
|  | Acceleration (g) (z-axis) | 1.15 |
|  | Yaw rate (degrees/sec) | 12 |
|  | Distance (cm) | 12 |
|  | Pressure (psi) | 44 |
|  | Image captured (Y/N) | Y |
|  | Audio captured (Y/N) | Y |

While Tables 17 and 18 respectively indicate the collection of environmental information and operational information separately, and as part of an actuation data set, it should be appreciated that various embodiments of the present invention are not limited in this respect. In particular, both environmental information and operational information may be collected together as part of a given actuation data set. Furthermore, the inclusion of one or both of environmental information and operational information in an electronic record such as the record 2835 need not be limited to one or more particular actuations data sets; rather, in some exemplary implementations, one or both of environmental information and operational information may be included as a unique component of an electronic record apart from any particular actuation data set (e.g., one or both of environmental and operational information may be common to, or "shared by," one or more actuation data sets).

VIII. ASSESSING OPERATION AND/OR USE OF A MARKING DEVICE

Environmental information and/or operational information, as well as any of the other constituent components of marking information and landmark information discussed herein, may be used to assess whether a marking device is being used and/or a marking operation was or is being performed in accordance with recommended practices or within recommended environmental or operational conditions.

As an illustrative example, there may be certain preferred environmental conditions in which a marking device may be used and/or a marking operation may be performed, particularly with respect to storage, handling and dispensing of the marking material. In particular, the marking material manufacturer may specify an ideal temperature, a maximum temperature, a minimum temperature, an ideal humidity, a maximum humidity, and the like, for the use of their product. Accordingly, the use of the marking material above the maximum temperature specification, below the minimum temperature specification, and/or above the maximum humidity specification may yield undesirable results, such as an uneven spray, poor adhesion to the surface on which it is sprayed, and/or poor durability. This may result in marginally or poorly performed marking operations, which may have an adverse impact on customer satisfaction and an increased risk of damage to facilities.

Additionally, there may be certain preferred process tolerances with respect to performing marking operations. For example, there may be a minimum ambient light specification, a certain angle of spray specification with respect to dispensing of marking material, a certain distance specification (i.e., distance from target surface) with respect to dispensing of marking material, a certain motion specification with respect to sweeping the marking device, and the like. Violations of these process tolerances may result in poorly performed marking operations, which may result in poor customer satisfaction and an increased risk of damage to facilities.

Other environmental and operational tolerances may also be applicable to marking operations, and it should be appreciated that those listed above are non-limiting examples provided for purposes of illustration.

In view of the foregoing, according to another aspect of the present invention, a marking device, or a locate operations system comprising a marking device, may include an operations monitoring application that operates in combination with the marking device or that is installed fully or in part on the marking device. In exemplary implementations discussed below, an operations monitoring application may provide for detecting and monitoring the use of locating equipment such as the marking devices described herein for out-of-tolerance environmental or operational conditions. For example, with respect to marking material that is dispensed during marking operations, the operations monitoring application of the present disclosure may provide for detecting and monitoring the use of the marking material within the limits of its product specifications with respect to, for example, the ambient temperature and humidity. Additionally or alternatively, monitoring may be based on certain standard operating procedures (e.g., as established by a facility owner, a locate contractor, a regulatory body, etc.). Other bases for monitoring the operation of a marking device may also be used.

According to one aspect of this embodiment, once an out-of-tolerance condition is detected, either environmental or operational, an out-of-tolerance alert or notification may be provided to the user (technician) of the marking device. In some exemplary implementations, the out-of-tolerance alert may be generated by the control electronics of the marking device, although not all implementations are limited in this respect. Additionally or alternatively, a record of such out-of-tolerance alerts may be stored, such as a record of alert acknowledgments that may be stored or transmitted by the marking device in response to technician acknowledgement of the alert.

An example of an operations monitoring application is now described. For purposes of illustration, the operations monitoring application is described in connection with marking device 2010 discussed above in connection with FIG. 19. However, it should be appreciated that the operations monitoring application may be used in connection with other marking devices described herein.

Figure 25:
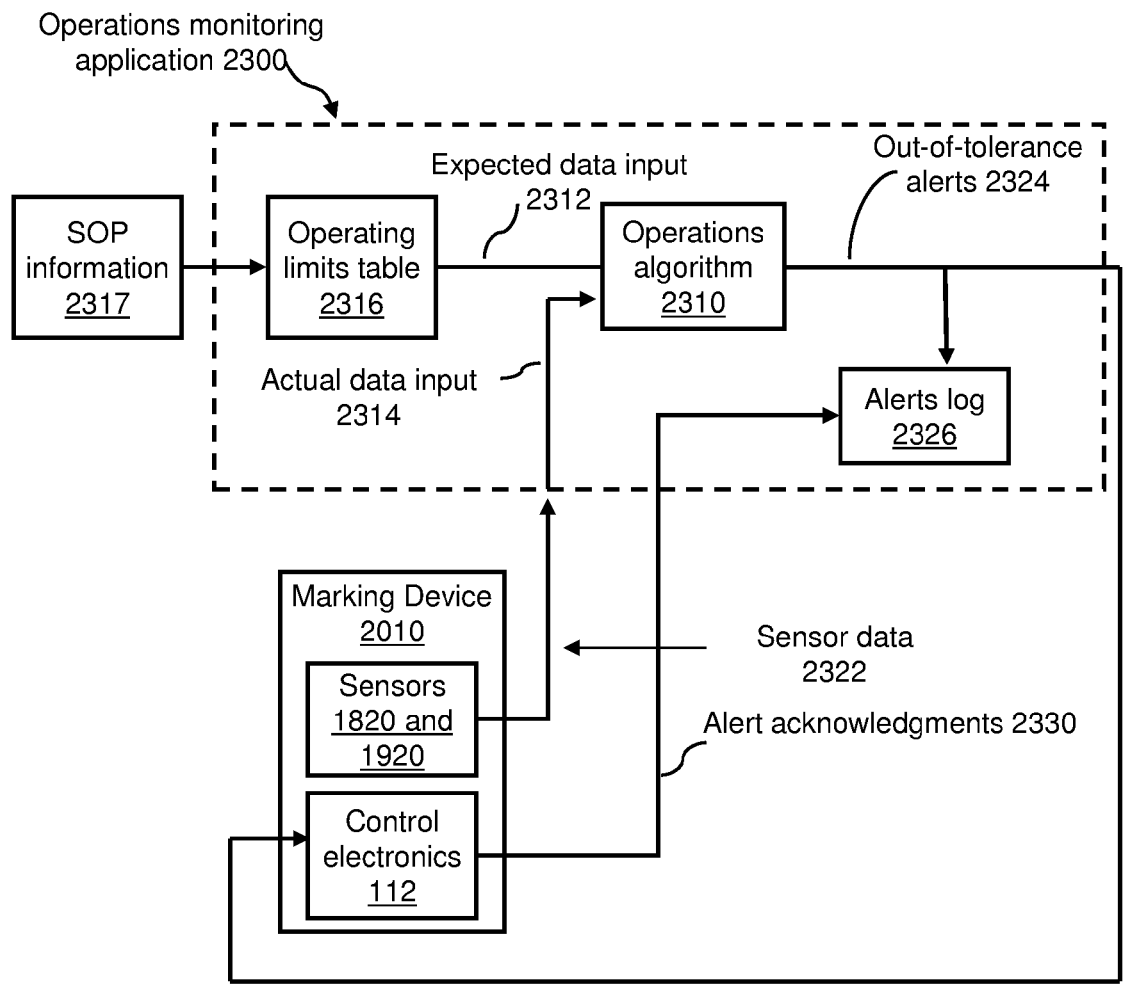
FIG. 25 illustrates a functional block diagram of an example of an operations monitoring application for monitoring the use of locating equipment such as a marking device, according to one embodiment of the present invention.

Referring to FIG. 25, a functional block diagram of an example of an operations monitoring application 2300 for detecting and monitoring the use of a marking device (e.g., marking device 2010 in this non-limiting example) for out-of-tolerance conditions is presented. Operations monitoring application 2300 may include an operations algorithm 2310, which is a software algorithm for determining whether out-of-tolerance environmental and/or operational conditions are present during locate operations and/or whether violations of certain process operational tolerances occur.

To make determinations of out-of-tolerance conditions/occurrences, operations algorithm 2310 may compare information supplied at an expected data input 2312 to information supplied at an actual data input 2314. For example, an operating limits table 2316 may provide the source of information feeding expected data input 2312. An example of the contents of operating limits table 2316 is shown in Table 19 below. It should be appreciated that such a table may include entries for any one or more conditions sensed by a sensor of the marking device, and that those entries shown are non-limiting examples.

TABLE 19

Example contents of operating limits table 2316

| Quantity | Value |
|---|---|
| Maximum ambient temperature | 100 degrees F. |
| Minimum ambient temperature | 0 degrees F. |
| Maximum surface temperature | 150 degrees F. |
| Minimum surface temperature | 40 degrees F. |
| Maximum ambient humidity | 90% |
| Minimum ambient light level | 2.0 volts |
| Minimum spray angle | −60 degrees |
| Maximum spray angle | 60 degrees |
| Minimum spray distance | 3 inches |
| Maximum spray distance | 6 inches |
| Maximum motion rate | 1.5 g |
| Maximum yaw rate | 30 degrees/second |
| Minimum battery strength | 15% |
| Maximum altitude | 1500 meters |
| Difference between actual vs. expected geo-location | 0.2 miles from location on ticket |
| Combination: Maximum spray distance when ambient humidity is ≧95% | 4 inches |
| Combination: Maximum spray distance when ambient temperature is ≦32 degrees F. | 5 inches |

The contents of operating limits table 2316 may be informed by standard operating procedures (SOP) information 2317. In this respect, the contents of operating limits table 2316 may have a dynamic component. That is, in the event that the content of SOP information 2317 is modified and/or that the content of SOP information 2317 varies, for example from one geographic location to another or from one job/work site to another, the content of operating limits table 2316 may automatically vary accordingly. SOP information 2317 may include information, such as, but not limited to, state, local, and/or regional regulations with respect to underground facility locate and marking operations; locate service provider policy information; contractual information; and the like. Further, SOP information 2317 may include information about the current industry-accepted best practices and/or procedures with respect to underground facility locate and marking operations.

One source of information that may be included in SOP information 2317 may be, for example, the information of the Best Practices Version 6.0 document, published in February 2009 by the Common Ground Alliance (CGA) of Alexandria, Va. (www.commongroundalliance.com) incorporated herein by reference in its entirety. The Best Practices Version 6.0 document is a compilation of the current best practices that are performed with respect to preventing damage to underground facilities. Another source of information that may be included in SOP information 2317 may be, for example, the information of the Recommended Marking Guidelines For Underground Utilities as endorsed by the National Utility Locating Contractors Association (NULCA) of North Kansas City, Mo., which is incorporated herein by reference in its entirety.

Generally, the contents of operating limits table 2316 may be variable and dynamic based on one or more factors, such as, but not limited to, dynamic information that may be included in SOP information 2317, best practices that may vary with time of year, best practices that may vary with time of day, best practices that may vary with weather conditions, best practices that may vary with the skill level of the locate technician, and the like.

According to one embodiment, the information supplied to actual data input 2314 is generated and/or collected in real time during marking operations that are performed in the field. For example, the source of information feeding actual data input 2314 may be the marking device 2010, although marking device 2010 is only a non-limiting example, as any of the marking devices described herein may be used. The actual data input 2314 may be fed with the data from one or more of the sensors 1820 and 1920, which data is indicated generally in FIG. 25 as sensor data 2322.

Referring again to Table 19, the values that are contained in operating limits table 2316 may be expressed in terms that correspond to the data format that is returned from sensor devices 1820 and 1920. For example, in one embodiment the light sensor 1826 output may be a voltage, and thus the ambient light level may be expressed in volts in operating limits table 2316. However, the values in table 2316 are not limited to being in any particular format, as discussed above in connection with Tables 15-18.

Operations algorithm 2310 may compare the information of operating limits table 2316 that is present at expected data input 2312 to the information of sensor data 2322 that is present at actual data input 2314 to determine whether out-of-tolerance environmental and/or operational conditions and/or violations of certain process tolerances are present during marking operations. In one example, operations algorithm 2310 may determine whether marking operations are being performed when the ambient temperature is too hot or too cold, or when the ambient humidity is too high. In another example, operations algorithm 2310 may determine whether the spray angle or spray distance detected during marking operations exceed acceptable parameters. In yet another example, operations algorithm 2310 may determine whether marking operations are being performed when it is too dark, based on a comparison of a sensed light level to a light level specification.

When out-of-tolerance environmental and/or operational conditions and/or violations of certain process specifications are detected, operations algorithm 2310 may generate out-of-tolerance alerts 2324, the contents of which may reflect the nature of the out-of-tolerance condition. The alerts may take any suitable form, such as an audible alert (a chime, a ring tone, a verbal message or command (e.g., synthesized speech provided by a text-to-speech synthesizer of the marking device), etc., for example presented via speaker 2138), a visual alert (e.g., a text display presented via display 2126, an indicator light, etc.), a tactile alert (e.g., vibration of a tactile indicator, as described below in connection with FIG. 30), any combination of those options, or any other suitable type of notification.

Any out-of-tolerance alerts 2324 that are generated may be logged in an alerts log 2326 of operations monitoring application 2300. Further, in those embodiments in which the operations monitoring application 2300 is not loaded and running on the marking device itself, any out-of-tolerance alerts 2324 that are generated may be transmitted to the marking device 2010, in which the control electronics 112 may process the out-of-tolerance alerts 2324. For example, control electronics 112 may receive out-of-tolerance alerts 2324 and present the contents thereof to the user of marking device 2010 (e.g., visually and/or audibly via the display 2126 and/or speaker 2138, via a tactile indicator, etc.).

Additionally, control electronics 112 may generate alert acknowledgments 2330 that correspond to out-of-tolerance alerts 2324. Alert acknowledgments 2130 may be returned to operations monitoring application 2300 and logged in alerts log 2326. Alert acknowledgments 2330 provide evidence that out-of-tolerance alerts 2324 have been received and processed at marking device 2010. The contents of alerts log 2326 may be useful to various business applications with respect to marking operations. For example, the contents of alerts log 2326 may be useful to business applications for assessing the quality of marking operations that are performed in the field, assessing the skill and/or competency levels of technicians, and the like. In a specific example, out-of-tolerance alerts 2324 in alerts log 2326 may be monitored in real time by, for example, management personnel of locate companies (e.g., locate contractors, facility owners) regulatory authorities, or other agencies, wherein certain actions in response to out-of-tolerance alerts 2324 may be initiated in real time by the management personnel.

In one implementation, operations monitoring application 2300 may be installed and executing on a computing device (not shown) that is separate from marking device 2010, but in communication with the marking device 2010, such as remote computer 150. In another implementation, operations monitoring application 2300 may be installed (in memory) and executing (via one or more processors) on a marking device itself, such the marking device 2010. In yet another implementation, certain functionality and/or components of operations monitoring application 2300 may be installed and executing fully or in part on the combination of a separate computing device and a marking device (e.g., marking device 2010).

To facilitate operation of a marking device (e.g., marking device 2010) with operations monitoring application 2300 of FIG. 25 when the application 2300 is executed partly or entirely on a separate computing device (e.g., remote computer 150), the marking device may have loaded thereon an operations monitoring client, which may be a counterpart to operations monitoring application 2300. For example, the operations monitoring client may be executed by the processor 118 and may process information of operations monitoring application 2300. Alternatively, the operations monitoring client may comprise a combination of hardware and software and/or firmware, which may be coupled to the marking device to communicate with the processor 118. In such an embodiment, the software and/or firmware may process information of operations monitoring application 2300. Alternatively, as noted above, the control electronics 112 of the marking device may include fully or in part operations monitoring application 2300 itself.

Table 20 shows an example of sensor data 2322 that may be returned from environmental sensors 1820 and operational sensors 1920. Further, sensor data 2322 may include timestamp information, for example from the timing system 128.

TABLE 20

Example sensor data 2322 that may be returned from marking device

| Quantity | Data returned |
|---|---|
| Timestamp | 12-Jul-2008; 09:35:15.2 |
| Ambient temperature | 73 degrees F. |
| Surface temperature | 78 degrees F. |
| Humidity | 31% |
| Illuminance | 1500 lux |
| Altitude | 300 meters |
| Heading (from compass) | 243 degrees |
| Inclination | −40 degrees |
| Acceleration (x-axis) | 0.285 g |
| Acceleration (y-axis) | 0.05 g |
| Acceleration (z-axis) | 0.155 g |
| Yaw rate | 12 degrees/second |
| Proximity | 15 cm |
| Pressure | 65 psi |
| Device health sensor battery strength | 67% |
| Geo-location | N35°43.57518, W078°49.78314 |
| Image captured (Y/N) | Y |
| Audio captured (Y/N) | N |

Non-limiting examples of how the data provided by the environmental sensors 1820 and operational sensors 1920 may be used by the operations monitoring application 2300 are now given. It should be appreciated that numerous other conditions may be detected and acted upon.

1. Readings from ambient temperature sensor 1822 may be used by operations monitoring application 2300 to determine whether marking material is being dispensed while in an out-of-tolerance condition with respect to ambient temperature. If an out-of-tolerance condition with respect to ambient temperature is present, an example of the corresponding out-of-tolerance alert 2324 may be "It is too cold (or too hot) to be dispensing marking material reliably. Please acknowledge."

2. Readings from surface temperature sensor 1823 may be used by operations monitoring application 2300 to determine whether marking material is being dispensed on a surface whose temperature is in an out-of-tolerance condition. If an out-of-tolerance condition with respect to surface temperature is present, an example of the corresponding out-of-tolerance alert 2324 may be "The surface is too cold (or too hot) to be dispensing marking material reliably. Please acknowledge."

3. Readings from humidity sensor 1824 may be used by operations monitoring application 2300 to determine whether marking material is being dispensed while in an out-of-tolerance condition with respect to humidity. If an out-of-tolerance condition with respect to humidity is present, an example of the corresponding out-of-tolerance alert 2324 may be "The humidity is too high to be dispensing marking material reliably. Please acknowledge."

4. Readings from light sensor 1826 may be used by operations monitoring application 2300 to determine whether marking operations are being performed while in an out-of-tolerance condition with respect to lighting. If an out-of-tolerance condition with respect to lighting is present, an example of the corresponding out-of-tolerance alert 2324 may be "There is insufficient light to be performing marking operations effectively and/or safely. Please acknowledge."

5. Readings from location tracking system 130 may be used by operations monitoring application 2300 to determine whether marking operations are being performed in an out-of-tolerance condition with respect to geo-location (e.g., at the wrong location). If an out-of-tolerance condition with respect to the geo-location is present, an example of the corresponding out-of-tolerance alert 2324 may be "It appears that you are at the wrong location. Please suspend operations and check the location information on the locate request ticket. Please acknowledge."

6. Readings from one or more operational temperature sensors 1922 may be used by operations monitoring application 2300 to determine whether a component of the marking device is overheating. An example of the corresponding out-of-tolerance alert 2324 may be "Warning. The marking device is overheating. Please turn off the device and allow it to cool. Please acknowledge."

7. Readings from compass 1924 may be used by operations monitoring application 2300 to determine whether the heading of the marking device is out-of-tolerance. If an out-of-tolerance condition with respect to heading is present, an example of the corresponding out-of-tolerance alert 2324 may be "You appear to be heading in the wrong direction. Please adjust course. Please acknowledge."

8. Readings from inclinometer 1926 may be used by operations monitoring application 2300 to determine whether the marking device is being used in an out-of-tolerance condition with respect to marking material spray angle. If an out-of-tolerance condition with respect to marking material spray angle is present, an example of the corresponding out-of-tolerance alert 2324 may be "Spraying angle is too shallow (or too steep). Please adjust the spraying angle to be about perpendicular to target surface. Please acknowledge."

9. Readings from accelerometer 1928 may be used by operations monitoring application 2300 to determine whether the marking device is being used in an out-of-tolerance condition with respect to the rate of movement and/or motion of the marking device during the marking operations. If an out-of-tolerance condition with respect to the motion is present, an example of the corresponding out-of-tolerance alert 2324 may be "Spraying motion is too rapid or too erratic. Please slow down or smooth out the spraying motion. Please acknowledge."

10. Readings from yaw rate sensor 1929 may be used by operations monitoring application 2300 to determine whether the marking device is being used in an out-of-tolerance condition with respect to yaw rate. If an out-of-tolerance condition with respect to yaw rate of the marking device is present, an example of the corresponding out-of-tolerance alert 2324 may be "You are twisting the device too quickly. Please acknowledge."

11. Readings from proximity sensor 1930 may be used by operations monitoring application 2300 to determine whether the marking device is being used in an out-of-tolerance condition with respect to the marking material spray distance. If an out-of-tolerance condition with respect to marking material spray distance is present, an example of the corresponding out-of-tolerance alert 2324 may be "The tip of the marking device is too close (or too far) from the target surface. Please adjust to between 3 and 6 inches from surface. Please acknowledge."

12. Readings from pressure sensor 1931 may be used by operations monitoring application 2300 to determine whether the technician is applying sufficient pressure to an actuation mechanism (e.g., trigger) of the marking device. If an out-of-tolerance condition with respect to applied pressure is present, an example of the corresponding out-of-tolerance alert 2324 may be "You are not applying sufficient pressure to the trigger. Please acknowledge."

13. In one embodiment the device health sensor 1932 may monitor a battery level of the marking device. If an out-of-tolerance condition with respect to the battery level is detected by operations monitoring application 2300, an example of the corresponding out-of-tolerance alert 2324 may be "The battery of the marking device is too weak to perform locate operations reliably. Please replace or recharge the battery as soon as possible. Please acknowledge."

14. Audio provided by audio recorder 1830 may be used to monitor whether a marking dispenser is operating appropriately. For example, if an actuation of the marking device's actuation system is detected but no sound is present from the audio recorder, an error in the operation of the marking dispenser may be indicated. An example of a corresponding alert which may be generated is "The marking dispenser is empty or not functioning. Please investigate. Please acknowledge."

Other conditions and events that may arise with the operations monitoring application 2300 and which may trigger an alert or notification to the technician include, but are not limited to, the following:

(a) User Input Errors—Action taken by the user, or suggested by usage pattern is invalid for the current device configuration;

(b) System Malfunction Errors—Marking device encountered a problem while processing valid data, and was unsuccessful in automatically correcting this problem;

(c) Storage Errors—Standard data cache of the marking device or extended storage experiences some error in storing the current data, such as insufficient storage space or some other storage error;

(d) Power Errors—Marking device has either exhausted the battery supply (e.g., power source 114), or an unrecoverable battery/power error was encountered;

(e) Network Errors—The network component (e.g., communication interface 124) has experienced an unrecoverable error;

(f) Geographic Location Errors—The GPS component (e.g., location tracking system 130) has experienced an unrecoverable error;

(g) Marking Material Detection Errors—The RFID component of marking material detection mechanism 132 has experienced an unrecoverable error;

(h) Actuator Errors—The actuator component (e.g., actuation system 120) has experienced an unrecoverable error;

(i) Synchronization Errors—Marking device encountered a problem while synchronizing with the host server (e.g., computer 150) and was unsuccessful in automatically correcting this problem;

(j) Data Accessibility Errors—The requested data cannot be retrieved due to data corruption, cache locking, or missing medium;

(k) User Input Required—Operator response is required prior to continuing;

(l) Network Connectivity—The network component (e.g., communication interface 124) has detected a change in coverage (coverage loss, overage gain, etc);

(m) Geographic Position Accuracy—The GPS component (e.g., location tracking system 130) has detected a change in overall accuracy (gain or loss of satellite, WAAS support, etc); and (n) Paint Detection—The RFID component of marking material detection mechanism 132 has detected a change.

In the examples above, alert acknowledgments 2330 in response to out-of-tolerance alerts 2324 may take various forms. In one example, the technician may acknowledge using the user interface 126, for example by pushing a button, flipping a switch, or selecting a menu option, depending on the type of user interface. Different user inputs (buttons, toggles, menu selections, etc.) may have different meanings with respect to providing alert acknowledgments 2330. Table 21 below shows an example of alert acknowledgments 2330, wherein, as a non-limiting example, certain keys of a user interface of the marking device have certain meanings.

TABLE 21

Example alert acknowledgments 2330

| Key | Meaning |
| --- | --- |
| # | Indicates an acknowledgement that the alert is received |
| * | Indicates an acknowledgement that the alert is received and that corrective action is being or has been taken |
| @ | Indicates an acknowledgement that the alert is received and that marking operations are continuing regardless |
| $ | Indicates an acknowledgement that the alert is received and that marking operations are (temporarily) suspended |

In another example, a dropdown menu and/or a set of icons that include the various types of alert acknowledgments 2330, such as shown in Table 21, may be presented on the display of the marking device. The user may then select the desired type of alert acknowledgment 2330 from the dropdown menu and/or icons.

Also, as mentioned above, out-of-tolerance conditions and other conditions detected by the environmental and/or operational sensors may be logged, for example into alerts log 2326, irrespective of whether an alert is provided to the technician. Thus, for any of the above-described examples in which an alert may be generated, a log of the detected condition may also or alternatively be made. Also, other conditions than those described above may be logged.

Figure 26:
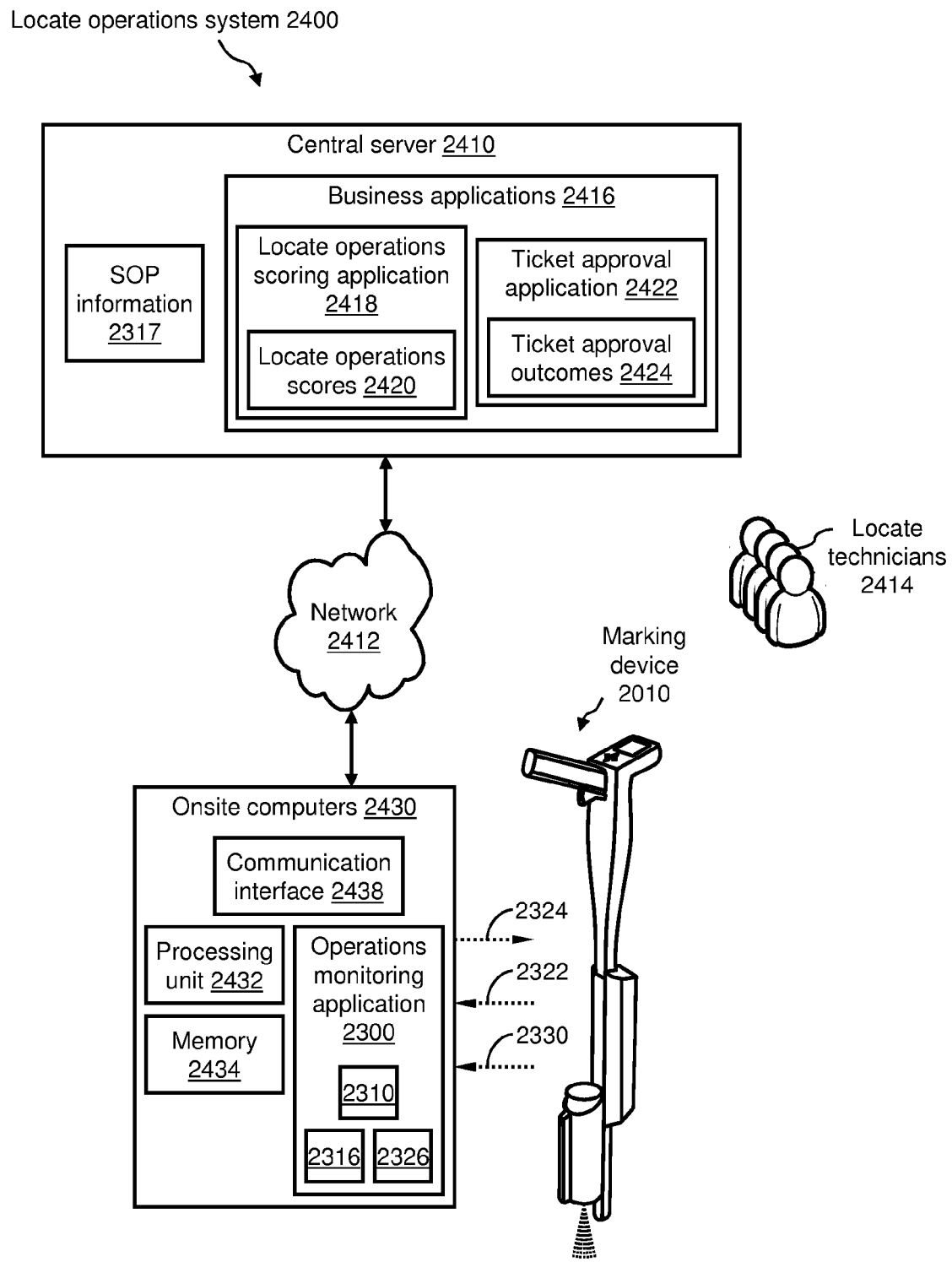
FIG. 26 illustrates a functional block diagram of an example of a locate operations system including the operations monitoring application of FIG. 25, according to one embodiment of the present invention.

FIG. 26 is a functional block diagram of an example of a locate operations system 2400 that includes operations monitoring application 2300 of FIG. 25 and the marking device 2010 of FIG. 19. Again, other marking devices as described herein may be used, and marking device 2010 is described only for purposes of illustration. Locate operations system 2400 may include a central server 2410, which is maintained and operated by, for example, a locate company, a facilities owner, a regulatory authority, or other agency (not shown). Central server 2410 may be any local or centralized computing device that is capable of hosting and facilitating execution of one or more applications. In implementation, central server 2410 may be a networked application server and/or web server that is connected to a network 2412. Examples of personnel that may be associated with central server 2410 include locate technicians 2414.

Residing on central server 2410 may be business applications 2416, which may be any business applications that may be useful with respect to locate and marking operations. In one example, business applications 2416 may include a locate and marking operations scoring application 2418 that processes information about locate operations and generates locate operations scores 2420 that may indicate the degree of quality of individual locate operations. Additionally, SOP information 2317 may reside at central server 2410 and may be accessed by operations monitoring application 2300 and/or any entity of locate operations system 2400 via network 2412.

For example, locate operations scoring application 2418 may be based on various embodiments of a quality assessment application, as well as any one or more of the scoring criteria and/or exemplary metrics disclosed in connection with such quality assessment applications, as set forth in U.S. Non-provisional application Ser. No. 12/493,109, filed Jun. 26, 2009, entitled "METHODS AND APPARATUS FOR QUALITY ASSESSMENT OF A FIELD SERVICE OPERATION," and published as U.S. Patent Publication 2009-0327024-A1, which application is hereby incorporated herein by reference in its entirety. In particular, a quality assessment application may be configured to receive a variety of information germane to locate and marking operations, and compare such information to expected values or benchmarks (metrics) based on various criteria. A scoring algorithm implemented as part of some implementations of a quality assessment application may compare various input information (e.g., "field information," as obtained from one or more pieces of locating equipment such as a marking device) to the expected values or benchmarks to generate a quality assessment score in an automated fashion.

In another example, business applications 2416 may include a ticket approval application 2422 that processes information about locate and marking operations and generates ticket approval outcomes 2424 that again may indicate the degree of quality of individual locate and marking operations. For example, ticket approval application 2422 may be based on the ticket approval system that is described in U.S. Non-provisional application Ser. No. 12/204,454, filed Sep. 4, 2008, entitled "TICKET APPROVAL SYSTEM FOR AND METHOD OF PERFORMING QUALITY CONTROL IN FIELD SERVICE APPLICATIONS," and published as U.S. Patent Publication 2009-0204466-A1, which application is hereby incorporated herein by reference in its entirety. This application describes a ticket approval system for and method of performing quality control (QC) in field service applications. The ticket approval system may include a work management server. The work management server may include a ticket approval software application and a database for storing digital ticket information, such as field service site identification information, manifest information, and digital images of field service activities. A method of performing QC may include, but is not limited to, the field technician completing the ticket and providing data/images, an approver viewing and selecting a certain field technician and ticket for quality control review, the approver reviewing data/images of the selected ticket, the approver approving the ticket, the approver tagging the ticket for QC, a QC approver processing QC referrals, the QC approver routing the ticket to a QC technician, the QC technician completing the QC tasks and updating the data/images of the selected ticket, the approver tagging the ticket for coaching, the approver processing coaching referrals, and the approver performing coaching tasks.

Network 2412 may be, for example, any local area network (LAN) and/or wide area network (WAN) for connecting to the Internet. In one non-limiting embodiment, network 2412 provides the communication link between any and/or all entities of locate operations system 2400. For example, network 2412 provides the communication network by which information may be exchanged between central server 2410, one or more onsite computers 2430, and/or locating equipment (e.g., marking device 2010) that are used by locate technicians 2414 in the field.

Onsite computers 2430 may be any computing devices that are capable of processing and executing program instructions. Onsite computers 2430 may be used by locate technicians 2414 that are performing locate and marking operations in the field. For example, each onsite computer 2430 may be a portable computer, a personal computer, a tablet device, a personal digital assistant (PDA), a cellular radiotelephone, a mobile computing device, a touch-screen device, a touchpad device, or generally any device including, or connected to, a processor and a user interface. Preferably, each onsite computer 2430 is a portable computing device, such as laptop computer or tablet device. Onsite computers 2430 may be used by locate technicians 2414 to process locate request tickets (not shown) and to perform locate and marking operations accordingly.

Additionally, operations monitoring application 2300 may be installed on onsite computers 2430. For example, operations monitoring application 2300 may be used to process information received from or transmitted to marking device 2010. Each onsite computer 2430 may include a processing unit 2432, which may be any standard controller or microprocessor device that is capable of executing program instructions, such as those from operations monitoring application 2300. Each onsite computer 2430 may also include a quantity of memory 2434, which may be any data storage mechanism for storing any information that is processed locally at onsite computer 2430. Processing unit 2432 and memory 2434 may be used for managing the overall operations of onsite computer 2430.

Further, each onsite computer 2430 may include a communication interface 2438 for connecting to network 2412 and/or for communication with locating equipment. For example, communication interface 2438 may be any wired and/or wireless communication interface by which information may be exchanged between any entities of locate operations system 2400.

Operations monitoring application 2300 is used in locate operations system 2400 for detecting and monitoring the use of locating equipment (e.g., marking device 2010) in out-of-tolerance conditions, as described above. For example, operations algorithm 2310 of operations monitoring application 2300 determines whether out-of-tolerance environmental and/or operational conditions are present during locate operations and/or whether violations of certain process tolerances are present during locate operations. Optionally, operations monitoring application 2300 may be used to automatically enable and disable (either electrically, mechanically, or both) locating equipment in the field based on certain out-of-tolerance conditions being present.

Further, locate operations system 2400 is not limited to the types and numbers of entities that are shown in FIG. 26. Any types and numbers of entities that may be useful in underground facilities locate applications may be included in locate operations system 2400. More details of a method of detecting and monitoring the use of locating equipment for out-of-tolerance conditions by use of locate operations system 2400 are described with reference to FIG. 27.

Figure 27:
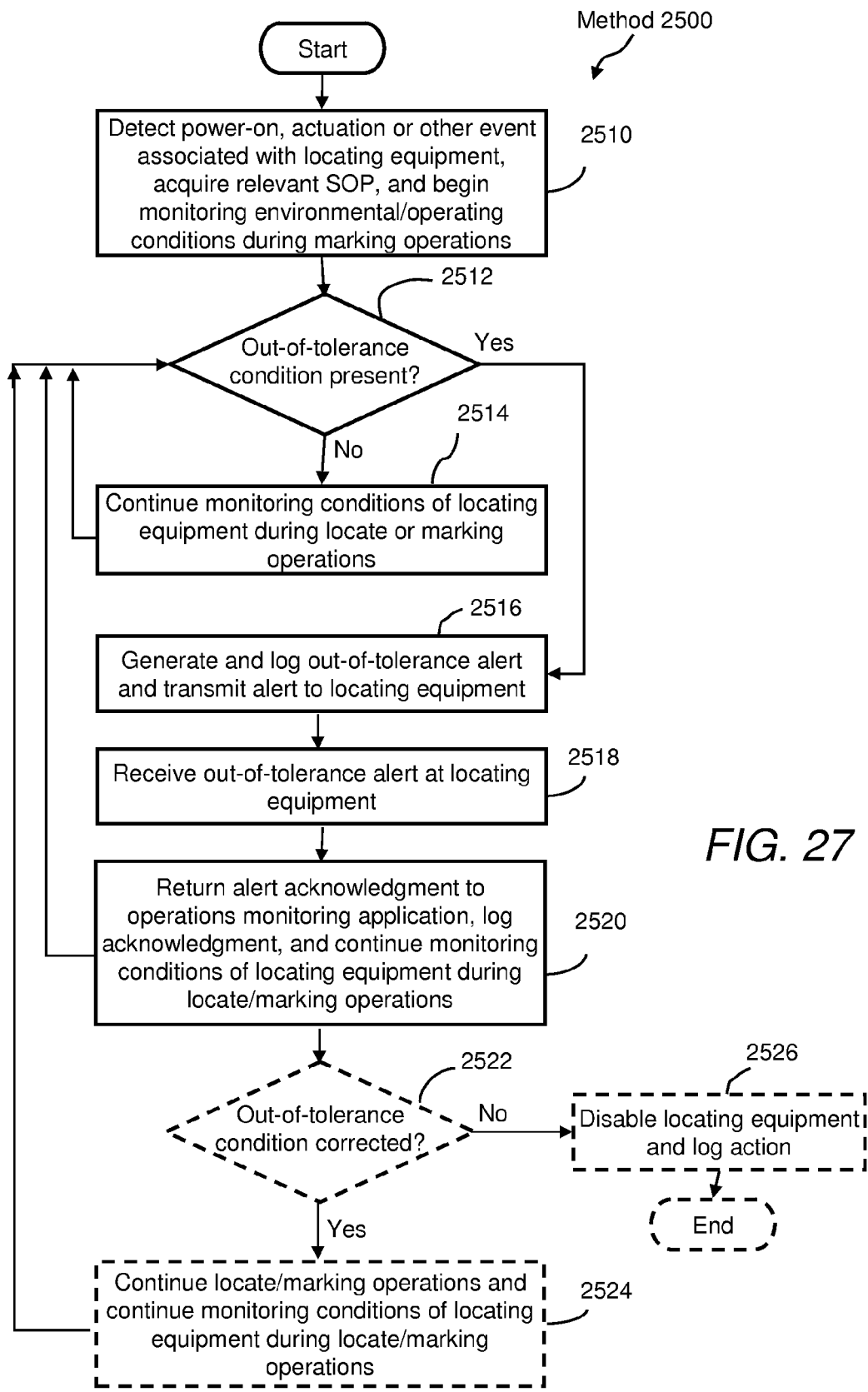
FIG. 27 illustrates a method of operation of a locate operations system including an operations monitoring application, according to one embodiment of the present invention.

FIG. 27 illustrates a flow diagram of an example of a method 2500 of detecting and monitoring the use of locating equipment, such as the various marking devices described herein, for out-of-tolerance conditions utilizing, for example, locate operations system 2400 of FIG. 26. As noted above, the method may be implemented on any suitable combination of hardware, such as those items shown in FIG. 26, or entirely on the marking device itself. Method 2500 may include, but is not limited to, the following steps, which may be implemented in any order.

At step 2510, onsite computer 2430 or the marking device itself may detect powering up (e.g., a power on state), and/or one more specific events (e.g., docking/de-docking of a marking device, one or more actuations, error conditions, technician interaction with a user interface, etc.) associated with a marking device, such as marking device 2010 or 2100. Additionally, the relevant SOP information is acquired. For example, using location tracking system 130 of marking device 2010, the geo-location of the job/work site may be determined. Based on this geo-location information, operations monitoring application 2300 automatically queries SOP information 2317 at central server 2410 for the SOP information of the regulatory body that corresponds to the location of the work site, which is used to inform operating limits table 2316 of operations monitoring application 2300.

Subsequently, operations monitoring application 2300 at onsite computer 2430 may begin monitoring the environmental and/or operating conditions associated with use of the marking device. For example, operations algorithm 2310 of operations monitoring application 2300 begins monitoring sensor data 2322 that is returned from marking device 2010 and compares the contents of sensor data 2322 to information in operating limits table 2316.

At decision step 2512, operations algorithm 2310 of operations monitoring application 2300 determines whether any out-of-tolerance conditions are present. For example, if any one of the following out-of-tolerance conditions is present, method 2500 may proceed to step 2516. However, if none of the following out-of-tolerance conditions are present, method 2500 may proceed to step 2514. The following out-of-tolerance conditions are exemplary only and not meant to be limiting.

1. Readings from ambient temperature sensor 1822 may indicate an out-of-tolerance condition with respect to ambient temperature when compared against, for example, the maximum ambient temperature and/or minimum ambient temperature specifications of operating limits table 2316 (see, for example, Table 19).
2. Readings from surface temperature sensor 1823 may indicate an out-of-tolerance condition with respect to surface temperature when compared against, for example, the maximum surface temperature and/or minimum surface temperature specifications of operating limits table 2316 (see, for example, Table 19).
3. Readings from humidity sensor 1824 may indicate an out-of-tolerance condition with respect to humidity when compared against, for example, the maximum ambient humidity specification of operating limits table 2316 (see, for example, Table 19).
4. Readings from light sensor 1826 may indicate an out-of-tolerance condition with respect to lighting when compared against, for example, the minimum ambient light level specification of operating limits table 2316 (see, for example, Table 19).
5. Readings from compass 1924 may indicate an out-of-tolerance conditions with respect to heading when compared against, for example, an expected value.
6. Readings from inclinometer 1926 may indicate an out-of-tolerance condition with respect to marking material spray angle when compared against, for example, the minimum spray angle and/or maximum spray angle specifications of operating limits table 2316 (see, for example, Table 19).
7. Readings from accelerometer 1928 may indicate an out-of-tolerance condition with respect to the rate of movement and/or motion of the marking device when compared against, for example, the maximum motion rate specification of operating limits table 2316 (see, for example, Table 19).
8. Readings from yaw rate sensor 1929 may indicate an out-of-tolerance condition with respect to yaw rate when compared against, for example, the maximum yaw rate specification of operating limits table 2316 (see, for example, Table 19).
9. Readings from proximity sensor 1930 may indicate an out-of-tolerance condition with respect to the marking material spray distance when compared against, for example, the minimum spray distance and/or maximum spray distance specifications of operating limits table 2316 (see, for example, Table 19).
10. Information from the device health sensor 1932 that is monitoring the battery of the marking device may indicate an out-of-tolerance condition with respect to battery strength when compared against, for example, the minimum battery strength specification of operating limits table 2316 (see, for example, Table 19).

At step 2514, operations monitoring application 2300 continues to monitor the conditions (e.g., environmental and/or operating) of the marking device during marking operations. For example, operations monitoring application 2300 at onsite computer 2430 continues to monitor the conditions of the marking device 2010 during marking operations by comparing the contents of sensor data 2322 to information in operating limits table 2316. At the conclusion of this step, method 2500 may, for example, return to step 2512.

At step 2516, operations monitoring application 2300 generates the corresponding out-of-tolerance alert 2324, logs the out-of-tolerance alert 2324 in alerts log 2326, and transmits the out-of-tolerance alert 2324 to the locating equipment, such as to marking device 2010, in those embodiments in which the method is not entirely implemented on the marking device itself. By way of example, the following out-of-tolerance alerts 2324 correspond respectively to the example out-of-tolerance conditions of step 2512. The following out-of-tolerance alerts 2324 are exemplary only and not meant to be limiting.
1. "The ambient temperature is too cold (or too hot) to be dispensing marking material reliably. Please acknowledge."
2. "The surface temperature is too cold (or too hot) to be dispensing marking material reliably. Please acknowledge."
3. "The humidity it too high to be dispensing marking material reliably. Please acknowledge."
4. "There is insufficient light to be performing marking operations effectively and/or safely. Please acknowledge."
5. "You appear to be heading the wrong direction. Please adjust course. Please acknowledge."
6. "Spraying angle is too shallow (or too steep). Please adjust the spraying angle to be about perpendicular to target surface. Please acknowledge."
7. "Spraying motion is too rapid or too erratic. Please slow down or smooth out the spraying motion. Please acknowledge."
8. "You are twisting the device too quickly. Please acknowledge."
9. "The tip of the marking device is too close (or too far) from the target surface. Please adjust to between 3 and 6 inches from surface. Please acknowledge."
10. "The battery of the marking device is too weak to perform locate operations reliably. Please replace or recharge the battery as soon as possible. Please acknowledge."

At step 2518, one or more out-of-tolerance alerts 2324 are received at the locating equipment, such as marking device 2010, in those embodiments in which alerts are not generated on the marking device itself. The out-of-tolerance alerts 2324 may be presented to the user in, for example, text form via a display of the marking device, audible form (e.g., synthesized speech provided by a text-to-speech synthesizer of the marking device) via a speaker of the marking device, or in any other suitable manner.

At step 2520, a certain alert acknowledgment 2330 may be returned to operations monitoring application 2300. For example, the user, such as a certain locate technician 2414 may press a certain key of the user interface of the marking device and initiate the desired alert acknowledgment 2330, such as those shown above in Table 21. Once the alert acknowledgment 2330 is received at operations monitoring application 2300, it may be associated with its originating out-of-tolerance alert 2324 and logged in alerts log 2326. Subsequently, operations monitoring application 2300 continues to monitor the operating conditions of the locating equipment, such as marking device 2010. At the conclusion of this step, method 2500 may, for example, return to step 2512 and may optionally proceed to step 2522.

Optionally, method 2500 may include steps to disable locating equipment until or unless a certain out-of-tolerance condition is corrected. For example, method 2500 may optionally include the following steps.

At optional decision step 2522, certain out-of-tolerance conditions may carry such importance that the suspension of marking operations is mandated (e.g., disable actuations so as to impede dispensing of markers). One such out-of-tolerance condition may be the out-of-tolerance condition with respect to temperature. Another such out-of-tolerance condition may be the out-of-tolerance condition with respect to humidity. Yet another such out-of-tolerance condition may be the out-of-tolerance condition with respect to lighting. Still another such out-of-tolerance condition may be the out-of-tolerance condition with respect to geo-location. Other out-of-tolerance conditions may also be sufficiently important to mandate suspending marking operations, and those examples listed are non-limiting. In these examples, operations monitoring application 2300 may wait a certain amount of time (e.g., 1 minute) from the initial detection of the out-of-tolerance conditions and again acquire sensor data 2322 to determine whether the out-of-tolerance condition is still present or has been corrected. If the out-of-tolerance condition has been corrected, method 2500 may proceed to step 2524. However, if the out-of-tolerance condition has not been corrected, method 2500 may proceed to step 2526.

At optional step 2524, the locate technician 2414 continues to perform marking operations and operations monitoring application 2300 continues to monitor the conditions of the marking device. At the conclusion of this step, method 2500 may, for example, return to step 2512.

At optional step 2526, the marking device may be disabled. For example, actuation system 120 of marking device 2010 may be disabled so as to impede dispensing of marking material. The action to disable may be logged in alerts log 2326.

At any time during the steps of method 2500, the contents of alerts log 2326 may be processed by business applications 2416. In one example, alerts log 2326 may be processed by locate operations scoring application 2418 and/or ticket approval application 2422 for assessing the quality of locate and marking operations that are performed in the field, assessing the skill and/or competency levels of locate technicians, and the like.

While FIGS. 25-27 illustrate some non-limiting examples of manners in which data provided by environmental sensors and/or operational sensors of a marking device may be used, other uses are also possible. For example, the data from environmental sensors 1820 and/or operational sensors 1920 may be used to trigger alerts or notifications to a technician irrespective of whether the sensed condition is outside tolerances. For example, in some instances there may not be a specific tolerance for a given environmental or operational condition, and yet an alert to the technician may be generated for the purpose of making the technician aware of whatever value the sensed condition has taken. Thus, the generation of alerts/notifications/warnings based on sensed environmental and operational conditions is not limited to those instances in which the sensed condition takes any particular value(s). Also, as previously explained, the notification signal may take any suitable form, such as an audible alert (a chime, a ring tone, a verbal message or command (e.g., synthesized speech provided by a text-to-speech synthesizer of the marking device), etc.), a visual alert (e.g., a text display (for example, in those embodiments in which the marking device includes a display), an indicator light, etc.), a tactile indication, any combination of those options, or any other suitable type of notification.

Also, it should be appreciated that information from one or more of the environmental sensors 1820 and/or operational sensors 1920 may be used more generally to control or alter operation of the marking device. For example, one or more components of the marking device 2010 or 2100 may be activated, enabled, or disabled, or the functionality thereof controlled or altered in some manner, in response to one or more of the environmental sensors 1820 and/or operational sensors 1920 providing environmental information and/or operational information indicative that such control should be exhibited. Such activation, enablement, and/or disablement may be electrical in nature (e.g., providing power or an enable signal, triggering operation of a sensor, etc.), mechanical in nature (e.g., causing a locking mechanism to be engaged on the actuation system) or both. For example, if the surface temperature sensed by surface temperature sensor 1823 is outside of acceptable tolerances for dispensing of a marking material (such as paint), the actuation system 120 may be disabled, thus preventing dispensing of a marking material. If the sensed inclination of the marking device as sensed by inclinometer 1926 is unsuitable for dispensing of a marking material (such as paint), the actuation system 120 may be disabled, thus preventing dispensing of the marking material. Similarly, if the acceleration as sensed by accelerometer 1928 is out-of-tolerance with accepted practices, the actuation system 120 may be disabled. If a sensed condition is out-of-tolerance, the operation of one of the environmental and/or operational sensors may be altered, for example by altering the sampling rate to collect more or less data. According to one embodiment, the sampling rate of a location tracking system of the marking device may be increased in response to an out-of-tolerance heading detected by the compass of the marking device. According to another embodiment, the sampling rate of the location tracking system may be increased in response to the location tracking system detecting an out-of-tolerance location. Other control actions are also possible, and the aspects described herein relating to controlling the marking device in response to sensing environmental and/or operational conditions are not limited in the types of actions that may be taken or the sensed conditions which may trigger action/alteration.

Furthermore, the determination of whether a condition or multiple conditions are out-of-tolerance, whether to generate an alert or notification to a technician, or whether to control/alter some functionality of the marking device based at least in part on environmental and/or operational information, may be made in any suitable manner. For instance, as illustrated in some of the foregoing examples, such a determination may be made by comparison of a single value from a sensor to an expected or target value. Alternatively, outputs from the environmental sensors and/or operational sensors may be monitored for changes (e.g., any change, or by some predetermined amount), rather than for a particular single value. For example, a change in temperature, or a change in light, may initiate generation of an alert, rather than a single temperature or light value.

In addition, information provided by one or more of the environmental sensors and/or operational sensors may be monitored and analyzed to detect patterns. For example, information provided by the operational sensors may be used to formulate and assess patterns of operation of a particular technician, which may be thought of as technician "signatures." As an example, a particular technician may have a characteristic motion when performing a marking operation, such as painting an arrow on the ground, or may perform the operation at a characteristic speed. Assessing information provided by the one or more accelerometers 1928, for example, may allow for determination of the unique characteristic. Once determined, information from the operational sensors on future jobs may allow for identification of the technician based on the unique characteristic, and may also be used to assess whether the technician is operating in his/her normal manner or whether he/she is deviating from his/her usual operation, which may suggest that the technician was doing something out of the ordinary, and which accordingly may cause generation of an alert/notification and/or alteration of the marking device. Such information, therefore, may be used for quality control and/or for training purposes of technicians. Similarly, such operating information from multiple technicians may be used to develop standard operating guidelines or protocols.

It should be appreciated from the foregoing discussion that information provided by two or more of the environmental sensors may be used in combination, for example to assess the environmental conditions, to interact with the technician (e.g., generate an alert), and/or to control/alter operation of the marking device (e.g., disable or enable actuation of the marking device). As a non-limiting example, the sensed ambient temperature in combination with the sensed humidity may provide information about whether a particular form of precipitation is present (e.g., snow, rain, etc.), in response to which an alert may be generated and/or one or more components of the marking device may be enabled or disabled (e.g., the actuation system may be disabled). Non-limiting examples of useful combinations of environmentally sensed conditions include: ambient temperature+humidity; surface temperature+humidity; ambient temperature+surface temperature; ambient temperature+light sensor; light+image capture; light+audio capture; and ambient temperature+humidity+light. However, it should be appreciated that other combinations are also possible.

It should also be appreciated from the foregoing discussion that information provided by two or more of the operational sensors may be used in combination, for example to assess the operational conditions of a marking device, to interact with the technician, to assess, determine and/or analyze technician "signatures" associated with device use/manipulation, and/or to control or alter operation of the marking device (e.g., to disable actuation of the marking device, enable actuation of the marking device, etc.). Non-limiting examples of useful combinations of sensed operational conditions which may be used for any of the purposes described above include: acceleration of marking device+proximity of marking device to surface; proximity of marking device to surface+inclination of marking device; acceleration+heading; geo-location+heading+acceleration; and geo-location+acceleration+inclination. However, it should be appreciated that other combinations are also possible.

Furthermore, according to one embodiment, information provided by one or more environmental sensors may be used in combination with information provided by one or more operational sensors, for example to assess the quality of the marking operation, to interact with the technician, to assess, determine and/or analyze technician "signatures" associated with device use/manipulation, and/or to control or alter operation of the marking device (e.g., disable or enable actuation of the marking device). For example, when dispensing marking material, the angle at which the marking dispenser may be suitably held may depend on the surface temperature on which the marking material is being dispensed. Thus, information from an inclinometer and a surface temperature sensor of the marking device may be considered in combination to assess whether a technician is performing a marking operation appropriately, and may trigger any of the actions described above. Other combinations of sensor information may also be useful depending on a particular application.

IX. GROUP MODE AND SOLO MODE

As previously explained, the marking devices described herein may be used in different modes, examples of which include marking mode and landmark mode. In addition, marking devices according to one aspect of the present invention may be operated in a so-called "solo mode" or a so-called "group mode."

For some marking operations, a single technician may be present at the jobsite and may complete the marking operation. Thus, any marking data collected relating to the job may be solely from the technician's marking device and may not need to be combined with marking data from any other marking devices. In such situations, the marking device may be operated as an individual, independent marking device in solo mode. As described above, data collected by the marking device may be stored locally and/or transmitted to a host server, such as remote computer 150.

For certain types of underground facility locate operations, multiple locate technicians may be working on a same locate ticket simultaneously. When this occurs, it may be advantageous for some or all of the marking devices that are used during performance of the ticketed job to consolidate data, such as by providing data to one of the marking devices or to a host server. This may be accomplished through the use of a group mode of operation of the marking devices. In group mode, a marking device may act as a "worker" device, and may not be capable of transmitting its collected marking data to a remote computer. For example, the wireless transmission capability of the marking device may be disabled in group mode. Rather, the marking data may be cached in local memory 122 of the marking device, or may be transmitted to another marking device, which may act as a "leader" device, receiving the collected marking data from the other marking devices used for the marking operation. The leader marking device may then transmit the collected marking information to a remote computer, or may handle the collected information in any suitable manner.

Selection of solo mode and group mode may be accomplished in any suitable manner. For example, selection between these two modes may be facilitated by any suitable combination of hardware and/or software on the marking device. For example, the marking device may include mode controller software for selecting the operating mode of the marking device. According to one embodiment, the user interface of the marking device may include a toggle switch for toggling between solo mode and group mode. Alternatively, the marking device may present the technician with a menu on a graphical display of user interface 122, from which the technician may choose the desired mode. Other schemes for allowing selection of solo mode and group mode are also possible.

X. ENHANCEMENTS TO DETERMINATION OF DISPENSING LOCATION OF MARKING MATERIAL

As mentioned previously, in some situations it may be desirable to know the location of any marking material dispensed by a marking device. According to some embodiments, the location of any dispensed marking material may be approximated by the location of virtually any point on the marking device itself (e.g., by acquiring geo-location information from a location tracking system coupled to the marking device).

In one exemplary embodiment, the accuracy of the dispensing location of marking material may be improved by selecting a point on the marking device sufficiently close to the point from which marking material is dispensed. For example, in some implementations, the marking material may be dispensed near the tip of the marking device, such that determination of the location of the tip of the marking device may provide a sufficiently accurate approximation of the location of the dispensed marking material, and therefore a determination of the resulting marking pattern (e.g., dots, lines, arrows, lettering, etc.). In addition, determining the motion of the tip of the marking device may allow for assessment of technician manipulation of the marking device, which may be used for quality control, training purposes, and standard setting, among other things.

Thus, according to another aspect of the present invention, methods and apparatus are provided for determining the location of the tip of a marking device. However, it should be appreciated that the tip of the marking device is a non-limiting example of a specific point of a marking device for which it may be desirable to know the location, as, for example, other portions of the marking device may be closer to the point from which marking material may be dispensed depending on the configuration of the marking device. The methods and apparatus described herein may be applied equally well to the determination of any point of interest on the marking device.

One approach for determining the location of the tip of the marking device (e.g., tip 2302 shown in FIG. 23), or any other point of interest on the marking device, is to place a location tracking system at that point. Thus, according to one embodiment, a marking device, such as any of the marking devices described previously herein, or any other marking device, may include a location tracking system 130 as discussed in other embodiments (e.g., a GPS receiver), wherein the location tracking system is disposed at or sufficiently near the tip of the marking device, allowing for determination of the location of the tip of the marking device. Thus, the location tracking system 130 may provide the geo-location of the tip of the marking device, which, as mentioned, may be useful for at least two reasons. First, because of the close proximity of the location tracking system 130 to the point from which marking material is dispensed, the geo-location information provided may be used as an indicator of the location of any dispensed marking material. Secondly, the geo-location information provided by the location tracking system may be used to record the motion of the tip of the marking device, which, as mentioned, may be used for various purposes, including detection of out-of-tolerance operation of the marking device, determination of operating patterns of technicians, etc.

While the above-described embodiment provides a location tracking system positioned at the point of interest on the marking device, such positioning of a location tracking system may not always be possible or advantageous. For example, as explained previously herein, in some embodiments the operation of the location tracking system may be facilitated by positioning the location tracking system toward the top of the marking device, for example if the location tracking system is a GPS receiver. However, as mentioned, it may be desirable in some embodiments to determine the location of the tip of the marking device, or any other point of interest of the marking device, which in some situations will not correspond to the top of the marking device. Thus, according to one embodiment, methods and apparatus are provided for determining the location of a point of interest of a marking device when a location tracking system is located at a different point on the marking device. For simplicity of explanation, the following examples will be discussed assuming that a location tracking system is located near the top of the marking device and that the point of interest of the marking device is the tip of the marking device. It should be appreciated that the described apparatus and techniques may apply equally well to other positions of the location tracking system and points of interest on the marking device.

Figure 28:
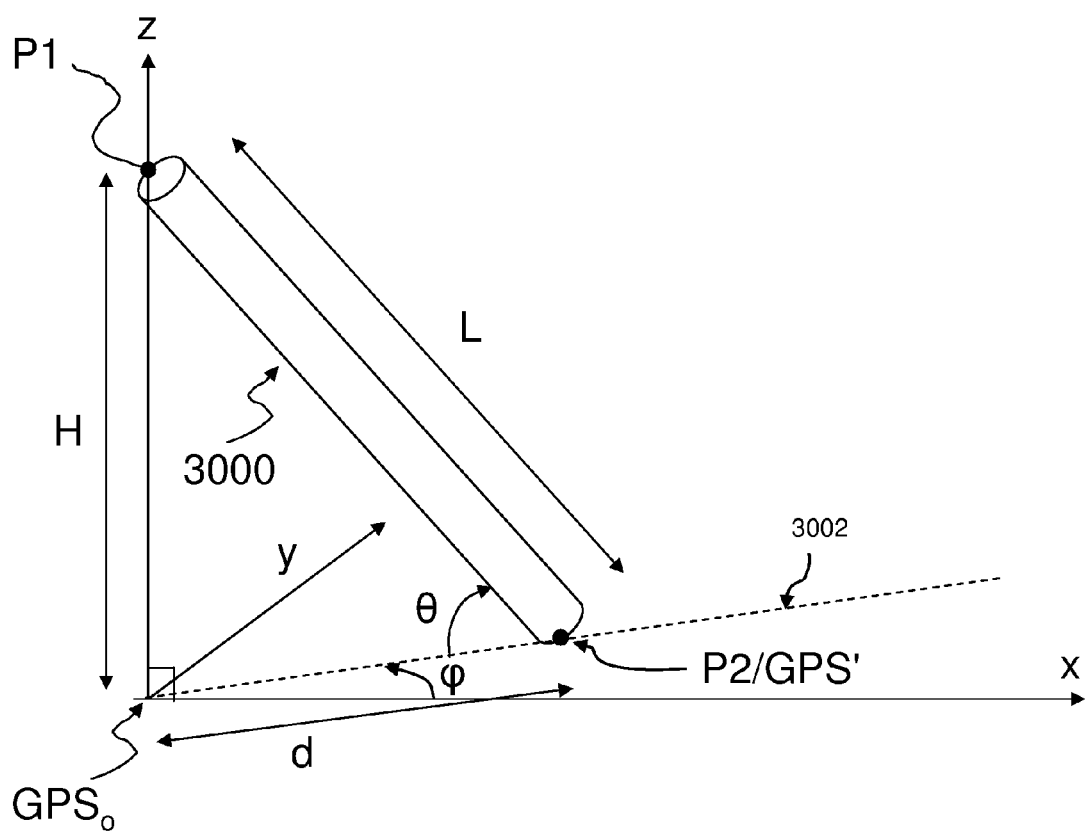
FIG. 28 is a schematic diagram illustrating a configuration for determining the difference in location between two points of a marking device.

To facilitate the following discussion, it is useful to first consider the physical configuration at issue for determining the location of the tip of the marking device when the location tracking system is located at or near the top of the marking device. For this purpose, the marking device may be represented in simplified form as an elongated rod or stick. FIG. 28 illustrates a perspective view of such a simplified representation of a marking device, shown as marking device 3000.

In FIG. 28, the x-y plane represents the ground and the z-direction represents the vertical direction perpendicular to the ground. The point P1 may be the location of a location tracking system (e.g., a GPS receiver), and in some embodiments may correspond generally to the top of the marking device, for example near where the technician may hold the marking device if it is a handheld device. The point P2 represents the point of interest of the marking device, and in this non-limiting example corresponds generally to the tip of the marking device. The point P2 may be assumed to be at ground level, i.e., in the x-y plane (z=0) for purposes of simplicity, except as described below in those embodiments in which the distance of P2 from the x-y plane may be measured. The shortest distance between P1 and P2 is given by L, which in some embodiments may correspond to the length of the marking device, although not all embodiments are limited in this respect. For example, if the marking device has a non-linear shape, the distance L may not correspond to the length of the marking device. The marking device 3000 may be projected onto the x-y plane (z=0) along the dashed line 3002, which therefore lies in the x-y plane. The distance between the points P1 and P2 in the x-y plane (i.e., along the dashed line 3002) is represented by d. The distance between the point P1 and ground is given by H (i.e., z=H). At any given time, the marking device may make an angle $\theta$ with respect to the x-y plane, i.e., with respect to ground in this non-limiting example. The projection of the marking device on the x-y plane, i.e., along the line 3002, may be at an angle $\phi$ in the x-y plane with respect to the x axis. In some embodiments, the x-axis may be defined to align with true North, although not all embodiments are limited in this respect.

According to one embodiment, a marking device, such as marking device 3000, may comprise a location tracking system at the point P1. The location tracking system may provide the geo-location of the point P1 with respect to the x-y plane, represented as $GPS_o$. The geo-location of P2 in the x-y plane may be represented by GPS'. As will be explained, GPS' may be determined based on a value of $GPS_o$ given by a location tracking system and determination of suitable combinations of L, d, H, $\theta$, and $\phi$. The value of L may be known before the marking operation begins, for example since it may be set after manufacture of the marking device. The values of d, H, $\theta$, and $\phi$ may be directly sensed during operation of the marking device or may be calculated using suitable ones of the operational sensors 1920, as will be described below.

According to one embodiment, the geo-location of the tip of a marking device, such as marking device 3000, may be determined using the value of $GPS_o$ given by the location tracking system at P1 and accelerometer data from an accelerometer positioned at or sufficiently near the tip of the marking device (i.e., at point P2 in FIG. 28). In this embodiment, it is assumed that the value of L is known or determined in any suitable manner. The accelerometer in this non-limiting embodiment is a 3-axis accelerometer. By suitable analysis of the acceleration values for each axis, using known algorithms, the angle $\theta$ that the marking device 3000 makes with the ground may be determined (see, e.g., the previous discussion of how to use an accelerometer as an inclinometer, as described by Shanghai Vigor Technology Development Co.). Based on the known distance L and the determined angle $\theta$, the distance d between $GPS_o$ and GPS' in the x-y plane may be calculated (using the fact that the cosine of $\phi$ is equal to d/L).

Once the distance d is known, the value of GPS' may be derived from $GPS_o$ if the angle $\phi$ is known, since $\phi$ may provide the direction from $GPS_o$ to GPS' (again, in some embodiments the x-axis may be aligned with, or taken as, true North, such that $\phi$ may represent an angle with respect to true North). The value of $\phi$ may be determined in one of several manners. One manner for determining $\phi$ is from the readout of a compass of the marking device, such as previously described compass 1924. If the location tracking system providing $GPS_o$ is a GPS receiver, then the value of $\phi$ may alternatively be taken from the heading information provided as part of the NMEA data stream provided by the GPS receiver. A third alternative for determining φ is to calculate a direction of motion based on multiple GPS points taken from the location tracking system. According to this third alternative, multiple GPS points taken at different times may be used to calculate a direction of motion by, for example, determining the direction indicated by a straight line connecting the multiple GPS points. Other methods for determining φ are also possible, as these are non-limiting examples. Once φ is known, the value of GPS' may then be determined from $GPS_o$, d and φ. Once GPS' is determined, it may be used instead of $GPS_o$ (or in addition to $GPS_o$) as more accurate geo-location data, which may be included, for example, in one or more event entries and/or electronic records as discussed above.

According to an alternative embodiment, the value of GPS' may be determined from a measured value of $GPS_o$ using an inclinometer on the marking device, such as inclinometer 1926, previously described. The inclinometer may provide the value of θ. In this embodiment, it is assumed that the value of L is known or determined in any suitable manner. Thus, the value of d may be determined using L and θ, as explained above. The value of φ may be determined in any suitable manner, for example using any of the techniques described above. The value of GPS' may then be determined from $GPS_o$, d, and φ, as noted above.

According to another embodiment, the value of GPS' may be determined from a measured value of $GPS_o$ using a proximity sensor, such as previously described proximity sensor 1930. In this embodiment, it is assumed that the value of L is known or determined in any suitable manner. The proximity sensor may be positioned at P1 and configured to measure the value of H. Assuming that the point P2 is at or very near the ground (i.e., having a vertical height of approximately zero), the value of H and the known distance L of the marking device may be used to determine d, for example using the Pythagorean theorem. The value of φ may be determined in any suitable manner, for example using any of the techniques described above. The value of GPS' may then be determined using $GPS_o$, d, and φ.

As explained, the above-described example, in which a single proximity sensor is used to determine the value of H, may provide suitable results when it is assumed that the point P2 has zero vertical height. In one embodiment, that assumption may be avoided by also including a proximity sensor at the point P2 and configured to measure the distance between P2 and the ground. Then, the difference in height between P1 and P2 (rather than the value of H) may be used in connection with the known distance L to determine the distance d (e.g., using the Pythagorean Theorem). The value of φ may be determined in any suitable manner, for example using any of the techniques described above. The value of GPS' may then be determined using $GPS_o$, d, and φ.

According to a further alternative embodiment, the value of GPS' may be determined from a measured value of $GPS_o$ using two 3-axis accelerometers on the marking device. One accelerometer may be located at the point P1 on the marking device, while the second may be located at the point P2. Using the techniques described in U.S. Patent Application Publication 2008/0255795, which is incorporated herein by reference in its entirety, the location of P2 relative to P1 may be determined.

As mentioned, in some instances it may be desirable to track the motion of a specific portion of a marking device, such as the tip of the marking device, for any one of the reasons previously described. In those embodiments in which the marking device includes a location tracking system providing a value of $GPS_o$ for a different point on the marking device than the point of interest, the tracking of the point of interest may be performed by determining GPS' (the location of the point of interest) for each value of $GPS_o$ as the marking device is moved using any of the above-described techniques.

However, in some instances, the value of $GPS_o$ provided by the location tracking system may not have sufficient accuracy to allow for a desired level of accuracy in tracking the motion at the desired point on the marking device (e.g., the point P2). For example, when performing a marking operation, a technician may make marking patterns that are relatively small compared to the resolution of the location tracking system. For example, the technician may make lines, arrows, write words, or make other patterns that have details smaller than the resolution of the location tracking system (e.g., smaller than approximately 30 inches in some embodiments). In such instances, using the above-described techniques for determining GPS' as the point P2 moves may not sufficiently capture the movement with a desired resolution. Thus, the techniques described below may be used.

According to one embodiment, the motion of the point P2 may be tracked by using any of the above-described techniques to get an initial value of GPS' and then using data from an accelerometer at the point P2 to determine the distance traveled in the x and y directions. This technique is commonly referred to in the relevant arts as "dead reckoning." In this embodiment, the accelerometer may provide acceleration data for the x and y axes. That data may be integrated twice to determine the total distance traveled in the x and y directions, thus giving the position of P2 at any point in time relative to any initial GPS' value. Alternatively, the accelerometer may output velocity data for each axis, which may be integrated to determine the total distance traveled in the x and y directions. A specific example is now described with respect to FIG. 29.

Figure 29:
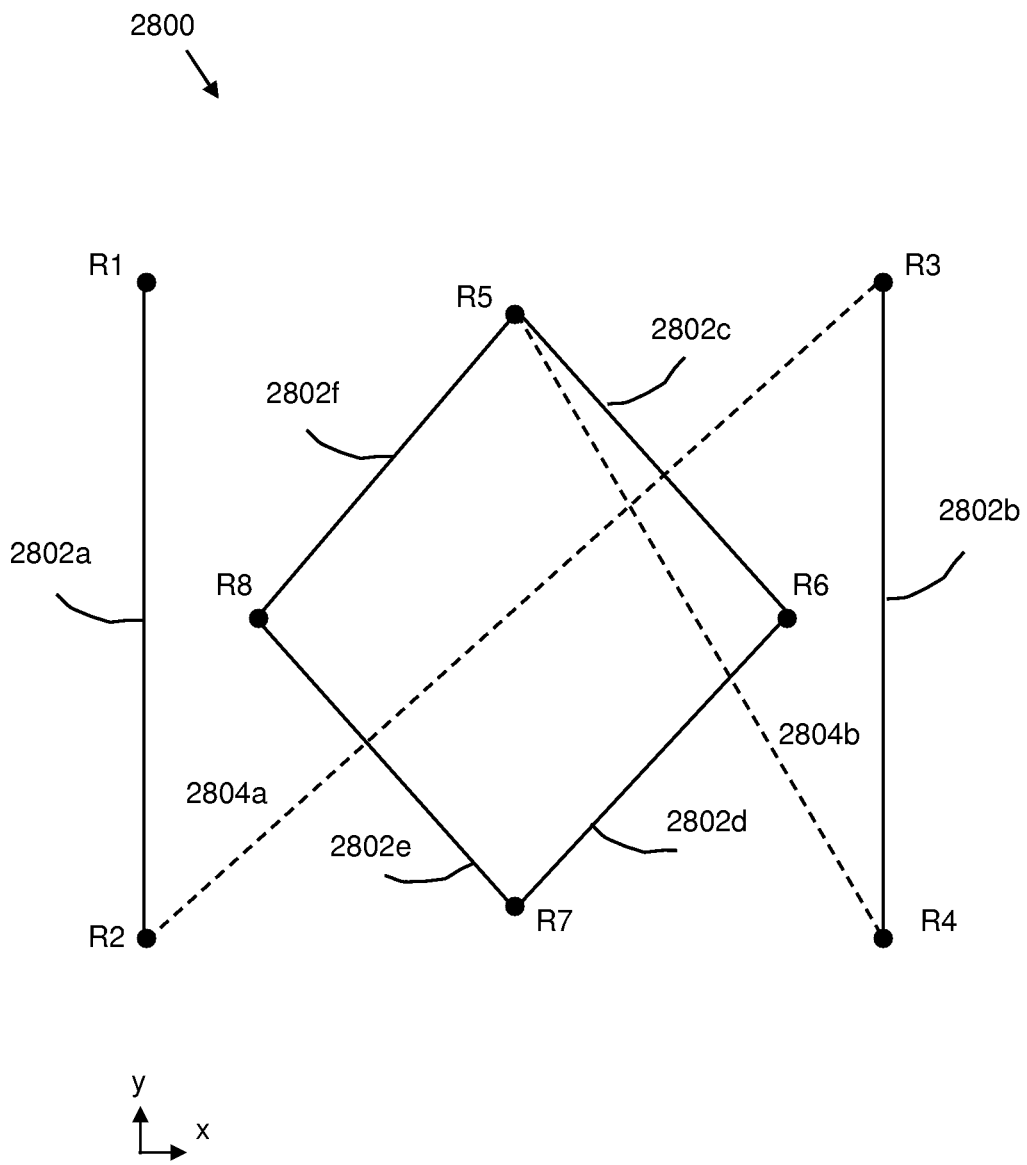
FIG. 29 illustrates a marking pattern that may be made by a technician using a marking device according to various of the embodiments described herein.

FIG. 29 illustrates a top view of a non-limiting example of a marking pattern 2800 that may be made by a technician using one of the marking devices described herein. The marking pattern 2800 comprises lines 2802a-2802f, which may be painted lines in those embodiments in which the marking material is paint. Those lines are represented in FIG. 29 as solid lines because they correspond to when the actuation system of the marking device (e.g., actuation system 120) is activated to dispense marking material. Lines 2804a and 2804b, described below, are shown as dashed lines because the actuation system is not actuated as the marking device traversed the paths indicated by those lines and therefore no paint was dispensed.

The making of the marking pattern 2800 by a marking device may be determined as follows. First, the technician may begin the marking pattern at the point R1, at which time the technician actuates the actuation system to begin dispensing marking material. The location of point R1 may correspond to the initial location of the tip of the marking device and therefore may be determined from a value of $GPS_o$ of the top of the marking device and any of the above-described techniques for determining the location of the tip relative to the location of the top of the marking device.

The technician may then begin to move the marking device along the path indicated by line 2802a, ending at the point R2. The motion of the tip of the marking device along line 2802a may be determined from the output of an accelerometer at the tip of the marking device, providing an output signal for both the x and y directions. According to one embodiment, the output of the accelerometer is velocity data for both the x and y axes, and is output periodically, for example twice per second, although higher and lower data output rates are possible. The velocity values for each of the x and y axes may be multiplied by the time duration between samples of the accelerometer (e.g., one-half of a second in this non-limiting example) to get the distance traveled in the x and y directions from the initial point R1. Alternatively, the total velocity of the marking device may be multiplied by the time duration between samples of the accelerometer, and the direction of motion may be determined by comparing the velocity values for the x and y axes to each other, e.g., by taking the ratio of the velocity along the x-axis to the velocity along the y-axis. Either way, the distance traveled in the x and y directions may be determined.

In the non-limiting example of FIG. 29, the first line painted by the technician, i.e., line 2802a, may serve as a base line or reference line, from which the angle of subsequent motions may be referenced. Thus, in FIG. 29, the angle of the second motion of the technician, from points R2 to R3 along the path indicated by line 2804a may be determined by reference to the direction of line 2802a since the accelerometer output will indicate a change from the motion along the path of line 2802a. The distance and direction of the line 2804a may be determined as described above for line 2802a. Again, the line 2804a is shown as a dashed line, as the actuation system of the marking device is not activated while the marking device traverses the illustrated path.

The marking device is subsequently moved along line 2802b (from point R3 to R4), then along line 2804b (from point R4 to R5), then along line 2802c (from point R5 to R6), along line 2802d (from point R6 to R7), along line 2802e (from point R7 to R8), and finally along line 2802f (from point R8 back to point R5). The length and relative direction of each of the indicated lines may be determined as described above for line 2802a.

Thus, it should be appreciated that according to this non-limiting embodiment, a value of $GPS_o$ provided by a location tracking system is used only to determine the initial location of R1, after which the locations of points R2-R8 are determined using dead reckoning.

Also, it should be appreciated that while the relative orientation of each of the indicated lines is determined from the dead reckoning techniques described, the absolute, or actual, orientation is not determined from the accelerometer data since the actual orientation of line 2802a is not determined from the accelerometer data. Thus, according to one embodiment an additional step of determining an actual orientation of the line 2802a may be performed. According to one non-limiting embodiment, the actual orientation of line 2802a may be given by a heading provided by a compass of the marking device while the line 2802a is made. Other techniques may alternatively be used to determine the actual direction of the first motion of the marking pattern.

According to the above-described embodiment, the location of the tip of a marking device may be determined by determining an initial location using a location tracking system and subsequently using the dead reckoning techniques described. Because the error associated with dead reckoning may increase as the distance traversed increases, it may be desirable in some embodiments to "reset" the dead reckoning by determining a new initial location value using a location tracking system. For example, referring to the marking pattern 2800, in one embodiment the location of R1 may be determined from a value of $GPS_o$ given by a location tracking system and any of the techniques described for determining a value of GPS' for the given $GPS_o$. Subsequently, dead reckoning may be used to determine the paths of lines 2802a, 2804a, 2802b, and 2804b. According to one embodiment, the location of point R5 is not determined from dead reckoning, but rather may be determined by getting a value of $GPS_o$ at the point R5 and calculating a corresponding value of GPS'. Then, dead reckoning may be used to determine the locations of lines 2802c-2802f. In this manner, location errors that accumulate using dead reckoning may be minimized or eliminated.

Accordingly, it should be understood that a new initial location point serving as a starting point for the use of dead reckoning may be set at any suitable intervals during a marking operation. Suitable criteria for determining when to set a new initial location point for the use of dead reckoning include setting a new initial point for the beginning of each new mark that a technician makes (e.g., each new line, arrow, letter, etc.), for each new marking pattern (e.g., a dotting pattern, a lines pattern, etc.), for each new marking job, or every time the dead reckoning data indicates a threshold total distance has been traveled (e.g., 5 meters, 10 meters, 50 meters, or any other threshold value). This list is not exhaustive, as other criteria may also be used to determine when to set a new initial location point for the use of dead reckoning.

XI. ENHANCED USER INTERFACE

According to one aspect of the present invention, a marking device may include an enhanced user interface with tactile functionality. As will be described, the tactile functionality may be provided in one or more of various locations on the marking device, and may be used for various purposes.

Figure 30:
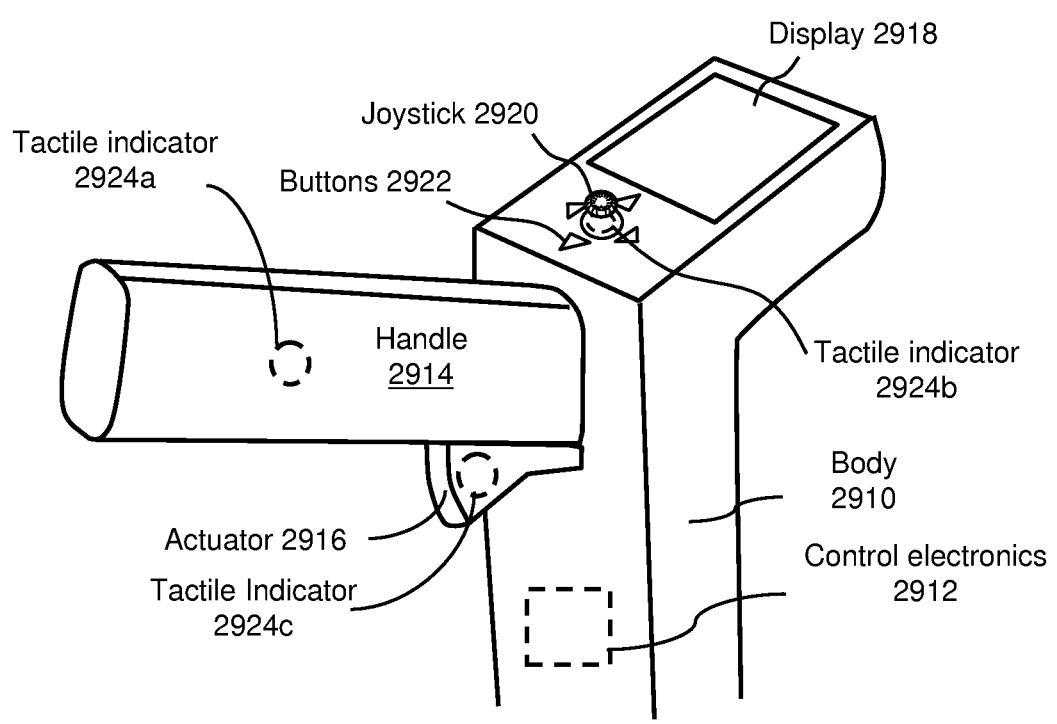
FIG. 30 illustrates a portion of a marking device including tactile indicators, according to one embodiment of the present invention.

FIG. 30 illustrates an example of a portion of a marking device 2900 including multiple tactile indicators for providing a tactile indication to a technician using the marking device. The marking device 2900 may be a marking device according to any of the embodiments previously described herein. The marking device 2900 includes a body 2910, control electronics 2912, a handle 2914 and an actuator 2916. In addition, the marking device 2900 includes a user interface including a display 2918, a joystick 2920, and arrow selection buttons 2922. As compared to the user interfaces of the marking devices previously described, the user interface of the marking device 2900 also includes three tactile indicators, 2924a-2924c, which may alternatively be referred to as vibrating devices or vibrators.

The tactile indicator 2924a is disposed within or on the handle 2914 of the marking device 2900, or otherwise mechanically coupled to the handle 2914. The tactile indicator 2924b is disposed within or on the joystick 2920, or is otherwise mechanically coupled to the joystick 2920. The tactile indicator 2924c is disposed within or on the actuator 2916, or otherwise mechanically coupled to the actuator 2916. It should be appreciated that marking devices including tactile indicators according to the embodiments described herein are not limited to having any particular number of tactile indicators (i.e., one or more) and are not limited in the locations at which the tactile indicators are placed.

The tactile indicators may be of any suitable type. One example of a suitable type of tactile indicator is that used in cellular telephones to provide the "vibrate" functionality. According to one embodiment, one or more of the tactile indicators is formed by a flywheel that has a weight configured to unbalance the flywheel, so that when the flywheel spins it wobbles. According to one embodiment, all three of the tactile indicators are the same type, although not all embodiments are limited in this respect.

The tactile indicators 2924a-2924c may provide any suitable type of tactile indication to a technician, in terms of duration, frequency, intensity, pattern, and any combinations thereof. Also, the tactile indicators 2924a-2924c need not provide the same type of tactile indication. For example, tactile indicator 2924a may provide a relatively strong, continuous vibration of long duration, whereas tactile indicator 2924*b* may provide a series of low intensity, short vibrations. Furthermore, one or more of the tactile indicators may be configurable to provide multiple different types of tactile indications. For example, in some instances the tactile indicator 2924*a* may provide a long, continuous vibration, whereas in other instances the tactile indicator 2924*a* may provide a short vibration. Thus, the type(s) of tactile indication presented by the tactile indicators is not limiting.

According to one embodiment, the tactile indications provided to a user may have different meanings. According to one embodiment, the meaning may differ depending on the tactile indicator providing the tactile indication. For example, vibration of the tactile indicator 2924*a* may indicate the marking device power supply is low, while vibration of the tactile indicator 2924*b* may indicate the technician has tried to select an invalid entry for a menu displayed on display 2918, and vibration of the tactile indicator 2924*c* may indicate that the actuator 2916 is not functioning. According to one embodiment, different meanings may be conveyed by a single tactile indicator. For example, a short vibration of tactile indicator 2924*a* may indicate the marking device power supply is low, while a longer duration vibration of tactile indicator 2924*a* may indicate, for example, that the marking device is not at the correct job location, for example as may be determined by a location tracking system of the marking device. Thus, it should be appreciated that the tactile indicators may be used to convey various messages to the technician.

According to one aspect of the present invention, one or more of the tactile indicators 2924*a*-2924*c* may operate in response to information collected by an environmental sensor and/or operational sensor of the marking device. For example, as described above (e.g., in connection with FIG. 25), some embodiments of the present invention provide an alert or notification to the marking device technician if an out-of-tolerance condition is detected based on a condition sensed by an environmental or operational sensor. As explained, the alerts may take any suitable form including visual and/or audible. In addition, or alternatively, the alerts may be presented via one or more of the tactile indicators. For example, the tactile indicator 2924*c* may vibrate if an out-of-tolerance condition is detected that would be adverse to dispensing of a marking material, and therefore adverse to operation of the actuator 2916.

According to one embodiment, the nature of operation of each of the tactile indicators in FIG. 30, in terms of what triggers vibration of the tactile indicator, the type of vibration (intensity, duration, frequency, pattern, etc.), and the meaning may be controlled by the control electronics 2912. For example, the nature of operation of each of the tactile indicators may be programmed into a processor of the control electronics (e.g., similar to processor 118, previously described).

In one example, the tactile sensations programmed for tactile indicator 2924*a* may be associated with the general operation of marking device 2900 and/or aspects of the marking operations. In other words, conditions associated with the general operation of marking device 2900 and/or aspects of the marking operations are communicated to the user via tactile sensations at handle 2914. In this example, tactile sensations provided at handle 2914 may be used to indicate any events that may occur on and/or any conditions of the marking device. Examples of tactile sensations that are provided at handle 2914 by tactile indicator 2924*a* may include, but are not limited to, the following:

1. when powering on the marking device, a certain tactile sensation may indicate the start of the boot cycle, followed by a "ready" tactile sensation;
2. a certain tactile sensation may indicate the status of certain calibration processes and/or testing processes of components of the marking device. This status may be indicated during or just following the boot cycle. Additionally, this status may be indicated at any time during the operation of the marking device that any component falls out of calibration;
3. a certain tactile sensation may indicate that marking dispenser is installed and has been read successfully;
4. a certain tactile sensation may indicate a change in connectivity of the marking device to a network (e.g., dropped or gained WiFi connectivity);
5. a certain tactile sensation may indicate a change in GPS connectivity (e.g., dropped or gained);
6. certain tactile sensations may indicate that the battery power (e.g., power supply 114) is below certain capacities (e.g., 75%, 50%, 25% capacity);
7. a certain tactile sensation may indicate that the marking device is not oriented correctly (e.g., at the wrong angle); and
8. any combinations thereof.

In one embodiment, the tactile sensations programmed for tactile indicator 2924*b* at the joystick 2920 may be associated with user interface functions. In other words, when the user is using the joystick or buttons to navigate through menus on display 2918, tactile feedback to the user at the joystick 2920 may be used to communicate, for example, a validation of certain selections or user interface functions. Examples of tactile sensations that may be provided at joystick 2920 via tactile indicator 2924*b* may include, but are not limited to, the following:

1. a certain tactile sensation may be provided when moving from option to option of a menu of the display 2918;
2. certain tactile sensations may indicate the selection of different options of a menu of the display 2918. For example:
   a. a certain tactile sensation may indicate a job started selection and/or job stopped selection;
   b. a certain tactile sensation may indicate that landmark mode was selected as well as a certain type of landmark selected;
   c. a certain tactile sensation may indicate that Bluetooth® communication is enabled and/or disabled;
   d. a certain tactile sensation may indicate that an invalid option has been selected. For example, the user has selected a gas landmark, but no gas facility is indicated on the current locate operation work order; or that the user has selected a gas landmark, but the marking material color installed in the marking device does not correspond to gas; and
3. any combinations thereof.

In one embodiment, the tactile sensations programmed for tactile indicator 2924*c* at actuator 2916 may be associated with the process of dispensing marking material. In other words, conditions associated with dispensing marking material from a marking dispenser may be communicated to the user via tactile sensations at actuator 2916. Examples of tactile sensations that may be provided at actuator 2916 via tactile indicator 2924c may include, but are not limited to, the following:
1. when the user presses actuator 2916, a certain tactile sensation may indicate that no marking material is installed in the marking device;
2. when the user presses actuator 2916, a certain tactile sensation may indicate that the wrong color marking material is installed in the marking device. For example, blue marking material is installed, but no water facility is indicated on the current locate operation work order;
3. when the user presses actuator 2916, a certain tactile sensation may indicate an out of (or low) marking material condition;
4. a certain tactile sensation at actuator 2916 may be used to prompt the user to activate actuator 2916 to dispense marking material; and
5. any combinations thereof.

Tactile sensations may also be generated based on information received from one or more sources external to the marking device, such as, but not limited to, external systems, external networks, external computing devices, external business applications, and external instrumentation, among others. For example, the marking device (e.g., marking device 2900) may be in communication with one or more external devices, such as remote computer 150, via a network. The network may be, for example, a local area network (LAN) and/or a wide area network (WAN). The control electronics 2912 may be programmed to generate tactile sensations via one or more of tactile indicators 2924a-2924c based on information received from the remote computer 150.

Thus, further examples of scenarios which may trigger generation of a tactile sensation via any one or more of the tactile indicators 2924a-2924c may include, but are not limited to, the following:
1. the marking device may receive workflow information and/or a checklist with respect to performing locate operations according, for example, to U.S. patent application Ser. No. 12/703,809, entitled "Marking Apparatus Equipped with Ticket Processing Software for Facilitating Marking Operations, and Associated Methods," filed Feb. 11, 2010, which application is hereby incorporated by reference. A certain tactile sensation may be generated to indicate compliance and/or non-compliance with the workflow and/or checklist;
2. the marking device may receive standard operating procedure (SOP) information with respect to performing locate operations according to, for example, the Best Practices Version 6.0 document, published in February 2009 by the Common Ground Alliance (CGA) of Alexandria, Va. (www.commongroundalliance.com) and/or the Recommended Marking Guidelines For Underground Utilities as endorsed by the National Utility Locating Contractors Association (NULCA) of North Kansas City, Mo. A certain tactile sensation may be generated to indicate compliance and/or non-compliance with the SOP information;
3. the marking device may receive wage and hour information with respect to performing locate operations according to, for example, the wage and hour guidelines of one or more regulatory bodies, such as federal, regional, state, and/or local wage and hour guidelines. For example, a certain tactile sensation may be generated to indicate compliance and/or non-compliance with the wage and hour guidelines. Also, a certain tactile sensation may be generated to indicate, for example, that it is time for a required break, it is time for lunch, it is the end of the day, the employee is now in overtime mode for the week, etc.;
4. the marking device may receive quality assessment information with respect to performing locate operations according to, for example, a quality assessment application of the locate company. A certain tactile sensation may be generated to indicate that the locate operation has passed and/or failed the locate company's quality assessment process;
5. the marking device may receive VWL information with respect to the current locate operation work order according to, for example, the VWL application that is described with in U.S. Patent Application Publication No. 20090238417, entitled "Virtual white lines for indicating planned excavation sites on electronic images;" that is incorporated by reference herein in its entirety. A certain tactile sensation may be generated to indicate that the locate operation is being performed inside and/or outside of the boundaries of the associated VWL;
6. the marking device may receive facilities maps information with respect to the current locate operation work order. A certain tactile sensation may be generated to indicate that the locate operation is approaching the location of a certain facility that is indicated on the facilities maps associated with the current locate operation work order. Also, a tactile sensation may be generated to indicate that certain types of facilities being located do not match the types of facilities indicated on the facilities maps;
7. the marking device may receive information about prior locate operations (e.g., historical work order information) with respect to the location of the current locate operation. A certain tactile sensation may be generated to indicate that the locate operation is approaching the location of a certain facility that is indicated in the historical information that is associated with the current locate operation work order. Also, a tactile sensation may be generated to indicate that certain types of facilities being located do not match the types of facilities indicated by the historical locate information.

It should be appreciated that information about the generation of a tactile signal may be included in an electronic record, a message, or any other source of information including the other marking information described herein. For example, information about whether a tactile signal was generated, which tactile indicator generated the signal, the type of signal (e.g., duration, frequency, intensity, etc.), the cause of the signal, the time of the signal (e.g., from a timestamp), and/or the geo-location at which the signal was issued, may be recorded, among other things.

Table 22 illustrates an example of an event entry that may be made in response to actuation of an actuation system of a marking device, in which the marking device includes a tactile indicator. The illustrated event entry is similar to that of Table 15, shown and described previously, with the addition of an indication of whether a tactile signal was generated (e.g., a "yes" or "no" indication being represented by "Y" and "N" for "TCTL"). As in Table 15, for purposes of this event format, the actuator is deemed to have three possible states, i.e., PRESSED, HELD and RELEASED. Marking information from one or more input devices/other components of the marking device is recorded with these events to provide information about the job in progress.

TABLE 22

| | |
|---|---|
| Format | INFO+ WPTR: (DATE) (TIME) (GPS data) (PAINT info) (TRIGGER SWITCH STATE) (AMB TEMP info) (SURF TEMP info) (HUM info) (LIGHT info) (IMAGE info) (AUDIO info) (OP TEMP info) (COMPASS info) (INCL info) (ACC1 info) (ACC2 info) (YAW info) (PROX info) (DH1 info) (DH2 info) (TACTILE INDICATION info)<CR><LF> |
| Examples | INFO+WPTR: DATE(2008-12-07) TIME(09:35:15)<br>GPS($GPGGA, 120443, 4807.038, N, 01131.000, E, 1, 08, 0.9, 545.4, M, 46.9, M,, *47)<br>CLR(RED) SWCH(PRESSED) AMB TEMP(73F) SURF TEMP(78F) HUM(31)<br>LIGHT(1500) IMAGE(Y) AUDIO(Y) OP TEMP(97F) COMPASS(243) INCL(−40)<br>ACC1(.285) ACC2(!) YAW(!) PROX(15) DH1(67) DH2(!) TCTL(Y) <CR><LF><br>INFO+WPTR: DATE(2009-04-15) TIME(12:04:45)<br>GPS($GPGGA, 120445, 4807.038, N, 01131.000, E, 1, 08, 0.9, 545.4, M, 46.9, M,, *47)<br>CLR(RED) SWCH(HELD) AMB TEMP(73F) SURF TEMP(78F) HUM(31) LIGHT(1500)<br>IMAGE(Y) AUDIO(Y) OP TEMP(97F) COMPASS(243) INCL(−40) ACC1(.285) ACC2(!)<br>YAW(!) PROX(15) DH1(67) DH2(!) TCTL(Y) <CR><LF><br>INFO+WPTR: DATE(2009-04-15) TIME(12:04:46)<br>GPS($GPGGA, 120446, 4807.038, N, 01131.000, E, 1, 08, 0.9, 545.4, M, 46.9, M,, *47)<br>CLR(RED) SWCH(RELEASED) AMB TEMP(73F) SURF TEMP(78F) HUM(31)<br>LIGHT(1500) IMAGE(Y) AUDIO(Y) OP TEMP(97F) COMPASS(243) INCL(−40)<br>ACC1(.285) ACC2(!) YAW(!) PROX(15) DH1(67) DH2(!) TCTL(N) <CR><LF> |

Table 23 illustrates an example of a data record that may be generated by a marking device including a tactile indicator, as well as various environmental and operational sensors. As shown, the data record may include a "yes/no" indication of whether a tactile signal was generated, as well as information about the type of signal. It should be appreciated that other forms for the data are possible and that other information regarding the tactile indicator may be included, such as any of the types of information described above.

TABLE 23

Example record of data acquired by marking device 2900 upon actuation

| Record # act-1 | Service provider ID | 0482 |
|---|---|---|
| | User ID | 4815 |
| | Device ID | 7362 |
| | timestamp data | 12-Jul-2008; 09:35:15.2 |
| | Geo-location data | 2650.9256, N, 08003.5234, W |
| | Product data | Color = Red, Brand = ABC |
| | Locate request data | Requestor: XYZ Construction Company, Requested service address: 222 Main St, Orlando, FL |
| | Temperature (° F.) | 75 |
| | Humidity (%) | 76 |
| | Heading (degrees) | 243 |
| | Inclination (degrees) | 25 |
| | Acceleration (g) | 0.75 |
| | Yaw rate (degrees/sec) | 10 |
| | Distance (cm) | 15 |
| | Pressure (psi) | 44 |
| | Image captured (Y/N) | Y |
| | Audio captured (Y/N) | N |
| | Tactile signal (Y/N) | Y |
| | Type of Tactile signal | Repeating vibration; duration 3 seconds |

In those embodiments in which a marking device includes both a tactile indicator and at least one accelerometer, data from the accelerometer(s) may be used to verify whether a tactile indication was generated, as the accelerometer data may reflect any physical movement of the marking device, including the physical vibrations caused by a tactile indicator. Thus, referring again to Table 23, for example, the acceleration data may provide verification that the indicated tactile signal was in fact generated.

It should be appreciated that many of the aspects of the present invention described above also apply to a combination locate and marking device. As explained, a locate receiver is a device typically used to locate an underground facility, after which the location may be marked using a marking device of the types described herein. According to one embodiment, a single device may perform the function of a locate receiver and a marking device, and thus may be a combination locate and marking device, as described in U.S. patent application Ser. No. 12/569,192, filed on Sep. 29, 2009 and titled "Methods, Apparatus, and Systems For Generating Electronic Records Of Locate And Marking Operations, And Combined Locate And Marking Apparatus For Same," which is hereby incorporated herein by reference in its entirety. The various aspects described herein relating to marking devices may also apply to such combination locate and marking devices as those described in U.S. patent application Ser. No. 12/569,192.

XII. CONCLUSION

As discussed herein, a wide variety of information/data may be acquired and analyzed in connection with marking operations, for a variety of purposes. The data of interest that may be acquired and analyzed may include, but is not limited to, t1 timestamp data, t2 timestamp data, geo-location information of physical locate marks, geo-location information of environmental landmarks, direction information, any information included in the standard data stream of the locate tracking system (e.g., GPS system), color/type of marking material, amount of marking material in marking dispenser, serial number of marking dispenser (e.g., barcode, RFID), ID information (e.g., individual, vehicle, wage and/or hour compliance), battery status of the marking device, angle of spray of marking material (e.g., using an inclinometer), wired/wireless connection status, Bluetooth® signal strength, storage capacity of the local memory, temperature, humidity, light level, movement of the marking device, mode of operation of the marking device, docking state of the marking device (e.g., docked/undocked, charging/not charging), alerts against expectations in performance (e.g., compare amount and/or type of marking material sprayed against facility maps), and any combination thereof.

The information, such as shown in various tables herein, that may be acquired by use of the data acquisition system and methods described herein, may be used for any purpose. In an embodiment, the information of the data acquisition system may be analyzed against expected marking operations in order to gain benefits in, for example, operating efficiency, personnel management, inventory management, quality control, training operations, safety, customer satisfaction, and the like.

Additionally, the information that is acquired by use of the data acquisition system and the methods of the present disclosure may be correlated to other aspects of locate and marking operations. For example, the marking device data streams (e.g., respective event entries or one or more electronic records transmitted by the marking device) may be correlated to other data streams of multiple marking devices or any other devices in order to aggregate, assess, evaluate, draw insights from, take action on this information, and any combination thereof. Correlating disparate data streams may be useful in order to better interpret and/or gain new interpretations that are useful. For example, by analyzing the aggregated data, field service providers may gain visibility into the distributed workforce, may take corrective and/or any other constructive action to improve process management, may improve and/or develop best practices, and any combination thereof. In an embodiment, certain trends may be identified by correlating historical records of the amount of time that is spent performing locate and marking operations to other information, such as, but not limited to, the time of day, time of year, address of the locate site, experience of the locate technician, weather conditions, heavy or light traffic times, and the like.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

The various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory or tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A marking apparatus for performing a marking operation to indicate a presence or an absence of at least one underground facility, the marking apparatus comprising:
 a hand-held housing;
 a holder configured to hold to the hand-held housing at least one marking dispenser containing a marking material;
 a location tracking system mechanically coupled to the hand-held housing and configured to determine a location of the apparatus;
 at least one processor communicatively coupled to the location tracking system; and
 at least one input device communicatively coupled to the at least one processor, configured to sense at least one operating condition of the apparatus, and provide an output signal to the at least one processor indicative of the sensed at least one operating condition,
 wherein the at least one input device includes at least one of:
  an inclinometer configured to sense a degree of inclination of the marking apparatus;
  a compass configured to sense a heading of the marking apparatus;
  a proximity sensor configured to sense a distance between the marking apparatus and a target surface for the marking material;
  a yaw rate sensor configured to sense a yaw rate of the marking apparatus;
  a first accelerometer disposed at a first position on the marking apparatus and a second accelerometer disposed at a second position on the marking apparatus;
  a pressure sensor configured to sense a pressure applied to the marking apparatus;
  an audio recorder configured to sense an acoustic signal emitted by the at least one marking dispenser; and
  an image capture device.

2. The apparatus of claim 1, wherein the at least one input device comprises the inclinometer and wherein the at least one operating condition is the degree of inclination of the marking apparatus.

3. The apparatus of claim 1, further comprising a marking material detection mechanism communicatively coupled to the at least one processor to provide a second output signal to the at least one processor.

4. The apparatus of claim 1, wherein the at least one input device comprises the compass and wherein the at least one operating condition is the heading of the marking apparatus.

5. The apparatus of claim 1, wherein the at least one input device further includes a temperature sensor and wherein the at least one operating condition is a temperature of the at least one processor.

6. The apparatus of claim 1, wherein the at least one input device further includes a temperature sensor and wherein the at least one operating condition is a temperature internal to the hand-held housing.

7. The apparatus of claim 1, wherein the at least one input device is the proximity sensor and the at least one operating condition is the distance between the marking apparatus and a target surface for the marking material.

8. The apparatus of claim 7, wherein the distance between the apparatus and a target surface is a distance between the location tracking system and physical ground.

9. The apparatus of claim 7, wherein the distance between the apparatus and a target surface is a distance between a tip of the apparatus and a surface on which marking material is to be dispensed.

10. The apparatus of claim 1, wherein the at least one input device is the yaw rate sensor and wherein the at least one operating condition is the yaw rate of the marking apparatus.

11. The apparatus of claim 1, wherein the at least one input device is the first accelerometer and the second accelerometer and wherein the at least one operating condition is an acceleration of the marking apparatus.

12. The apparatus of claim 11, wherein at least one of the first accelerometer and the second accelerometer is a three-axis accelerometer and wherein the at least one operating condition is a respective acceleration for each of the three axes.

13. The apparatus of claim 11, wherein at least one of the first accelerometer and the second accelerometer is a three-axis accelerometer and wherein the at least one operating condition is a combined acceleration for all three axes.

14. The apparatus of claim 11, wherein the first accelerometer is disposed proximate a tip of the apparatus and the second accelerometer is disposed proximate the location tracking system.

15. The apparatus of claim 11, wherein the first accelerometer is disposed proximate a tip of the apparatus and the second accelerometer is disposed proximate a top of the apparatus.

16. The apparatus of claim 1, wherein the at least one input device comprises the pressure sensor and wherein the at least one operating condition is a pressure applied to at least a portion of the hand-held housing.

17. The apparatus of claim 16, wherein the hand-held housing includes a handle, and wherein the at least one operating condition is a pressure applied to the handle.

18. The apparatus of claim 16, wherein the hand-held housing includes a trigger, and wherein the at least one operating condition is a pressure applied to the trigger.

19. The apparatus of claim 18, wherein the trigger forms at least part of an actuation mechanism configured to control dispensing of the marking material.

20. The apparatus of claim 1, wherein the at least one input device includes a device health sensor and wherein the at least one operating condition is indicative of an operating state of at least one component of the apparatus.

21. The apparatus of claim 1, wherein the at least one input device comprises the audio recorder and wherein the at least one operating condition is the acoustic signal emitted by the at least one marking dispenser.

22. The apparatus of claim 21, further comprising a microphone coupled to the audio recorder and configured to detect the acoustic signal and provide an analog representation of the acoustic signal to the audio recorder.

23. The apparatus of claim 1, wherein the at least one input device comprises the image capture device.

24. The apparatus of claim 23, wherein the at least one operating condition is a condition of the marking material dispensed by the apparatus, and wherein the output signal forms at least part of an image of dispensed marking material.

25. The apparatus of claim 24, wherein the image capture device is further configured to provide to the at least one processor at least one output signal indicative of an operating state of the image capture device.

26. The apparatus of claim 23, wherein the at least one operating condition is an operating state of the image capture device.

27. The apparatus of claim 26, wherein the operating state of the image capture device is a mode of operation of the image capture device.

28. The apparatus of claim 1, wherein the at least one processor is mechanically coupled to the at least one housing.

29. The apparatus of claim 1, wherein the at least one processor is disposed within the hand-held housing.

30. A method for performing a marking operation to mark a presence or absence of at least one underground facility using a marking device, the method comprising:
A) dispensing, via actuation of an actuation system of the marking device, marking material onto a target surface;
B) detecting, via a location tracking system, a location of the marking device;
C) detecting, via at least one input device of the marking device, at least one operating condition of the marking device, wherein the at least one input device includes at least one of:
an inclinometer configured to sense a degree of inclination of the marking apparatus;
a compass configured to sense a heading of the marking apparatus;
a proximity sensor configured to sense a distance between the marking apparatus and the target surface;
a yaw rate sensor configured to sense a yaw rate of the marking apparatus;
a first accelerometer disposed at a first position on the marking apparatus and a second accelerometer disposed at a second position on the marking apparatus;
a pressure sensor configured to sense a pressure applied to the marking apparatus;
an audio recorder configured to sense an acoustic signal emitted by the at least one marking dispenser; and
an image capture device; and
D) logging into local memory of the marking device marking information relating at least in part to A), B), and C).

31. The method of claim 30, wherein C) comprises detecting the degree of inclination of the marking device.

32. The method of claim 30, further comprising E) detecting, via a marking material detection mechanism of the marking device, at least one characteristic of the marking material.

33. The method of claim 30, wherein C) comprises detecting the heading of the marking device.

34. The method of claim 30, wherein C) comprises detecting a temperature of a processor of the marking device.

35. The method of claim 30, wherein the marking device includes a hand-held housing in which the local memory is disposed, and wherein C) comprises detecting a temperature internal to the hand-held housing.

36. The method of claim 30, wherein C) comprises detecting the distance between the marking device and the target surface.

37. The method of claim 36, wherein detecting a distance between the marking device and the target surface comprises detecting a distance between the location tracking system and physical ground.

38. The method of claim 36, wherein detecting a distance between the marking device and the target surface comprises detecting a distance between a tip of the marking device and a surface on which marking material is to be dispensed.

39. The method of claim 30, wherein C) comprises detecting the yaw rate of the marking device.

40. The method of claim 30, wherein C) comprises detecting an acceleration of the marking device.

41. The method of claim 40, wherein detecting an acceleration of the marking device comprises detecting a respective acceleration along each of three axes of the marking device.

42. The method of claim 40, wherein detecting an acceleration of the marking device comprises detecting a combined acceleration along three axes of the marking device.

43. The method of claim 40, wherein detecting an acceleration of the marking device comprises detecting an acceleration of a first point of the marking device and detecting an acceleration of a second point of the marking device.

44. The method of claim 43, wherein the first point of the marking device corresponds to a tip of the marking device and wherein the second point of the marking device corresponds to a position of the location tracking system.

45. The method of claim 43, wherein the first point of the marking device corresponds to a tip of the marking device and wherein the second point of the marking device corresponds to a top of the marking device.

46. The method of claim 30, wherein the marking device includes a hand-held housing and wherein C) comprises detecting a pressure applied to at least a portion of the hand-held housing.

47. The method of claim 46, wherein the hand-held housing includes a handle, and wherein detecting a pressure applied to at least a portion of the hand-held housing comprises detecting a pressure applied to the handle.

48. The method of claim 46, wherein the hand-held housing includes a trigger, and wherein detecting a pressure applied to at least a portion of the hand-held housing comprises detecting a pressure applied to the trigger.

49. The method of claim 30, wherein C) comprises detecting a condition indicative of whether a component of the marking device is operating correctly.

50. The method of claim 30, wherein C) comprises detecting the acoustic signal generated by dispensing of the marking material in A).

51. The method of claim 30, wherein C) comprises acquiring data from the image capture device.

52. At least one computer readable storage medium storing processor-executable instructions which, when executed by at least one processor, perform a method for facilitating a marking operation to mark a presence or absence of at least one underground facility using a marking device, the method comprising:

A) detecting, via a location tracking system, a location of the marking device;

B) detecting, via at least one input device of the marking device, at least one operating condition of the marking device, wherein the at least one input device includes at least one of:
- an inclinometer configured to sense a degree of inclination of the marking apparatus;
- a compass configured to sense a heading of the marking apparatus;
- a proximity sensor configured to sense a distance between the marking apparatus and a target surface for the marking material;
- a yaw rate sensor configured to sense a yaw rate of the marking apparatus;
- a first accelerometer disposed at a first position on the marking apparatus and a second accelerometer disposed at a second position on the marking apparatus;
- a pressure sensor configured to sense a pressure applied to the marking apparatus;
- an audio recorder configured to sense an acoustic signal emitted by the at least one marking dispenser; and
an image capture device; and C) logging into local memory of the marking device marking information relating at least in part to A) and B).

* * * * *